United States Patent [19]

Quernemoen et al.

[11] Patent Number: 4,484,270
[45] Date of Patent: Nov. 20, 1984

[54] CENTRALIZED HARDWARE CONTROL OF MULTISYSTEM ACCESS TO SHARED AND NON-SHARED SUBSYSTEMS

[75] Inventors: John M. Quernemoen, New Brighton; Timothy R. Voltz, St. Paul; Richard P. Campbell; Joseph G. Kriscunas, both of Blaine, all of Minn.

[73] Assignee: Sperry Corporation, New York, N.Y.

[21] Appl. No.: 395,936

[22] Filed: Jul. 7, 1982

[51] Int. Cl.³ .............................................. G06F 15/16
[52] U.S. Cl. .................................................... 364/200
[58] Field of Search .......................... 364/200 MS File

[56] References Cited

U.S. PATENT DOCUMENTS 4,000,487 12/1976 Patterson et al. .................. 364/200

Primary Examiner—Raulfe B. Zache
Attorney, Agent, or Firm—Charles A. Johnson; Kenneth T. Grace; Marshall M. Truex

[57] ABSTRACT

A centralized control unit for use in a multisystem data processing configuration to provide dynamic access to shared and non-shared peripheral subsystems is disclosed. This unit, known herein as a subsystem access unit (SAU) is able to remotely control one or more system's accessibility to peripheral subsystem's from a central location. It is able to provide this control with the capability of either allowing a peripheral subsystem to be concurrently accessed by more than one system or forcibly ensuring that the peripheral subsystem is exclusively accessible by only a single system.

34 Claims, 55 Drawing Figures

SUBSYSTEM ACCESS UNIT
FUNCTIONAL DIAGRAM

| BYTE 0 | BYTE 1 | BYTE 2 | BYTE 3 |
|--------|--------|--------|--------|
| 0-7 | 0-7 | 0-7 | 0-7 |
| $91_{16}$ | HISTORY FLAGS | TABLE ADDRESS | ZEROS |

| BYTE 0 | BYTE 1 | BYTE 2 | BYTE 3 |
|--------|--------|--------|--------|
| 0-7 | 0-7 | 0-7 | 0-7 |
| $92_{16}$ | ZEROS | TABLE ADDRESS | ZEROS |

| 00 | 01 — 05 | 06 | 07—10 | 11 | 12—15 | 16 | 17—20 | 21 | 22—25 |
|---|---|---|---|---|---|---|---|---|---|
| | PARTITIONING CONTROL FLAGS | | SUBSYSTEM IOP NUMBER | | | | | | |
| MAS | C0 \| C1 \| C2 \| C3 \| EU | U | C0 IOP NUMBER | U | C1 IOP NUMBER | U | C2 IOP NUMBER | U | C3 IOP NUMBER |

FIG. 17

| 00 – 03 | 04 | 05 | 06 — 07 |
|---|---|---|---|
| ZEROS | L | U | SSP NUMBER |

FIG. 18

| 00 — 02 | 03 — 07 |
|---|---|
| ZEROS | IOP STATE |

FIG. 19

| BYTE 0 | BYTE 1 | BYTE 2 | BYTE 3 |
|---|---|---|---|
| 0 – 7 | 0 – 7 | 0 – 7 | 0 – 7 |
| COMMAND CODE | OPERAND | ADDRESS (LSB) | ADDRESS (MSB) |

FIG. 21

| BYTE 0 | BYTE 1 | | | | BYTE 2 | BYTE 3 |
|---|---|---|---|---|---|---|
| 0 – 7 | 0-2 | 3 – 6 | | 7 | 0 – 7 | 0 – 7 |
| $05_{16}$ | ZEROS | SPI PORT/ BCTS CHANNEL  0/A \| 1/B \| 2/C \| 3/D | | EU | TABLE ADDRESS | ZEROS |

| 00 | 01 | 02 | 03 | 04 | 05 | 06 | 07 |
|---|---|---|---|---|---|---|---|
| SAU LOCK SET | UNASSIGNED | MICROCODE LOADED | IOP NUMBERS LOADED | SSP NUMBERS WRITTEN | IOP STATES WRITTEN | ADD/REMOVE SUBSYSTEMS COMPLETE | NO SSP ACTION TAKEN |

FIG. 25

| BYTE 0 | | BYTE 1 | | BYTE 2 | | BYTE 3 | | BYTE 4 | |
|---|---|---|---|---|---|---|---|---|---|
| 0-2 | 3-7 | 0-2 | 3 | 4-7 | 0-2 | 3 | 4-7 | 0-2 | 3 | 4-7 |
| ZEROS | UNDEFINED | ZEROS | U | C0 IOP NUMBER | ZEROS | U | C1 IOP NUMBER | ZEROS | U | C2 IOP NUMBER |

 

FIG. 25

| BYTE 0 | | BYTE 1 | | | BYTE 2 | | | BYTE 3 | | |
|---|---|---|---|---|---|---|---|---|---|---|
| 0-2 | 3-7 | 0-2 | 3 | 4-7 | 0-2 | 3 | 4-7 | 0-2 | 3 | 4-7 |
| ZEROS | UNDEFINED | ZEROS | U | C0 IOP NUMBER | ZEROS | U | C1 IOP NUMBER | ZEROS | U | C2 IOP NUMBER |

FIG. 27

| BYTE 0 | | | | | | | BYTE 1 | | | BYTE 2 | | | BYTE 3 | | | BYTE 4 | | |
|---|---|---|---|---|---|---|---|---|---|---|---|---|---|---|---|---|---|---|
| 0-1 | 2 | 3 | 4 | 5 | 6 | 7 | 0-2 | 3 | 4-7 | 0-2 | 3 | 4-7 | 0-2 | 3 | 4-7 | 0-2 | 3 | 4-7 |
| ZEROS | MAS | C0 | C1 | C2 | C3 | EU | ZEROS | U | C0 IOP NUMBER | ZEROS | U | C1 IOP NUMBER | ZEROS | U | C2 IOP NUMBER | ZEROS | U | C3 IOP NUMBER |

| BYTE 0 | BYTE 1 | | | BYTE 2 | BYTE 3 |
|---|---|---|---|---|---|
| 0 - 7 | 0-2 | 3-6 | 7 | 0 - 7 | 0 - 7 |
| $05_{16}$ | ZEROS | SPI PORT/ BCTS CHANNEL <br> 0/A 1/B 2/C 3/D | E U | TABLE ADDRESS | ZEROS |

FIG. 23

| BYTE 0 | BYTE 1 | BYTE 2 | BYTE 3 |
|---|---|---|---|
| 0-7 | 0-7 | 0-7 | 0-7 |
| $09_{16}$ | ZEROS | ZEROS | ZEROS |

FIG. 24

| BYTE 0 | BYTE 1 | BYTE 2 | BYTE 3 |
|---|---|---|---|
| 0-7 | 0-7 | 0-7 | 0-7 |
| $0A_{16}$ | COUNT | TABLE ADDRESS | ZEROS |

FIG. 26

| BYTE 0 | BYTE 1 | | BYTE 2 | | BYTE 3 |
|---|---|---|---|---|---|
| 0-7 | 0-3 | 4-7 | 0-3 | 4-7 | 0-7 |
| $31_{16}$ | ZEROS | IOP STATE | ZEROS | IOP NUMBER | ZEROS |

FIG. 28

| BYTE 0 | BYTE 1 | BYTE 2 | | BYTE 3 |
|---|---|---|---|---|
| 0-7 | 0-7 | 0-3 | 4-7 | 0-7 |
| $32_{16}$ | COUNT | ZEROS | IOP NUMBER | ZEROS |

FIG. 29

| BYTE 0 | BYTE 1 | | | BYTE 2 | | BYTE 3 |
|---|---|---|---|---|---|---|
| 0 - 7 | 0-4 | 5 | 6-7 | 0-3 | 4-7 | 0-7 |
| $21_{16}$ | ZEROS | U | SSP NUMBER | ZEROS | APPLICATION | ZEROS |

FIG. 30

| BYTE 0 | BYTE 1 | BYTE 2 | | BYTE 3 |
|---|---|---|---|---|
| 0 - 7 | 0 - 7 | 0-3 | 4-7 | 0-7 |
| $22_{16}$ | COUNT | ZEROS | APPLICATION | ZEROS |

FIG. 31

| BYTE 0 | BYTE 1 | BYTE 2 | BYTE 3 |
|---|---|---|---|
| 0 - 7 | 0 - 7 | 0 - 7 | 0 - 7 |
| $81_{16}$ | COUNT | CONTROL STORE ADDRESS (LSB) | CONTROL STORE ADDRESS (MSB) |

FIG. 32

| BYTE 0 | BYTE 1 | BYTE 2 | BYTE 3 |
|---|---|---|---|
| 0 - 7 | 0 - 7 | 0 - 7 | 0 - 7 |
| $82_{16}$ | COUNT | CONTROL STORE ADDRESS (LSB) | CONTROL STORE ADDRESS (MSB) |

FIG. 33

| BYTE 0 | BYTE 1 | BYTE 2 | BYTE 3 |
|---|---|---|---|
| 0-7 | 0-7 | 0-7 | 0-7 |
| $13_{16}$ | ZEROS | ZEROS | ZEROS |

FIG. 34

| BYTE 0 | BYTE 1 | BYTE 2 | BYTE 3 |
|--------|--------|--------|--------|
| 0-7    | 0-7    | 0-7    | 0-7    |
| $23_{16}$ | ZEROS | ZEROS | ZEROS |

FIG. 35

| BYTE 0 | BYTE 1 | BYTE 2 | BYTE 3 |
|--------|--------|--------|--------|
| 0-7    | 0-7    | 0-7    | 0-7    |
| $FF_{16}$ | ZEROS | ZEROS | ZEROS |

FIG. 36

| BYTE 0 | BYTE 1 | BYTE 2 | BYTE 3 |
|--------|--------|--------|--------|
| 0-7    | 0-7    | 0-7    | 0-7    |
| $0E_{16}$ | ZEROS | ZEROS | ZEROS |

FIG. 37

| BYTE 0 | BYTE 1 | BYTE 2 | BYTE 3 |
|--------|--------|--------|--------|
| 0-7    | 0-7    | 0-7    | 0-7    |
| $12_{16}$ | ZEROS | ZEROS | ZEROS |

FIG. 38

| BYTE 0 | BYTE 1 | BYTE 2 | BYTE 3 |
|--------|--------|--------|--------|
| 0-7    | 0-7    | 0-7    | 0-7    |
| $2A_{16}$ | COUNT | TABLE ADDRESS | ZEROS |

FIG. 39

| BYTE 0 | BYTE 1 | BYTE 2 | BYTE 3 |
|---|---|---|---|
| 0-7 | 0-7 | 0-7 | 0-7 |
| 3A$_{16}$ | COUNT | TABLE ADDRESS | ZEROS |

FIG. 40

| BYTE 0 | BYTE 1 | BYTE 2 | BYTE 3 |
|---|---|---|---|
| 0-7 | 0-7 | 0-7 | 0-7 |
| 17$_{16}$ | ZEROS | ZEROS | ZEROS |

FIG. 41

| BYTE 0 | BYTE 1 | BYTE 2 | BYTE 3 |
|---|---|---|---|
| 0-7 | 0-7 | 0-7 | 0-7 |
| 27$_{16}$ | ZEROS | ZEROS | ZEROS |

FIG. 42

| BYTE 0 | BYTE 1 | | BYTE 2 | BYTE 3 |
|---|---|---|---|---|
| 0-7 | 0-3 | 4-7 | 0-7 | 0-7 |
| 67$_{16}$ | ZEROS | APPLI-CATION | ZEROS | ZEROS |

FIG. 43

| BYTE 0 | BYTE 1 | | BYTE 2 | BYTE 3 |
|---|---|---|---|---|
| 0-7 | 0-3 | 4-7 | 0-7 | 0-7 |
| 87$_{16}$ | ZEROS | APPLI-CATION | ZEROS | ZEROS |

FIG. 44

CENTRALIZED HARDWARE CONTROL OF MULTISYSTEM ACCESS TO SHARED AND NON-SHARED SUBSYSTEMS

BACKGROUND OF THE INVENTION

A. Field of the Invention

This invention relates generally to a centralized control apparatus for use in conjunction with a plurality of data processing systems and a plurality of shared and non-shared peripheral subsystems. In particular, a unit is provided which is able to control one or more system's accessibility to one or more peripheral subsystems from a central location. This unit has the capability of either allowing a peripheral subsystem to be concurrently accessed by more than one data processing system or ensuring that the peripheral subsystem is exclusively accessible to one one data processing system.

B. Prior Art

In the past, as a customer's need for data processing capability increased, the customer was required to either replace his existing system with a larger system or alternatively to add further systems to operate in conjunction with his existing one. Because of the numerous difficulties inherent in either solution, the customer often either delayed his decision until the last possible moment or he attempted to do without the expansion altogether. In other words, there was little or no flexibility in his existing system.

Even with the advent of large scale multiprocessing systems or with the increasing use of multiple similar systems, there was an increasing need for flexibility in the manner of use of each system component or set of system components.

It is often advantageous to be able to separate a multiprocessor system into two or more electrically isolated and software independent entities. Each of these entities, of course, has the complete characteristics of a full operational system. One such entity might be required for maintenance purposes, while the other is used for work applicable to its site. Or there may exist the need for two user programs to be running concurrently, one performing scheduled production work while the other is dedicated to highly sensitive data processing that requires complete electrical isolation from the first for reasons of security.

The capability of forming electrically isolated and software independent entities in a given multiprocessor system from a central location has been achieved. Further, changing the composition of the independent entities within a system, by adding or removing components, without disrupting normal operations has also been achieved. Although the peripheral subsystems could be uniquely associated with a particular independent entity and electrically isolated from the others, the control of their association was either manual or via software functions associated with each independent entity. In the latter case, there was no dynamic hardware means to prevent the software of one independent entity from causing the removal of a subsystem from another entity and subsequently adding the subsystem to the first entity. In particular, dynamic hardware protection of mass storage files from a multiplicity of entities having a hardware means of communication with them was not available. Additionally, the capability of adding or removing a subsystem to or from entities was limited to entities within a single system. For example, a peripheral subsystem such as a card reader may have limited use as a single subsystem, however, if a customer site had multiple systems then the subsystem's utilization would be considerably increased if it could be used by each of the multiple systems. Naturally, the cost of any additional subsystems also could be spread over all of the systems using it and its increased utilization would likewise reduce its unit cost.

Most peripheral subsystems of present day data processing systems have interfaces capable of communication with more than one input/output processor.

However, in all of such known systems, these interfaces were fixed in a certain inflexible mode, either electrically or manually, upon determination of a particular system configuration. Thereafter they were only changed if the particular predetermined system configuration was modified and a change was necessary to accommodate the modification.

It is the purpose of this invention to provide a peripheral subsystem access unit which possesses increased interface flexibiity, in that it is not limited in its utilization to one system nor to one configuration.

BRIEF DESCRIPTION OF THE INVENTION

A. Objects of the Invention

Accordingly, it is an object of this invention to provide a unique and relatively simple means which dynamically and switchably controls the accessibility of a plurality of data processing systems to a plurality of shared and non-shared peripheral subsystems.

It is another object of this invention to extend the capability of present data processing systems, so that such peripheral subsystems may be shared between a plurality of entities each having characteristics of a complete data processing system.

It is a further object of this invention to provide a central controlling unit which, from a central location, dynamically enables and/or disables a plurality of subsystem interface interconnections to a set of data processing systems and a set of entities each having characteristics of a complete data processing system.

It is a still further object of this invention to provide a centralized peripheral subsystem access unit which is capable of enforcing exclusive use of a particular subsystem by a particular entity of the plurality of entities within a multi-processing system or a set of data processing systems.

It is also an object of this invention to provide a centralized peripheral subsystem access unit which is capable of enforcing this exclusive use during the period that non-sharing of this particular peripheral subsystem is desired.

Summary of the Invention

A peripheral subsystem access unit is disclosed which allows complete flexibility of the use of a peripheral subsystem by a plurality of entities within a multiprocessing system or a plurality of data processing systems. These entities are referred to in this description as applications and are hereinafter defined.

The access unit disclosed comprises a first interface means capable of being coupled to a plurality of command sources, a second interface means capable of being coupled to a plurality of peripheral subsystems and an internal storage and logic means. The internal storage and logic means, under control of certain command sources, includes the resident data and the logic necessary to provide control and switching signals to the peripheral subsystems for switchably connecting particular peripheral subsystems to certain applications for shared use by these entities. Further, and equally important, the access unit is capable of preventing such shared use where exclusive use is desired.

Thus, via the interface to the command sources, the subsystem access unit accepts requests to enable or disable a subsystem interface. This enabling or disabling of the data path to the peripheral subsystem allows a subsystem to be concurrently accessible to more than one application (i.e. shared) or to be exclusively used by one one such entity. The subsystem access unit is capable of enforcing this exclusive use upon all of the systems. That is, it can prevent any I/O processor from having access to a subsystem even though the I/O processor may desire such access.

BRIEF DESCRIPTION OF THE DRAWINGS

The foregoing objects and the summary will be more readily understood when read in conjunction with the accompanying drawings in which:

FIG. 17 illustrates the format of each entry register of the Subsystem Interface Table.

FIG. 18 shows the format of a register entry of the System Support Processor (SSP) Application Table.

FIG. 19 is the format of a register entry of the Input-/Output Processor State Table.

FIG. 20 presents the format of a register entry in the SSP History Table.

FIG. 21 is the register format of the four byte command word which controls the operations of the Subsystem Access Unit (SAU).

FIG. 22 is the format of the Add Subsystem command.

FIG. 23 presents the format of the Remove Subsystem command.

FIG. 24 is the format of the Write Subsystem IOP Number command.

FIG. 25 is the format of each of the entries in the 160 locations of the Subsystem Interface Table when the command of FIG. 14 is given.

FIG. 26 is the format of the command to read the Subsystem Interface Table.

FIG. 27 is the format of the five bytes of data which are returned to the SSP when the Read Subsystem Interface command of FIG. 27 is given.

FIG. 28 is the format of the Write IOP State command.

FIG. 29 shows the corresponding format of the Read IOP State command.

FIG. 30 is the command format of Write SSP Number.

FIG. 31 is the corresponding command format of Read SSP Number.

FIG. 32 is the format of the command to Write Control Store.

FIG. 33 is the corresponding command to Read Control Store.

FIG. 34 is the format of the command to Reserve SAU.

FIG. 35 is the command format for Release SAU.

FIG. 36 shows the command format for the Resetting of the SAU.

FIG. 37 is the format of the command to Read ID Word 0.

FIG. 38 shows the format of the command to Read ID Word 1.

FIG. 39 presents the format of the command to Read SPI.

FIG. 40 is the command format for reading the BCTS interface.

FIG. 41 is the command format for Set Test Mode.

FIG. 42 is the format of the command to Clear Test Mode.

FIG. 43 shows the command format to Set the SAU Lock.

FIG. 44 illustrates the command format to Clear the SAU Lock.

DETAILED DESCRIPTION OF THE INVENTION

Figure 1:
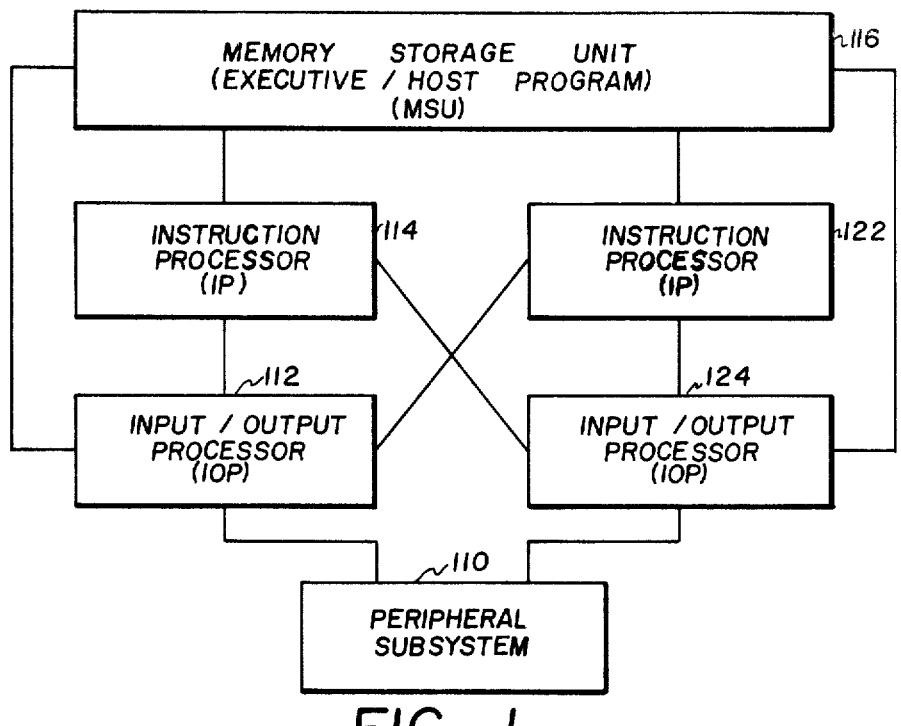
FIG. 1 is a block diagram of a data processing system illustrating a multiprocessing environment. It also illustrates an example of an application wherein the multiple processors share the same memory and executive software.

The following detailed description will be more easily comprehended when it is read with reference to the foregoing drawings in which like reference characters symbolize corresponding parts.

Definitions

The following terms are defined for use in the detailed description that follows:

System

A system is a set of components with interfaces between the components connected, i.e., the hardware means of communication between the components exists. Additionally, this set of components will at least support an executive or host software and consists of the following:
 (a) Processor complexes
 (b) Memory
 (c) I/O complexes
 (d) Peripheral subsystems

Enabled Interface

The interface between two components is enabled whenever the transfer of data and control information between the components is not prohibited by component or interface hardware, or by electrical isolation. One component is considered accessible to another component if the interface between them is enabled.

Partitioning

The process of enabling and disabling component interfaces.

Application

An application is all or a subset of a systems components where:
 (a) The set of components supports an executive or host software.
 (b) Interfaces between the components are enabled.
 (c) Any component with interfaces enabled to other components in the application is considered a part of this application. A mainframe component not in any particular application is said to be offline. A mainframe component cannot be in two applications simultaneously. A subsystem is in a particular application if it has an interface enabled to a channel of an Input/Output processor in this application.

Shared Peripheral Subsystem

A peripheral subsystem is shared if its control unit(s) has (have) interfaces enabled to different Input/Output complexes in different applications of the same or different systems.

Exclusive Use

An application is said to have exclusive use of a peripheral subsystem when:
 (a) the peripheral subsystem's interfaces are enabled only to Input/Output channel(s) in that application;
 (b) the peripheral subsystems interfaces to other Input/Output channel(s) in other applications are prevented from being enabled.

FIG. 1 is a block diagram of a data processing system illustrating a multiprocessing single application environment.

A pair of instruction processors 114, 122 share a common memory storage unit 116 which houses a single executive or host program. Similarly, a pair of input/output processors 112, 124 also share the same memory storage unit 116. A single peripheral subsystem 110 may be used by either IOP, 112, or IOP 124. Although there exists a certain amount of concurrency in the multiprocessing system of FIG. 1, in that IOP 112 and IOP 124 may be concurrently operating in conjunction with selected peripheral devices within the subsystem 110, this concurrency may exist only in a certain predetermined manner. Likewise, the instruction processors 114, 122 may also concurrently operate in a manner established by the single executive software. Similarly, the exclusive use of any given unit of the system or of any given peripheral device of the subsystem 110 is never enforced since no means exists to prevent any system unit from gaining access to any other system unit. In the present instance, this system may be partitioned into completely separate and independent applications.

Figure 2:
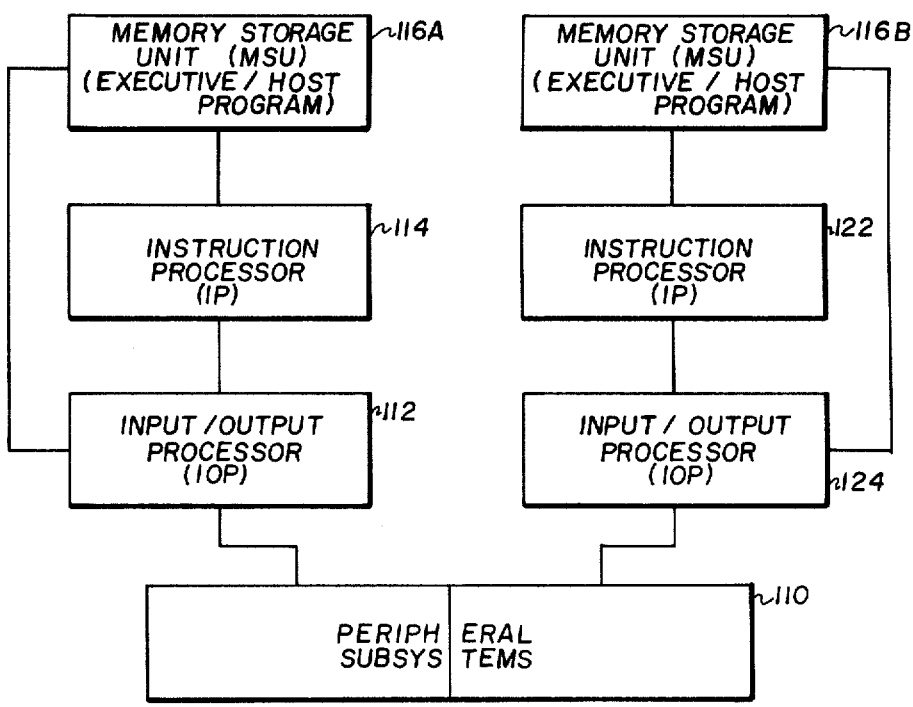
FIG. 2 is a block diagram of the multiprocessing system of FIG. 1 which system is separated (partitioned) into two applications wherein the processor of a given application has its own memory and executive software. The peripheral subsystems may or may not be shared.

FIG. 2 illustrates this concept. In this case, a processor 114, a memory 116A and an input/output processor 112 have interfaces enabled to each other. Likewise, a second processor 122, a second memory 116B and a second input/output processor 124 have interfaces enabled to each other. However, the interfaces between the differing sets of components i.e., the cross-coupled interfaces as shown in FIG. 1, are disabled. Each application has its own memory and host software.

The following described system which illustrates a preferred environment in which the present invention can operate, can have up to four Instruction Processors, (IP's), Input/Output Processors (IOP's) and Memory Storage Units (MSU's). It supports centralized partitioning and power control at the IP, IOP, MSU, and peripheral subsystem levels. Partitioning of the peripheral subsystems is performed by the Subsystem Access Unit (SAU) which is the subject of this application. The SAU operates under commands from the System Support Processor (SSP), however, any source of command signals to the SAU may be utilized. Additionally, the SAU performs the subsystem partitioning function for a plurality of the above described systems.

Figure 3:
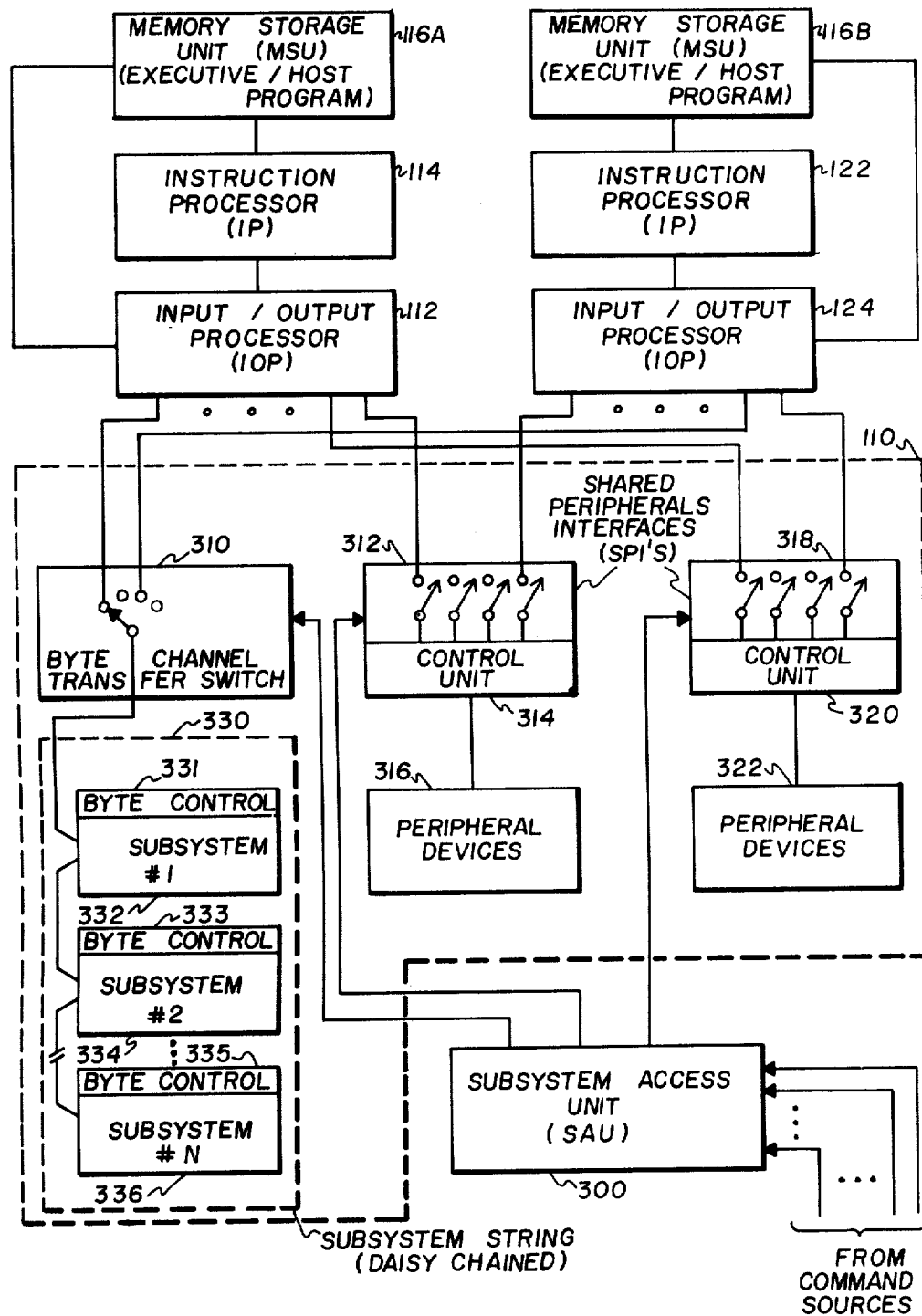
FIG. 3 is a block diagram showing the multiprocessing system of FIG. 1 partitioned into two applications, the introduction of the subsystem access unit of the present invention into such a separated system, and an illustration of the switchable concepts of the peripheral subsystems.

Referring to FIG. 3, there is shown a first and a second separate application. Thus, the first application includes MSU, 116A; IP, 114; and IOP 112, while the second application comprises MSU, 116B; IP, 122; and IOP, 124. Thus, the multiprocessing system of FIG. 1 has been partitioned into two separate applications.

Further, the IOP's 112 and 124 share the peripheral subsystem 110, which includes a byte channel interface 310, and a first 312 and a second 318 shared peripheral interface (SPI). It is believed readily apparent from the pictorial of FIG. 3 drawing that the SPI's are capable of providing concurrent access through the plurality of separate switches of SPI, 312 and SPI, 318. Alternately, the byte channel transfer switch 310 is pictorially illustrated as a single switch which allows only a single IOP to be coupled to the subsystem strings 330 at any given time.

The Subsystem Access Unit (SAU) 300 shown is capable of controlling the switch of the byte channel interface 310 and the multiple switches of the SPI's 312, 318.

Subsystem partitioning consists of providing a means to connect a control unit or a subsystem string to one or more I/O channels. Three methods of connection are possible:
 1. The connection is direct, i.e., no switching mechanism exists between the control unit and I/O channel.
 2. If the control units and subsystem strings are adapted for use with a Shared Peripheral Interface (SPI) and Byte Channel Transfer Switch (BCTS), respectively, or with similar functioning entities, then subsystem partitioning may be accomplished by manually setting the SPI or BCTS switches. Setting these switches causes the enabling or disabling of appropriate ports or channels on the SPIs and BCTSs. (An SPI allows a control unit to interface with up to four I/O channels; a BCTS allows a subsystem string to interface with one of four I/O channels.)

3. A means to remotely set the SPI and BCTS switches is provided.

Note that the latter two methods make it possible to share a subsystem between applications. This invention provides a means to remotely set the SPI's and the BCTS's with or without the presence of an operator.

For the present system it was decided to develop a free-standing system component which would perform the remote subsystem partitioning function via commands from one or more command sources (herein SSP's) This component is called a Subsystem Access Unit (SAU).

Through the SAU, the present system supports an application's exclusive use of a subsystem and the sharing of subsystems between applications in the same or different systems. Because of this type of support, the SAU must perform subsystem partitioning for more than one system and/or application, i.e., if a subsystem can be shared by applications in more than one system, then the same SAU performs the subsystem partitioning for all the systems connected to that subsystem. In exercising this function there is no inherent requirement for communications between applications either at the SSP or application level.

In the present embodiment, the SAU can accept commands from a maximum of four SSP's, and it supports subsystem partitioning for a maximum of sixteen applications.

A maximum of four SAU's can be configured in a system or in systems having common peripheral equipment. Each SAU is physically and logically independent of the other SAU; thus, no communication between SAUs is required. Although an SSP treats the SAUs as separate physical entities, it treats them logically as one; in particular, an SSP can have no more than one SAU request outstanding. Conversely, an SAU will neither queue nor honor a subsequent SSP request until it has completed service of the current one.

One SAU supports the partitioning for up to one hundred twenty eight (128) SPI and four (4) BCTS interfaces. Thus, support is provided for a maximum of 512 SPI's and 16 BCTS's in the maximum configuration.

Having a single component (since the SAUs are functionally one component, they are hereafter referred to as one) perform partitioning functions for peripheral subsystems in different applications requires that this component also be able to prevent an application's unauthorized removal, and subsequent use, of a subsystem being used in other applications. The SAU meets this requirement by providing the following protection.

(a) It enforces an application's exclusive use of a subsystem.

(b) It accepts the SSP-generated subsystem partitioning change commands only when an SSP issuing a command is associated with the application affected or is permitted to issue the command on behalf of the application affected.

In order to provide this protection and to make subsequent decisions, the SAU relies on information that is provided to it during its initialization. The SAU receives and maintains the following information: cabling information, SSP/application designation, IOP/application status, partitioning status, and exclusive use status.

1. CABLING INFORMATION

The cabling information identifies which IOP is connected to each port of each SPI and each channel of each BCTS. It also identifies those control units (i.e., SPI's) which are connected as multi-access subsystems. This data is written into the SAU via an SSP during the SAU's initialization.

2. SSP/APPLICATION DESIGNATION

An SSP requesting subsystem partitioning changes must be assigned to the same application(s) whose subsystem partitioning status is affected. Associated with each application is a SAU resident location specifying which SSP is assigned to the application. The assignment of SSP to an application can be made by any SSP via a command to the SAU; additionally, any SSP can assign another SSP to an application. SSP assignments can be made whenever certain locks are not set. These locks are described in subsequent paragraphs.

The association between SSP and application is logical only from an SAU point of view; it is not necessarily physical from an application or system point of view. Specifically, the SSP which performs the partitioning, testing, and maintenance functions on the units in a given application is generally assigned to the application from a SAU point of view. However, another SSP not physically associated with the application is not precluded from being assigned to the application from a SAU point of view.

3. IOP STATUS

Associated with each IOP is a SAU resident location indicating the status of the IOP. From a SAU viewpoint, an IOP is in one of the following states:

(a) It is assigned to Application 0, 1, . . . , or 15.

(b) It is offline, i.e., not assigned to an application.

(c) It has not been assigned to any of the above states.

The assignment of IOP's to applications or offline status within the SAU is made via SSP commands to the SAU.

Any SSP, via an SSP command to the SAU, can assign an IOP in "unassigned" state to offline status. In order to assign an IOP to an application, the following conditions must be met:

(a) The SSP making the request must be in the same application as that to which the IOP is being assigned.

(b) The IOP must be in offline status.

(c) All subsystem interfaces that are to this IOP and are controlled by the SAU must be disabled.

An IOP that is currently assigned to an application (from a SAU viewpoint) can be placed in offline status via an SSP command provided the following are met:

(a) The SSP making the request must be in the same application as that from which the IOP is being removed.

(b) All subsystem interfaces that are to this IOP and are controlled by the SAU must be disabled.

4. SUBSYSTEM PARTITIONING STATUS

Associated with each SPI and each subsystem string of each BCTS is SAU resident data that indicates SPI port or BCTS channel enable/disable status. This information is updated with each subsystem partitioning change requested by an SSP and effected by the SAU.

When the SAU powers on, the partitioning status table indicates that all SPI and BCTS interfaces are disabled. Once the SAU has been initialized, the partitioning status table indicates current status of each interface.

5. EXCLUSIVE USE STATUS

Associated with each SPI is information indicating whether or not the subsystem is currently dedicated to (i.e., is being exclusively used by) a particular application. Note that exclusive use is applied to the subsystem, not an SPI only. Thus, due consideration must be made to multi-access subsystems, i.e., subsystems controlled by more than one control unit via an SPI per control unit.

Enabling/disabling exclusive use is a function that is implemented and enforced within the SAU. In particular, the subsystem's control unit(s) is (are) not cognizant of exclusive use; rather, the control of which SPI ports are enabled or disabled according to application is within the scope of the SAU's functions. The enabling or disabling of exclusive use is initiated by a command from an SSP.

Recall that all the data described above is supplied by SSP commands and is modified as a result of SSP commands. It is necessary to protect this information from modification due to a faulty SSP, operator error, or lack of application integrity. As the same time an objective is to minimize and possibly eliminate manual intervention in the event of SAU faults and subsequent recovery. How these objectives are met and how the data is protected are described in the subsequent paragraphs.

SAU locks are used to protect the cabling information and the SSP/Application assignments. These locks, internal to the SAU, are set via commands and, when set, provide the protection desired. The locks are cleared (i.e., data modification is made possible) via SSP commands, manual actions, or SAU internal actions. There is one lock for each possible application, i.e., 16 locks. Their meaning is as follows:

(a) The SAU will allow cabling information to be written only if all locks are cleared;

(b) The SSP/application assignment for a particular application can be written only when the lock associated with that application is cleared.

A lock is set by any SSP. The SAU locks are cleared according to the following:

1. A command from the SSP assigned to a given application causes the corresponding lock to be cleared. With one exception, no other SSP can cause the SAU lock to be cleared. The exception is described below.

2. All the SAU locks are cleared when the SAU powers up.

3. Located on the SAU are four push-button, momentary switches, each uniquely associated with an SSP interface. The activation of a given switch causes the clearing of those SAU locks corresponding to applications to which the SSP associated with the switch is assigned.

4. Located on the SAU are two two-state switches called SAU Lock Access Switches. One switch is associated with SSP interfaces 0, 1 and the other, with SSP interfaces 2, 3. If a system's SSP has a Unit Available Signal then associated with each SAU interface to an SSP is an SSP Unit Available Signal interface. The SAU interprets an inactive unit available signal to be the same as not having a unit available signal line connected to the SAU. The SAU's interpretation of the status of the switches and the unit available signals is described in Table 1.

TABLE 1

| Switch State | Signal State Port A | Signal State Port B | SAU Interpretation Port A | SAU Interpretation Port B | SSP'S Without Unit Available Signals | SSP'S With Unit Available Signals |
|---|---|---|---|---|---|---|
| 0 | A | A | F | F | Not Applic. | An SSP cannot clear SAU locks associated with the other SSP, if the latter SSP's unit available signal is active. |
|   | A | I | F | T | Not Applic. |   |
|   | I | A | T | F | Not Applic. |   |
|   | I | I | T | T | Either SSP can clear SAU locks associated with other SSP |   |
| 1 | A/I | A/I | F | F | Lock associated with an SSP can be cleared only by that SSP. |   |

NOTES
1. A implies Active; I, Inactive.
2. T/F implies that the other port's SSP can/cannot respectively clear SAU lock(s) associated with application(s) to which this ports SSP is assigned.

The SAU locks described above protect the cabling information and SSP/Application assignments. The IOP status, partitioning status and exclusive use status are protected via the checks specified in later paragraphs. These checks are summarized as follows:

(a) IOP status is changed only via commands from the SSP assigned to subject application.

(b) A change in partitioning status (i.e., enabling/disabling interfaces) is a direct result of changing the entry in the partitioning status table, an action taken only as a result of certain checks:
1. match of application associated with SSP and subject interface(s);
2. current enable/disable status (BCTS only);
3. not violating implications of exclusive use, if currently in effect.

(c) Exclusive use status is changed only when
1. requested by the appropriate SSP
2. a single application has interfaces enabled to the subsystem.

Figure 4:
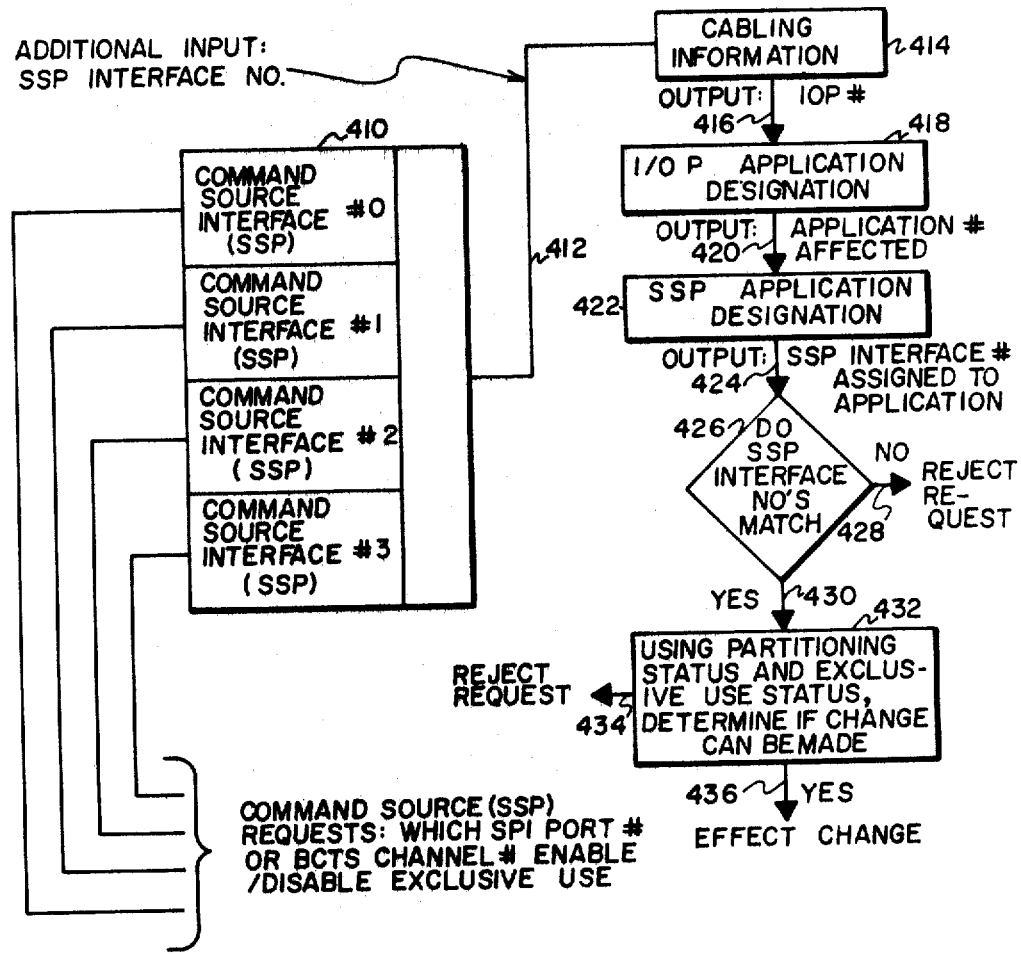
FIG. 4 illustrates a flowchart of the use of resident information within the subsystem access unit to affect partitioning of the subsystems.
Figure 47A:
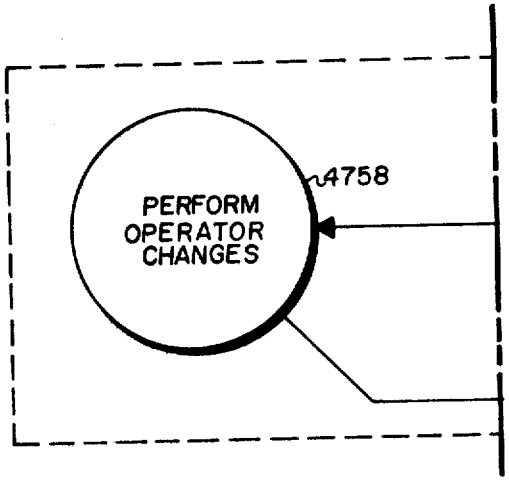
FIG. 47 comprises FIGS. 47A, 47B, 47C, 47D and 47E positioned as shown, and taken together form a flow chart of the SAU microcode.

FIG. 4 illustrates how the above information is used when a subsystem partitioning change request is made by an SSP. In particular, the SAU can make the following determinations:

(a) Which application's partitioning status is being affected;

(b) Whether the SSP making the request is assigned to the application affected;

(c) Whether exclusive use is in effect for a given subsystem, and, if so, to which application the subsystem is given exclusive use.

Having made these determinations, the SAU will either reject the request or effect the subsystem partitioning change requested.

Note that it is inherently the SSP's responsibility to check for potential partitioning violations prior to making a subsystem partitioning change request to the SAU. Those checks effectively protect the application with which the SSP is associated. The SAU, on the other hand, protects applications from SSP's not associated with those application.

Referring again to FIG. 4, a plurality of SSP's request access via interface 410. Note here that four SSP interfaces are shown, however, this is just for purposes of explanation and as shown by the present embodiment. Also note that the SSP's here are really command sources, however, they are called SSP's in the present preferred system. The interface number is passed along connection 412 to the cabling information table 414 contained in the Random Access Memory. This cabling information from that table provides the IOP number at output terminal 416. This IOP number is then used to determine the application designation 418 to provide the number of the application affected at terminal 420. The System Support Processor application designated is provided at connection 424 to indicate the SSP interface number assigned to that application. It must then be determined whether the SSP interface number designated corresponds to the SSP interface number assigned to that application. This comparison is done in block 426. If the numbers do not correspond, a rejection signal is activated at terminal 428. If they do, this is indicated by a signal at terminal 430. Next, it must be determined if a change can be made. This is accomplished in block 432 using partitioning status and exclusive use status information. If the change cannot be effected, a rejection signal is indicated at terminal 434. If the change can be made, a signal so indicating this is presented at terminal 436.

Figure 5:
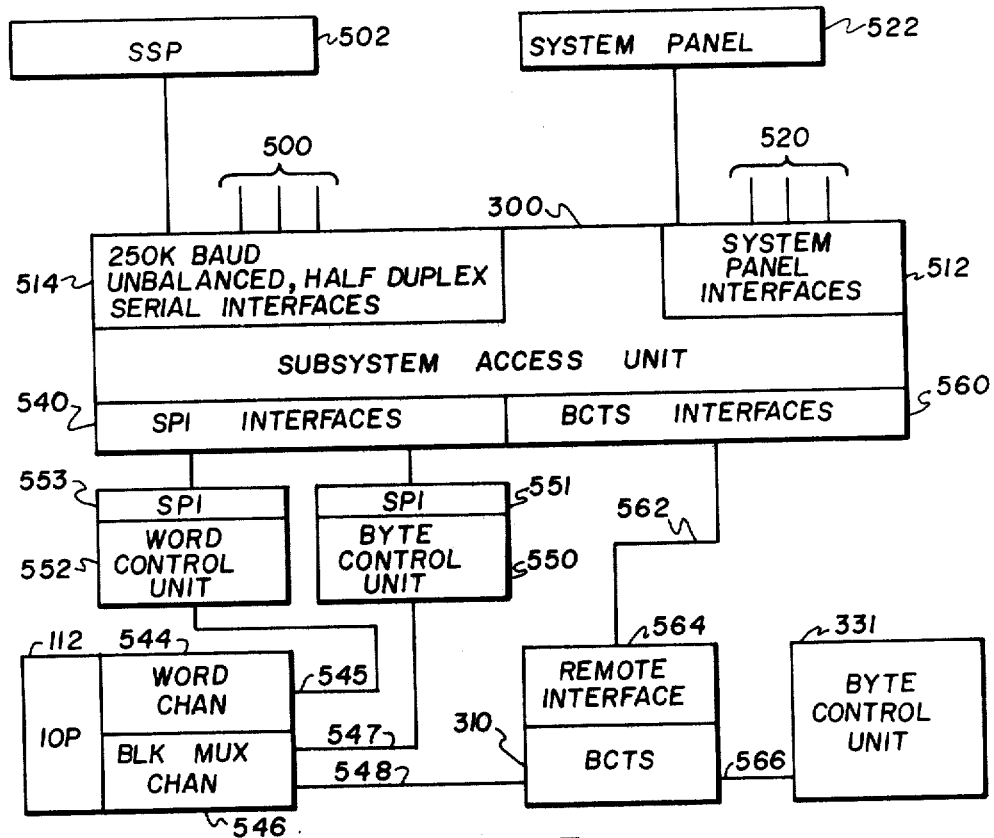
FIG. 5 is a more detailed block diagram of the subsystem access unit and its use in a system configuration.

FIG. 5 is a block diagram of the Subsystem Access Unit (SAU) of the present invention as it might be used in a system.

The SAU 300 is shown with a plurality of command sources 500. Indicated as one of these sources is an SSP 502. It is under the order of these command sources 500 that the SAU is controlled. They are coupled into the SAU 300 via the 250K baud, unbalanced, half-duplex serial interface means 514. Likewise, a plurality of system panel controls 520 are coupled into the SAU 300 via the system panel interfaces 512. Only one of these panels 522 is shown.

The peripheral subsystem interfaces are illustrated at the bottom of the SAU 300. They are shown as the shared peripheral interfaces 540 and the BCTS interfaces 560. Coupled to one of the SPI interfaces 540, via coupling 542, is an SPI word control unit 552.

An Input/Output Processor unit 112 is shown having a Word Channel interface 544 and two Block Multiplexer Channel interfaces 546. The Word Channel interface 544 is connected to the word control unit 552 having an SPI 553. One Block Multiplexer Channel interface is connected via 548 to a BCTS 310 with a remote interface 564 and the other, via 547 to a Byte Control Unit 550 having an SPI, 551.

A plurality of Byte Channel Transfer Switch interfaces 560 has one of its interfaces connected to a BCTS remote interface 564 of the BCTS interface unit 310. A Byte Subsystem String 331 is coupled via connection 331 to the BCTS remote unit 310.

The basic functions of the Subsystem Access Unit 300 of FIG. 5 are to:

(1) Accept commands from up to four command sources 500 execute these commands and report their status.

(2) Maintain configuration tables in its local memory which tables include information concerning:

(a) The association between input/output processors (IOP's) and applications.

(b) The association between command sources (SSP's) and applications.

(c) The connections between shared peripheral interface (SPI) ports 540 byte channel transfer switch (BCTS) strings 560 and IOP's 112.

(3) Make partitioning checks according to information contained in the configuration tables of the local store.

(4) Enforce exclusive use within an application.

The maximum SAU interfaces per SAU are:

(1) Four 250K Baud interfaces, 500.

(2) One hundred twenty eight shared peripheral interface ports, 540.

(3) Four system panels, 520.

Figure 6:
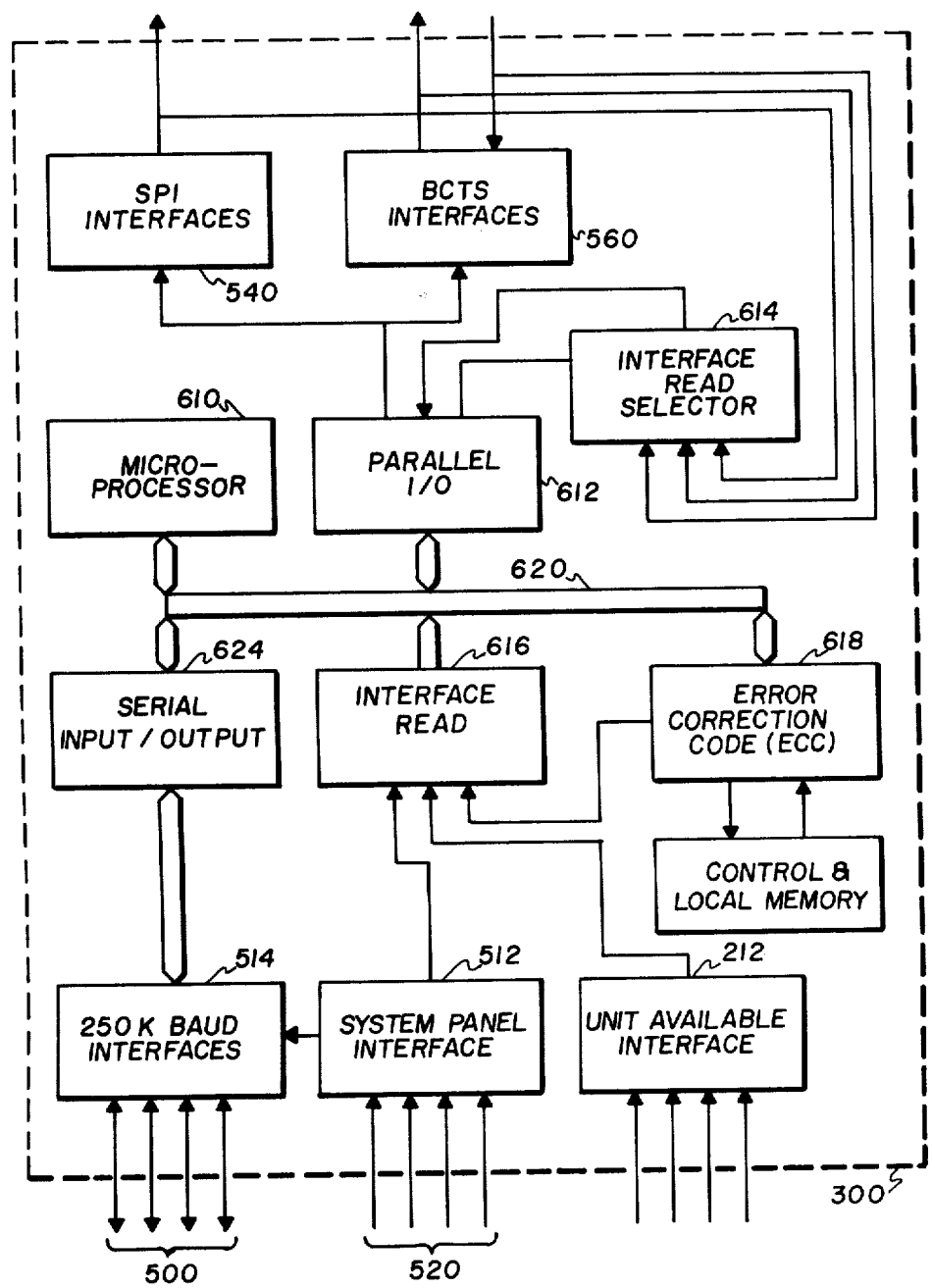
FIG. 6 is a functional block diagram of the subsystem access unit (SAU) of the present invention.

(4) Four Unit Available Signal interfaces, 212 (shown in FIG. 6).

(5) Four Byte Channel Transfer Switches, 560.

A basic SAU is used to provide centralized control of peripheral subsystem partitioning. Control and Data Flow between these interfaces may be accomplished by many well known microprocessing systems, however, the one used in the present description is the Zilog Z80.

The term "microcomputer" has been used to describe virtually every type of small computing device designed within the last few years. This term has been applied to everything from simple "microprogrammed" controllers constructed out of TTL MSI up to low end minicomputers with a portion of the CPU constructed out of TTL LSI "bit slices." However, the major impact of the LSI technology within the last few years has been with MOS LSI. With this technology, it is possible to fabricate complete and very powerful computer systems with only a few MOS LSI components.

The major reason for MOS LSI domination of the microcomputer market is the low cost of these few LSI components. For example, MOS LSI microcomputers have already replaced TTL logic in such applications as terminal controllers, peripheral device controllers, traffic signal controllers, point of sale terminals, intelligent terminals and test systems. In fact the MOS LSI microcomputer is finding its way into almost every product that now uses electronics and it is even replacing many mechanical systems such as weight scales and automobile controls.

Microcomputer systems are extremely simple to construct using well known components. Any such system consists of three parts:

(1) Microprocessor (2) Memory (3) Interface Circuits to peripheral devices

The microprocessor is the heart of the system. Its function is to obtain instructions from the memory and perform the desired operations. The memory is used to contain instructions and in most cases data that is to be processed. For example, a typical instruction sequence may be to read data from a specific peripheral device, store it in a location in memory, check the parity and write it out to another peripheral device. Various general purpose I/O device controllers, and a wide range of memory devices may be used from any source. Thus, all required components can be connected together in a very simple manner with virtually no other external logic. The user's effort then becomes primarily one of software development. That is, the user can concentrate on describing his problem and translating it into a series of instructions that can be loaded into the microcomputer memory.

The components suggested for use herein are the Zilog Z-80 microprocessor (CPU), the Z-80 Serial Input/Output interfaces (510) and the Z-80 Parallel Input/Output Interfaces (PIO). Other similar systems may be substituted herein without departing from the spirit of this invention.

Next, consider FIG. 6, which illustrates a functional block diagram of the subsystem access unit.

Basically, there are two separate data paths in the SAU300. First, there is the bidirectional data bus 620. This bus allows the microprocessor 610 to communicate with the SIO 624, the PIO 612, the memory 622 and the I/O Read Selector 614. The processor 610 generates a 16 bit address and five control signals to supervise control of the data bus.

The five control signals are:
(1) Instruction Fetch Cycle Signal
(2) Memory operation Signal
(3) The Input/Output Operation Signal
(4) The Read Signal
(5) The Write Signal Using the 16 bit address and given a combination of the five control signals, the microprocessor 610 is able to read its program instructions from memory. It can then perform the following instructions under program control.

It may:
(1) Read from or write into each SIO device.
(2) Read from or write into each PIO device.
(3) Read from or write into the memory.
(4) Read data from the I/O Read Selector.

In an SIO instruction, an SIO 624 translates a serial message from one of the 250K baud interfaces 514 into a series of eight bit bytes that can be read by the microprocessor 610. Alternately, it translates the eight bit bytes from the microprocessor 624 into serial (bit by bit) data for transmission out upon one of the interfaces 514.

The Interface Read Selector 614 allows the microprocessor to read a number of bytes of information from the parallel input/output device 612 by doing an input/output operation.

In a parallel input/output instruction, the PIO 612, which houses a pair (2) of eight bit parallel I/O ports, is used as an input or an output means. These I/O ports are used to communicate with the SPI and the BCTS interface registers.

The second data path is between the SPI and the BCTS registers and the PIO device. The data lines from the PIO's are used to:
(a) generate an eight bit interface address. These eight bits are used to select an interface register for a read or a write operation.
(b) generate write data for the interface registers.
(c) generate a write control signal for the interface registers.
(d) provide a read path for data from the registers. These registers are read only as data assurance means, that is, merely as a corroboration that the correct data was transmitted.

Their particular states are maintained in the Subsystem Interface Table, shown in FIG. 17, of the memory 622.

Using these signals, the microprocessor is able to read from or write into the interface registers via the PIO devices. The interface registers are used to drive the SPI and the BCTS interfaces.

From a functional standpoint, the SPI and the BCTS interface registers are really the only registers in the subsystem access unit (SAU). All resident information (tables) are stored in the RAM memory contained in the local store 622.

Figure 7B:
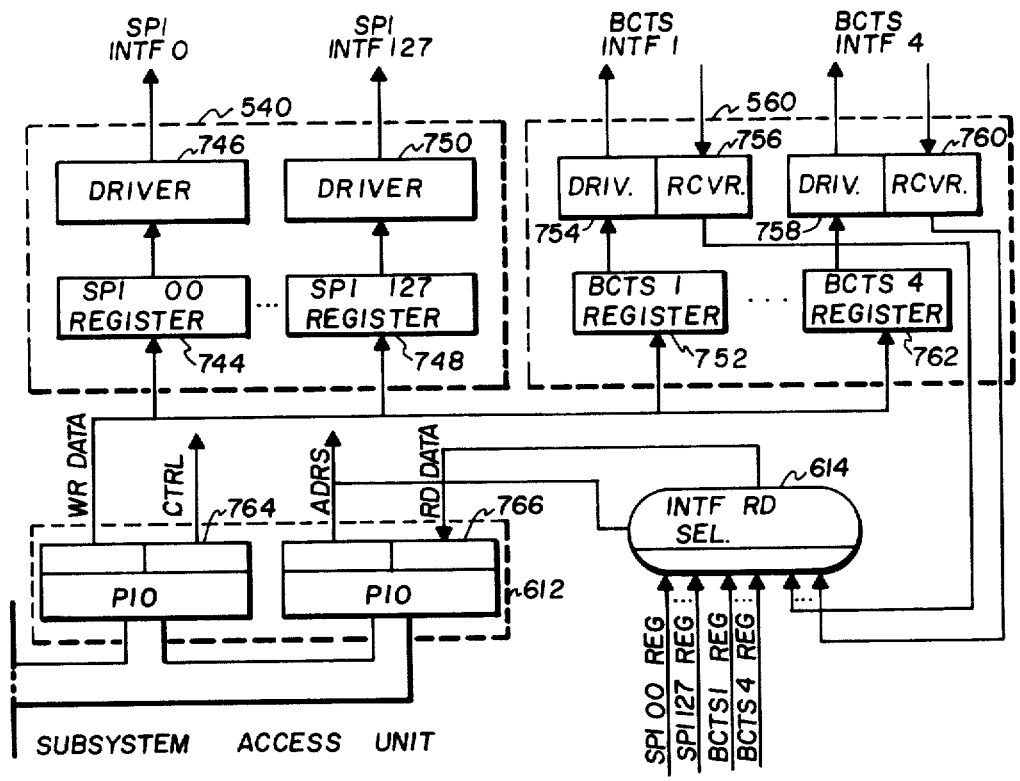
FIG. 7 includes FIGS. 7A and 7B positioned as shown, and is a more detailed block diagram of the subsystem access unit illustrating specific suggested elements for each of the blocks.
Figure 7:
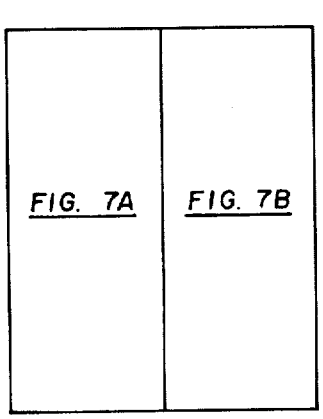

FIG. 7 is a detailed schematic block diagram of the Subsystem Access Unit 300.

The microprocessors in the lower left hand corner of FIG. 7 are the main microprocessor 610 and a redundant or support microprocessor 710. They both utilize an eight bit bidirectional data bus 620 and a sixteen bit address bus. The two microprocessors 610, 710 are run simultaneously to provide error checking. The address generated by each microprocessor is compared on each read or write cycle. Data from each microprocessor is compared on a write cycle only. The microprocessors share the data bus during a read cycle. A data or address miscompare will set a flip flop (not shown) which will in turn suspend the operation of the microprocessor and a fault indicator will be activated. This condition will continue until a reset of the hardware is accomplished.

The microprocessors are used for system control, addressing and eight bits of data handling. Monitoring of the address and data busses and some external control of the microprocessors is possible through the maintenance interface 726.

In general, support for the microprocessors consists of a system clock generator and drivers, timing logic, bus drivers and transceivers, serial input/output and parallel input/output integrated circuits. The circuits, or chips as they are known in the art, which are used in the present embodiment are commercially known as the Z-80A family manufactured by the ZILOG Corporation.

Sixteen Tri-State buffered address lines are provided as the internal address bus. External access to this address bus is provided through the maintenance interface 726. The address bus buffers are set to the Tri-State condition when the microprocessor is in BUS-ACK mode. With 16 bits, the microprocessor is capable of addressing 65,136 memory locations, however, only the lower byte is used for I/O operations providing a maximum of 256 device addresses.

In addition, an 8 bit internal bidirectional data bus is provided for the microprocessors 610, 710. This bus 620 is buffered with Tri-State transceiver circuits. Access to the data bus is also provided through the maintenance interface 726. As with the address bus, the data bus transceivers are set to the Tri-State condition during BUS-ACK mode.

Addressing of the RAM 712 and EPROM 714 memories is expressed in hexadecimal notation.

The RAM address range is 4000 to 6FFF (C000 to EFFF). This repeats at address location C000 since address bit 0 is not used in the RAM selection bits.

The EPROM address range is OOOO to 2FFF (8000 to AFF). This also repeats at address 8000 since address bit 0 is not used in the EPROM selection bits.

Any attempt to read a memory location which is not included in the above specified ranges will produce an FE data byte and will log a single bit memory error in the SBE counter 724. The Subsystem Access Unit contains 12,288 thirteen bit words in random access memory (RAM) 712. Bits 00 to 07 represent data, and bits 08 to 12 are the error correction code (ECC) which activates ECC logic 618. The entire ram array is built from 39 units, each similar to those known in the industry as type 2147. This type 2147 static chip is a 4096 word by one bit Random Access Memory integrated circuit. This monolithic memory uses N channel silicon gate MOS technology, is TTL compatible and requires no clocks nor refreshing cycles to operate. Data is read out non-destructively and has the same polarity as the input data. Separate pins are provided for input and output data with the outputs being three or tri-state: High, Low and High Impedance.

The SAU also contains 10,240 sixteen bit words of EPROM memory. Bits 00 to 07 represent data, bits 08 to 12 are the Error Correction Code previously mentioned, and bits 13 to 15 are not used. The EPROM array is built with 10 units similar to those known in the industry as type 2716 or 2716-1. The type 2716 memory unit is an N-channel MOS, 16, 384 bit, Erasable Programmable Read Only Memory (EPROM). This monolithic device has an organization of 2048 words, each 8 bits long. The inputs and outputs are TTL compatible and the outputs are three state; High, Low, and High Impedance. The memory is non-volative until erased under ultraviolet light.

The Error Correction Code Logic 618 is a single bit correction, double bit detection error correcting network which is incorporated in the memory. This network operates on both RAM and EPROM space. A 5-bit ECC code $C_0$-$C_4$ is generated from the data as shown in Table 2 below. Even parity is maintained, i.e., a check bit is set whenever an odd number of the data inputs associated with that check bit are set.

TABLE 2

| Five Error Code Bits | EIGHT DATA BITS | | | | | | | |
|---|---|---|---|---|---|---|---|---|
| | $D_0$ | $D_1$ | $D_2$ | $D_3$ | $D_4$ | $D_5$ | $D_6$ | $D_7$ |
| $C_0$ | X | X | | X | X | X | | X |
| $C_1$ | X | | X | X | X | | X | X |
| $C_2$ | | X | X | X | | X | X | X |
| $C_3$ | | | | X | X | X | X | X |
| $C_4$ | X | X | X | | | | | X |

When a single bit error is detected, the memory address and syndrome bits are loaded into Trap Registers 720, 722. A 4-bit single bit error counter 724 is then incremented. These trap registers and the error counter are read through an I/O port 516.

The syndrome bits for single bit errors are given in Table 3 below:

TABLE 3

| Syndrome Bits | | | | | Failing Data Bit |
|---|---|---|---|---|---|
| $S_0$ | $S_1$ | $S_2$ | $S_3$ | $S_4$ | |
| 1 | 1 | 0 | 0 | 1 | $0_0$ |
| 1 | 0 | 1 | 0 | 1 | $0_1$ |
| 0 | 1 | 1 | 0 | 1 | $0_2$ |

TABLE 3-continued

| Syndrome Bits | | | | | Failing Data Bit |
|---|---|---|---|---|---|
| $S_0$ | $S_1$ | $S_2$ | $S_3$ | $S_4$ | |
| 1 | 1 | 1 | 0 | 0 | $0_3$ |
| 1 | 1 | 0 | 1 | 0 | $0_4$ |
| 1 | 0 | 1 | 1 | 0 | $0_5$ |
| 0 | 1 | 1 | 1 | 0 | $0_6$ |
| 1 | 1 | 1 | 1 | 1 | $0_7$ |
| 1 | 0 | 0 | 0 | 0 | Check bit 0 |
| 0 | 1 | 0 | 0 | 0 | Check bit 1 |
| 0 | 0 | 1 | 0 | 0 | Check bit 2 |
| 0 | 0 | 0 | 0 | 1 | Check bit 3 |

When a multiple bit memory error (MBE) is detected, the MBE FF is set. This FF drives the multiple bit memory error LED on the SAU panel. Operation of the microprocessors is suspended using its wait control line. The microprocessors will remain in this condition until the hardware is reset.

The Input/Output (I/O) port addresses are assigned and shown in Table 4 below. Note that an I/O read operation to an address outside of this map will result in an $FF_{16}$ data byte.

TABLE 4

| HEX ADDRESS | CONTENTS |
|---|---|
| 80 | Memory Address Trap 00–07. |
| 81 | Memory Address Trap 08–15. |
| 82 | Syndrome Trap 00–04, 3 unused bits. |
| 83 | SBE Counter 00–03, 2 unused bits, access FF00, 02. |
| 84 | SSP Unit Available 00–03, SSP Interface Enable 00–03 |
| 85 | SPI Feature 01–03, BCTS Feature 01–02, UTS 4000 Feature 01. |
| 88 | PATCH word 00 bits 00–07. |
| 89 | PATCH word 01 bits 00–07. |
| 8A | PATCH word 02 bits 00–07. |
| 8B | PATCH word 03 bits 00–07. |
| 8C | PATCH word 04 bits 00–07. |
| 8D | PATCH word 05 bits 00–07. |
| 8E | PATCH word 06 bits 00–07. |
| 8F | PATCH word 07 bits 00–07. |
| 90 | PIO 0 Port A Data word bits 00–07. |
| 91 | PIO 0 Port B Data word bits 00–07. |
| 92 | PIO 0 Port A control word bits 00–07. |
| 93 | PIO 0 Port B control word bits 00–07. |
| A0 | PIO 1 Port A Data word bits 00–07. |
| A1 | PIO 1 Port B Data word bits 00–07. |
| A2 | PIO 1 Port A control word bits 00–07. |
| A3 | PIO 1 Port B control word bits 00–07. |
| B0 | SIO 0 Port A Data word bits 00–07. |
| B1 | SIO 0 Port B Data word bits 00–07. |
| B2 | SIO 0 Port A control word bits 00–07. |
| B3 | SIO 0 Port B control word bits 00–07. |
| C0 | SIO 1 Port A Data word bits 00–07. |
| C1 | SIO 1 Port B Data word bits 00–07. |
| C2 | SIO 1 Port A control word bits 00–07. |
| C3 | SIO 1 Port B control word bits 00–07. |
| D0 | SIO 2 Port A Data word bits 00–07. |
| D1 | SIO 2 Port B Data word bits 00–07. |
| C2 | SIO 2 Port A control word bits 00–07. |
| D3 | SIO 2 Port B control word bits 00–07. |
| E0 | SIO 3 Port A Data word bits 00–07. |
| E1 | SIO 3 Port B Data word bits 00–07. |
| E2 | SIO 3 Port A control word bits 00–07. |
| E3 | SIO 3 Port B control word bits 00–07. |

The Parallel Input/Output Interface 612, includes a first 764 and a second 766 PIO device. Each device is a parallel input/output chip known in the industry as a Z-80 PIO. Each Z-80 parallel I/O (PIO) circuit is a programmable, two part device which provides a TTL compatible interface between peripheral devices and the central Z-80 microprocessor (CPU). The Z-80 PIO utilizes N channel silicon gate depletion load technology and is packaged in a 40 pin dual inline package (DIP). Major features of the Z-80 PIO include:

(a) Two independent 8 bit bidirectional peripheral interface ports with "handshake" data transfer control.
(b) Interrupt driven "handshake" for fast response.
(c) Any one of four distinct modes of operation may be selected for a port, including:
 1. Byte output
 2. Byte Input
 3. Byte bidirectional bus (available on "A" port only)
 4. Bit Control mode
(d) Daisy chain interrupt logic included to provide for automatic interrupt vectoring without external logic.
(e) Eight outputs capable of driving Darlington transistors.
(f) All inputs and outputs are fully TTL compatible.
(g) A single 5 volt supply and a single phase clock are used.

The PIO's 764, 766 are primarily used to control, to read, and to write the interface registers and the locking flip flops of the SAU.

The following Table 5 illustrates the Parallel Input/Output signal usage:

TABLE 5

| PIO 0 Port A | | | |
|---|---|---|---|
| Bit 00 | (output) | MBE DSBL. | This signal will hold the MBE FF clear. |
| Bit 01 | (output) | UNUSED. | |
| Bit 02 | (output) | UNUSED. | |
| Bit 03 | (output) | UNUSED. | |
| Bit 04-07 | (output) | SPI BCTS WR DATA 00-03. | These signals provide write data for the SPI and BCTS interface registers. |
| PIO 0 Port B | | | |
| Bit 00-03 | (output) | SAU Lock Ctrl. 00-03. | The rising edge of this signal will toggle the associated SAU Lock FF. |
| Bit 04-07 | (input) | SAU Lock FF Rd. | These signals represent the state of the SAU Lock FFs. |
| PIO 1 Port A | | | |
| Bit 00-07 | (output) | SPI BCTS ADRS 00-7. | These signals are used to address an interface register for a read or write operation. SPI interface registers 0-127 = ADRS 00-7F$_1$ BCTS interface registers 0-32 = Adrs 80-9F$_1$ Configuration Display Lines BCTS 0-32 = Adrs A0-BF$_{16}$. |
| Bit 00 | (output) | SPI mainframe control. | This signal will disable the SPI and BCTS interface pulses and will enable all SPI control lines regardless of the state of the interface registers. |
| Bit 01 | (output) | SPI BCTS WR Ctrl. | The addressed interface register will be loaded with wr data from PIO 0 Port A on the rising edge of this signal. |
| Bit 02 | (output) | Pulse All Ctrl. | This signal will send an interface pulse on all SPI and BCTS interfaces. |
| Bit 03 | (output) | Clear ECC ERRORS. | This signal will hold the SBE counter and trap registers clear. |
| Bit 04-07 | (input) | SPI BCTS rd DATA 00-03. | These signals represent the state of the addressed interface register or set of BCTS configuration lines. |

There are four SIO interface chips 770, 774, 778 and 782 shown in FIG. 7. These are similar to commercial units known in the industry as Z-80 SIO's. Each is a dual channel multifunction peripheral component designed to satisfy a wide variety of serial data communications required in microprocessing systems. Its basic function is a serial to parallel, parallel to serial converter/controller.

It is capable of handling asynchronous and synchronous byte-oriented protocols such as the IBM SDLC. It can be used to handle most any other serial protocol for applications other than data communications, (for example 250K baud). It is an N-channel silicon-gate depletion-load device, with a 40 pin DIP. It uses a single 5 V supply and a single phase clock. The SIO includes two fully duplexed, independent channels.

The SIO control line usage is as follows:
1. TXDA (OUTPUT) Transmit Data
2. RTSA (OUTPUT) Transmitter and its clock enabled (Receiver is always enabled)
3. RXCA (INPUT) Receive Data
4. RXCA (INPUT) Extracted Receive clock
5. TXCA (INPUT) 250 KHZ Transmit clock

CLOCK GENERATION

Figure 8:
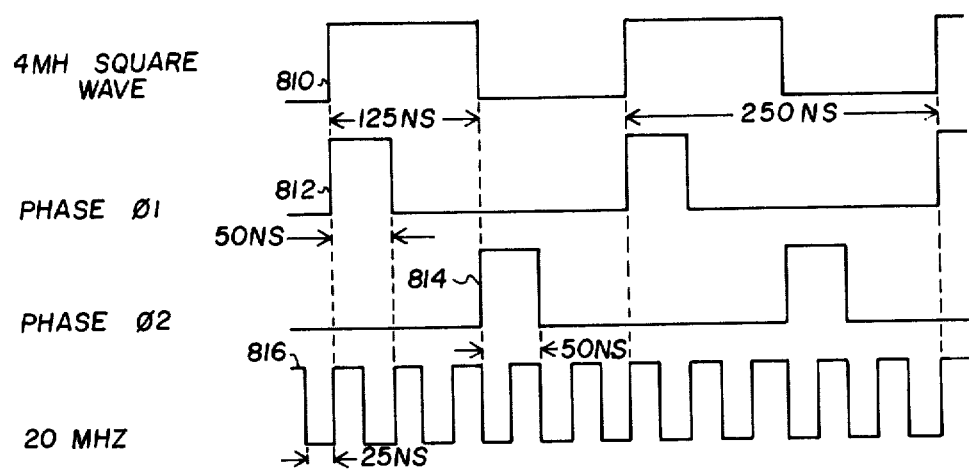
FIG. 8 is a timing diagram illustrating the clock signal sequence.

Timing of the clock signals is shown in FIG. 8. The 4 MH$_Z$ square wave 810 is used by the Z-80 microprocessors, SIO and PIO chips. The 4 MH$_Z$ phase clocks 812, 814 are used by control sequences. The 20 MH$_Z$ signal 816 is used to decode and to clock receive data on the 250K band interfaces.

4 MH$_Z$ signals 810 are derived from an 8 MH$_Z$ oscillator. The 20 MH$_Z$ signal 816 is generated independently from the 4 MH$_Z$ signals 810.

CONTROL SEQUENCES

FIGS. 9, 10, 11, 12, 13 and 14 illustrate the five control sequences used in the Subsystem Access Unit of the present invention.

A. Reset Sequence

Figure 9:
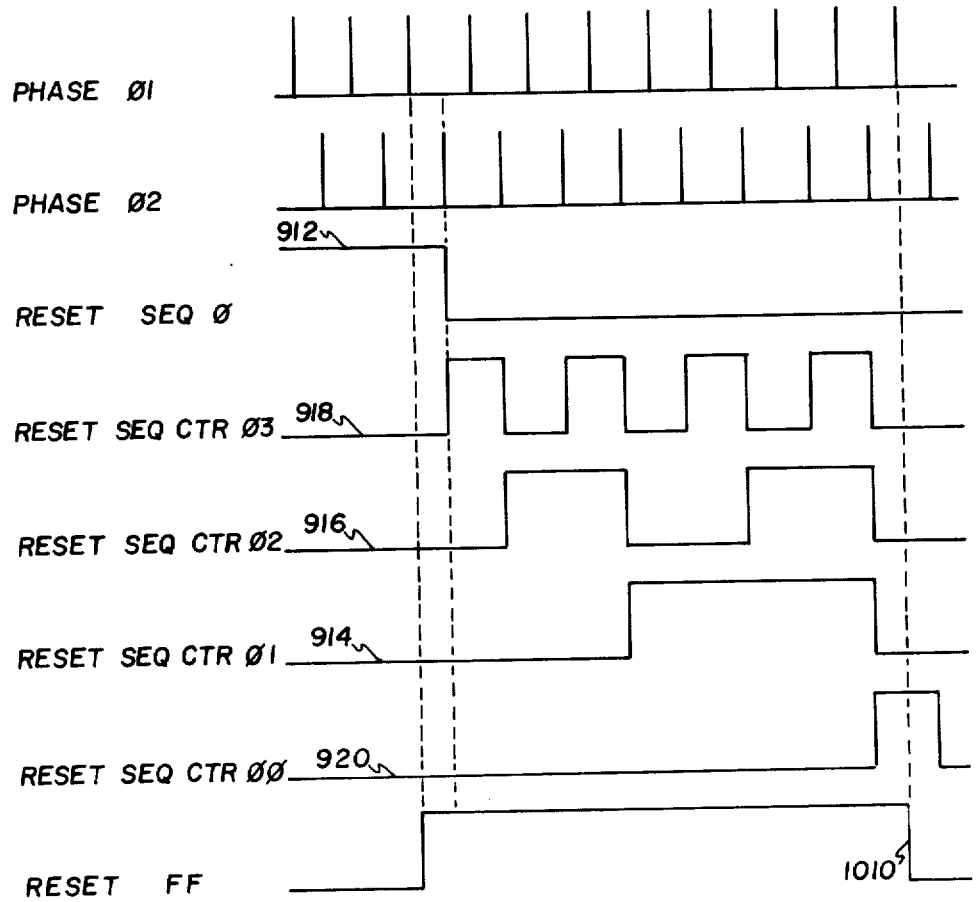
FIG. 9, FIG. 10, FIG. 11, FIG. 12, FIG. 13, and FIG. 14 respectively show the five control sequences used in the subsystem access unit.

This sequence shown in FIG. 9 is used to generate a two microsecond pulse 910 on the Reset FF. It is started on the trailing edge of a reset signal initiated by the power control or a switch on the SAU panel. The reset sequence follows through on signals 912, 914, 916, 918 and 920.

B. Memory Wait Sequences

1. Microprocessor M1 cycle from EPROM

Figure 10:
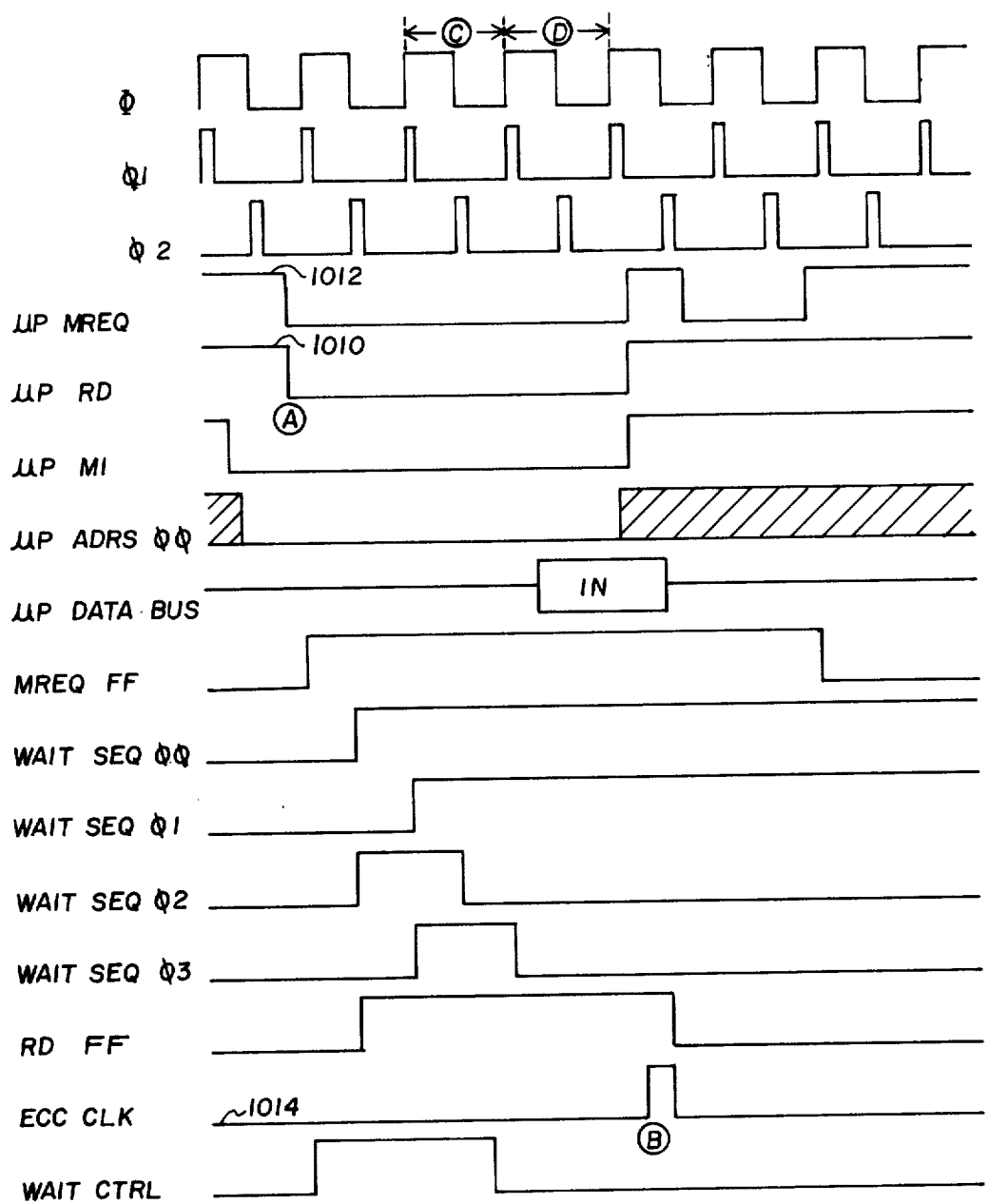

This sequence illustrated in the timing diagram of FIG. 10, is used to generate two wait states on the M1 cycle to the EPROM. This sequence is initiated by the control signals RD 1010 and MREQ 1012 on the control lines of the microprocessor. The two wait states are shown as C and D at the top of the figure. At point A of signal 1010, i.e., the falling edge, the address is loaded in the hold register and the address miscompare FF is clocked. At point B the rising edge, of signal 1014, the address trap register is loaded and the Single Bit Error counter is incremented if it is an SBE operation. However, if it is an MBE operation, then the MBE FF is set.

2. Microprocessor Read Cycle from EPROM

Figure 11:
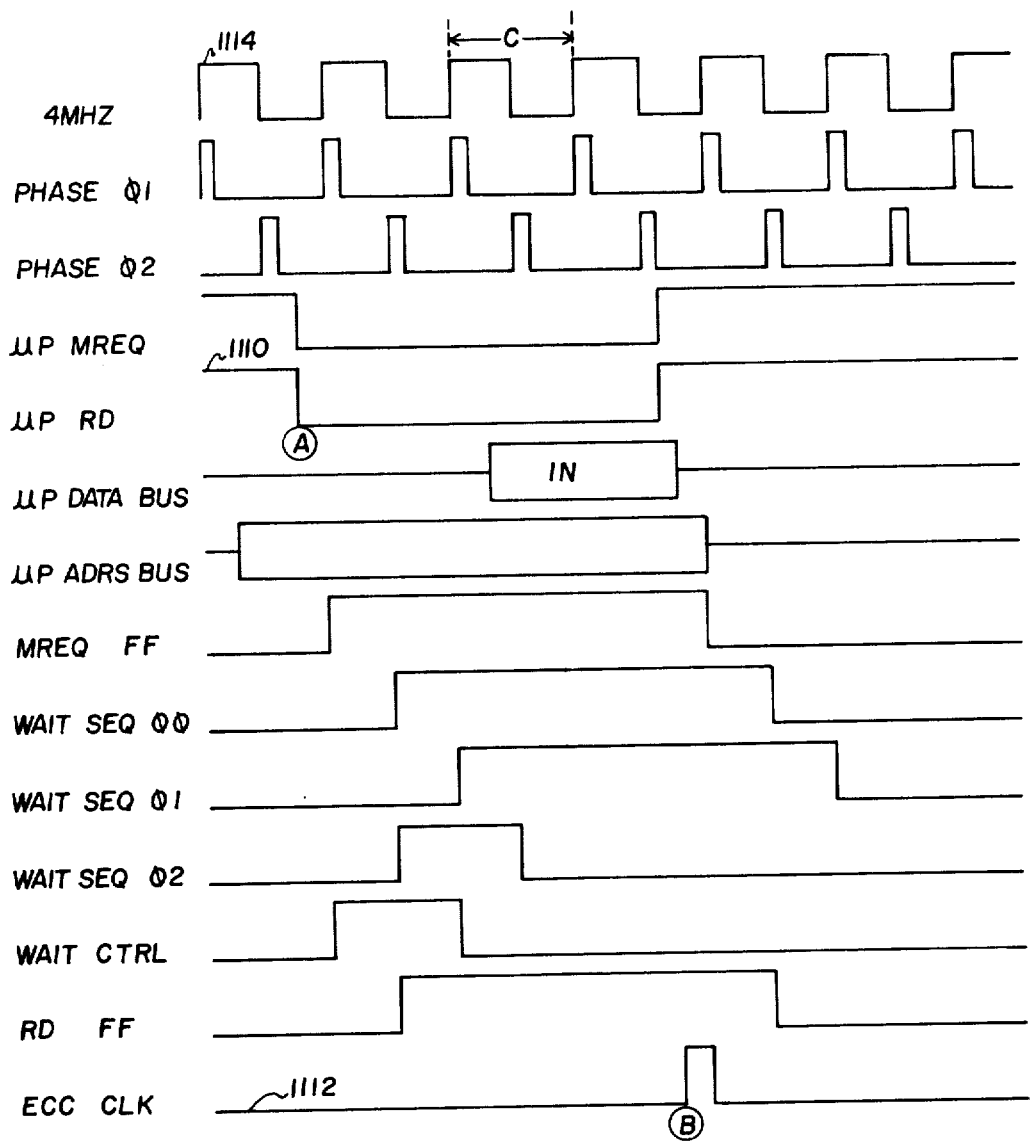

This is the second memory wait sequence and it is used to generate one wait state on a read cycle to EPROM and is illustrated in the timing diagram of FIG. 11.

At point A of signal 1110, the address hold register is loaded and the address miscompare flipflop is clocked by the falling edge of this microprocessor read signal.

At point B of signal 1112, the Error Correction Code clock signal, the address and syndrome trap registers are loaded and the SBE counter is incremented if it is an SBE operation. However, the MBE FF is set if the MBE is on the rising edge of the ECC Clock signal 1110.

Point C of signal 1114, the 4 MH$_Z$ clock, shows the wait cycle.

C. Interface Pulse Sequence

Figure 12:
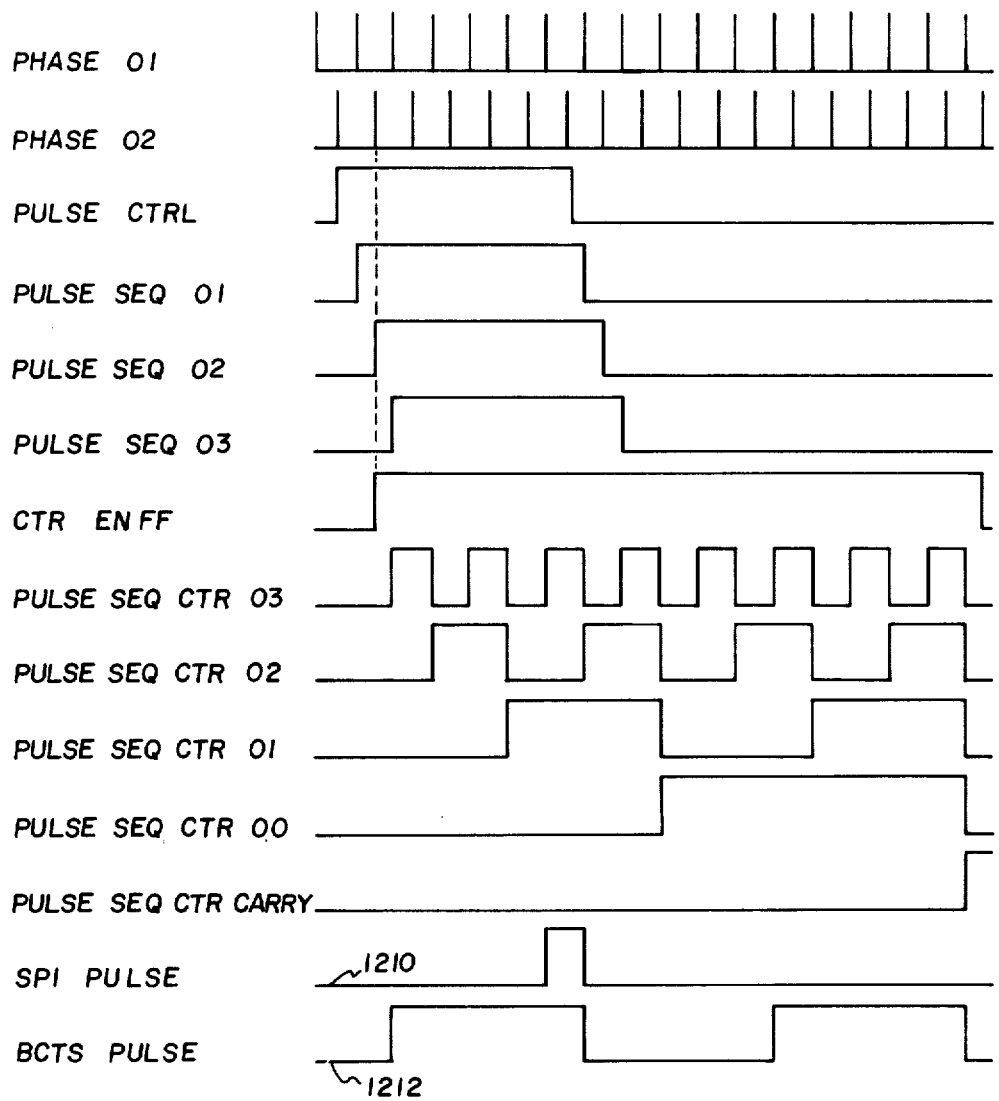

This sequence, shown in FIG. 12, is used to generate a partitioning pulse for the SPI 1210 and BCTS 1212 interfaces. The sequence is initiated by the SPI BCTS Write control (WR) or Pulse all control lines from PIO 1.

D. Manchester Encode Sequence

Figure 13:
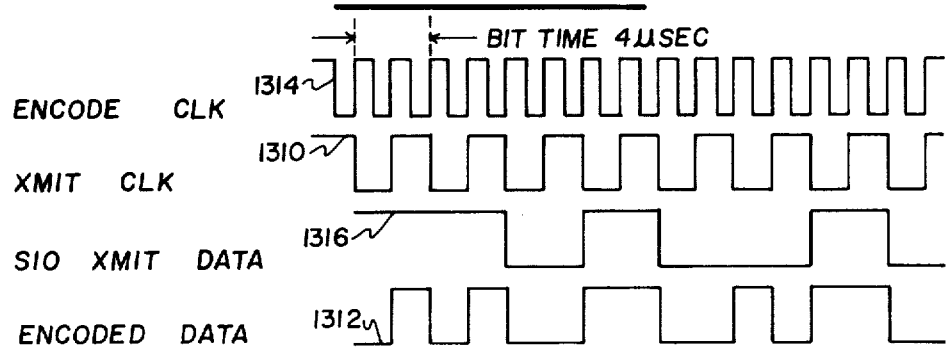

This sequence shown in FIG. 13 is used to generate a transmit clock signal 1310 for the SIO chip and to encode the transmit data signal 1312 for the 250K baud interface. The encode 1314 and transmit clock 1310 signals are generated from the 4 MH$_Z$ clock using a counter. The falling edge of transmit clock signal 1310 is used for the SIO transmit clock signal 1316.

E. Manchester Decode Sequence

Figures 14, 45, 46:
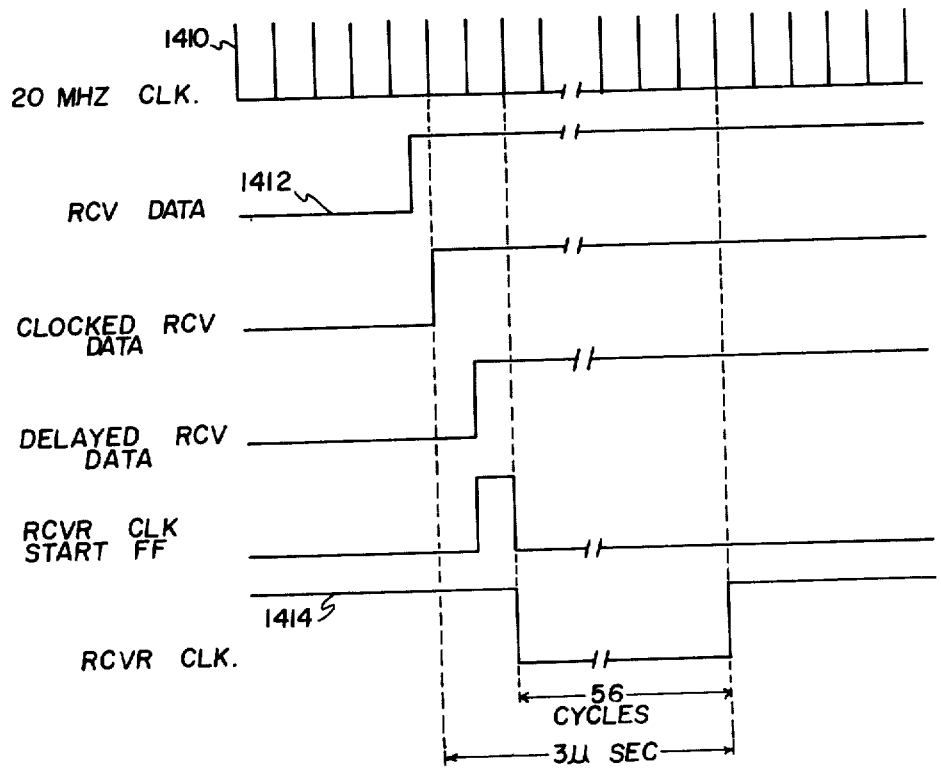
FIG. 45 is the format of the command to Write SSP History.
FIG. 46 is the corresponding format of the command to Read SSP History.

This sequence, shown in FIG. 14, generates a clock signal used by the SIO chip to receive the encoded data on the 250K baud interface. The sequence is run on the 20 MH$_Z$ clock 1410. It is started by a Receive Data transition of signal 1412 and generates a rising edge on the Receiver Clock signal 1414 three microseconds later.

DATA REGISTERS AND FLIP-FLOP CIRCUITS

A. Shared Peripheral Interface (SPI) Register

Each SPI has a 4 bit (00 to 03) register used to drive the channel disable lines for the interface. The register is addressed, written into and read from using the address, data and write control signals from the PIO chips previously described.

B. Byte Channel Transfer Switch (BCTS) Registers

Each BCTS interface contains eight 4-bit (00 to 03) registers used to drive the switch enable lines. These registers are maintained in the same manner as the SPI Registers.

C. Address Hold Register

This 16 bit (00 to 15) register is used to hold the value of the address bus. It is loaded at the beginning of each microprocessor cycle by the falling e dge of the RD or WR microprocessor control lines.

D. Trap Address Register

This 16 bit (00 to 15) register is used to trap the memory address where the last single bit error was encountered. It is loaded with data from the Address Hold Register on the rising edge of the read control line if a single bit error is present.

E. Syndrome Trap Register

This 5 bit (00 to 04) register is used to trap the syndrome bits of the last single bit error encountered. It is clocked with the same signal as the Address Trap Register above.

F. Single Bit Error Counter

A 4 bit (00-03) used to log the number of single bit error encountered. The count is incremented using the same clock as the trap registers. Upon reaching the maximum value of 15, the counter will hold this value until cleared.

G. Multiple Bit Error flop (MBE FF)

This FF is set when a multiple bit memory error is detected. It is clocked using the rising edge of the microprocessor read control. When set the FF will drive the memory error LED and will suspend operation of the microprocessors using the wait control signal.

H. Data Miscompare Flip-flop

This FF is set when a miscompare is detected between the two microprocessor data busses during a write cycle. It is clocked on the rising edge of the microprocessor write control. When the FF is set it will activate the microprocessor fault LED and will suspend operation of the microprocessors using the wait control signal.

I. Address Miscompare Flip-flop

This FF is set when a miscompare is detected between the two microprocessor address busses during a ready or a write cycle. It is clocked on the falling edge of the microprocessor read or write control. Here again, the fault LED will be activated and the operation of the microprocessors will be suspended using a wait control signal.

J. Memory Request Flip-flop

This FF is used to define a memory request cycle. The state of the microprocessor memory request signal is loaded on every phase 01.

K. Read Flip-flops (RDFF)

RDFF used to detect the rising edge of the microprocessor RD control. The state of the RD signal is loaded every phase 02.

L. SAU Lock Flip-flops

These are four flipflops 00 to 03. They are used to drive the SAU lock LED's and to detect a lock clear from the SAU panel. The state of the FF's will toggle on the rising edge of the SAU Lock Control signal from PIO 0 and will be cleared using the CLEAR SAU lock switches.

M. Transmit Inhibit Flip-flop

This FF is used to disable the transmit enable signal from an SIO. It is set when an overload on the 250K baud interface is sensed by the transceiver circuit. It will be cleared when the SIO drops its transmit enable signal. Note here that registers, counters and flip-flops are well known devices in the art and are not considered to need any further description.

INTERFACES

A. Shared Peripheral Interface (SPI)

An SPI is shown in FIGS. 6 and 7 as 540. It consists of five signals sent to peripheral subsystems equipped to allow remote control of a multiple I/O channel interface. Signals consist of four channel disable lines and a partitioning pulse line. This partitioning pulse indicates to the SPI that it shall partition its channel interfaces according to the state of the signal on the channel disable lines.

Each interface consists of a four bit interface register (744, 748 of FIG. 7) and a partitioning pulse source for driving the control line drivers 746, 750.

All channel disable lines are set to the enable condition after the system has been powered up or after a reset operation. Each SPI feature contains thirty-two (32) interfaces.

Figure 15:
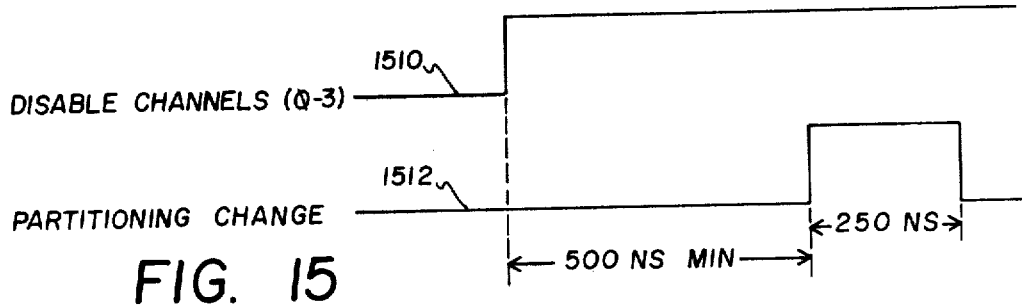
FIG. 15 is a timing diagram showing the timing signals of the shared peripheral interface (SPI).

1. Signal Description
   (a) Disable channel
      The active (high) level of the signal 1510, shown in FIG. 15 causes the SPI to disable its channel interface.
   (b) Partitioning change
      Signal 1512, shown in FIG. 15, causes the SPI to partition its channel interfaces according to the state of the enable lines.

B. Byte Channel Transfer Switch (BCTS) Interface

Interfaces for up to four byte channel transfer switches are available to the SAU. These are shown generally as 560 in FIG. 6 and FIG. 7. Each BCTS feature in the SAU accommodates two four channel by eight bit string switches. Connection to a BCTS is through its remote operator interface. Switch enable signals are generated in eight 4 bit interface registers 752, 762. These registers are maintained in the same manner as the SPI registers previously described.

Figure 16:
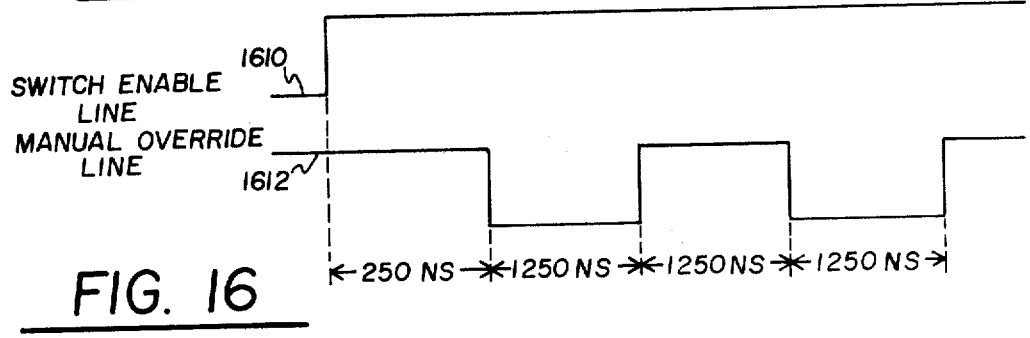
FIG. 16 is a also timing diagram showing the timing signals of the byte channel transfer switch (BCTS) interface.

1. Signal Description
   (a) Switch enable lines
      Thirty-two (32) of these signals 1610 of FIG. 16 are provided on each interface to control switching combinations for up to a four by eight (4×8) switch. These signals are considered active when they are low.
   (b) Manual override lines
      The signals on these lines are illustrated as 1612 of FIG. 16. It provides a demand strobe for the switch enable lines causing the switching of the subsystem to be performed.
   (c) Switch Configuration display lines
      Thirty-two (32) of these signals display the current partitioning status of the BCTS. The signals are considered in the active condition when they are low.

C. 250K Baud Interface

More completely defined, this is a 250K baud, unbalanced, half duplexed serial interface. It is used for communications between the SAU and the System Support Processor (SSP) or other command source. It is connected via the SSP's System Interface Adapter (SIA). Universal Data Link Control (UDLC) protocol is used and the interface data is Manchester encoded.

Two SIO ports are used for each interface to provide error checking. This is shown generally in FIG. 6 by reference numeral 624. FIG. 7 is more specific and illustrates the detail of this block at 728 to 472, and at 770 to 782. During a receive operation both SIO ports of 770a, 770b are programmed as receivers and the received data is compared by both 770a and 770b ports. During transmission, a master SIO 770b is programmed for transmit and a redundant SIO 770a is programmed for receive. The master SIO port 770b sends serial data which is encoded by encoder portion of 728 and driven by the interface transceiver circuit 736. This same data is returned by the receiver section of the transceiver 736, decoded by decoder portion of 728 and received by the redundant SIO port 770a for verification.

D. System Panel Interface

Interfaces to four system panels are contained in the SAU. Alarm and environmental signals are handled by the SAU's power control unit. A total of eight select SSP signals are available (two from each of the four interfaces). A patch is used to select one signal for each 250K baud interface.

1. Signal Description
   (a) Select SSP
      A high level on this signal will enable the selected 250K band interface in the SAU. Interfaces will be enabled when no system panel cables are converted.
   (b) Power/Environment Check
      When a power or environment fault is detectd in the SAU a low level signal will be sent to all four system panels. This signal is cleared by the fault reset switch on the SAU power control panel.
   (c) Alarm
      When a power or environment fault is detected in the SAU, a low level signal will be sent to all four system panels. An alarm reset signal from a system panel will clear the alarm signal only for that panel interface.
   (d) Alarm Reset
      A low active pulse from a system panel that will clear the alarm signal from the SAU to that panel.

E. Maintenance Interface

This is an interface to the microprocessor 610 of FIG. 7 address, data and control busses. It is accomplished through a pair of forty (40) pin connectors.

1. Signal Description
   (a) Data bus signals
      This is an internal eight bit (00 to 07) bidirectional data bus which is used by the microprocessor 610 of FIG. 7 for data handling. The bus is buffered with tri-state transceiver circuits.
   (b) Address Bus signals
      This is an internal sixteen bit (00 to 15) bus used by the microprocessor 610 to address the memory and the I/O ports. The bus is driven by tri-state drivers.
   (c) BUSAK, M1, RD, WR, IORQ, RFSH, MREQ signals
      These are control signals from the microprocessor 610. They are driven by tri-state drivers.
   (d) Clock signals
      This is a 4 MHZ square wave which is used by the microprocessor (CPU), SIO and PIO chips. It is driven by a Schottky circuit.
   (e) BUSRQ signal
      A low level on this signal will request the microprocessor 610 to go to the busy, acknowledge mode (BUS/ACK). It uses a Schottky receiver.
   (f) Wait Signal
      A low level on this signal will cause the microprocessor 610 to generate the wait signals previously described. A Schottky receiver is used.
   (g) Error Inhibit signal A low level signal here will override the fatal fault condition of a multiple bit memory error (MBE) or a microprocessor 610, 710 miscompare.

(h) A five volt signal provides the logic power to interface through these lines.

F. Unit Available Interface

The SAU contains an interface for receiving four SSP Unit Available signals. Implementation of these signals by an SSP is optional. This signal, when active, will prevent any other SSP from taking over partitioning functions regardless of the state of the SAU Lock Access Switches.

PROGRAMMING

A. Instruction Set

A list of commands and their format utilized by the Subsystem Access Unit (SAU) will now be described.

In order to accomplish partitioning of any system, it is necessary to be aware, not only of what is available in a computer room, but also how the various computer components are configured.

The computer room configuration tables contain physical parameters associated with this interconnection of system components. The data consists of:

(a) The association between IOP and application.
(b) The identification of up to four SPIs that can control access to a multiple access subsystem.
(c) The designation of one of four SSPs which can make subsystem partitioning changes on behalf of up to sixteen applications.
(d) The connection between each SPI port and one of sixteen IOPs.
(e) The connection between each BCTS subsystem string and up to four of sixteen IOPs.
(f) The enabled/disabled status of each SPI port.
(g) The enabled/disabled status of up to four IOP channels assigned to each BCTS subsystem string.
(h) The indication that a subsystem is sharable between applications or is dedicated to a single application.
(i) The indication to ensure that subsystem partitioning is requested only by the SSP designated to do so on behalf of that application.

All SSP requests to the SAU undergo a series of checks against data housed in the computer room configuration tables. Based on the results of these checks, the request is either executed or rejected with a status indicating why the request was rejected. The following tables comprise the computer room configuration tables.

Subsystem Interface Table

The Subsystem Interface Table contains 160 locations, one for each SPI and BCTS subsystem string. Each SPI is assigned a table location in the range of 00 to 7F (hexadecimal). Each BCTS string is assigned a location in the range of 80 to 9F (hexadecimal). The format of the table is shown in FIG. 17.

A Multiple Access Subsystem (MAS) represents one word subsystem (one word peripheral control unit) containing one or more four-channel Shared Peripheral Interfaces (SPI). The MAS bit identifies up to four SPIs controlling access of up to sixteen channels to a single multiple access subsystem. The following rules govern the use of multiple access subsystems.

(a) The MAS bit is used only for those subsystems connected to SPIs. It has no meaning for subsystem springs connected to a BCTS and must be zero in all BCTS table locations.
(b) When set, the MAS bit indicates that the SPI is part of a multiple SPI subsystem.
(c) When clear, the MAS bit indicates that the SPI is the first of a set of multiple SPIs if the MAS bit in the next location is set. If the MAS bit in the next location is clear, the SPI is the only one configured on the subsystem.
(d) Multiple SPI subsystems must be configured such that their Subsystem Configuration Table locations are contiguous.
(e) The maximum number of multiple SPIs is four, i.e., one table location with the MAS bit clear followed by three consecutive locations with the MAS bit set.

Associated with each SPI and each subsystem string of each BCTS is SAU resident data that indicates SPI port or BCTS channel enable/disable status. This information is updated with each subsystem partitioning change requested by an SSP and effected by the SAU.

When the SAU powers on, the partitioning status table indicates that all SPI and BCTS interfaces are disabled. Once the SAU has been initialized, the partitioning status table indicates current status of each interface. The SAU initialization process is described later in this specification.

This partitioning control flag field specifies the partitioning status of each SPI or BCTS subsystem string.

Partitioning Control Flags

C0

SPI Subsystems—The C0 bit controls IOP access to port zero of the SPI. When set, it indicates that port zero of the SPI is enabled to the channel to which it is connected. When clear, it indicates that port zero of the SPI is disabled from the channel to which it is connected.

BCTS Subsystem Strings—The C0 bit controls BCTS channel A access to the subsystem string. When set, it indicates that BCTS channel A is connected to the subsystem string. When clear, it indicates that channel A is disconnected from the subsystem string.

C1

SPI Subsystems—The C1 bit controls IOP access to port one of the SPI. When set, it indicates that port one of the SPI is enabled to the channel to which it is connected. When clear, it indicates that port one of the SPI is disabled from the channel to which it is connected.

BCTS Subsystem Strings—The C1 bit controls BCTS channel B access to the subsystem string. When set, it indicates that BCTS channel B is connected to the subsystem string. When clear, it indicates that channel B is disconnected from the subsystem string.

C2

SPI Subsystems—The C2 bit controls IOP access to port two of the SPI. When set, it indicates that port two of the SPI is enabled to the channel to which it is connected. When clear, it indicates that port two of the SPI is disabled from the channel to which it is connected.

BCTS Subsystem Strings—The C2 bit controlls BCTS channel C access to the subsystem string. When set, it indicates that BCTS channel C is connected to the subsystem string. When clear, it indicates that channel C is disconnected from the subsystem string.

C3

SPI Subsystems—The C3 bit controls IOP access to port three of the SPI. When set, it indicates that port three of the SPI is enabled to the channel to which it is connected. When clear, it indicates that port three of the SPI is disabled from the channel to which it is connected.

BCTS Subsystem Strings—The C3 bit controls BCTS channel D access to the subsystem string. When set, it indicates that BCTS channel D is connected to the subsystem string. When clear, it indicates that channel D is disconnected from the subsystem string.

EU

The Exclusive Use bit controls subsystem availability to multiple applications. When set, it indicates that the subsystem is accessible to one application. When clear, it indicates that the subsystem is accessible to more than one application.

The EU bit in the first location of a set of SPIs in a multiple access subsystem establishes Exclusive Use for all SPIs connected to the subsystem. When Exclusive Use is indicated, the SAU ensures that IOPs enabled to the subsystem all reside in the same application.

This subsystem IOP number field specifies the IOP number associated with each of the four ports/channels of a SPI or BCTS. It also provides an indication that multiple SPIs control access to the subsystem.

Subsystem

IOP Number

C0 IOP Number—This field contains the number of the IOP connected to port zero of the SPI or channel A of the BCTS.

C1 IOP Number—The field contains the number of the IOP connected to port one of the SPI or channel B of the BCTS.

C2 IOP Number—This field contains the number of the IOP connected to port two of the SPI or channel C of the BCTS.

C3 IOP Number—This field contains the number of the IOP connected to port three of the SPI or channel D of the BCTS.

U—Within each IOP number field is an Unassigned bit. This bit, when set, indicates that no IOP is connected to the SPI port or BCTS channel associated with this field.

SSP Application Table

The SSP application table, one entry of which is shown in FIG. 18, contains 16 locations, one for each application. Each application must be assigned one SSP to make partitioning changes affecting the application. Only the SSP designated to a particular application is allowed to change that application's partitioning. This designation can be altered by any SSP; however, the application whose SSP number is being changed must not be in SAU Lock Mode.

SSP's are assigned as follows:

L—When set, the SAU Lock Mode bit prevents the Subsystem IOP Number portion of the Subsystem Interface Table from being altered application. This bit can only be set by a command from the SSP whose number is present in bits 6-7. This bit can be cleared by a command from the SSP whose number is in bits 6-7; manually via the CLEAR SAU LOCK 0,1,2,3 operator controls; and, in the event of a disabled SSP with redundancy specified, via a command from the redundant SSP. (A disabled SSP with redundancy specified is defined as an SSP which has deactivated its Unit Available signal and whose associated SAU LOCK ACCESS switch is in the DUAL position.

U—When set, the Unassigned bit indicates that no SSP is assigned to make partitioning changes on behalf of the application. All partitioning requests affecting the application will be rejected. The U bit is set by power-up initialization and an SAU Reset command. When the U bit is clear, bits two and three specify the SSP assigned to make partitioning changes in the application.

SSP Number—This value specifies the SSP number designated to make partitioning changes on behalf of the application. The possible values are:

00 Specifies that this SSP is connected to the SSP/SAU interface 0

01 Specifies that this SSP is connected to the SSP/SAU interface 1

10 Specifies that this SSP is connected to the SSP/SAU interface 2

11 Specifies that this SSP is connected to the SSP/SAU interface 3

IOP State Table

Associated with each IOP is a SAU resident location containing the information shown in FIG. 19 indicating the status of the IOP. From an SAU viewpoint, an IOP is in one of the following states:

(a) It is assigned to Application 0, 1, . . . , or 15.

(b) It is offline, i.e., not assigned to an application.

(c) It has not been assigned to any of the above states.

The assignment of IOPs to application or offline status within the SAU is made via SSP commands to the SAU. Note that assigning an IOP to an application at the IOP or system level is an action independent of assigning an IOP to an application at the SAU level. The first action causes the IOP to respond to the SSP assigned to the same application. The second action updates SAU-resident information used for SAU-internal checks.

When the SAU powers up, the SAU considers an IOP to be neither in the offline state nor assigned to an application i.e., the IOP is in the unassigned state, defined above. After an IOP has been assigned to offline status or to an application, it is not re-assigned to the "unassigned" state without SAU reinitialization.

Any SSP, via an SSP command to the SAU, can assign an IOP in "unassigned" state to offline status. In order to assign an IOP to an application, the following conditions must be met:

(a) The SSP making the request must be in the same application as that to which the IOP is being assigned.

(b) The IOP must be in offline status.

(c) All subsystem interfaces that are to this IOP and are controlled by the SAU must be disabled.

An IOP that is currently assigned to an application (from an SAU viewpoint) can be placed in offline status via an SSP command under the following conditions:

(a) The SSP making the request must be in the same application as that from which the IOP is being removed.

(b) All subsystem interfaces that are to this IOP and are controlled by the SAU must be disabled.

The IOP State Table an entry of which is shown in FIG. 19 contains 16 locations, one for each IOP. Each location contains a 5-bit value which reflects the partitioning status of an IOP. The following values are assigned:

| State Value | IOP Partitioning Status |
| --- | --- |
| 00000 | Assigned to application zero |
| 00001 | Assigned to application one |
| 00010 | Assigned to application two |
| 00011 | Assigned to application three |
| 00100 | Assigned to application four |
| 00101 | Assigned to application five |
| 00110 | Assigned to application six |
| 00111 | Assigned to application seven |
| 01000 | Assigned to application eight |
| 01001 | Assigned to application nine |
| 01010 | Assigned to application ten |
| 01011 | Assigned to application 11 |
| 01100 | Assigned to application twelve |
| 01101 | Assigned to application thirteen |
| 01110 | Assigned to application fourteen |
| 01111 | Assigned to application fifteen |
| 10000 | Offline |
| 10001 to 11110 | Reserved |
| 11111 | Never assigned to an application |

SSP History Table

The information in the SSP History Table, an entry of which is shown in FIG. 20, is provided to aid in SAU initialization and recovery. The SSP History Table has four entries, one for each SSP. Only the SSP assigned to an entry may write or read that entry. The bit assignments of the SSP History flags are as follows:

| | |
| --- | --- |
| SAU Lock | This bit is set by the SAU whenever the SSP for this table entry assigned to an application which is in SAU Lock Mode. |
| Microcode Loaded | This bit is set by the SSP which loads and verifies the SAU control store. The setting of this bit by an SSP will cause it to be set for all table entries. |
| IOP Numbers Loaded | This bit is set by the SSP which loads and verifies the IOP Number portion of the Subsystem Interface Table. The setting of this bit by an SSP causes it to be set for all table entries. |
| SSP Numbers Written | This bit is set by an SSP after it gains control of its applications by making assignments in the SSP Application Table. |
| Add/Remove Subsystems Complete | This bit is set by an SSP after it performs the appropriate Add Subsystem and Remove Subsystems commands in order to initialize the Subsystem Interface Table to a state which reflects the current partitioning of control units and subsystem strings within this SSP's control. |
| No SSP Action Taken | This bit is set by the SAU if it receives no acknowledge to power-on status. The bit is set by an SSP in the event of an error or failure to initiate its responsibile areas within the SAU. |

Associated with each SPI is information indicating whether or not the subsystem is currently dedicated to (i.e., is being exclusively used by) a particular application. Note that exclusive use is applied to the subsystem, not an SPI only. Thus, due consideration must be made to dual access subsystems, i.e., subsystems controlled by two control units via an SPI per control unit.

Enabling/disabling exclusive use is a function that is implemented and enforced within the SAU. In particular, the subsystem's control unit(s) is (are) not cognizant of exclusive use; rather, the control of which SPI ports are enabled or disabled according to application is within the scope of the SAU's functions.

The enabling or disabling of exclusive use is initiated by a command word from an SSP. This command is an integral part of an SPI port enable/disable command (referred to later as an add subsystem or remove subsystem command).

SAU Operations

Command Word

SAU operations are controlled by a 4-byte command word in the format shown in FIG. 21.

Command—Contains the 8-bit code which identifies the operation.

Operand—Contains data necessary for the execution of the command.

Address—Contains the address where the command will be executed.

The commands as shown in Table No. 6 are executed by the SAU:

TABLE 6

SAU COMMANDS

| Command | Code 0 1 2 3 4 5 6 7 | |
| --- | --- | --- |
| Add Subsystem | 0 0 0 0 0 1 0 1 | $05_{16}$ |
| Remove Subsystem | 0 0 0 1 0 1 0 1 | $15_{16}$ |
| Write Subsystem IOP Number | 0 0 0 0 1 0 0 1 | $09_{16}$ |
| Read Subsystem Interface Table | 0 0 0 0 1 0 1 0 | $0A_{16}$ |
| Write IOP State | 0 0 1 1 0 0 0 1 | $31_{16}$ |
| Read IOP State | 0 0 1 1 0 0 1 0 | $32_{16}$ |
| Write SSP Number | 0 0 1 0 0 0 0 1 | $21_{16}$ |
| Read SSP Number | 0 0 1 0 0 0 1 0 | $22_{16}$ |
| Write Control Store | 1 0 0 0 0 0 0 1 | $81_{16}$ |
| Read Control Store | 1 0 0 0 0 0 1 0 | $82_{16}$ |
| SAU Reserve | 0 0 0 1 0 0 1 1 | $13_{16}$ |
| SAU Release | 0 0 1 0 0 0 1 1 | $23_{16}$ |
| SAU Reset | 1 1 1 1 1 1 1 1 | $FF_{16}$ |
| Read ID Word 0 | 0 0 0 0 1 1 1 0 | $0E_{16}$ |
| Read ID Word 1 | 0 0 0 1 0 0 1 0 | $12_{16}$ |
| Read SPI | 0 0 1 0 1 0 1 0 | $2A_{16}$ |
| Read BCTS Interface | 0 0 1 1 1 0 1 0 | $3A_{16}$ |
| Set Test Mode | 0 0 0 1 0 1 1 1 | $17_{16}$ |
| Clear Test Mode | 0 0 1 0 0 1 1 1 | $27_{16}$ |
| Set SAU Lock | 0 1 1 0 0 1 1 1 | $67_{16}$ |
| Clear SAU Lock | 1 0 0 0 0 1 1 1 | $87_{16}$ |
| Write SSP History | 1 0 0 1 0 0 0 1 | $91_{16}$ |
| Read SSP History | 1 0 0 1 0 0 1 0 | $92_{16}$ |

The SAU resident data is used by the SAU to ensure SSP and application integrity when partitioning status modifications are requested. These modifications occur during the SAU's initialization and may also occur during a production period or between production periods. In particular, the changes are initiated as a result of any of the following.

(a) The SAU is being initialized, and the partitioning status table and corresponding status are being changed to indicate current status.

(b) A subsystem is to be added to and/or removed from an application.

(c) An application's mainframe composition (i.e., IPs, MSUs, IOPs) is being changed as a result of the beginning or end of a particular production period.

Three basic SSP commands are used to carry out the changes: add subsystem, remove subsystem, and change IOP status. Depending on the action (described above) initiated, one or a series of these commands are made.

The SAU checks made before effecting the changes requested are described below.

Add Subsystem

The Add Subsystem command word is shown in FIG. 22.

Command—$05_{16}$

Operand—Specifies the SPI port, if any, or BCTS channel to be enabled and whether subsystem Exclusive Use is to be enabled.

Table Address—Contains the 8-bit Subsystem Interface Table address assigned to the subsystem.

The Add Subsystem command loads one-bits from positions 3-7 of the operand field into the partitioning control field of the addressed Subsystem Interface Table location. The subsystem is repartitioned as specified by the command. SPI ports and BCTS channels other than those specified by one-bits from positions 3-7 of byte 1 are unaffected.

The following errors cause a Data Check status condition:
  (a) The Exclusive Use bit is already set in the table, and the subsystem is already enabled to IOPs that are in different applications.
  (b) The subsystem is already enabled to an IOP that has never been partitioned to an application, assigned to a reserved state, or offline.

The following errors cause a Partitioning Check status condition:
  (a) The request specifies that more than one channel is to be enabled to a BCTS subsystem string.
  (b) The IOP to which the subsystem is to be enabled has never been partitioned or is assigned to an offline state.
  (c) The requesting SSP is not authorized to make partitioning changes on behalf of the applications associated with the IOPs to which the subsystem is to be enabled.
  (d) The command or table specifies Exclusive Use and the resulting partitioning state will cause the subsystem to be enabled to IOPs in different applications.
  (e) The table address specifies a subsystem whose feature is not installed.

The command will be rejected if specified table address is out of range.

Remove Subsystem

The Remove Subsystem command word is illustrated in FIG. 23.

Command—$15_{16}$

Operand—Specifies the SPI port, if any, or BCTS channel to be disabled and whether subsystem Exclusive Use is to be disabled.

Table Address Contains the 8-bit Subsystem Interface Table address assigned to the subsystem.

The Remove Subsystem command loads zero-bits from positions 3-7 of the operand field into the partitioning control field of the addressed table location. The subsystem is repartitioned as specified by the command. SPI ports and BCTS channels other than those specified by zero-bits from positions 3-7 of byte 1 are unaffected.

The following errors cause a Data Check status condition:
  (a) The Exclusive Use bit is set and the subsystem is enabled to IOPs in different applications.
  (b) The subsystem is enabled to an IOP that has never been partitioned to an application, assigned to a reserved state, or is offline.

The following errors causes a Partitioning Check status condition:
  (a) The requesting SSP is not authorized to make partitioning changes on behalf of the applications associated with the IOPs from which the subsystem is to be disabled.
  (b) The table address specifies a subsystem whose feature is not installed.

The command will be rejected if the specified table address is out of range.

Write System IOP number

The Write System IOP number is shown in FIG. 24.

Command—$09_{16}$

The Write Subsystem IOP Number command performs a block write of all 160 locations in the Subsystem Interface table starting at location zero.

Each table location requires five bytes of data as shown in the FIG. 25 format. The partitioning control flags field is set to zero.

The command will be rejected if any of the 16 applications are in the SAU Lock Mode.

The following error causes a Data Check status condition:
  (a) The MAS bit is set for the first location of the Subsystem Interface Table.
  (b) As a result of the execution of the command, the MAS bit is set in more than three consecutive table locations.
  (c) As a result of the execution of the command, the MAS bit is set for a BCTS subsystem string.

Read Subsystem Interface Table

A Read Subsystem Interface table entry is shown in FIG. 26. The $0A_{16}$ in Byte 0 is given in hexadecimal binary code.

Count—This field contains the number of consecutive entries to return to the SSP, beginning with the entry specified in byte 2. The maximum allowable count is $28_{16}$.

Table Address—This field contains the starting address of a block of Subsystem Interface Table entries which will be returned to the requesting SSP.

The five bytes of data shown in FIG. 27 for each specified entry are returned to requesting SSP. This command will be rejected if it specifies a table address which is out of range.

Write IOP State

This command is illustrated in FIG. 28.

IOP State—This field contains the partitioning state to be written into the IOP State Table location specified by the IOP number.

IOP Number—This field contains the IOP number whose state is changing.

The following errors cause a Partitioning Check status condition:
  (a) The requesting SSP is not authorized to make partitioning changes on behalf of the application currently assigned to the IOP.

(b) The requesting SSP is not authorized to make partitioning changes on behalf of the application specified in the IOP State field in the command.
(c) The addressed IOP is currently assigned to an application, and the command specifies an IOP state other than offline.
(d) The addressed IOP is currently assigned to offline, and the command specifies an IOP state other than an application.
(e) The addressed IOP is currently enabled to any SPI port or BCTS subsystem string.

Read IOP State

This command is shown in FIG. 29.

Command $32_{16}$ Count—This field contains the number of consecutive IOP's whose states will be returned, beginning with IOP specified in Byte 2.

IOP Number—This field specifies first of a block of consecutive IOP numbers whose states will be returned to the requesting SSP.

Write SSP Number

The Write SSP Number command is shown in FIG. 30.

Command—$21_{16}$

SSP Number—This field contains the number of the SSP to be assigned to make partitioning changes on behalf of the addressed application.

The SSP number assignments are shown below:

| SSP Number | SSP to be Assigned |
|---|---|
| 00 | 0 |
| 01 | 1 |
| 10 | 2 |
| 11 | 3 |

Application—This field specifies the application whose SSP assignment is changing.

U=0—Indicates that positions 6 and 7 of byte 1 specify the SSP number to be assigned to make subsystem partitioning changes on behalf of the addressed application.

U=1—Indicates that the addressed application is to be unassigned to any SSP.

The Write SSP Number command will be rejected if the specified application is in SAU Lock mode.

Read SSP Number

The Read SSP Number command is shown in FIG. 31.

Command—$22_{16}$

Count—This field contains the number of consecutive applications whose SSP assignments will be returned, beginning with the application specified by byte 2.

Application—This field specifies the first of a block of consecutive applications whose SSP assignments will be returned to the requesting SSP.

For each specified application a byte of data is returned to the requesting SSP. This Byte 0 includes zeroes in bits 0-3. The SSP number in bits 6 and 7. An L (locked) in bit 4 and a U (unavailable) in bit 5. The command is rejected if the command specifies a table address which is out of range.

Write Control Store

This command $81_{16}$ is illustrated in FIG. 32.

Count—This field contains the number of control store locations to be written, beginning at the location specified by bytes 2 and 3.

Control Store—These fields specify the first of a block of

Address—control store addresses to be written.

A write of control store is performed, beginning at the specified address. The number of bytes to be written is specified by the count field and is limited to 256 bytes per command.

The Load Control Storage command is rejected if any of the 16 applications are in SAU Lock Mode or if the command specified an address which is out of range.

Read Control Store

This command $82_{16}$ is shown in FIG. 33. Command—$81_{16}$

Count—This field contains the number of control store locations to be returned, beginning with the location specified by bytes 2 and 3.

Control Store Address—These fields specify the first of a block of control store addresses to be returned to the requesting SSP.

A read of control store is performed, beginning at the specified address. The number of bytes to be read is specified by the count field. A read of control store is limited to 256 bytes per command.

The command is rejected if the command specifies a control store address which is out of range.

SAU Reserve

The SAU Reserve command of FIG. 34 locks the SAU onto the SSP interface that received the command. Other SSPs are denied access to the SAU until the reserving SSP releases the interface or until an SAU Reset command is received from any SSP interface. A busy indication is returned for all commands (except SAU RESET) from other SSPs.

SAU Release

The SAU Release command of FIG. 35 unlocks the SAU from an SSP interface. The release command must be received from the same SSP that caused the reserve condition. A reserve condition results from receipt of a Reserve command or the sending of Unit Check Status.

SAU Reset

The SAU Reset command $FF_{16}$ shown in FIG. 36 clears any lock condition, terminates all operations in progress and causes the SAU to perform a power-on confidence sequence. The command is always accepted, i.e., it cannot receive a busy response. The SAU Reset command does not necessarily result in an orderly halt of operations in progress and clears all pending status conditions. Reset is intended to recover the SAU from an abnormal state or operation. Its use should be limited to this function.

Read ID word 0

This command $OE_{16}$ is shown in FIG. 37. In response to the Read ID word 0 command, the SAU sends five bytes of data to the requesting SSP. The type number is in byte 0, byte 1 and four bits of byte 2. The revision level is in bits 4-7 of byte 2 and bits 0-3 of byte 3. Zeroes are contained in bits 4-7 of byte 3 as well as in all of byte 4. The type number is the binary value of the six digit SAU type number; while the revision level is the binary value of the SAU hardware revision level. The read ID word 0 command is accepted by the SAU regardless of whether or not Control Store is loaded or the tables are initialized.

Read ID word I

The command $12_{16}$ is shown in FIG. 38. In response to this command, the SAU sends five bytes (40 bits) of data to the requesting SSP. If a bit is present in bit 1 of byte 0, the installation of a temporary hardware change in the unit is indicated. The remaining 6 bits of byte 0, all 8 bits of byte 1 and bits 16 and 17 of byte 2 contain the binary value of the Unit Serial number.

The presence of a bit in bit location 18 of byte 2 indicates that the SAU controls 64 SPI's. If a bit is also present in bit 19, then the SAU controls 96 SPI's. Finally, if a bit is also present in bit 20, then the SAU controls 128 SPI's. Similarly, a bit presence in bit 21 indicates that the SAU controls 16 subsystem strings while the further bit presence in bit 22 indicates control by the SAU of 32 subsystem strings. Bit presence at bit 24 indicates a system control interface expansion wherein the SAU contains four SSP interfaces. The SSP number of the unit requesting this ID word is contained in the two bit field of bits 32 and 33, while bits 34 and 35 provide the field which contains the unit number of the SAU. Values 0,1,2 and 3 can be selected for this number. All other bit values of the 40 bits are zero.

Read SPI

This command $2A_{16}$ is shown in FIG. 39.

Command—This field contains the number of consecutive SAU Partitioning Registers to be read, beginning with the SPI specified by byte 2.

Table Address—This field specifies the first of a block of consecutively numbered SPIs. The command performs a read of the specified SAU Partitioning Registers for the SPIs specified by bytes 1 and 2. One byte of data for each specified SPI is sent to the SSP in the following manner.

Each byte includes a 4-bit field (bits 4-7) denoted an SPI port enable field. This field indicates the state of the SAU Partitioning Register for the addressed SPI. A partitioning Check is generated if the Table Address specifies an SPI whose feature is not installed. The command is rejected if the command specified an SPI which is outside of the range of addresses assigned to SPIs.

Read BCTS Interface

This command $3A_{16}$ is pictured in FIG. 40.

Count—This field contains the number of consecutive SAU Partitioning Registers and receivers for BCTS subsystem strings to be read beginning with the BCTS subsystem string specified in byte 2.

Table Address—This field specifies the first of a block of consecutively numbered BCTS subsystem strings.

This command performs a read of the specified SAU Partitioning Registers and receivers for the BCTS subsystem strings specified by bytes 1 and 2. One byte of data for each specified BCTS is sent to the SSP in the following format. A four bit BCTS channel connected field (bit 0-3) indicates BCTS confirmation of the connection between the addressed subsystem string and the channel selected by the BCTS Channel Enabled field. This latter field is also four bits (4-7) and indicates the state of the SAU Partitioning Register for the addressed BCTS subsystem string.

A Partitioning Check status condition is generated if neither of the BCTS expansion features are installed or if the command specifies a subsystem string connected to a BCTS whose feature is not installed. The command is rejected if it specifies a BCTS subsystem string which is outside of the range of addresses assigned to BCTS subsystem strings.

Set Test Mode

This command $17_{16}$ is shown in FIG. 41. The Set Test mode command places all SPI port drivers in the enabled state and disables the partitioning change control line to each SPI and BCTS. The command is rejected if any application is in SAU Lock Mode.

Clear Test Mode

FIG. 42 illustrates the Clear Test Mode command $27_{16}$. The Clear Test Mode command removes the enable to all SPI port drivers and partitions each SPI and BCTS subsystem string according to the current state of the partitioning registers. The command is rejected if any application is in the SAU Lock Mode.

Set SAU Lock

This command $67_{16}$ is pictured in FIG. 43.

Application—This field specifies the application which is to be placed in SAU Lock Mode. This command will place the specified application in SAU Lock Mode. SAU Lock Mode prevents any SSP from changing the SSP assignment for the associated application and prevents the Write Subsystem IOP Number command and Test Mode commands from being executed. This command is rejected if the requesting SSP is not the same SSP assigned to the specified application or if the specified application is unassigned to any SSP.

Clear SAU Lock

This command $87_{16}$ is illustrated in FIG. 44.

Application—This field specifies the application which is to be taken out of SAU Lock Mode. This command is rejected if the specified application is not assigned to any SSP or if the requesting SSP is not the same SSP assigned to the specified application.

Write SSP History

This command $91_{16}$ is shown in FIG. 45.

History Flags—Specifies which flags are to be set for the specified SSP History Table Entry. For a description of each of the flags; see Section 22.

Table Address—Contains the number of the SSP History Table entry to be written into.

The Write SSP History command loads one-bits from byte 1 into the SSP History Table location specified by byte 2.

The following errors cause the command to be rejected:
(a) An attempt to set the Control Store Loaded bit when the control store has not been fully written.
(b) An attempt to set the IOP Numbers Loaded bit when the IOP Number portion of the subsystem Interface Table has not been written.
(c) The specified table address is out of range.

Read SSP History

FIG. 46 illustrates command $92_{16}$.

Table Address—Contains the number of the SSP History Table entry to be returned to the requesting SSP.

The Read SSP History command returns the SSP History Table entry as specified by byte 2. One byte of data is returned which indicates the binary value of the history flags. For a description of each of the flags, see FIG. 20. The command will be rejected if the specified table address is out of range.

STATUS PRESENTATIONS

The subsystem access unit (SAU) presents status information to the System Support Processor (SSP) in the system portion of its message. There are four possible status indications which the SAU can send to the SSP.

1. Data Assurance clear—indicates successful completion of a specified command at the SAU.
2. Data Assurance Fail—indicates that the SAU detected an unusual condition that is detailed by information contained in the sense bytes. This indication of a programming or equipment error precludes execution of the command.
3. SUP Message Waiting—indicates the SAU has detected an unusual condition not related to a command received by an SSP. This condition is detailed by information contained by the sense bytes.
4. SUP Receive Not Ready—indicates the SAU is unable to accept a command due to the existence of a reserve condition on one of the other SSP interfaces.

SENSE DATA

Sense data is transferred to the SSP, providing detailed information concerning unusual conditions detected by the SAU. There are seven sense bytes which will now be described.

First Sense Byte

The bits of the first sense byte as assigned as follows:

| Sense Bit | Description |
|---|---|
| 0 | Command Reject |
| 1 | Not used |
| 2 | Not used |
| 3 | Equipment check |

-continued

| Sense Bit | Description |
|---|---|
| 4 | Data check |
| 5 | Not used |
| 6 | Length Check |
| 7 | Partitioning Check |

Command Reject.—Command Reject indicates that the SAU has detected a programming error. A command was received that the SAU was not designed to execute or could not execute due to the state of the SAU Lock indicators.

Equipment Check. The Equipment Check sense bit indicates detection of an internal error. This includes checks on register-to-register data transfer. Detection of Equipment Check stops data transmission and terminates the operation prematurely. On write operations, this error may have caused invalid subsystem partitioning or invalid entries in the Subsystem Interface Table. The second and third sense bytes identify the failing area.

Data Check. Data Check indicates the detection of illegal state in the Subsystem Interface Table.

Length Check. The Length Check bit is returned if any of the following conditions are true:—A write command from an SSP has provided too little data or more data than is required.

Partitioning Check.—Partitioning Check indicates that the command attempted an operation that is currently protected by the SAU, e.g., the command requested exclusive use of a subsystem whose SPI ports were partitioned to IOPs in more than one application. The command is not executed.

Second Sense Byte

The second sense byte is an extension of the first. The following Table 7 defines each bit which is dependent upon the condition specified by the first sense byte.

Command Reject

Table Address Out of Range—The command, received from the SSP, specified an address which is beyond the maximum allowable address for the table.

SAU Lock Bit Set—The SAU is unable to execute the command due to an application in SAU Lock Mode.

TABLE 7

| | | First Sense Byte Specifies: | | | |
|---|---|---|---|---|---|
| Bit No. | Command Reject | Equipment | Data Check | Length Check | Partitioning Check |
| 0 | Table Address Out of Range | Correctable Memory Error | MAS Entries Greater Than 4 | Write Error | Subsystem Not Configured |
| 1 | SAU Lock Bit Set | Uncorrectable Memory Error | MAS Bit Set for BCTS | Read Error | Undefined |
| 2 | Unauthorized SSP | Register Error | MAS Bit Set for First Table Entry | Undefined | Unauthorized SSP |
| 3 | Application unassigned to an SSP | PIO Error | IOP State Error | Undefined | IOP State Error |
| 4 | Control Store Not Loaded | SIO Error | BCTS Enabled to More Than One IOP | Undefined | BCTS Enabled to More Than One IOP |
| 5 | Unrecognized Command | Undefined | Exclusive Use Violation | Undefined | Exclusive Use Violation |
| 6 | IOP | Undefined | Ambiguous | Undefined | IOP Currently |

TABLE 7-continued

| | | First Sense Byte Specifies: | | | |
|---|---|---|---|---|---|
| Bit No. | Command Reject | Equipment | Data Check | Length Check | Partitioning Check |
| | Numbers Not Loaded | | Data | fined | Enabled to a Subsystem |
| 7 | Undefined | Undefined | Undefined | Undefined | Undefined |

Unauthorized SSP—The requesting SSP does not have control of the application which would be affected by the execution of the command.

Application Unassigned to an SSP—The specified application has not been assigned to any SSP.

Control Store Not Loaded—Control store must be loaded in order to execute the command.

Unrecognized Command—The command received from the SSP is undefined.

Equipment Check

Correctable Memory Error—A single-bit memory error has been detected and corrected. The location of the error is identified by sense bytes 5 to 7.

Uncorrected Memory Error—A single-bit memory error has been detected but was not able to be corrected. The location of the error is identified by sense bytes 5 to 7.

Register Error—An error has been detected on a SAU hardware register identified by sense bytes 5 to 6.

PIO Error—An error has been detected on a parallel input/output device identified by sense bytes 5 and 6.

SIO Error—An error has been detected on a serial input/output device identified by sense bytes 5 and 6.

Data Check

MAS Entries Greater Than 4—After examination of the Subsystem Interface Table, the SAU has detected the presence of four consecutive entries with the MAS bit set.

MAS Bit Set for BCTS—The SAU has detected the presence of an MAS bit set for a BCTS entry in the Subsystem Interface Table.

MAS Bit Set for First Table Entry—The SAU has detected the presence of a MAS bit set in the initial Subsystem Interface Table entry.

IOP State Error—A subsystem is enabled to an IOP that has never been partitioned to an application, assigned to reserve state, or offline.

BCTS Enabled to More Than One IOP—A BCTS entry in the Subsystem Interface Table shows the subsystem string enabled to more than one IOP.

Exclusive Use Violation—The Exclusive Use bit is set for a subsystem, and that subsystem is already enabled to IOPs that are in different applications.

Ambiguous Data—The SAU has detected an undefined condition or state of a register or memory location identified by sense bytes 5 and 6.

Length Check

Write Error—The SSP has provided too little data or more data than is necessary for execution of the command.

Read Error—The SSP is requesting more data than the SAU can provide in a single-frame message.

Partitioning Check

Subsystem Not Configures—The SSP is requesting partitioning changes for a subsystem whose feature is not installed.

Unauthorized SSP—The requesting SSP is not authorized to make partitioning changes for subsystems associated with IOPs in applications it does not control.

IOP State Error—The SSP requests that a subsystem be enabled to an IOP which is notassigned to an application or is offline; or the SSP requests to assign the IOP to an illegal state.

BCTS Enabled to More Than One IOP—The SSP requests that a BCTS subsystem string be enabled to more than one IOP; or the SSP requests a BCTS subsystem string be enabled to an IOP while it is currently enabled to another.

Exclusive Use Violation—The command or table specifies Exclusive Use and the resulting partitioning state will cause the subsystem to be enabled to IOPs in different applications.

IOP Currently Enabled to a Subsystem—The SSP requests to change the state of an IOP which is enabled to a subsystem.

Third and Fourth Sense Bytes

Sense bytes 3 and 4 specify the program counter value at the time the error occurred. These bytes identify the SAU routines which detected the error. Sense bytes 3 and 4 will contain the least significant and most significant bytes of address, respectively.

Fifth and Sixth Sense Bytes

Sense bytes 5 and 6 specify the memory location or hardware ID where an error occurred. Sense byte 5 will contain the least significant byte of memory address or hardware ID. Sense byte 6 will contain the most significant memory address or hardware ID.

Seventh Sense Byte

Sense byte 7 contains five bits of syndrome information in the event of a single-bit error. Bits 3-7 identify the failing bit of microcode or ECC at the memory location identified by sense bytes 5 and 6. The syndrome information is defined in Table 8 as follows:

TABLE 8

| Syndrome Bits 0 1 2 3 4 5 6 7 | Failing Bit |
|---|---|
| 0 0 0 1 1 0 0 1 | Data 0 |
| 0 0 0 1 0 1 0 1 | Data 1 |
| 0 0 0 0 1 1 0 1 | Data 2 |
| 0 0 0 1 1 1 0 0 | Data 3 |
| 0 0 0 1 1 0 1 0 | Data 4 |
| 0 0 0 1 0 1 1 0 | Data 5 |
| 0 0 0 0 1 1 1 0 | Data 6 |

TABLE 8-continued

| Syndrome Bits | |
|---|---|
| 0 1 2 3 4 5 6 7 | Failing Bit |
| 0 0 0 1 1 1 1 1 | Data 7 |
| 0 0 0 1 0 0 0 0 | ECC 0 |
| 0 0 0 0 1 0 0 0 | ECC 1 |
| 0 0 0 0 0 1 0 0 | ECC 2 |
| 0 0 0 0 0 0 1 0 | ECC 3 |
| 0 0 0 0 0 0 0 1 | ECC 4 |

INITIALIZATION

Several tasks must be accomplished before the SAU can perform the initial or subsequent subsystem partitioning functions for one or several applications. These tasks, from SAU power-on through the initial subsystem partitioning for each of the active applications, will collectively be called SAU initialization. Specifically, they include powering on, loading control store, writing cabling information, writing the SSP/application designators, writing for IOP status, and enabling/disabling the subsystem interfaces. Additionally, these tasks or functions must be carried out in the same order.

POWER ON/OFF

The SAU has a manually controlled AC breaker switch. It also has a local/remote switch which allows the SAU's DC power to be controlled either at the unit or remotely. Additionally, the SAU is able to detect environmental and voltage fault conditions, and subsequently power itself off.

When the SAU DC powers on, all registers and tables are set to a known state. Specifically:
 (a) Cabling information is cleared.
 (b) The SSP/Application designators indicate no SSP is assigned to any application.
 (c) Each IOP is in the "unassigned" state.
 (d) SAU locks are cleared.
 (e) Data describing partitioning status and exclusive use status for each of the SPIs and BCTS indicates that all SPI ports and BCTS channels are disabled.

Once the SAU has powered up and has completed setting its registers and tables to a known state, it notifies the first available SSP of this action. The first available SSP is defined as the lowest numbered SSP interface number (at the SAU) with interface enabled. If the SSP has not responded within a specified period of time, the SAU will attempt to notify the next available SSP. This process is repeated indefinitely until a response is received from an SSP.

The expected response from an SSP is first a reserve command which locks the SAU onto the SSP interface that received the command and second, a command to load control store. The set of commands accepted by the SAU following its powering on is limited to these two plus two more: a reset command which causes the SAU to reset its registers and tables, and a release command which countermands the reserve command.

If the power-on confidence sequence has been successfully completed, the SAU will initialize all registers and storage elements to a known state. The Subsystem Interface Table is cleared to zeros. All 16 SSP application designators are set to unassigned. All 16 IOP state designators are set to never assigned. All SPIs are enabled; however, the partitioning change signals are not activated. All BCTS channel enable lines are deactivated and the Manual Override line is held inactive. When this sequence is complete, the SAU will report to each SSP: SUP Message Waiting, SUP Error, and sense data indicating "power-on complete" status. After an SSP acknowledges the status, the SAU will continue with the next until all SSPs have been notified. In the event no acknowledge is received for the status, the SAU will set the NO SSP ACTION TAKEN bit in the associated SSP History Table entry.

LOAD CONTROL STORE

An SSP command to load control store causes a block write of the SAU's microcode used to perform various required checks. These include the use of tables to determine SSP access rights, to enforce exclusive use, to maintain up-to-date partitioning status, and to report to the SSP any anomalous conditions as a result of a command. Writing this information is allowed by the SAU only if no SAU lock is set.

After reporting power-on complete status and prior to control Store initialization, the SAU will be able to perform the following commands.
 (a) Read Control Store
 (b) Write Control Store
 (c) SAU Reserve
 (d) SAU Release
 (e) SAU Reset
 (f) Write SSP History Table
 (g) Read SSP History Table
 (h) Read ID Word 0
 (i) Read ID Word 1

The normal sequence of events performed by an SSP in order to initialize the SAU control store following the receipt of power-on confidence status is as follows.
 1. The SSP reserves the SAU (SAU Reserve command).
 2. The SSP reads its SSP History Table entry (Read SSP History command) in order to determine whether the SAU control store has already been initialized by another SSP. If the control store initialized bit is set, the SSP would begin initialization of its associated SAU Tables (see 2.6.3).
 3a. The SSP performs Write Control Store and Read Control Store commands in order to load and verify the SAU microcode.
 3b. After the microcode is loaded, the SSP will set the Microcode Loaded bit (Write SSP History command). (The state of this bit is reflected in each SSP History Table entry.) If the microcode load is not successful, the SSP will set the NO SSP ACTION TAKEN bit in its associated SSP History Table entry.
 4. The SSP continues with the initialization of its associated SAU tables.

LOAD CABLING INFORMATION

The same SSP that loads the control store also would normally issue the command to load the cabling information. This information, also contained on SSP mass storage, identifies which of sixteen possible IOPs is connected to each SPI port or BCTS channel; it also identifies each group of SPI's that are in a multiaccess subsystem (note that the SPIs in a multiaccess subsystem can not be split between SAUs). As with the load control store command, the cabling information cannot be written into the SAU if any SAU lock is set.

CONDITIONING INTERFACES AND STATUS TABLES

The end result of the SAU's initialization is the SAU's subsystem partitioning status table representing the current and desired status of each SPI and BCTS interface. Given the cabling information, the processes remaining to accomplish this are designating which SSP is assigned to each application, specifying each IOP's status, and enabling/disabling subsystem interfaces.

The SAU is designed so that no primary SSP is required to complete the initialization process. Rather, each SSP can carry out the last three stages of SAU initialization for each application with which it is associated. In particular, the following sequence is effected by each SSP:

1. The applications with which the SSP is associated are specified.
2. The corresponding SAU locks are set.
3. IOP/Application assignments are written.
4. SPI and BCTS interfaces cabled to IOPs in the SSP's applications are enabled/disabled and corresponding entries in the partitioning status table are updated.

SAU TABLES

After the SAU Control Store has been loaded, the IOP Number portion of the Subsystem Interface Table must be initialized followed by the initialization of the SSP Application and IOP State Tables by each SSP.

The normal sequence of events performed by an SSP in order to initialize the SAU Tables is as follows. It is assumed that the SAU is reserved and the SSP History Table has been read from the control store initialization sequences.

1. Following the control store initialization sequences, the SSP determines from the SSP History Table (IOP Numbers Written bit) whether the Subsystem IOP Number portion of the Subsystem Interface Table has been written. If the IOP numbers have been written, then the SSP continues with step 3a.
2a. The SSP will perform a Write Subsystem IOP Number command and a Read Subsystem Interface Table command in order to load and verify the IOP Number portion of the Subsystem Interface Table.
2b. The SSP sets the IOP Number Loaded bit (Write SSP History command). (This bit is reflected in each SSP History Table entry.)
3a. The SSP writes its SSP number (Write SSP Number command) for the applications it controls.
3b. The SSP options sets the SAU lock bit (Set SAU Lock Command) to prevent other SSP control of these applications.
3c. The SSP sets the SSP Numbers written bit in its associated SSP History Table entry (Write SSP History command).
4. The SSP will write the appropriate IOP states (Write IOP State command) for IOPs in its system:
   a. IOP State Table entries representing IOPs which reside in an application are written to that state.
   b. Entries which represent offline IOPs are temporarily set to an application controlled by the SSP.
5a. The SSP performs the appropriate Add Subsystem commands for subsystems in its system.
5b. The SSP performs the appropriate Remove Subsystem commands for subsystems in its system.
5c. The SSP rewrites to offline the IOP States Table entries (Write IOP State command) for offline IOPs temporarily set to an application.
5d. The SSP sets the IOP States Written bit in its associated SSP History Table entry (Write SSP History command).
5e. The SSP Sets the Add/Remove Subsystems Complete bit in its associated SSP History Table entry (Write SSP History command).
6. The SSP releases the SAU Reserve condition (SAU Release command).

If any of the above sequences result in error, the SSP will set the NO SSP ACTION bit in its associated SSP History Table entry.

B. Microcode

A complete set of flow charts and their descriptions are included as an appendix to this specification for the sake of completeness. However, a representative flow chart giving an overall view of the microcode structure will be described here with reference to FIG. 47.

I. Microcode Structure

The subsystem access unit (SAU) microcode is broken down into three areas.
They are:
a. Power-on, Confidence and Initialization, 4710
b. Idle Loop, 4750
c. SAU Command Execution, 4720

1. Power-On, Confidence and Initialization (4710)
   Referring to FIG. 47, this area is noted as 4710. It contains a number of confidence tests 4714 status reporting procedures 4712 and initialization 4718. All of these steps are necessary prior to the execution of any commands from the command source (SSP). This area 4710 is entered whenever a reset command 4728 occurs. A reset is caused by a power-up signal, a manual reset signal from the SAU panel, or a command signal from a command souce. The command source in this instance, is, of course, the system support processor (SSP). Reset from this command implies that the SAU is operating in the Idle Loop 4750 and is capable of command execution. Power-on or a manual reset may be invoked at any time. The confidence tests, 4714, are the first tests to be performed following a reset. These tests will now be described:
   a. SAU Lock Test
      This test ensures the capability to set, clear and read the SAU lock flip-flops.
   b. Register Test
      This test writes and reads a pattern to and from each of the one hundred and sixty (160) partitioning registers looking for errors.
   c. Programmable Read-Only Memory (PROM) Test
      This test reads each location of the PROM and looks for single bit errors (SBE).
   d. Random Access Memory (RAM) Test
      This test writes and reads a pattern to and from each location of the RAM and looks for single or multiple bit errors (SBE, MBE).
   e. Error Correction Code (ECC) TEst
      This test reads eight (8) predetermined locations from the PROM, each containing a single bit error. The test will ensure proper bit correcting capability of the ECC logic for all eight bits of data. The tests also checks for proper capture of the failing address and syndrome information bits.

When any error is detected, a status reporting procedure is entered; and detailed error information is reported to all SSP's. After reporting status, the testing resumes until completed. The contents of the status message have been previously described in conjunction with the description of the Sense Registers.

When the confidence tests are completed, the initialization state, 4718, is activated. In this state, a number of tables and variables are initialized to a predetermined state prior to the command execution. It is also necessary to relocate a resident microcode procedure to the RAM due to timing restrictions. The number of configured SSP's is determined at this time and all SSP interfaces are set to the UDLC normal response mode.

2. Idle Loop (4750)

Figure 47E:
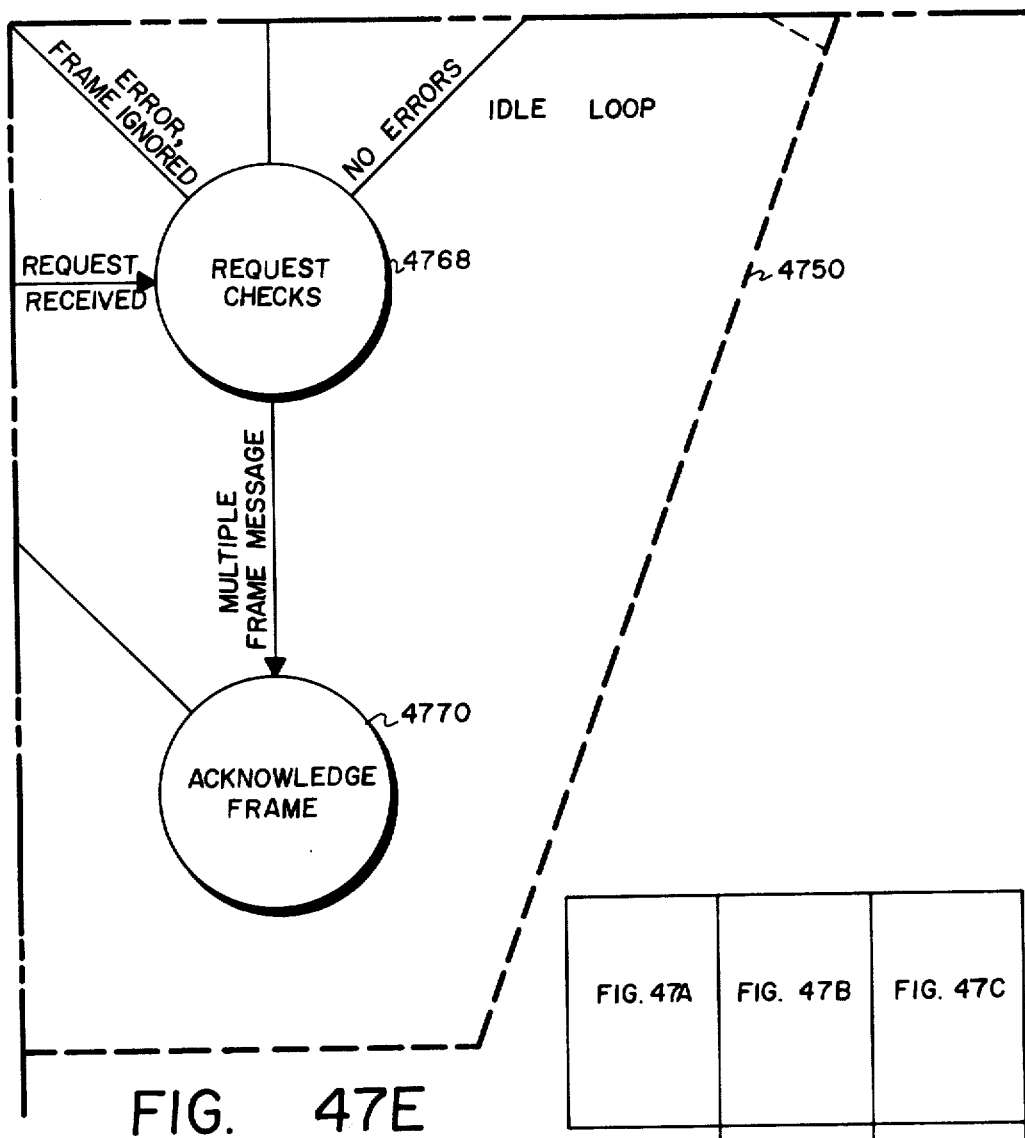
Figure 47:
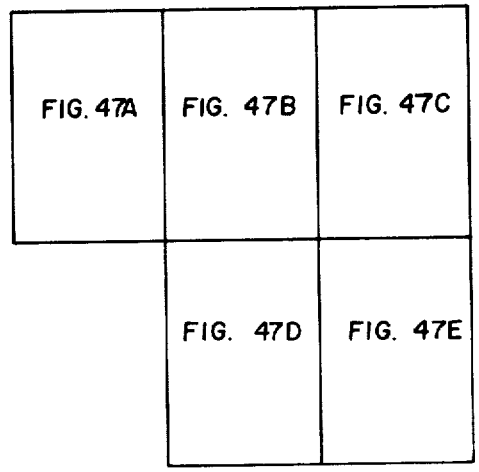
Figure 47B:
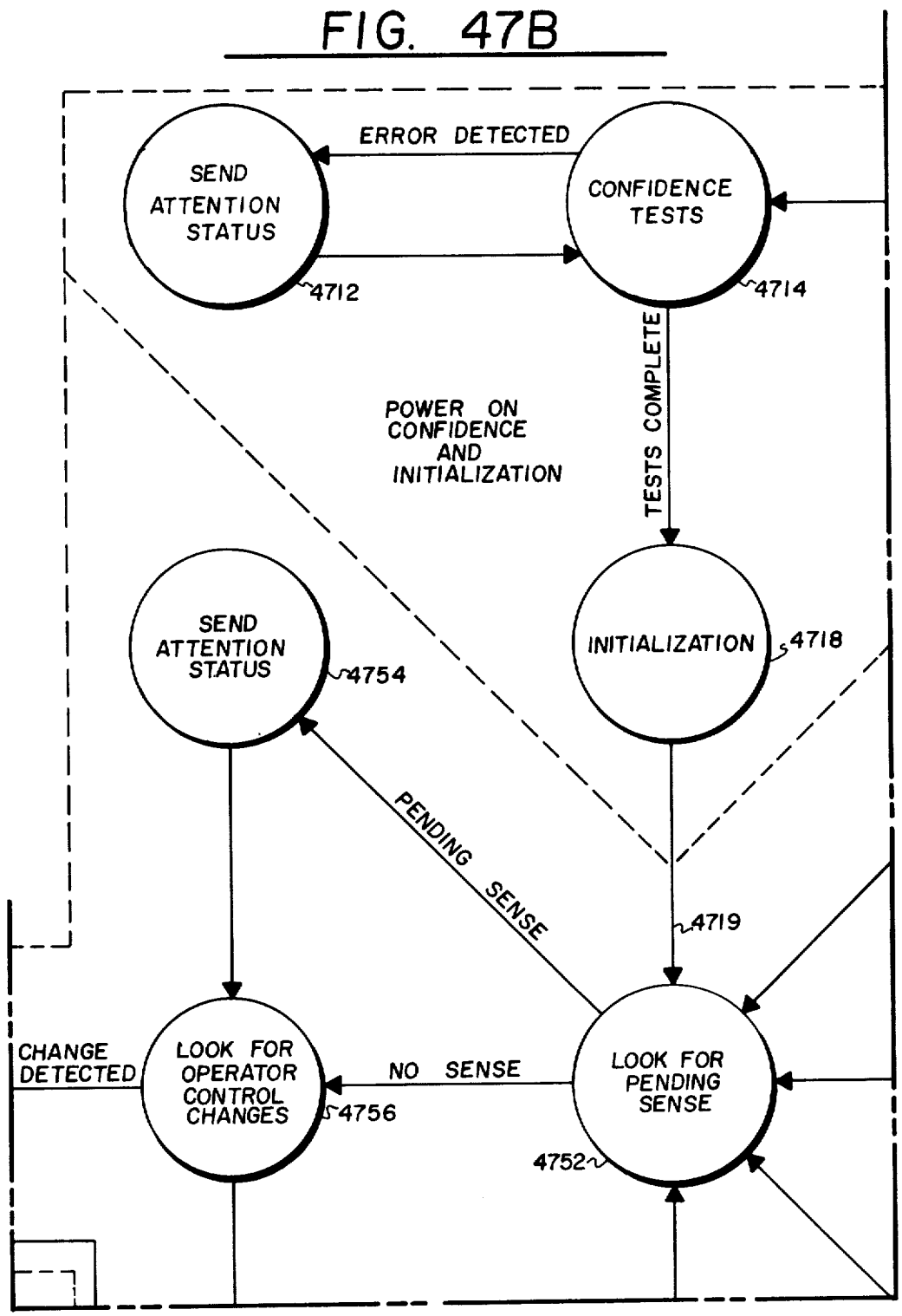
Figure 47C:
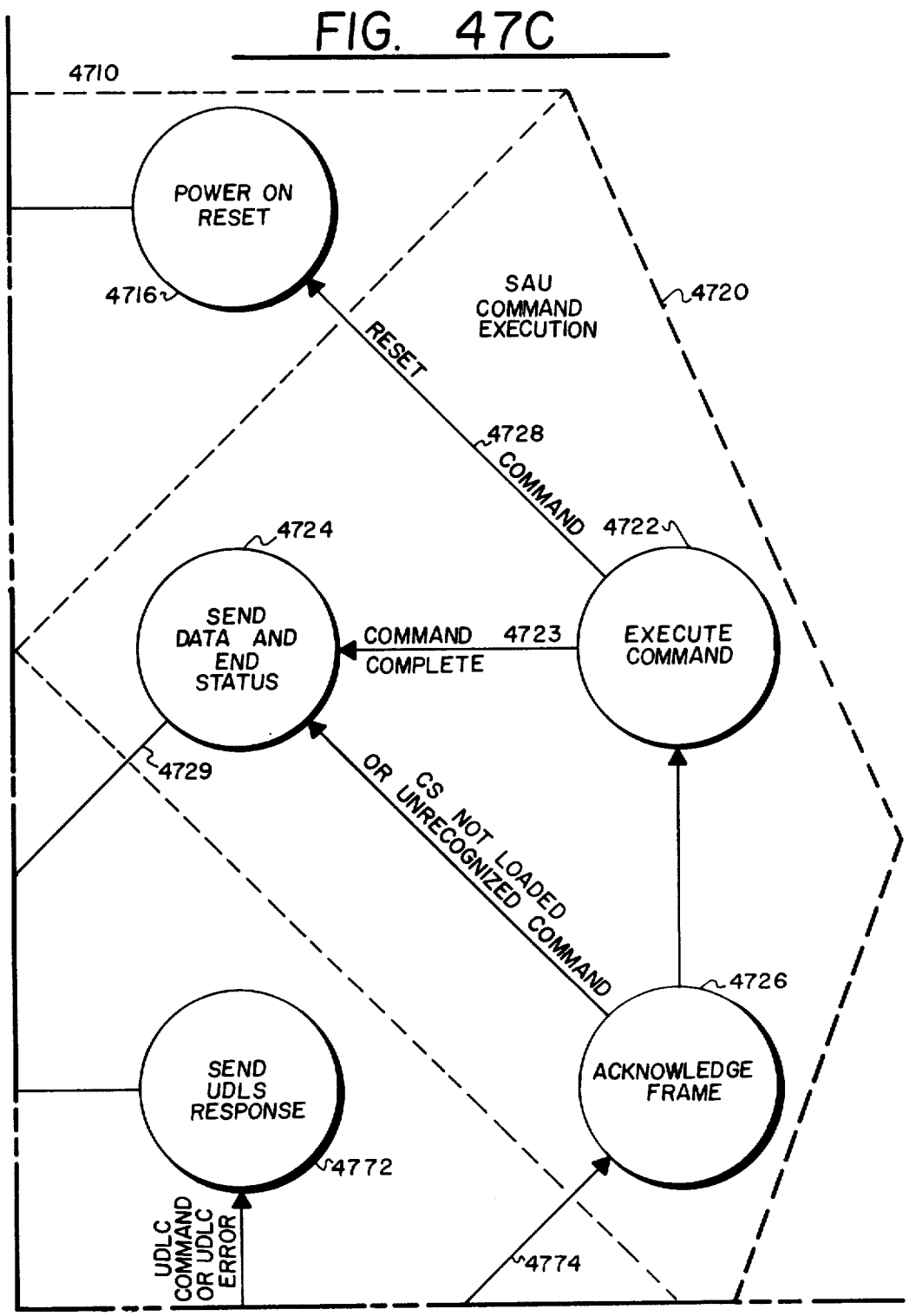
Figure 47D:
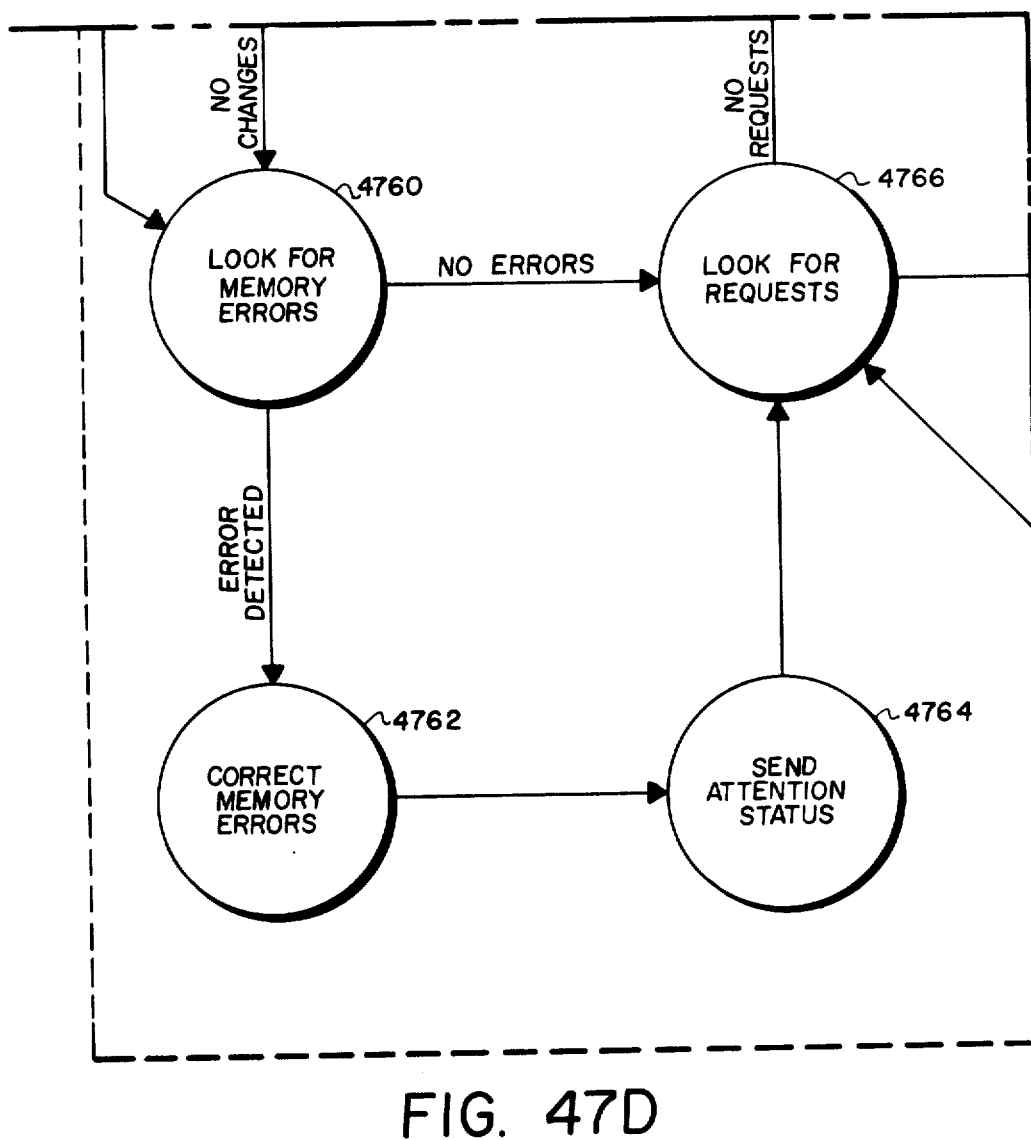

The Idle Loop portion is shown in FIG. 47 at 4750. This loop performs four functions. They are:
 a. Look for pending microcode detected sense conditions 4752;
 b. Look for any manual changes involving SAU Locks 4756;
 c. Look for any hardware detected memory errors 4760;
 c. Look for incoming SSP requests 4766.

The idle loop, 4750, is entered following the initialization procedure 4710, via line 4719, during power on or reset, or whenever an abort is executed. The abort is invoked whenever a command cannot be completed normally. The sense conditions which caused the abort are retained and reported during idle loop execution.

First, look for sense pending 4752. These procedures report any pending status conditions contained in the sense bytes previously described. The status is reported to all configured SSP's. Sense data is always cleared to zero, after the information is presented to the SSP's.

Status conditions found at this time are due, mainly, to hardware faults or errors which precluded normal completion of a command. This includes conditions which invoked the abort operation.

Next, we look for operator control changes, 4756. These procedures detect any manual clearing of the SAU lock flip-flops from the SAU operator panel. A detected manual clear causes the microcode to clear the associated SAU lock indicators stored in that table in the RAM. Each time the microcode looks for changes, the state of the lock flip-flops is stored. This stored information is used to determine manual clearing of the locks the next time these procedures are executed.

Memory errors, 4760 are looked for next. These procedures are used for detection of any single bit errors (SBE) which may have occurred since the last look for such memory errors. If the SBE counter has been incremented, status information is formed and reported to all configured SSP's. The content of this message has also been previously described in conjunction with the Sense Registers.

Look for requests, 4766 procedures perform the following tasks:
 a. look for incoming frames from all configured SSP's;
 b. prioritize the requests;
 c. read in the entire frame from one SSP;
 d. perform a number of checks involving both transmission faults and protocol violations;
 e. assemble more than one transmission into a multiple frame message, and report any protocol errors to the associated SSP.

This look for requests also handles UDLC protocol communication which includes mode setting commands.

3. SAU Command Execution (4720)

When an assembled message contains a SAU command, 4720, the following tasks are performed:
 a. The microcode determines whether the command can be executed, 4726 (i.e. microcode loaded);
 b. The command procedures are executed, 4722;
 c. A status message is returned indicating successful completion of the command 4723, or a reason given as to why the command cannot be performed. Data is returned with the status information when the command is a read operation, whereas data is sent in the command message for write type commands 4729. The SAU instruction set has been previously described and illustrated in Table 6 and will now be repeated here. Similarly, the tables and buffers stored in the RAM as the appear in the SAU microcode have also been previously described under the Instruction Set portion of the programming portion in the immediately preceding section. For example, the SSP application table is illustrated in FIG. 18 and the IOP state table is set forth in FIG. 19, etc. The Frame Buffer, however, has not been previously described and deserves a brief mention. It is a storge device which is 256 bytes deep by 8 bytes across, which is used to store outgoing/incoming frames to/from the SSP. Each frame is composed of four parts. They are:

1. UDLC command
2. System Session
3. Status
4. Read Data

For outgoing messages, the UDCL command and the system session portion of the frame is generated and placed in the frame buffer. The data and status are thereafter obtained from the Input/Output buffer and sense register respectively and placed in the frame buffer. The entire frame is then sent to an SSP.

For incoming messages, the entire frame is stored in the frame buffer. The UDLC command and system session is then checked and stripped off. The remainder of the frame which is composed of the SAU command and the write data, is stored in the Input/Output buffer. This process is repeated for multiple frame messages until the entire message has been assembled in the Input/Output buffer.

The Input/Output buffer is a 1K by 8 bit buffer used by the SAU command microcode. It contains a data length, command word, and read/write data. The data length is 16 bits long. It is the number of data bytes received in a SSP message or the number of data bytes to send to the SSP in an SAU message. The command word is 4 bytes long. It is for incoming messages only and contains the SAU command, one byte of operand and two address bytes. If more than one byte of operand is required, all operand bytes will be obtained from the data buffer.

The data buffer is 994 bytes long. It contains the data necessary for the execution of an SAU command or, for outgoing messages, it contains the read data requested by a previous SAU command.

The sense registers have been previously described in detail and will not be repeated here. They are described under Status Presentations and include Table 7.

Memory Map

Figure 48:
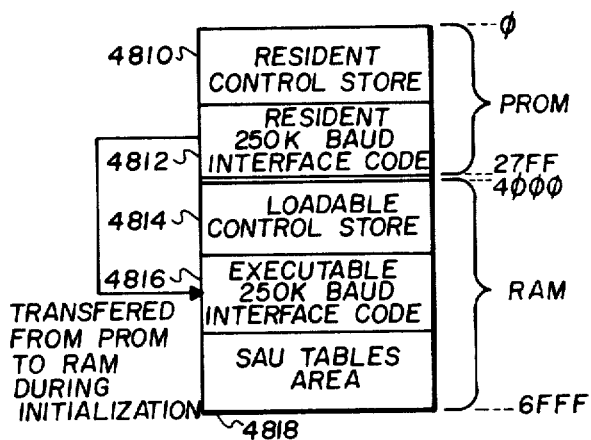
FIG. 48 is a memory map of the SAU.
Figure 7A:
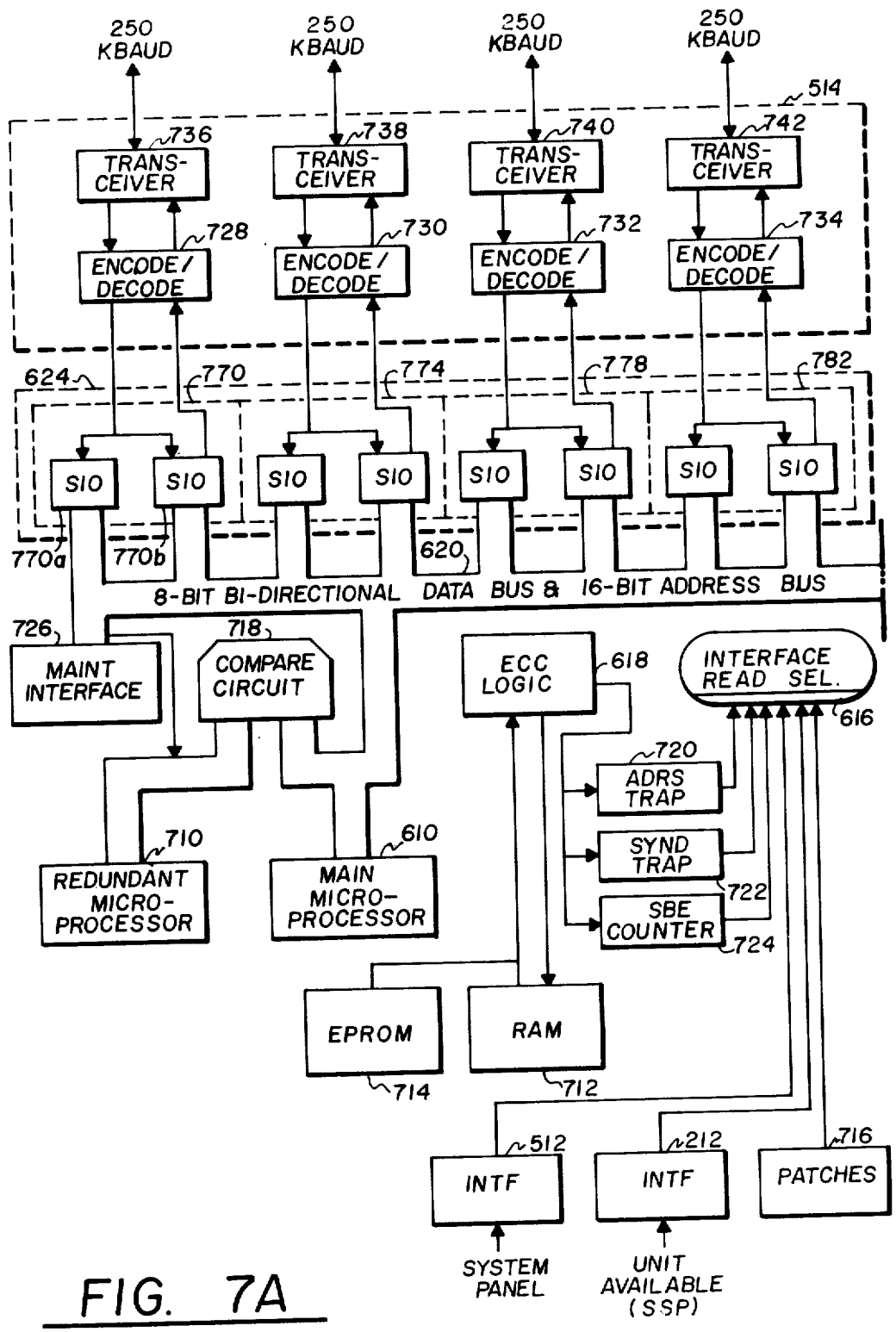

The SAU memory shown in FIG. 48 consists of 22K bytes of PROM and RAM. It is broken down into four sections.

They are:
1. Resident control store code, 4810.
2. Resident 250K baud interface code, 4812.
3. Loadable control store code, 4814.
4. SAU tables area, 4818.

The resident control store contains microcode capable of performing the necessary power on and initialization tasks. These include:
1. Confidence tests
2. Table initialization
3. 250K Baud interface protocol
4. Execution of the following commands
   a. Read Control Store
   b. Write Control Store
   c. SAU Reserve
   d. SAU release
   e. SAU Reset
   f. Write SSP History
   g. Read SSP History
   h. Read ID Word O
   i. Read ID word I The resident 250K baud interface code handles incoming SSP requests, and data transfers between the frame buffer and the SIO's. It is necessary for this code to be resident in the SAU as well as execute fast enough to keep up with the interface data transfer rate. This requires the 250K baud code to be stored in PROM and transferred to RAM during initialization. The code is executed out of RAM which has a faster access time than PROM.

Loadable control store contains the balance of the SAU command set not included in the resident control store. This code is loaded by the SSP during the SSP's SAU initialization sequences. A special sentinel character occupies the last location of loadable control store. This sentinel character is used by the SAU in determining whether this control store is loaded and thus, capable of being executed.

The SAU tables area contains all tables and variables used by the microcode. In addition, a stack, used to pass parameters and return addresses between procedures is contained in this area.

Code Assembly

NASI-SCHNEIDERMANN flowcharts are provided in the appendix of this application.

Summarizing the SAU can be thought of as consisting of three parts:
1. Interfaces to command sources.
2. interfaces to peripheral subsystems.
3. Internal resident data and logic used to control status of subsystem interfaces to I/O complexes.

Via the interface to a command source, the SAU can accept requests to enable or disable subsystem interfaces and to make a subsystem accessible to only one application or to all the applications (i.e., shared subsystems) whose I/O complexes have interfaces to the subsystem. These interfaces can also be used as a means to initialize the SAU, i.e., load the SAU with its control logic and resident data.

The SAU's interfaces to subsystems provide the means to electrically enable to disable the subsystem's interfaces to I/O complexes.

The SAU's control logic and resident data are used to service the requests made by the command source(s). Also, certain checks are made for each request in order to ensure the following:

1. If a subsystem's interface to an I/O complex is to be enabled or disabled, the command souce making the request must be associated with the same application that is associated with the subsystem interface.
2. If a subsystem interface is to be enabled, and exclusive use is in effect for that subsystem, then the interface to be enabled must be associated with the same application that has exclusive use of the subsystem.
3. If exclusive use is to be put into effect or be discontinued for a particular subsystem, then the request to do so must be from the command source associated with the same application that is associated with the currently enabled subsystem interface(s).
4. If exclusive use is to be put into effect for a particular subsystem, then that subsystem's interfaces that are already enabled must all be in the same application.

The association between command source and application is logical only from an SAU point of view; it is not necessarily physical from an application point of view. In particular, the command source may be a support processor which performs partitioning, testing, and maintenance functions on the units in a given application; normally this support processor would also be associated with the application from an SAU point of view. However, another command source not physically associated with the application is not precluded from requesting changes in subsystem interface status for interfaces associated with the application.

The association between application and command source is made via a command to the SAU from any command source. An SAU internal lock associated with the application can be set to prevent any other command source from making this association while one command source is so associated. This lock can be set by any command source. A lock is cleared when any of the following occurs:

1. The SAU powers up.
2. The associated command source causes the lock to be cleared.
3. Manual action at the SAU causes all locks associated with a given command source to be cleared.
4. The SAU can optionally be set in either of two modes: The only command source that can cause the lock to be cleared is the one so associated. Any of a pre-specified group of command sources can cause the lock to be cleared.

Setting of mode is a manual action at the SAU; specification of command source group is hard-wired.

In addition to locks, the SAU uses certain information to make its checks to ensure command source integrity; it also maintains a current status of each subsystem interface. Any command source provides the SAU with the association between each subsystem interface and I/O complex, indicating the connections that are made during configuration. Any of the above locks set prevents modification of this information. Also provided is the association between each I/O complex and application. A ground rule is that only the command source associated with a given application can make this association/deassociation. Thus, the following composite mapping exists:

Subsystem interface→I/O complex→Application

This allows the unit to determine if the subsystem interface affected is associated with the same application as the command source, i.e.,

| Subsystem interface → | I/O Complex → Command → Source | Application Application |
|---|---|---|

If the above applications correspond one to another, there is a match; otherwise a mismatch is indicated.

This information is also used to determine if a subsystem interface can be enabled or disabled relative to any exclusive use of subsystem. Suppose subsystem interface A is to be enabled and exclusive use is already set for this subsystem; then a check is to determine if all other enabled interfaces for this subsystem are associated with the same application:

Subsystem interface A→I/O Complex→Application

Subsystem interface B→I/O Complex→Application

If the applications correspond one to another, there is a match; otherwise a mismatch is indicated.

If exclusive use is to be set, then the same comparison is made, i.e., ensuring that all enabled interfaces are associated with the same application. Having more than one command source allows more hardware independence of systems and applications, i.e., communication between applications is not required, and a command source can uniquely represent an application's subsystem partitioning needs. In the latter case, the number of applications that will be accessing a common set of subsystems determine the number of command sources required.

The combination of locks and checking herein described provides the SAU with the capability to allow or disallow concurrent accessibility to a subsystem by more than one application. Additionally, this capability provides for ensuring application and command source integrity in the use of common subsystems.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the claims which follow the attached appendix of flowcharts.

APPENDIX

MICROCODE FLOWCHARTS

TABLE OF CONTENTS

Figures

| | | |
|---|---|---|
| Figure 0-1. | Flowchart of ABORT | 1-2 |
| Figure 0-2. | Flowchart of ADD_IOP_ENABLE_COUNT(enables) | 1-2 |
| Figure 0-3. | Flowchart of ADD SUBSYSTEM (part 1 of 2) | 1-3 |
| Figure 0-4. | Flowchart of ADD SUBSYSTEM (part 2 of 2) | 1-4 |
| Figure 0-5. | Flowchart of ASSEMBLE MESSAGE | 1-5 |
| Figure 0-6. | Flowchart of AUTHORIZED_SSP_CHECK | 1-6 |
| Figure 0-7. | Flowchart of BCTS_CONFIGURATION | 1-6 |
| Figure 0-8. | Flowchart of BCTS_ENABLE_CHECK | 1-7 |
| Figure 0-9. | Flowchart OF BLOCK_TRANSFER(readreg,writereg) | 1-8 |
| Figure 0-10. | Flowchart of BUILD SYSTEM SESSION | 1-9 |
| Figure 0-11. | Flowchart of CLEAR LED(ssp number) | 1-10 |
| Figure 0-12. | Flowchart of CLEAR_SAU_LOCK | 1-11 |
| Figure 0-13. | Flowchart of CLEAR_TEST_MODE | 1-12 |
| Figure 0-14. | Flowchart of COMMAND RECEIVED | 1-13 |
| Figure 0-15. | flowchart of CORRECTABLE MEMORY ERROR | 1-14 |
| Figure 0-16. | Flowchart of CORRECT ECC(memory address) | 1-15 |
| Figure 0-17. | Flowchart of ECC TEST | 1-16 |
| Figure 0-18. | flowchart of ECC TEST (part 2 of 3)@ | 1-17 |
| Figure 0-19. | flowchart of ECC TEST (part 3 of 3)@ | 1-18 |
| Figure 0-20. | flowchart of ECC TEST ERROR | 1-19 |
| Figure 0-21. | Flowchart of EU_CHECK | 1-20 |
| Figure 0-22. | Flowchart of EXECUTE_COMMAND (part 1 of 2) | 1-21 |

| | | |
|---|---|---|
| Figure O-23. | Flowchart of EXECUTE_COMMAND (part 2 of 2) | 1-22 |
| Figure O-24. | Flowchart of EXECUTE DISCONNECT COMMAND | 1-23 |
| Figure O-25. | Flowchart of EXECUTE SET NORMAL RESPONSE MODE COMMAND | 1-23 |
| Figure O-26. | Flowchart of EXECUTE TEST COMMAND | 1-23 |
| Figure O-27. | Flowchart of EXECUTE EXCHANGE ID COMMAND | 1-23 |
| Figure O-28. | Flowchart of FAULT DETECT | 1-24 |
| Figure O-29. | Flowchart of FRAME CHECKS | 1-25 |
| Figure O-30. | Flowchart of FRAME REJECT CHECKS (part 1 of 2) | 1-26 |
| Figure O-31. | Flowchart of FRAME REJECT CHECKS (part 2 of 2) | 1-27 |
| Figure O-32. | Flowcart of GENERATE FRAME REJECT RESPONSE | 1-27 |
| Figure O-33. | Flowchart of GENERATE SYSTEM SESSION POINTERS | 1-28 |
| Figure O-34. | Flowchart of HARDWARE_COMMAND(signal,signal_output_port) | 1-29 |
| Figure O-35. | Flowchart of IDLE | 1-30 |
| Figure O-36. | Flowchart of INFORMATION FIELD CHECKS | 1-31 |
| Figure O-37. | Flowchart of INITIALIZE BCTS SPI INTERFACE | 1-32 |
| Figure O-38. | Flowchart of INITIALIZE PIO(port,i/o control) | 1-32 |
| Figure O-39. | Flowchart of INITIALIZE_SIO_RECEIVE | 1-33 |
| Figure O-40. | Flowchart of INITIALIZE SIO TRANSMIT | 1-34 |
| Figure O-41. | Flowchart of INPUT | 1-34 |
| Figure O-42. | Flowchart of IOP_APPLICATION_CHECK | 1-35 |
| Figure O-43. | Flowchart of LOOK FOR ACKNOWLEDGE(interface number) | 1-36 |
| Figure O-44. | Flowchart of LOOK FOR OPERATOR CONTROL CHANGES | 1-37 |
| Figure O-45. | Flowchart of LOOK FOR POLL(interface number) | 1-38 |
| Figure O-46. | Flowchart of LOOK_FOR_REQUEST(udlc number,timout value) | 1-39 |
| Figure O-47. | Flowchart of LOOK FOR SENSE PENDING | 1-40 |
| Figure O-48. | Flowchart of MANUAL CLEAR SAU LOCKS(SSP NUMBER) | 1-40 |
| Figure O-49. | Flowchart of MODE CHECKS | 1-41 |
| Figure O-50. | Flowchart of OUTPUT(data,port) | 1-42 |
| Figure O-51. | Flowchart of OUTPUT_AND_VERIFY(data,port) | 1-42 |
| Figure O-52. | Flowchart of PC_ADDRESS | 1-42 |
| Figure O-53. | Flowchart of POLL_READ_CHARACTER_AVAILABLE_STATUS | 1-43 |
| Figure O-54. | Flowchart of PRESENTATION CHECKS | 1-44 |
| Figure O-55. | Flowchart of PROM TEST | 1-45 |
| Figure O-56. | Flowchart of RAM TEST | 1-46 |
| Figure O-57. | FLOWCHART OF READ_BCTS (PART 1 OF 2) | 1-47 |
| Figure O-58. | Flowchart of READ_CONTROL_STORE | 1-48 |
| Figure O-59. | Flowchart of READ_FRAME (part 1 of 2) | 1-49 |
| Figure O-60. | Flowchart of READ_FRAME (part 2 of 2) | 1-50 |
| Figure O-61. | Flowchart of READ_ID_WORD_0 | 1-51 |
| Figure O-62. | Flowchart of READ_ID_WORD_1 | 1-52 |
| Figure O-63. | Flowchart of READ_IOP_STATE | 1-53 |
| Figure O-64. | Flowchart of READ SSP HISTORY | 1-54 |
| Figure O-65. | Flowchart of READ SSP NUMBER | 1-55 |
| Figure O-66. | Flowchart of READ_SPI | 1-56 |
| Figure O-67. | Flowchart of READ SUBSYSTEM INTERFACE TABLE | 1-57 |
| Figure O-68. | Flowchart of REGISTER TEST (part 1 of 2) | 1-58 |
| Figure O-69. | Flowchart of REGISTER TEST (part 2 of 2) | 1-59 |
| Figure O-70. | Flowchart of REMOVE_SUBSYSTEM (part 1 of 2) | 1-60 |
| Figure O-71. | Flowchart of REMOVE_SUBSYSTEM (part 2 of 2) | 1-61 |
| Figure O-72. | Flowchart of SAU HARDWARE INITIALIZATION AND TEST | 1-62 |
| Figure O-73. | Flowchart of SAU_INITIALIZATION | 1-63 |
| Figure O-74. | Flowchart of SAU LOCK CHECKS(ssp number) | 1-64 |
| Figure O-75. | Flowchart of SAU LOCK TEST | 1-65 |
| Figure O-76. | Flowchart of SAU RELEASE | 1-66 |
| Figure O-77. | Flowchart of SAU RESERVE | 1-66 |
| Figure O-78. | FLOWCHART OF SAU_RESET | 1-66 |
| Figure O-79. | Flowchart of SEND ATTENTION | 1-67 |
| Figure O-80. | Flowchart of SEND COMMAND END | 1-68 |
| Figure O-81. | Flowchart of SEND DISCONNECT MODE | 1-69 |
| Figure O-82. | Flowchart of SEND_FRAME(udlc number,count) (part 1 of 3) | 1-69 |

| | |
|---|---|
| Figure O-83. Flowchart of SEND_FRAME(udlc number,count) (part 2 of 3) | 1-70 |
| Figure O-84. Flowchart of SEND_FRAME(udlc number,count) (part 3 of 3) | 1-71 |
| Figure O-85. Flowchart of SEND FRAME REJECT | 1-72 |
| Figure O-86. Flowchart of SEND RECEIVE NOT READY | 1-73 |
| Figure O-87. Flowchart of SEND RECEIVE READY | 1-74 |
| Figure O-88. Flowchart of SEND UNNUMBERED ACKNOWLEDGE | 1-74 |
| Figure O-89. Flowchart of SET LED(ssp number) | 1-75 |
| Figure O-90. Flowchart of SET_SAU_LOCK | 1-76 |
| Figure O-91. Flowchart of SET_TEST_MODE | 1-77 |
| Figure O-92. Flowchart of SIO TEST | 1-78 |
| Figure O-93. Flowchart of SPI_CONFIGURATION | 1-79 |
| Figure O-94. Flowchart of SUBTRACT_IOP_ENABLE_COUNT(enables) | 1-80 |
| Figure O-95. Flowchart of SYSTEM SESSION CHECKS (part 1 of 2)@ | 1-81 |
| Figure O-96. Flowchart of SYSTEM SESSION CHECKS (part 2 of 2)@ | 1-82 |
| Figure O-97. Flowchart of UDLC CODE TRANSPLANT | 1-83 |
| Figure O-98. flowchart of UNCORRECTABLE MEMORY ERROR | 1-84 |
| Figure O-99. Flowchart of VERIFY(signal,signal_output_port) | 1-84 |
| Figure O-100. Flowchart of WRITE_CONTROL_STORE | 1-85 |
| Figure O-101. Flowchart of WRITE_IOP_STATE | 1-86 |
| Figure O-102. Flowchart of WRITE_PARTITIONING_REGISTER | 1-87 |
| Figure O-103. Flowchart of WRITE SSP HISTORY | 1-88 |
| Figure O-104. Flowchart of WRITE_SSP_NUMBER | 1-89 |
| Figure O-105. Flowchart of WRITE SUBSYSTEM IOP NUMBER(Part 1 of 2) | 1-90 |
| Figure O-106. Flowchart of WRITE SUBSYSTEM IOP NUMBER(Part 2 of 2) | 1-91 |

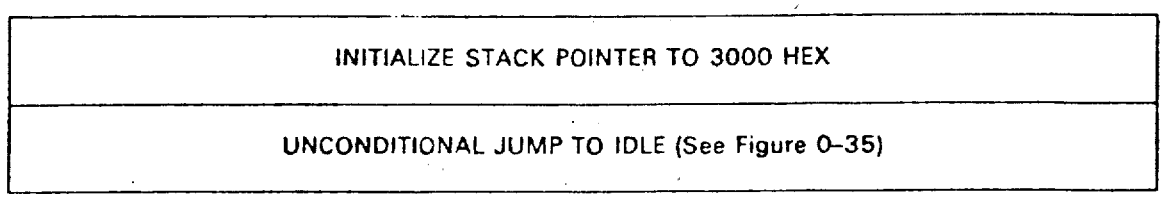

Figure O-1. Flowchart of ABORT

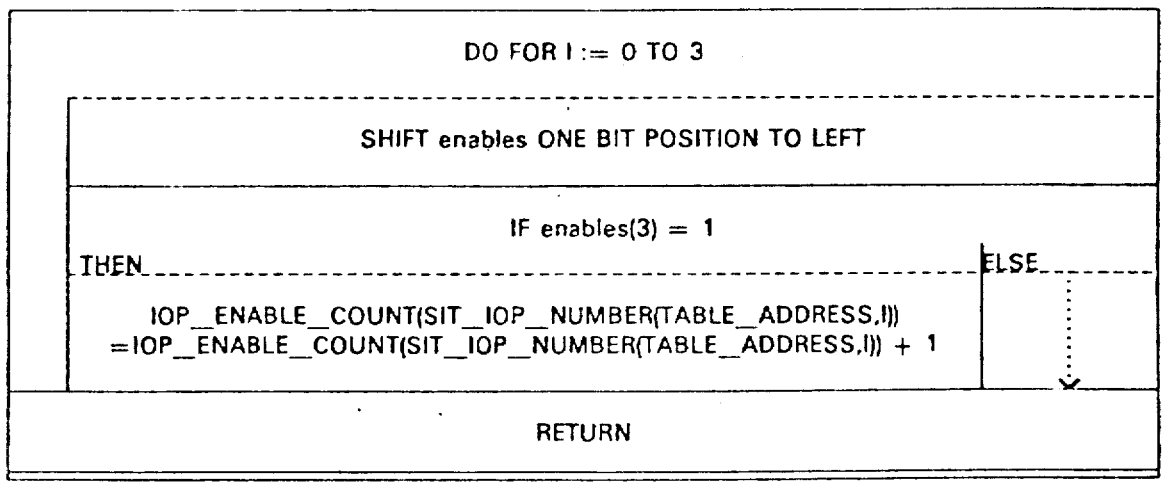

Figure O-2. Flowchart of ADD_IOP_ENABLE_COUNT(enables)

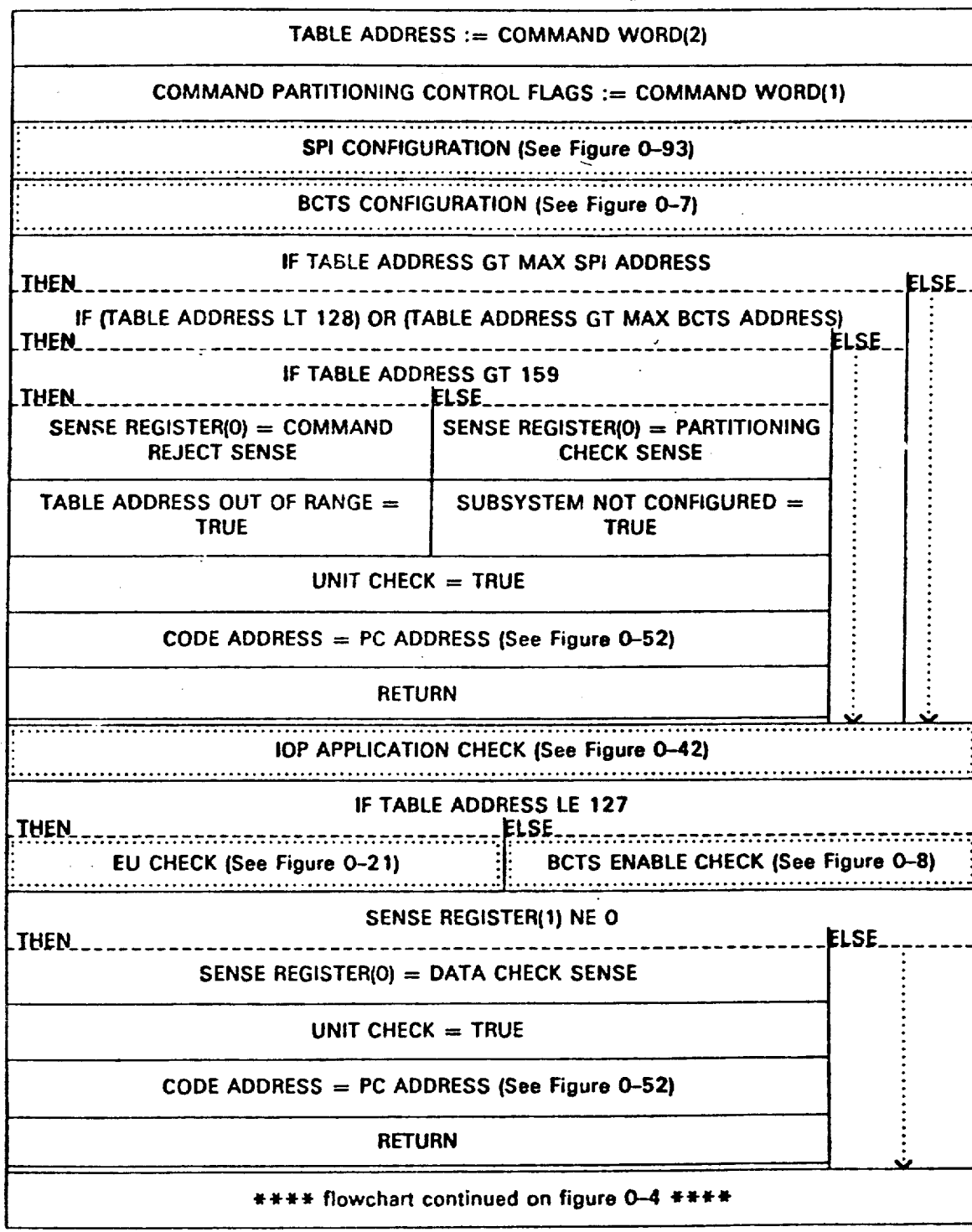
Figure O-3. Flowchart of ADD SUBSYSTEM (part 1 of 2)

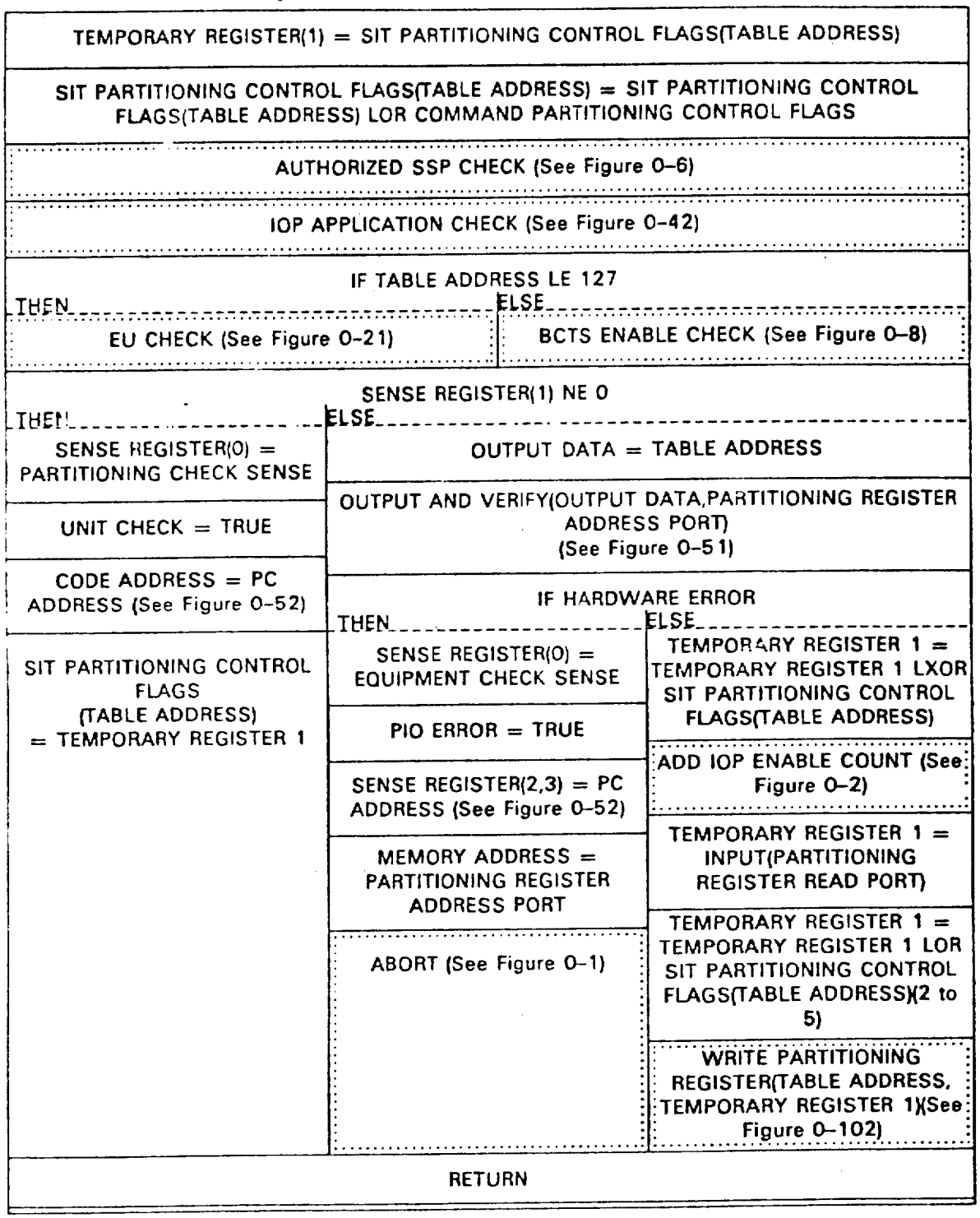
Figure O-4. Flowchart of ADD SUBSYSTEM (part 2 of 2)

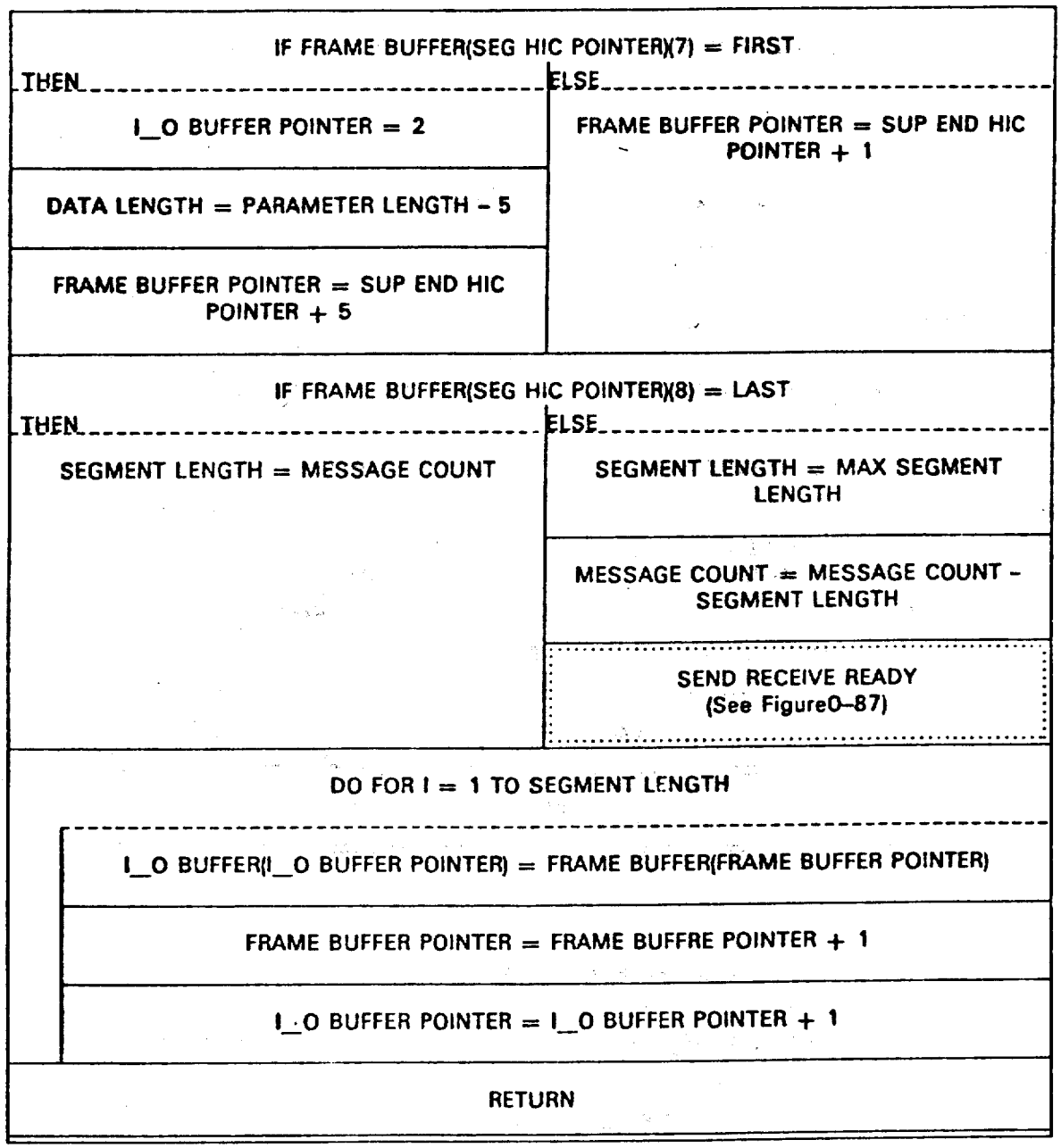
Figure O-5. Flowchart of ASSEMBLE MESSAGE

Figure O-6. Flowchart of AUTHORIZED_SSP_CHECK
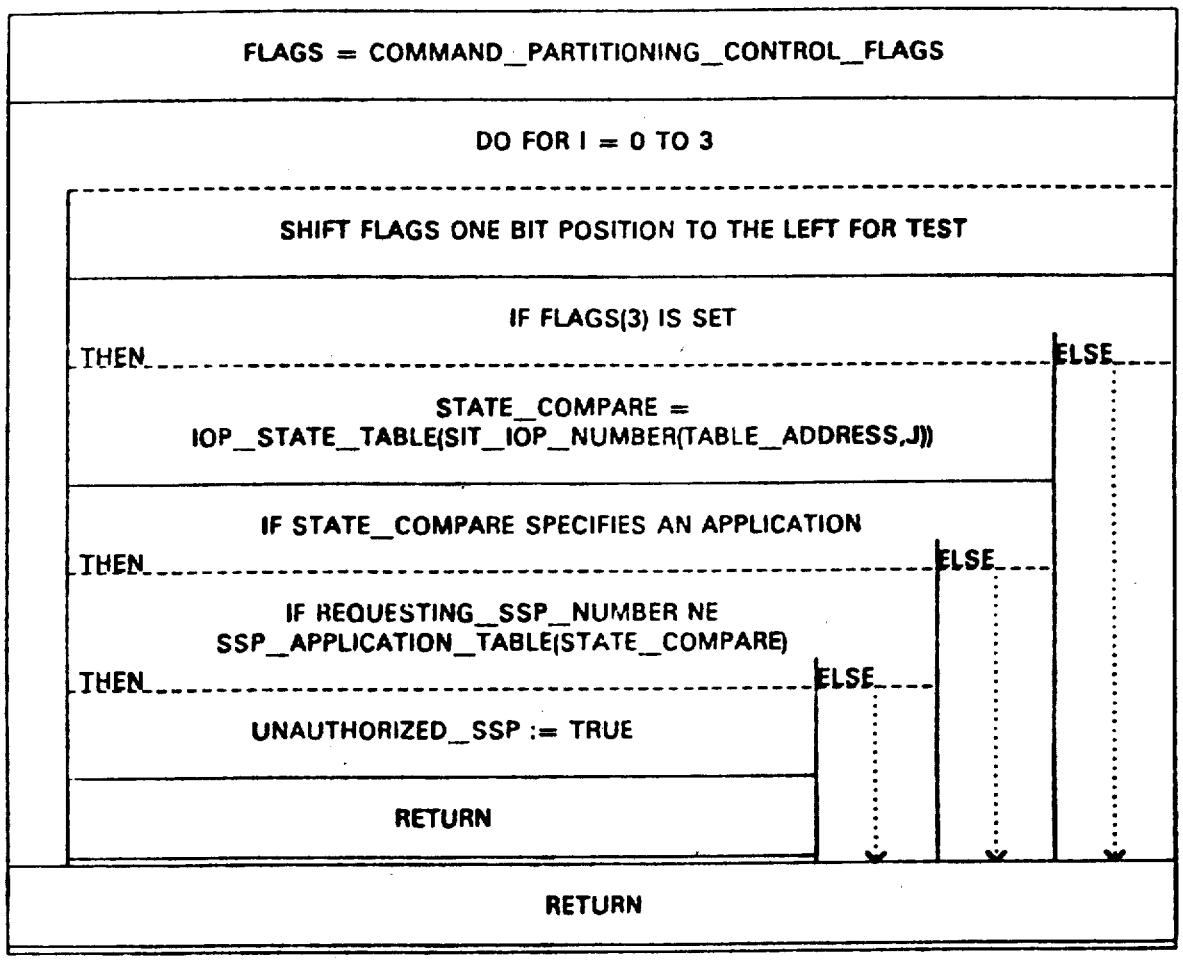
Figure O-7. Flowchart of BCTS_CONFIGURATION
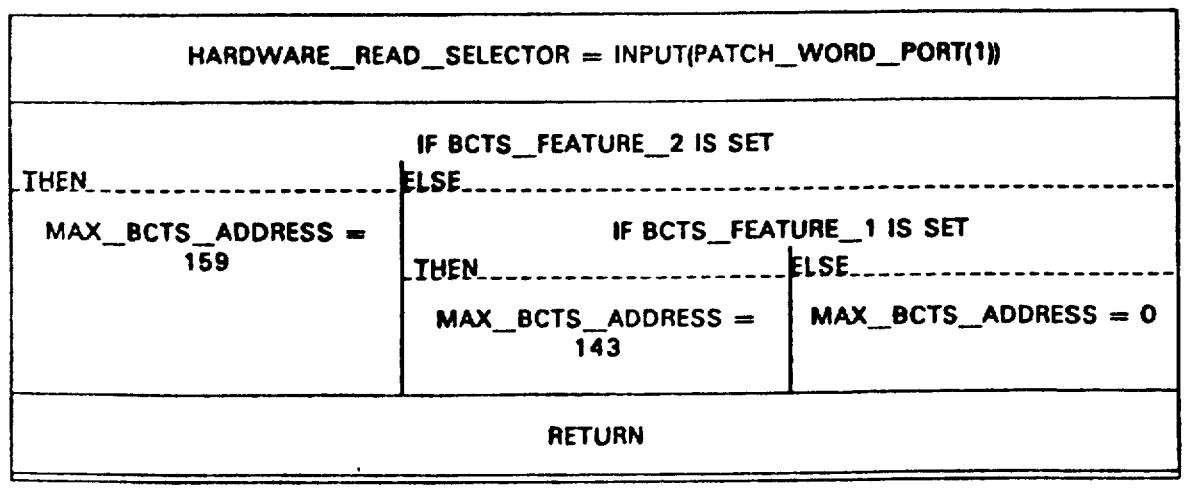

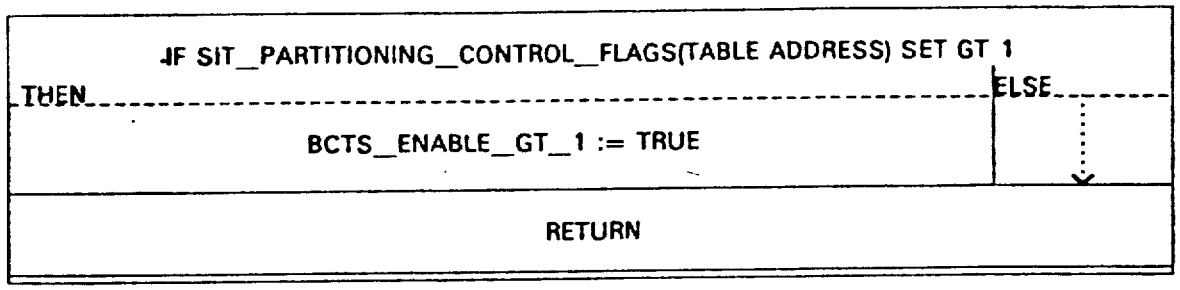
Figure O-8. Flowchart of BCTS_ENABLE_CHECK
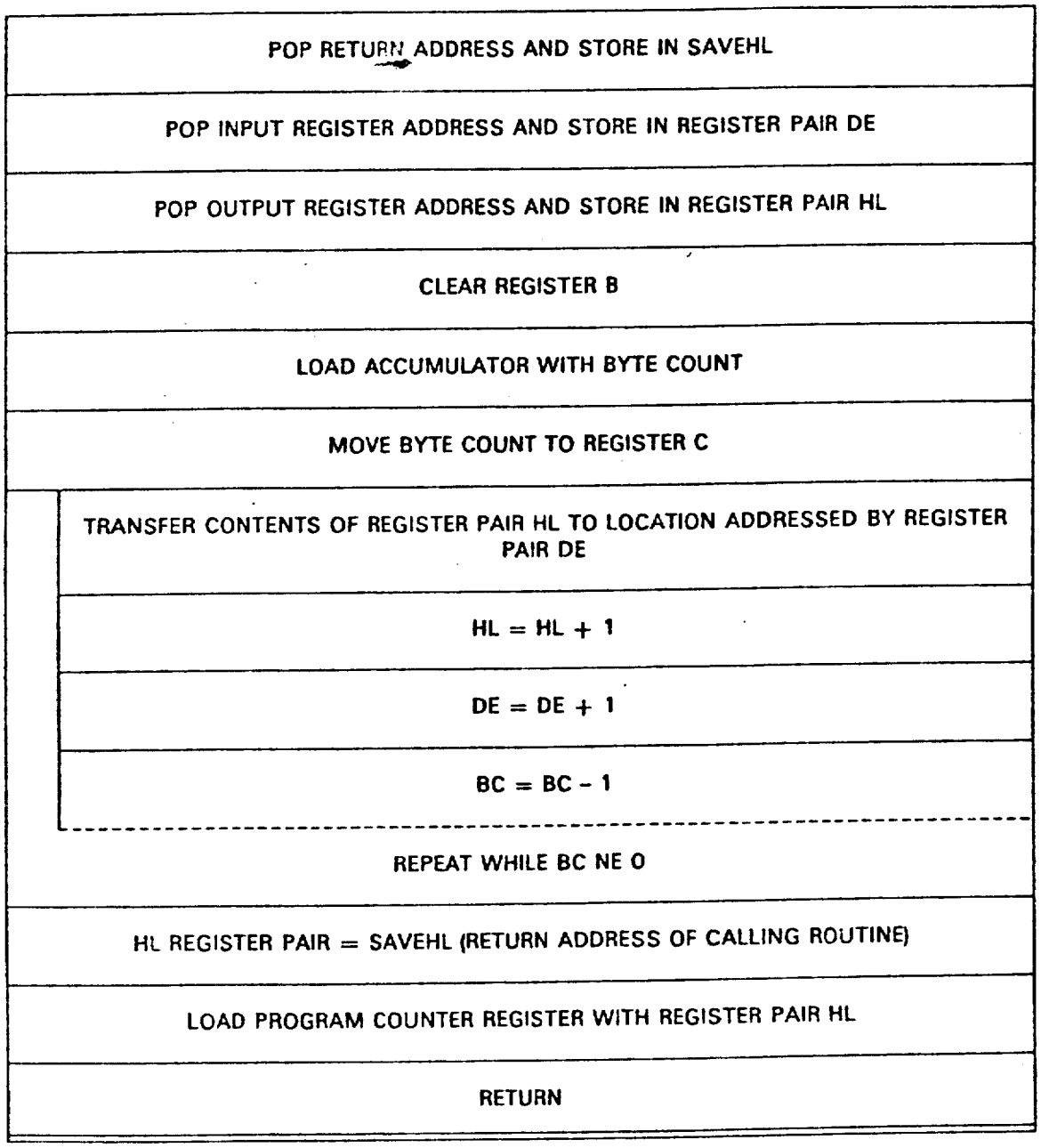
Figure O-9. Flowchart OF BLOCK_TRANSFER(readreg,writereg)

Figure O-10. Flowchart of BUILD SYSTEM SESSION

| UDLC COMMAND = INFORMATION RESPONSE CODE |||
|---|---|---|
| UDLC COMMAND(2 TO 4) = OUTPUT SEND VARIABLE(REQUESTING SSP NUMBER) |||
| UDLC COMMAND(2) :=: UDLC COMMAND(4) |||
| OUTPUT SEND VARIABLE(REQUESTING SSP NUMBER) = OUTPUT SEND VARIABLE(REQUESTING SSP NUMBER) + 1 |||
| UDLC COMMAND(6 TO 8) = OUTPUT RECEIVE VARIABLE(REQUESTING SSP NUMBER) |||
| UDLC COMMAND(6) :=: UDLC COMMAND(8) |||
| SYSTEM SESSION HIC = 11 |||
| SYSTEM SESSION ID = 01 |||
| FRAME BUFFER(3)(1 TO 4) = AU HIC |||
| FRAME BUFFER(3)(5 TO 8) = ASSURANCE UNIT |||
| FRAME BUFFER(4) = AU LENGTH |||
| FRAME BUFFER(5) = AU LABEL |||
| FRAME BUFFER(6) = SUP MESSAGE WAITING/BUSY HIC |||
| IF UNIT CHECK |||
| THEN | | ELSE |
| FRAME BUFFER(7) = ERR HIC || FRAME BUFFER(7) = SUP END HIC |
| FRAME BUFFER(8) = SS ERR || MESSAGE COUNT = 8 |
| DO FOR I = 9 TO 15 |||
| | FRAME BUFFER(I) = SENSE REGISTER(I-9) ||
| FRAME BUFFER(16) = SUP END HIC |||
| MESSAGE COUNT = 17 |||
| RETURN |||

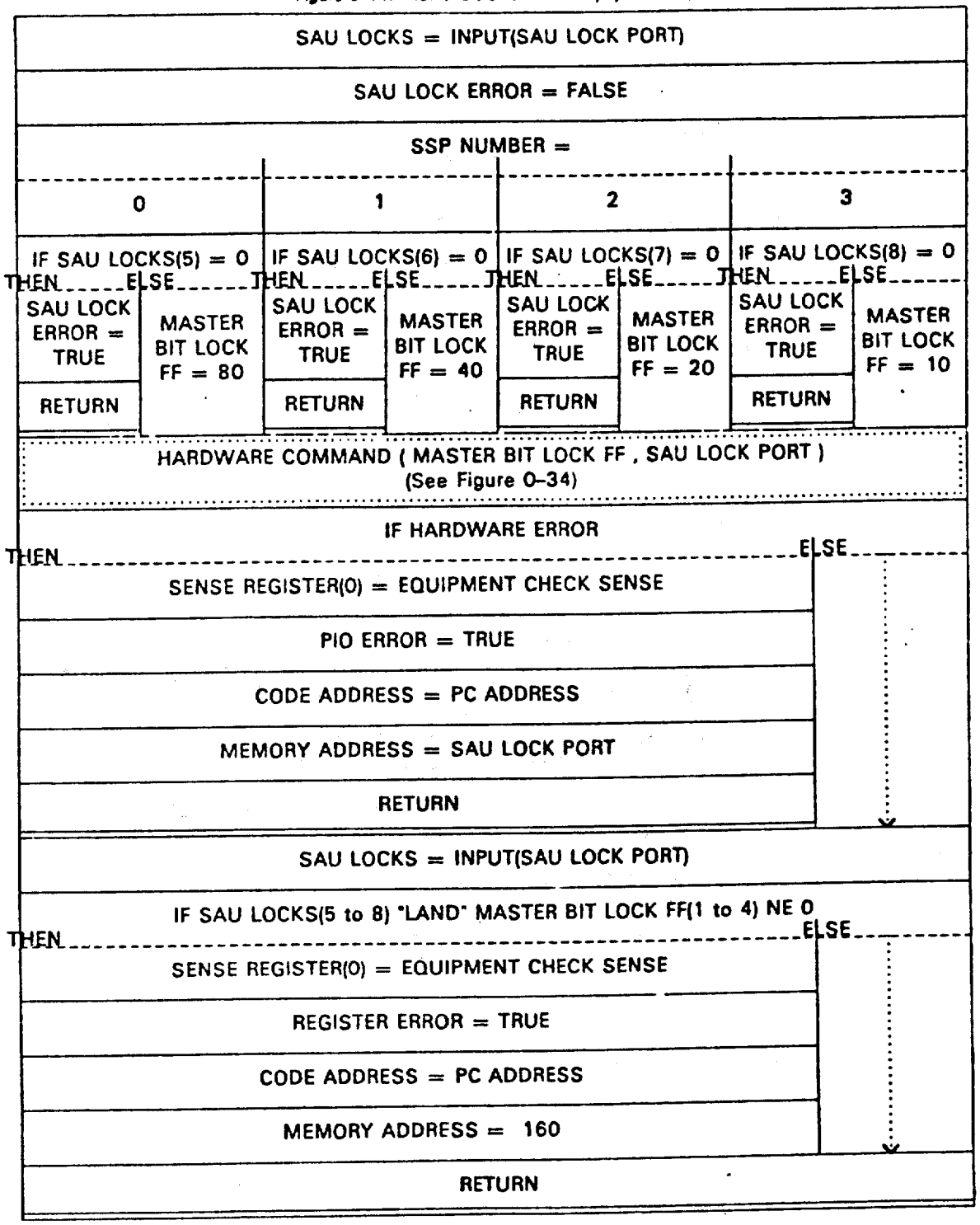
Figure O-11. Flowchart of CLEAR LED(ssp number)

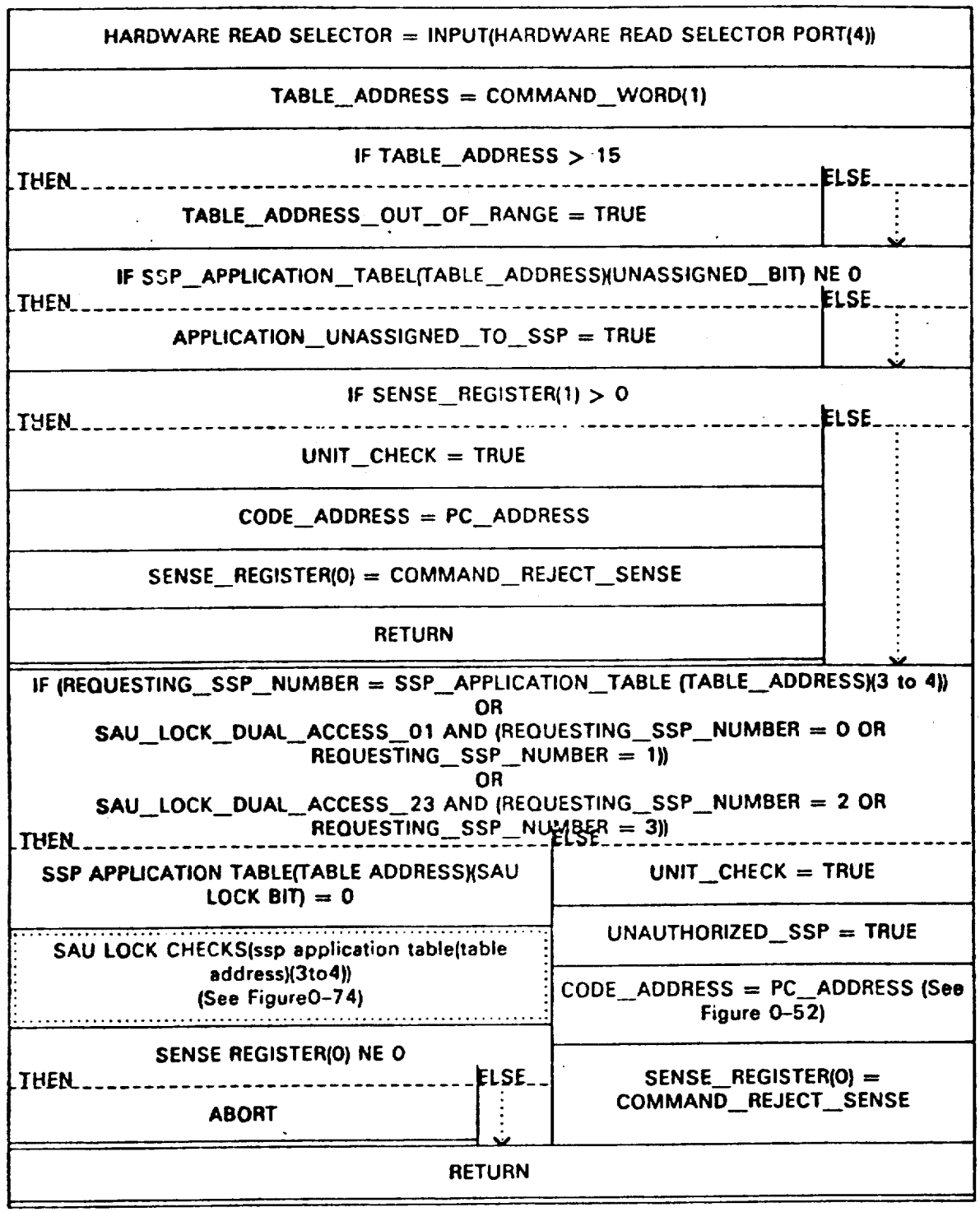
Figure O-12. Flowchart of CLEAR_SAU_LOCK

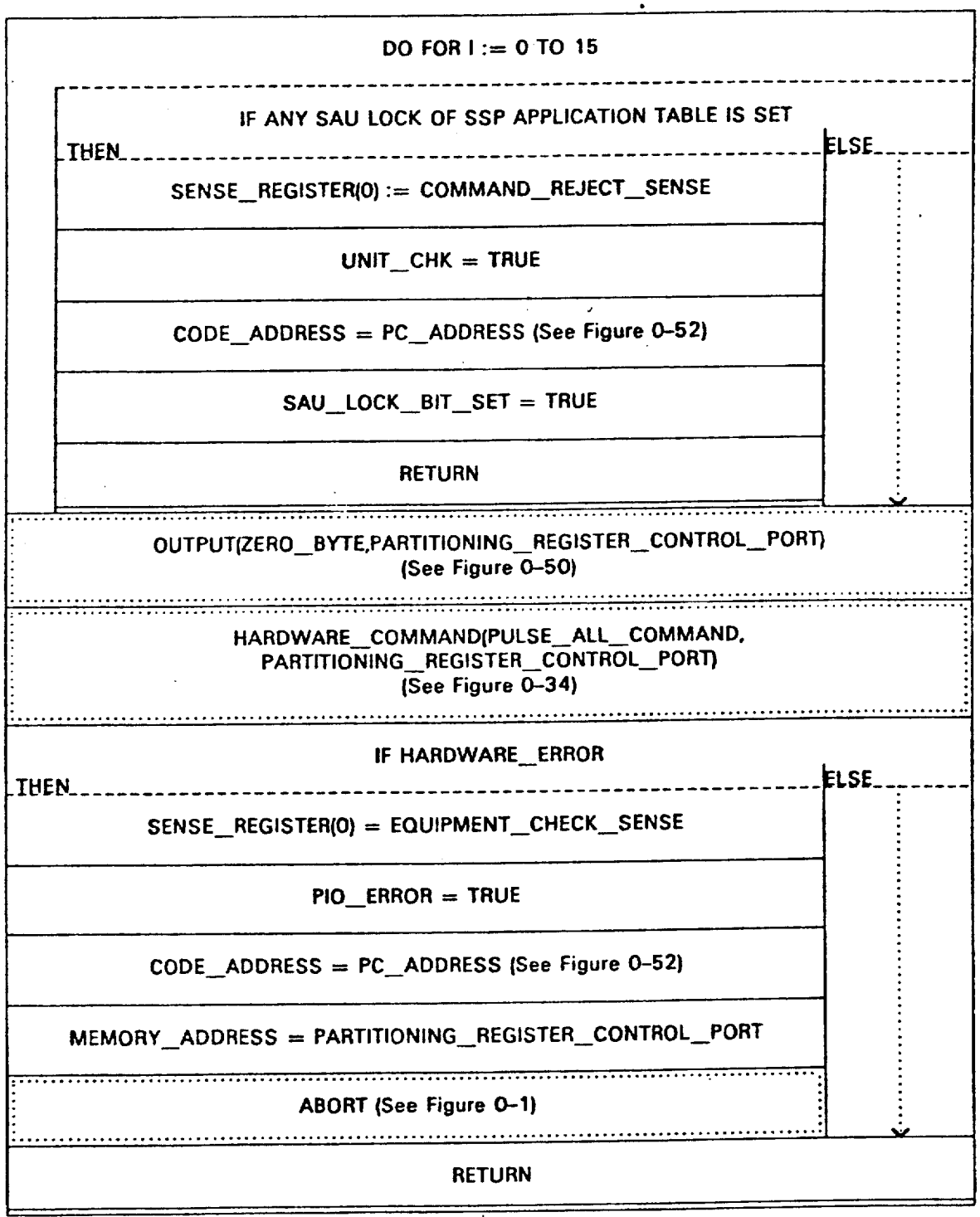
Figure O-13. Flowchart of CLEAR_TEST_MODE

Figure O-14. Flowchart of COMMAND RECEIVED

| UDLC COMMAND SPECIFIES: | | | |
|---|---|---|---|
| DISCONNECT | EXCHANGE ID | RECEIVE READY OR RECEIVE NOT READY | TEST |
| EXECUTE DISCONNECT COMMAND (See Figure O-24) | EXECUTE EXCHANGE ID COMMAND (See Figure O-27) | SEND RECEIVE READY (See Figure O-87) | EXECUTE TEST COMMAND (See Figure O-26) |

| UDLC COMMAND SPECIFIES: | | |
|---|---|---|
| NFORMATION | SET NORMAL RESPONSE MODE | OTHER |
| SEND RECEIVE READY (See Figure O-87) | EXECUTE SET NORMAL RESPONSE MODE COMMAND (See Figure O-25) | SENSE REGISTER(0) = DATA CHECK |
| EXECUTE COMMAND (See Figure O-22) | | AMBIGUOUS DATA = TRUE |
| | | CODE ADDRESS = PC ADDRESS |
| | | ABORT (See Figure O-1) |
| RETURN | | |

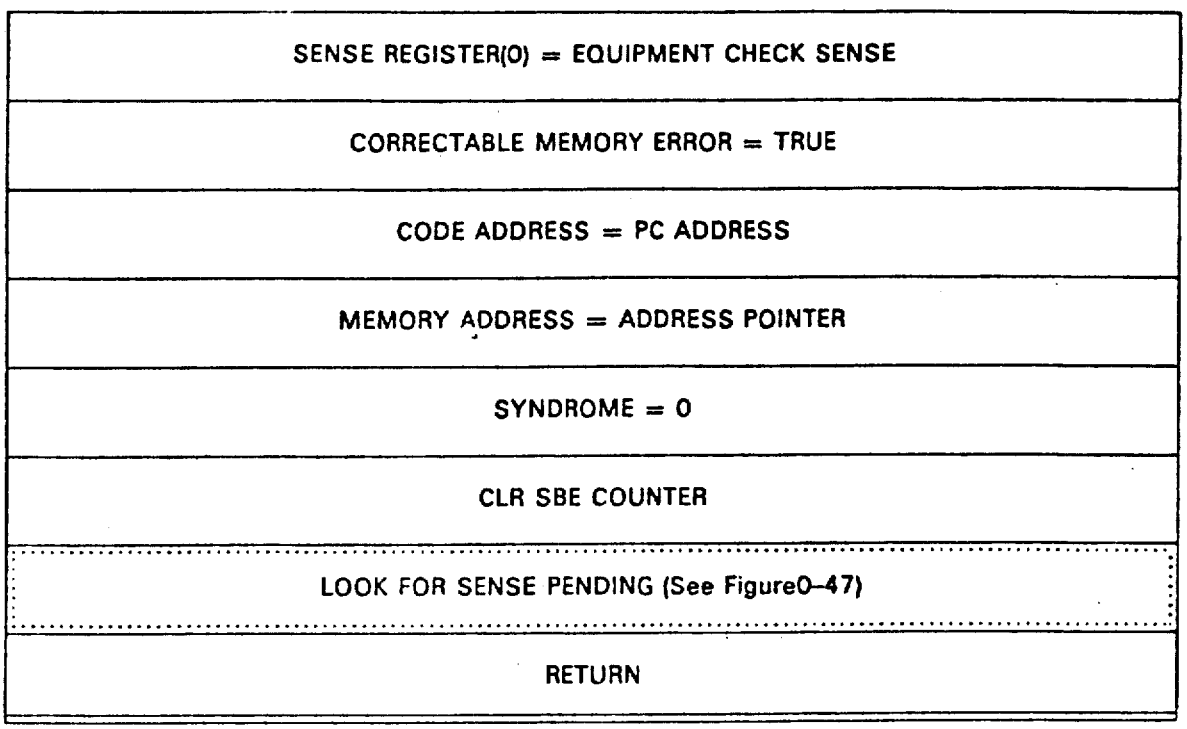
Figure O-15. flowchart of CORRECTABLE MEMORY ERROR

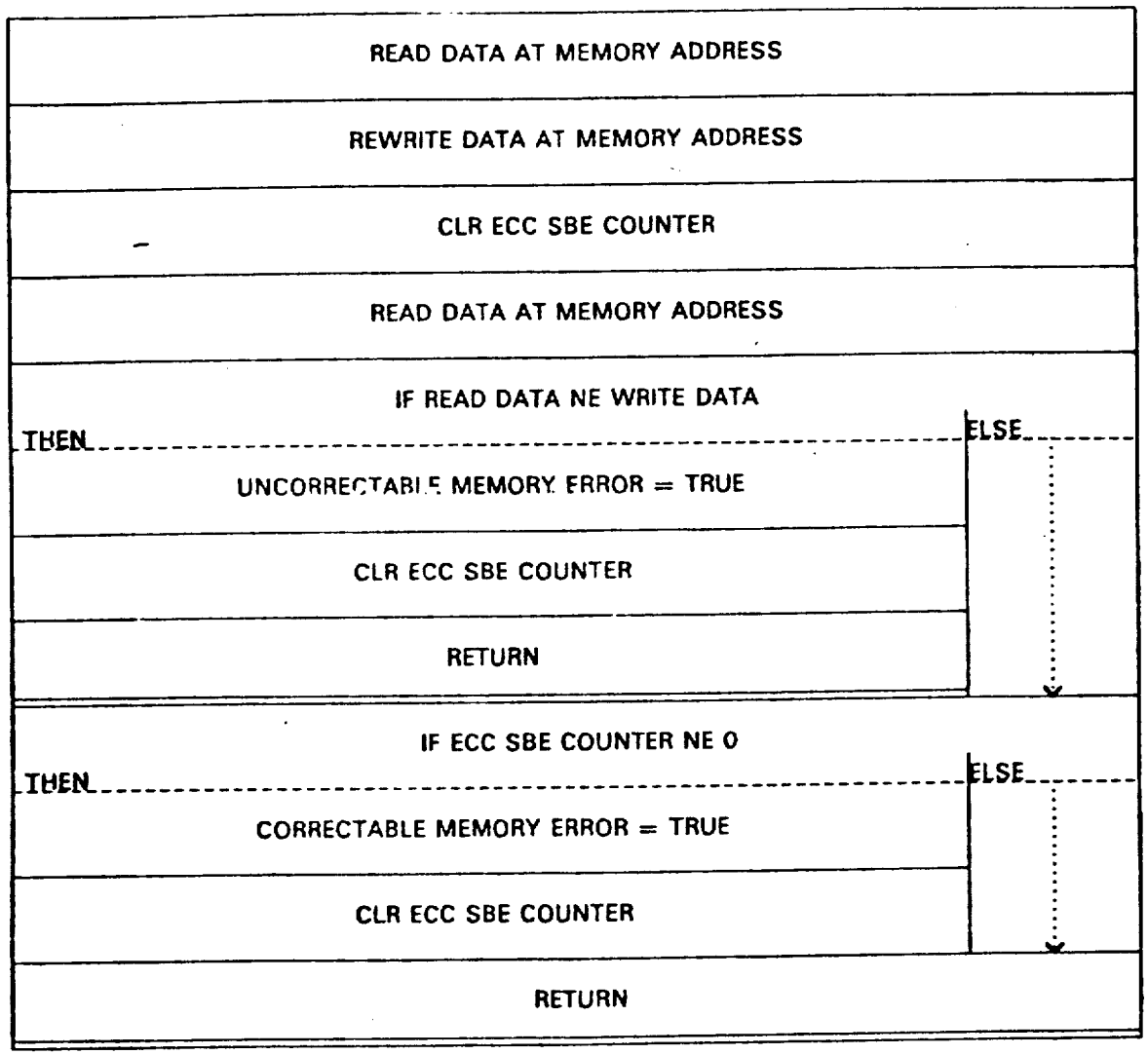
Figure O-16. Flowchart of CORRECT ECC(memory address)

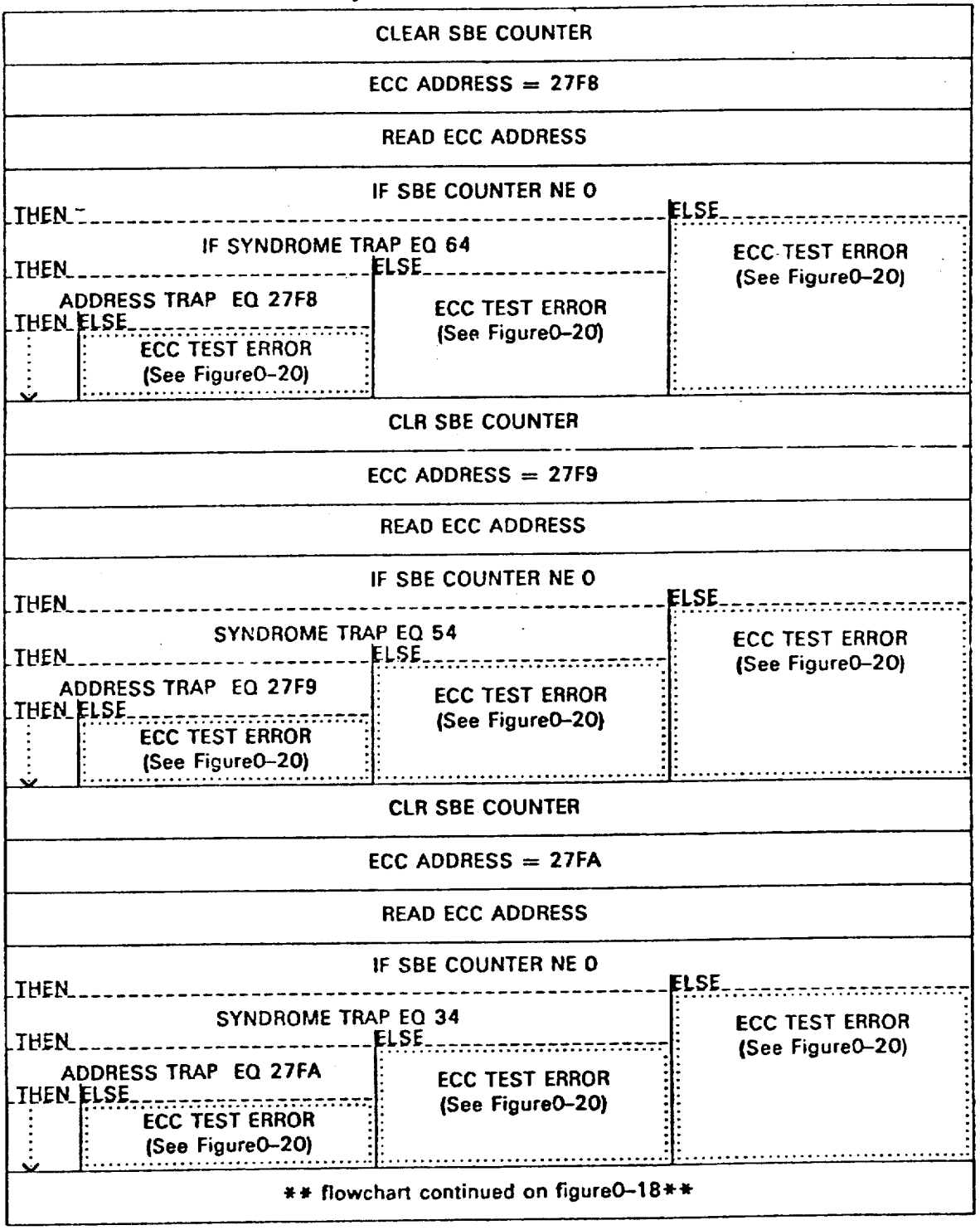
Figure O-17. Flowchart of ECC TEST

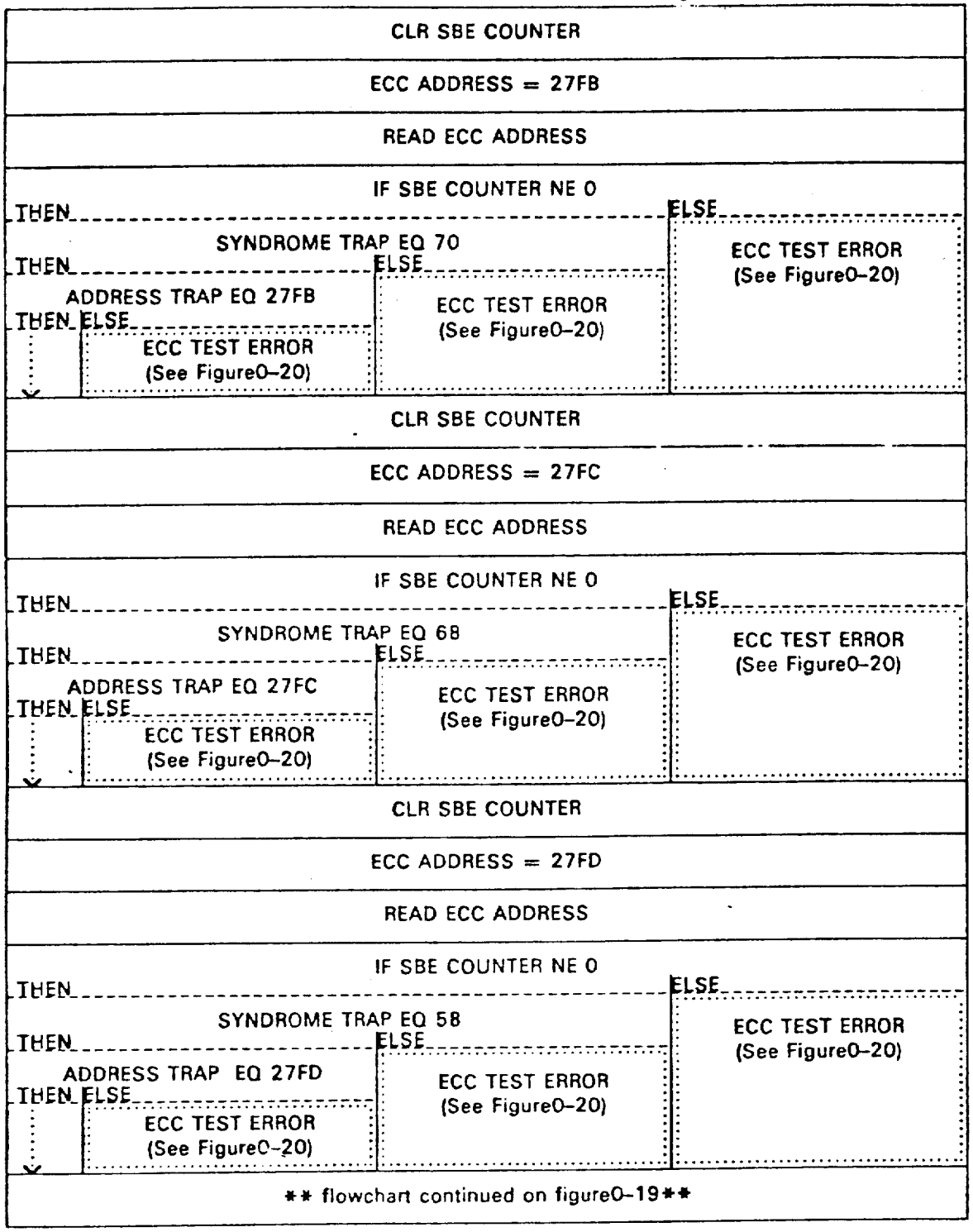
Figure O-18. flowchart of ECC TEST (part 2 of 3)

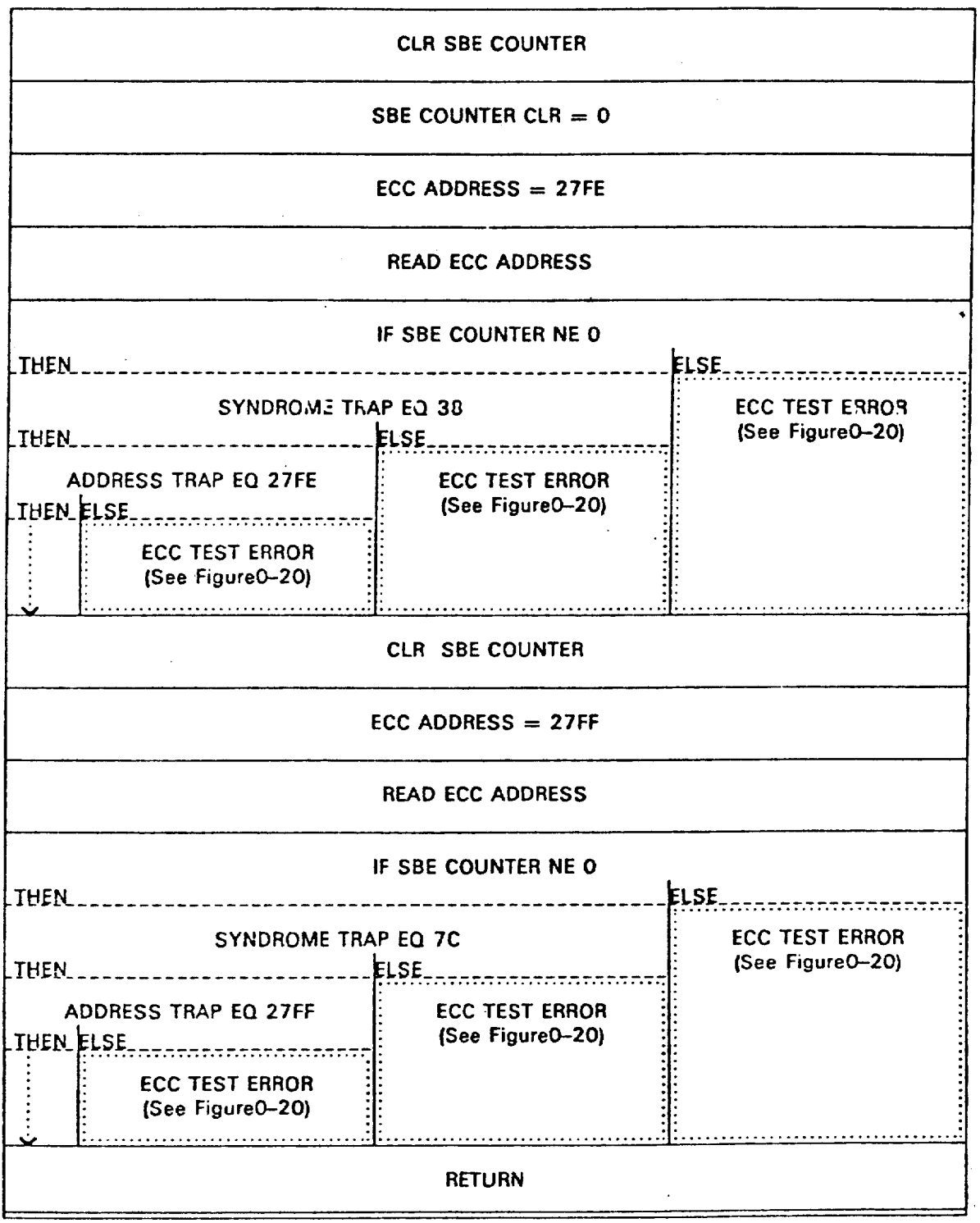
Figure O-19. flowchart of ECC TEST (part 3 of 3)

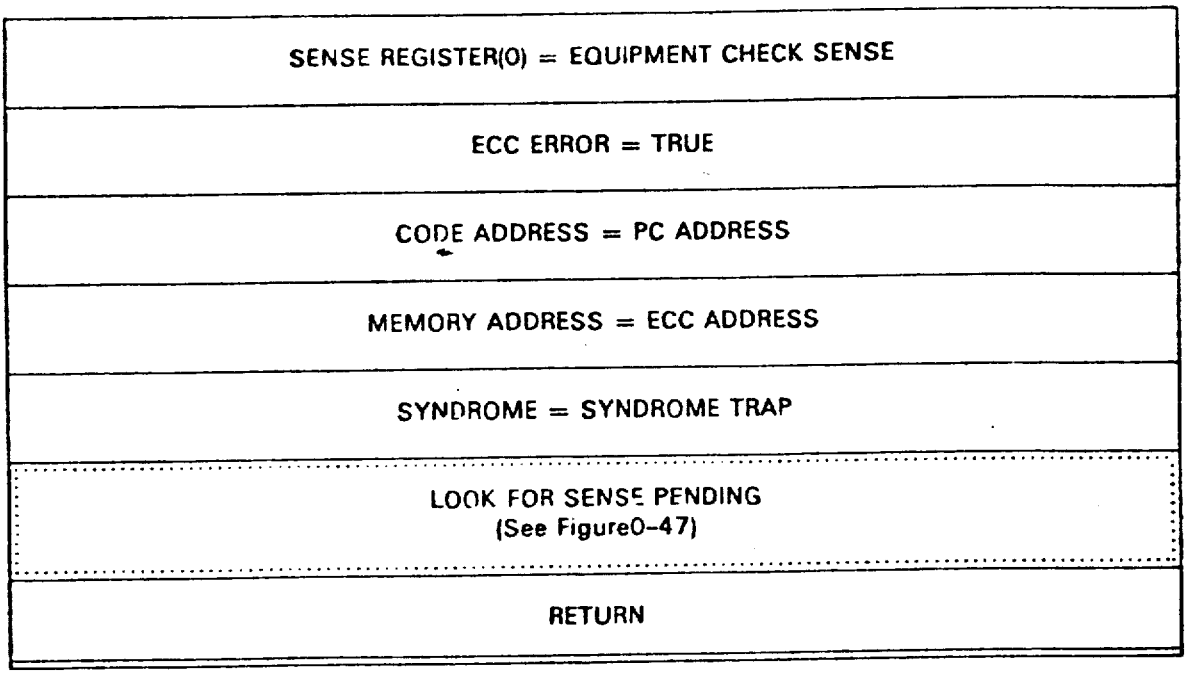
Figure 0-20. flowchart of ECC TEST ERROR

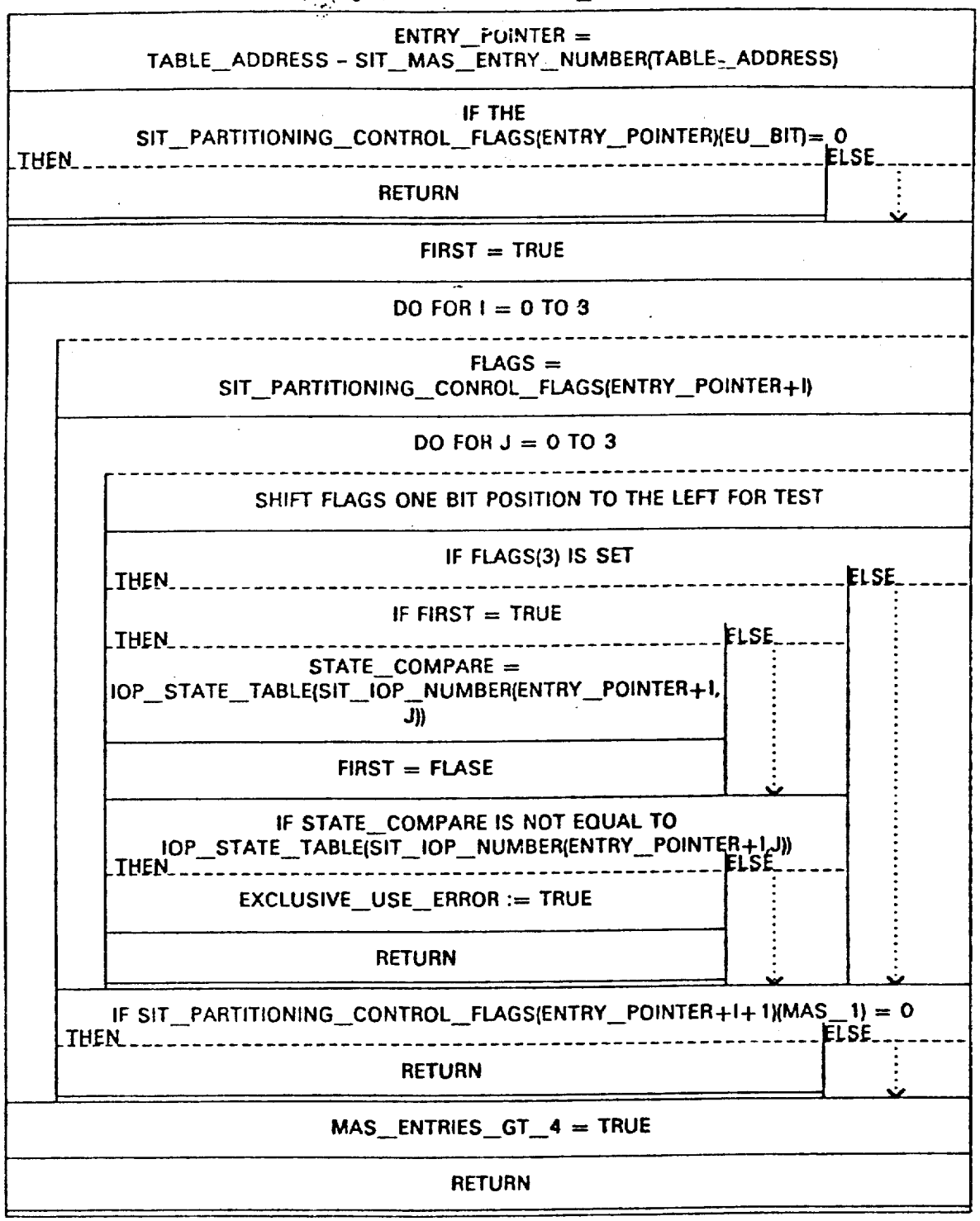
Figure O-21. Flowchart of EU_CHECK

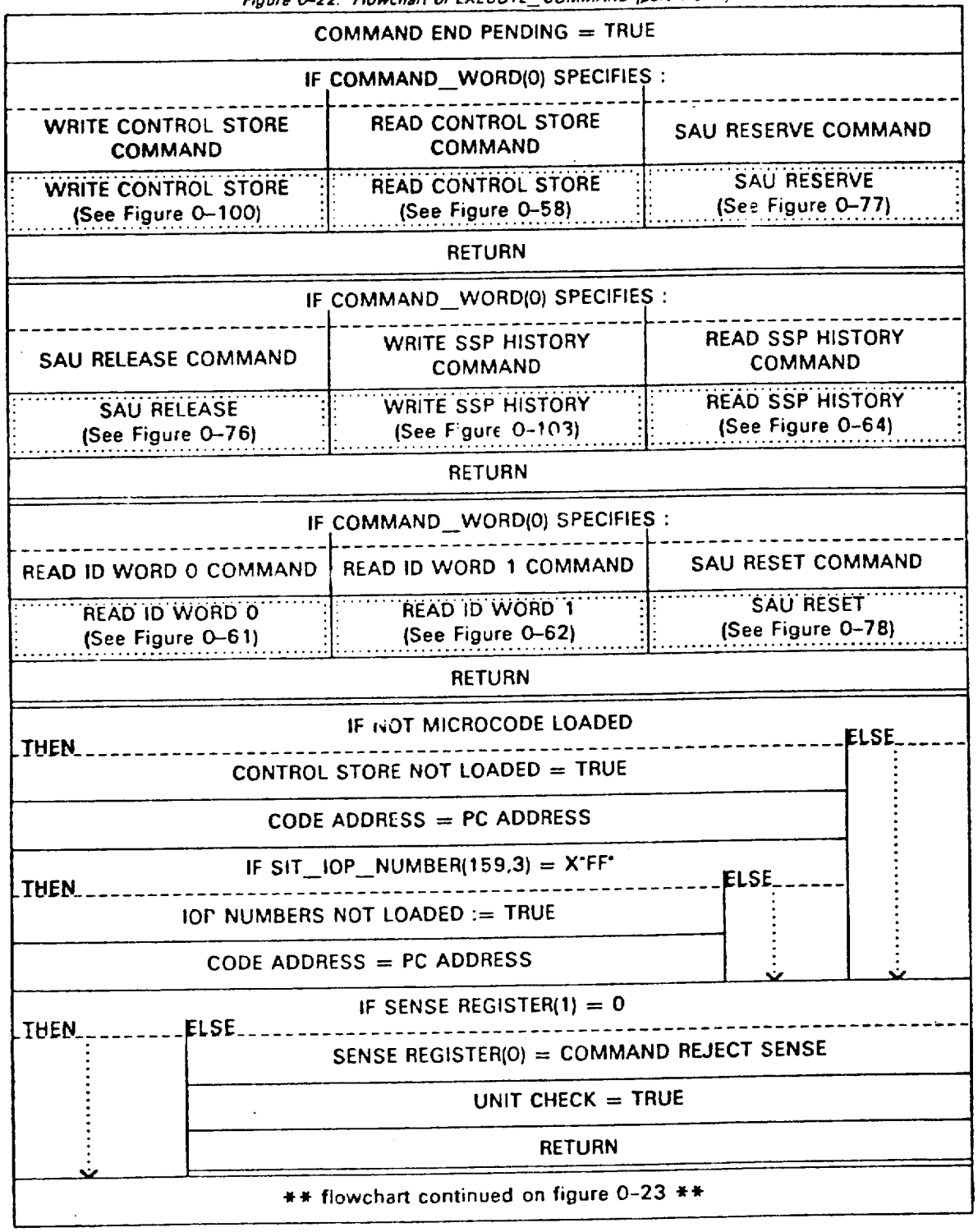
Figure O-22. Flowchart of EXECUTE_COMMAND (part 1 of 2)

Figure O-23. Flowchart of EXECUTE_COMMAND (part 2 of 2)

| IF COMMAND_WORD(0) SPECIFIES : ||||
|---|---|---|---|
| ADD SUBSYSTEM COMMAND | REMOVE SUBSYSTEM COMMAND | WRITE SUBSYSTEM IOP NUMBER COMMAND | READ SUBSYSTEM INTERFACE TABLE COMMAND |
| ADD SUBSYSTEM (See Figure O-3) | REMOVE SUBSYSTEM (See Figure O-70) | WRITE SUBSYSTEM IOP NUMBER (See Figure O-105) | READ SUBSYSTEM INTERFACE TABLE (See Figure O-67) |

| IF COMMAND_WORD(0) SPECIFIES : ||||
|---|---|---|---|
| WRITE IOP STATE COMMAND | READ IOP STATE COMMAND | WRITE SSP NUMBER COMMAND | READ SSP NUMBER COMMAND |
| WRITE IOP STATE (See Figure O-101) | READ IOP STATE (See Figure O-63) | WRITE SSP NUMBER (See Figure O-104) | READ SSP NUMBER (See Figure O-65) |

| IF COMMAND_WORD(0) SPECIFIES : ||||
|---|---|---|---|
| READ SPI COMMAND | READ BCTS INTERFACE COMMAND | SET TEST MODE COMMAND | CLEAR TEST MODE COMMAND |
| READ SPI (See Figure O-66) | READ BCTS INTERFACE (See Figure O-57) | SET TEST MODE (See Figure O-91) | CLEAR TEST MODE (See Figure O-13) |

| IF COMMAND_WORD(0) SPECIFIES : |||
|---|---|---|
| SET SAU LOCK COMMAND | CLEAR SAU LOCK COMMAND | OTHER |
| SET SAU LOCK (See Figure O-90) | CLEAR SAU LOCK (See Figure O-12) | UNIT CHECK = TRUE |
| | | SENSE REGISTER(0) = COMMAND REJECT SENSE |
| | | UNRECOGNIZED COMMAND =TRUE |
| | | CODE ADDRESS = PC ADDRESS |

| RETURN |
|---|

Figure O-24. Flowchart of EXECUTE DISCONNECT COMMAND
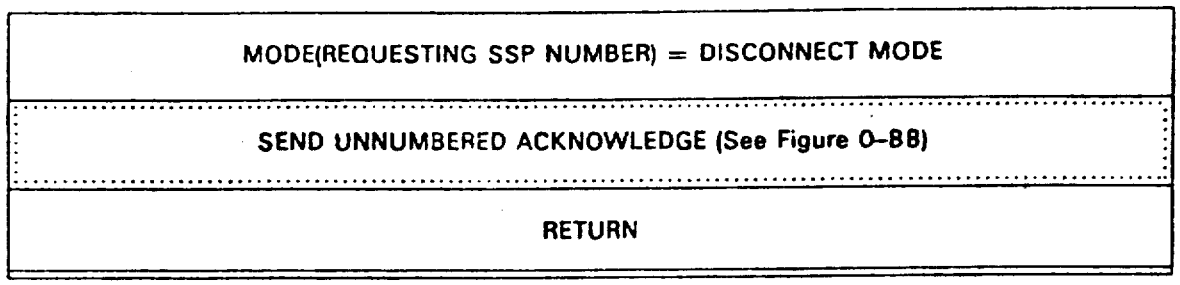
Figure O-25. Flowchart of EXECUTE SET NORMAL RESPONSE MODE COMMAND
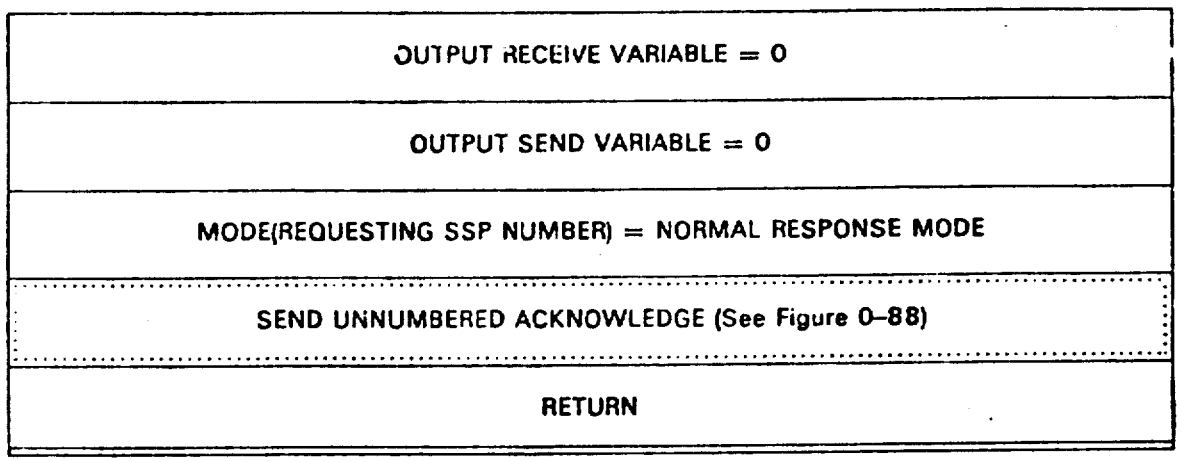
Figure O-26. Flowchart of EXECUTE TEST COMMAND
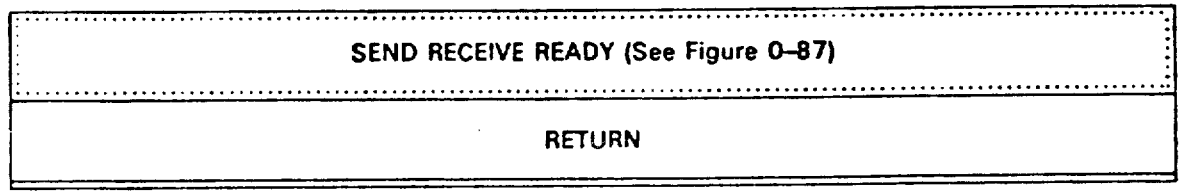
Figure O-27. Flowchart of EXECUTE EXCHANGE ID COMMAND
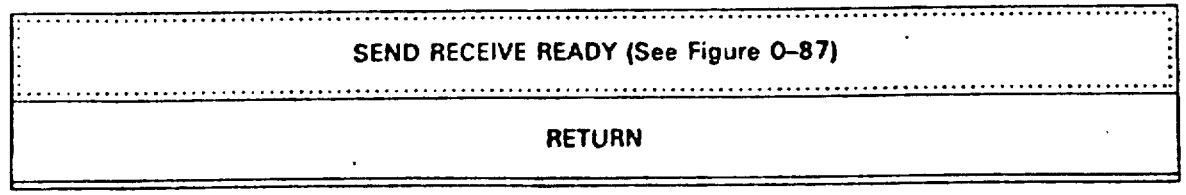

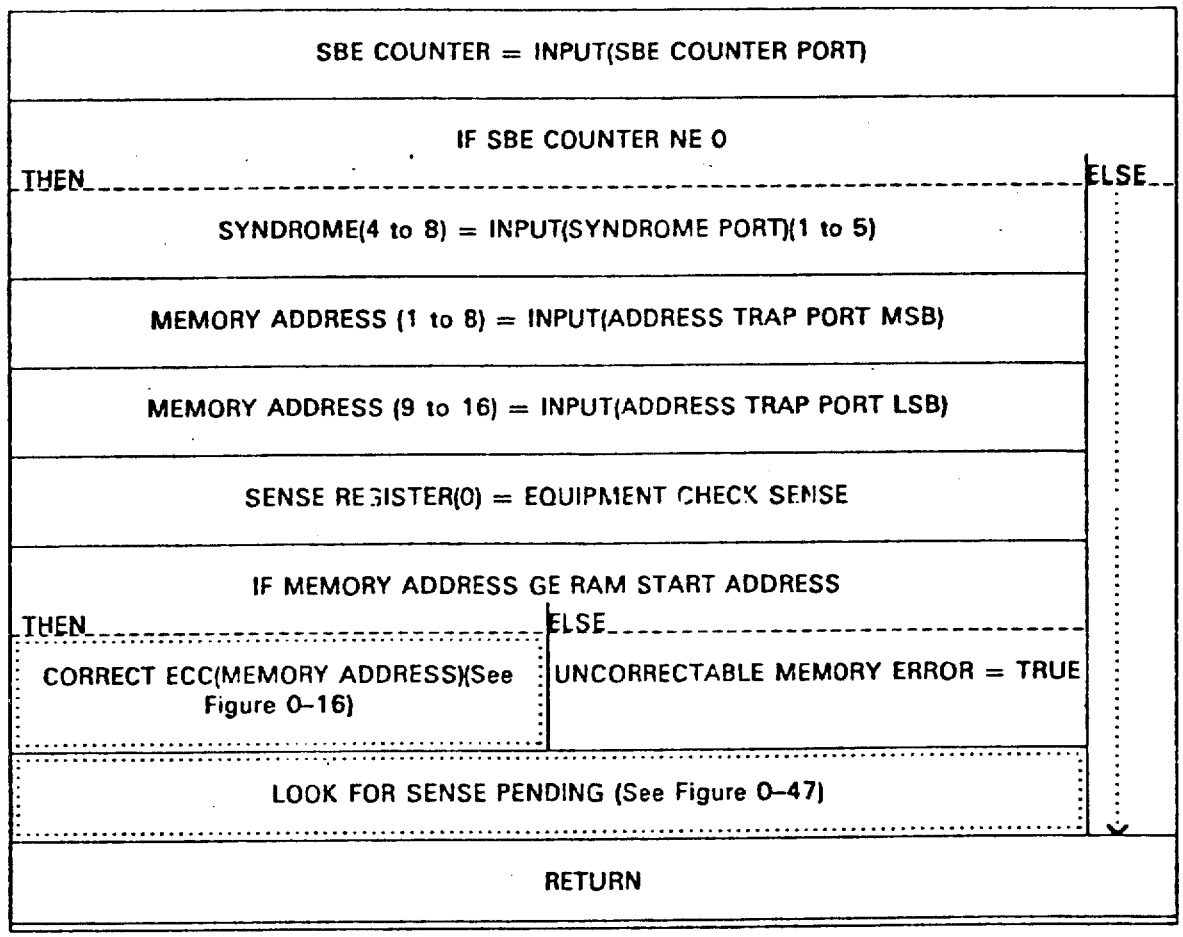
Figure O-28. Flowchart of FAULT DETECT

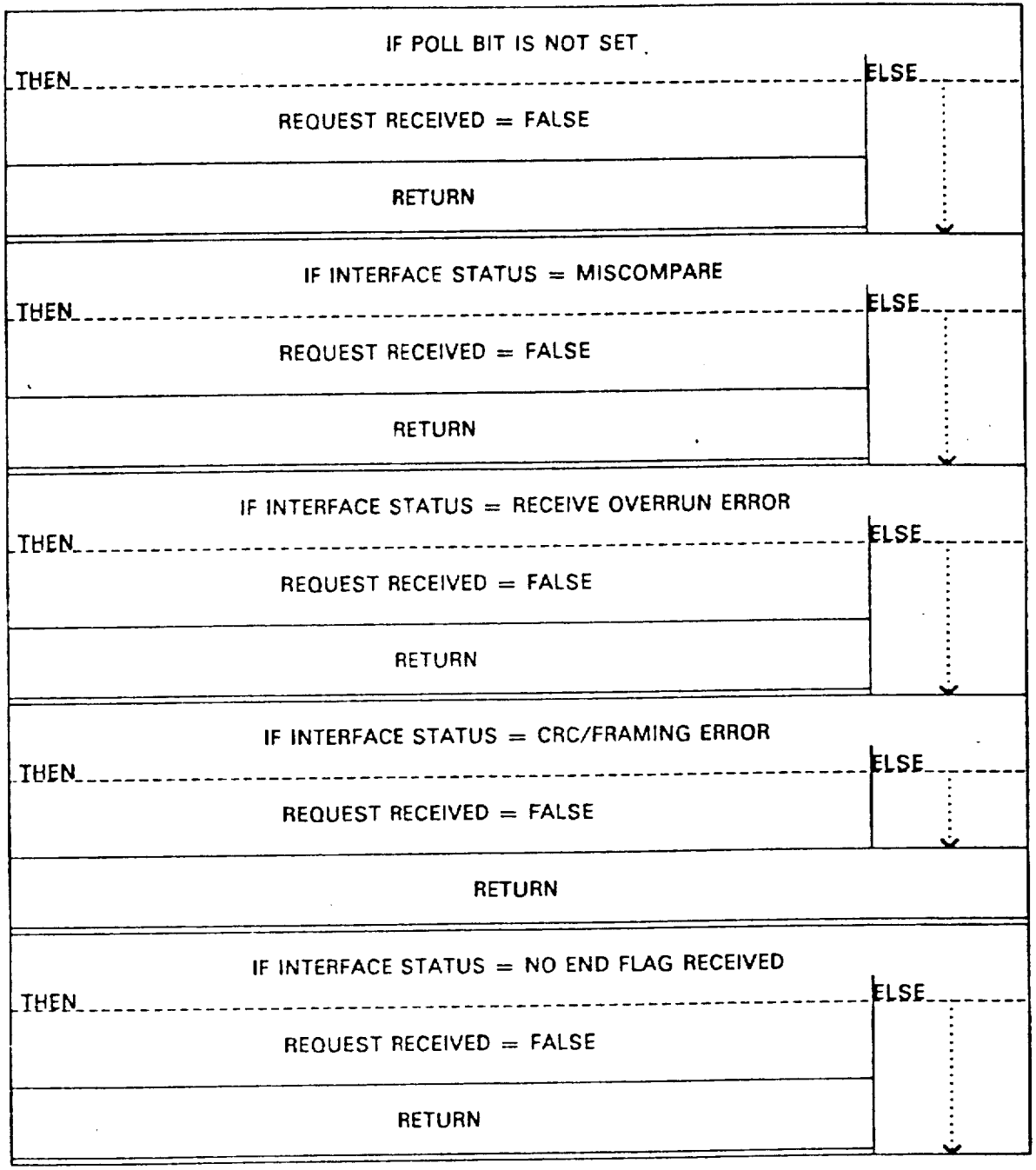
Figure 0-29. Flowchart of FRAME CHECKS

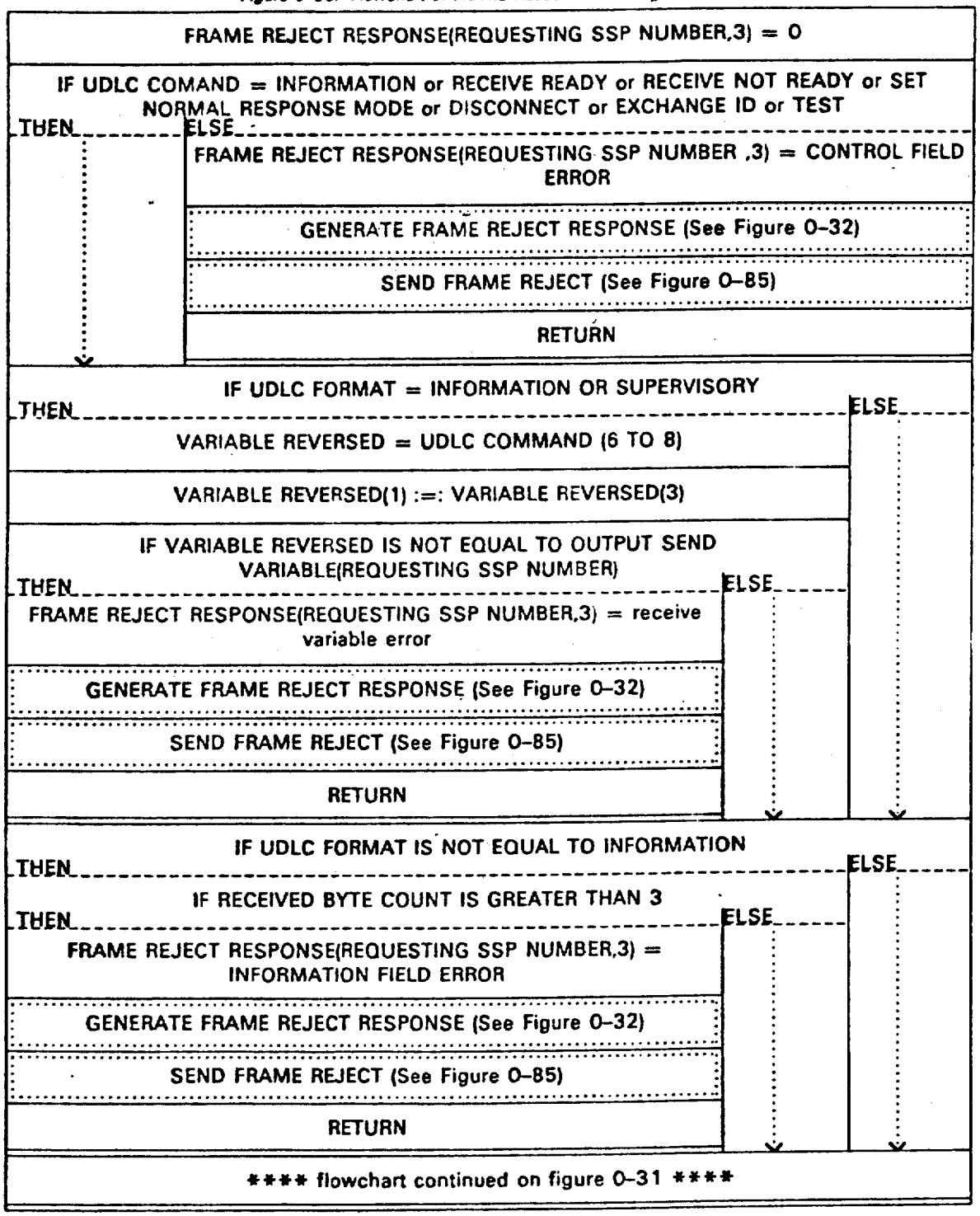
Figure O-30. Flowchart of FRAME REJECT CHECKS (part 1 of 2)

Figure O-31. Flowchart of FRAME REJECT CHECKS (part 2 of 2)
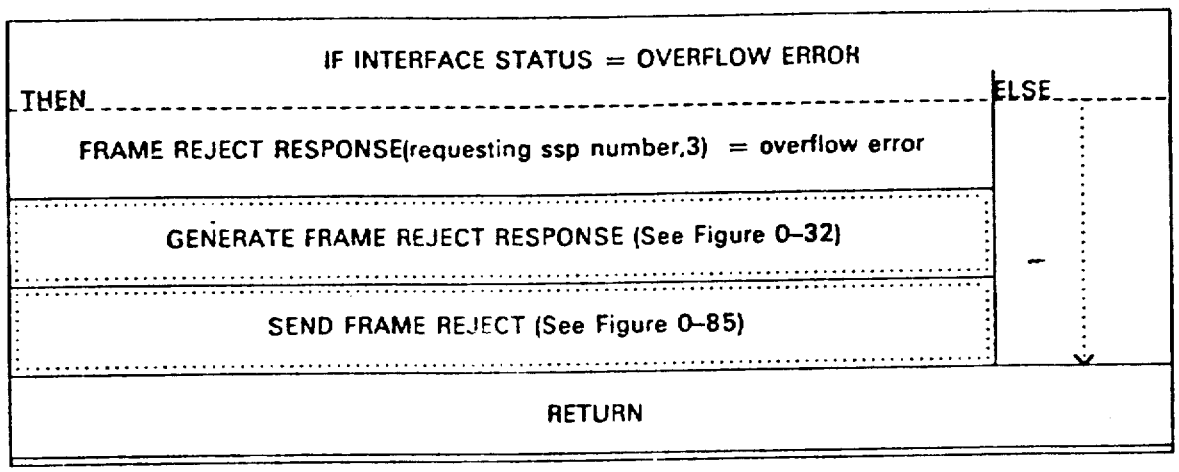
Figure O-32. Flowchart of GENERATE FRAME REJECT RESPONSE
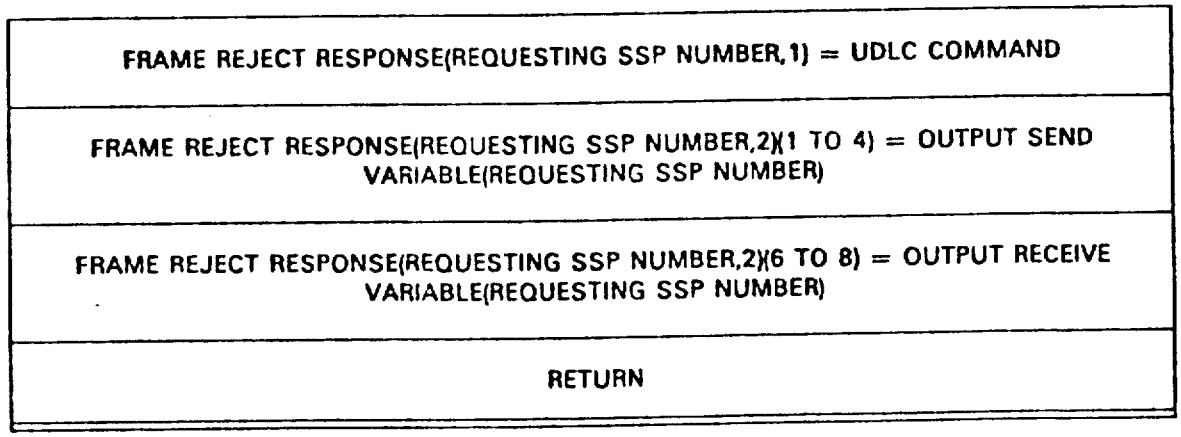

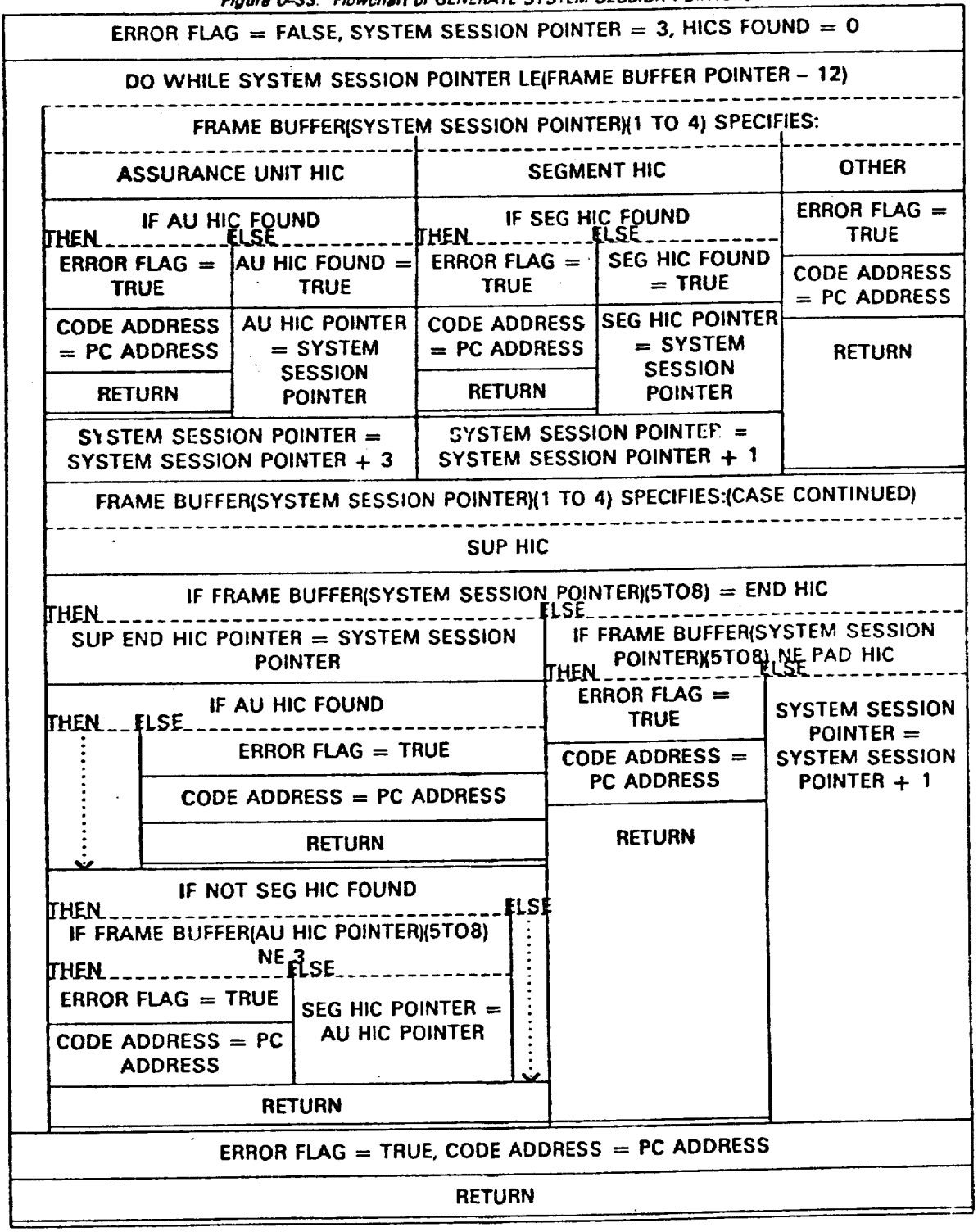
Figure O-33. Flowchart of GENERATE SYSTEM SESSION POINTERS

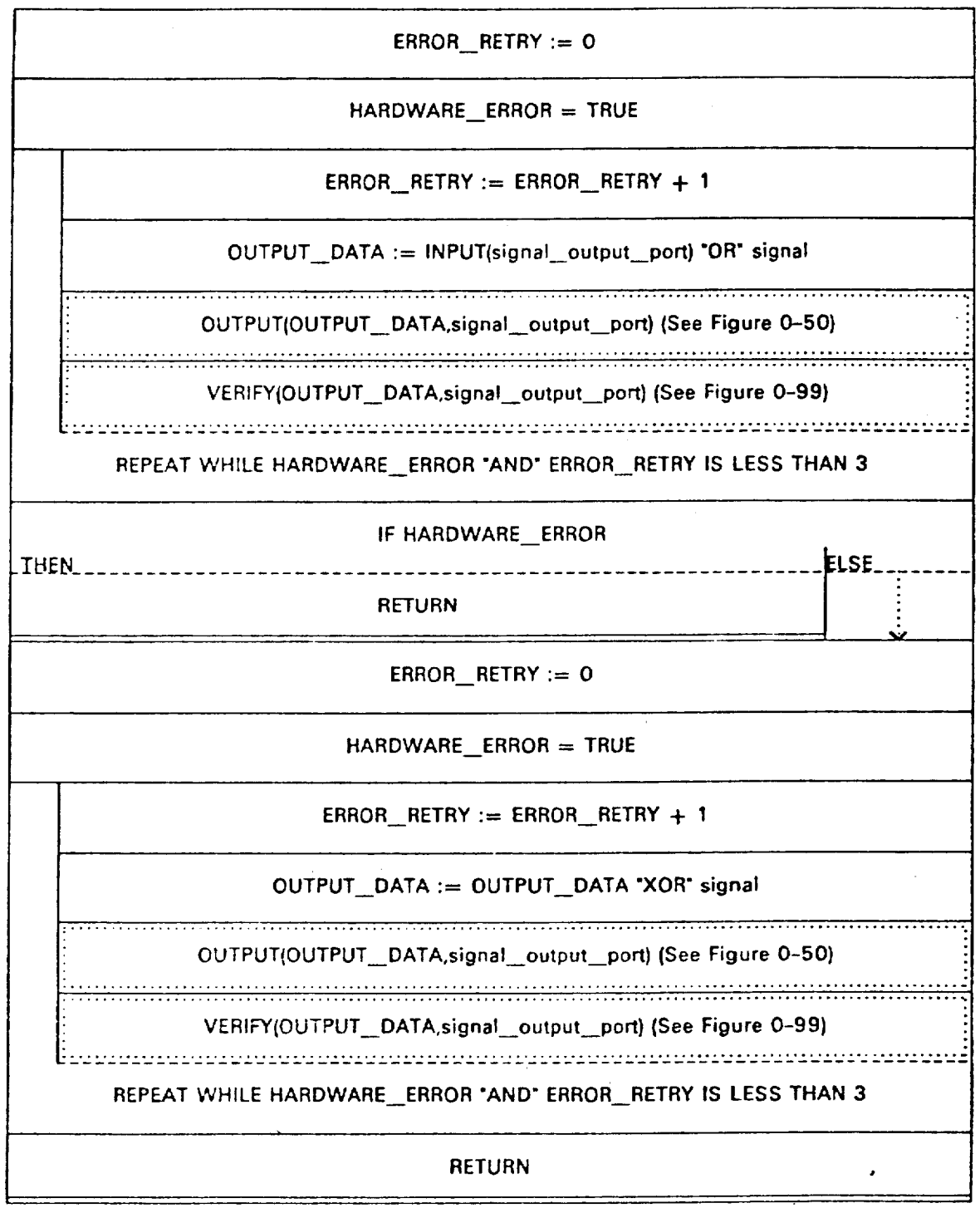
Figure O-34. Flowchart of HARDWARE_COMMAND(signal, signal_output_port)

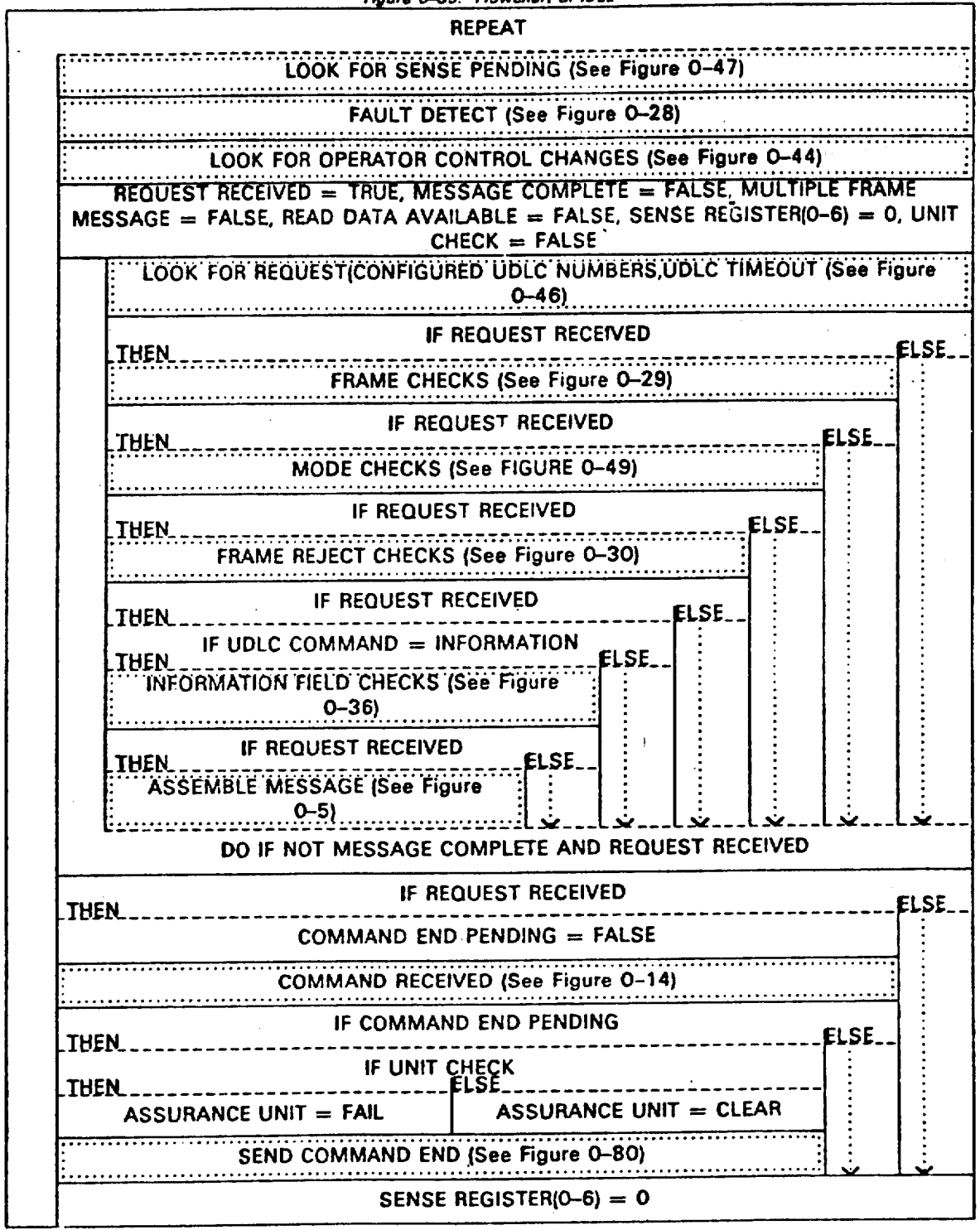
Figure O-35. Flowchart of IDLE

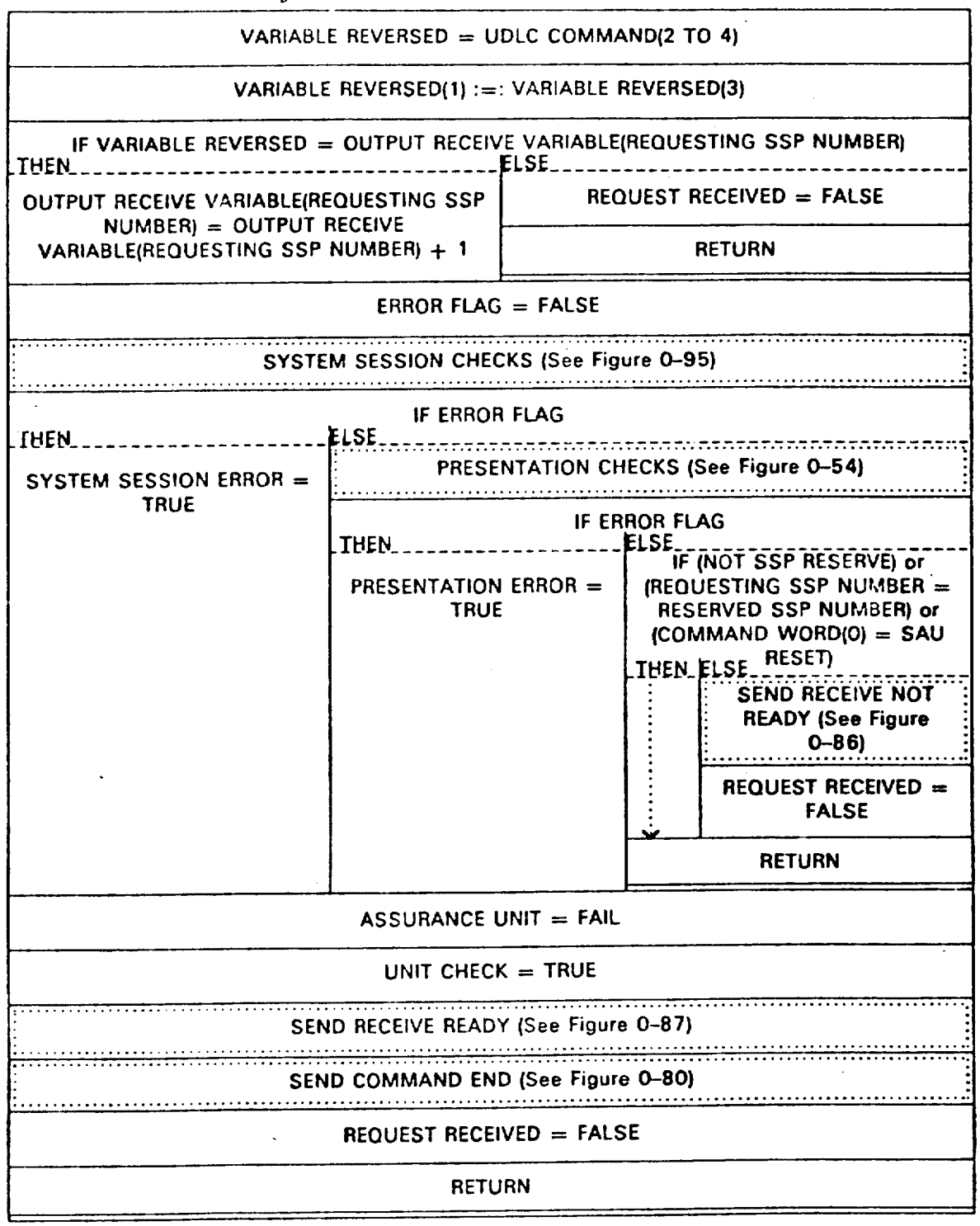
Figure O-36 Flowchart of INFORMATION FIELD CHECKS

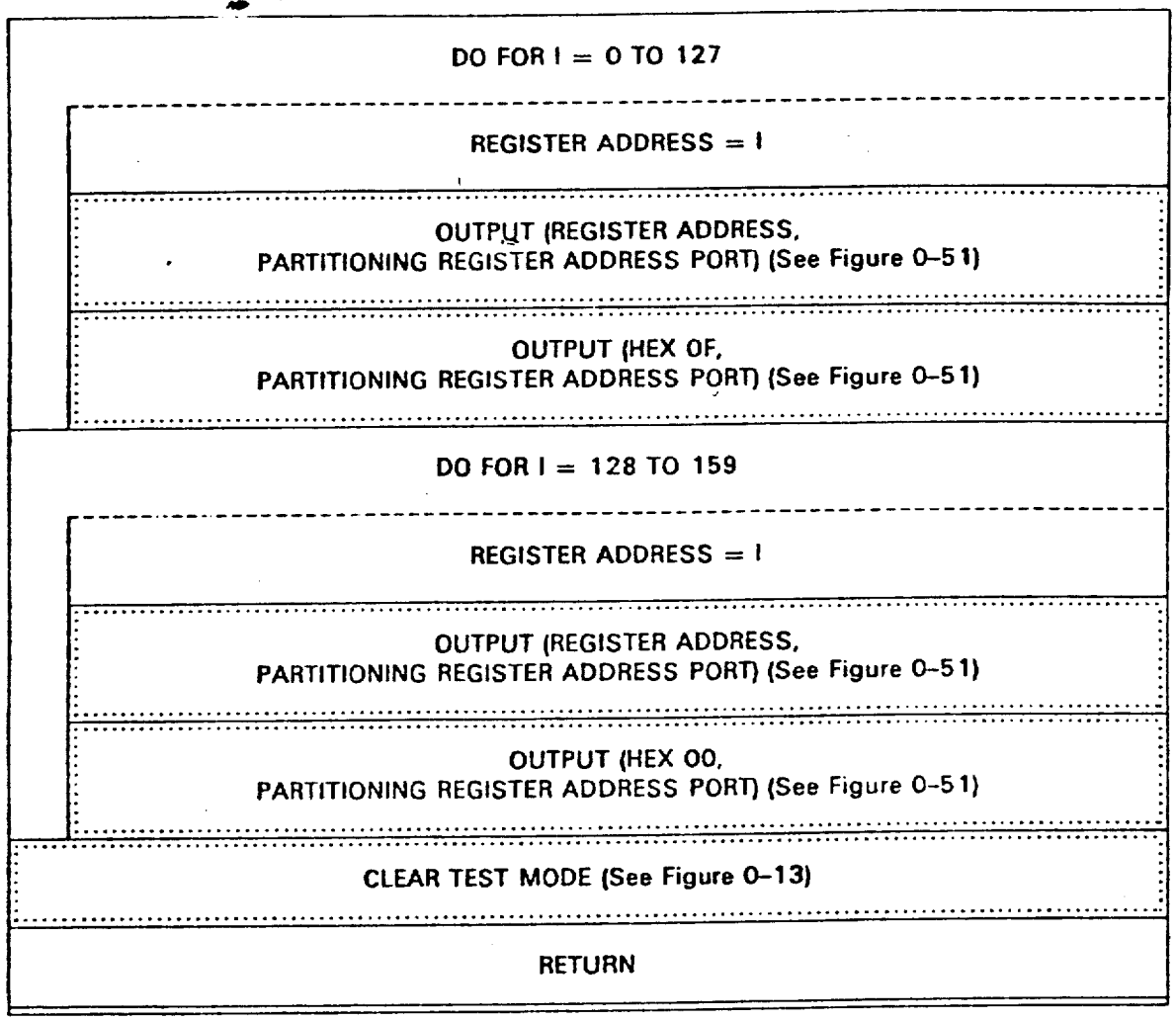
Figure O-37. Flowchart of INITIALIZE BCTS SPI INTERFACE
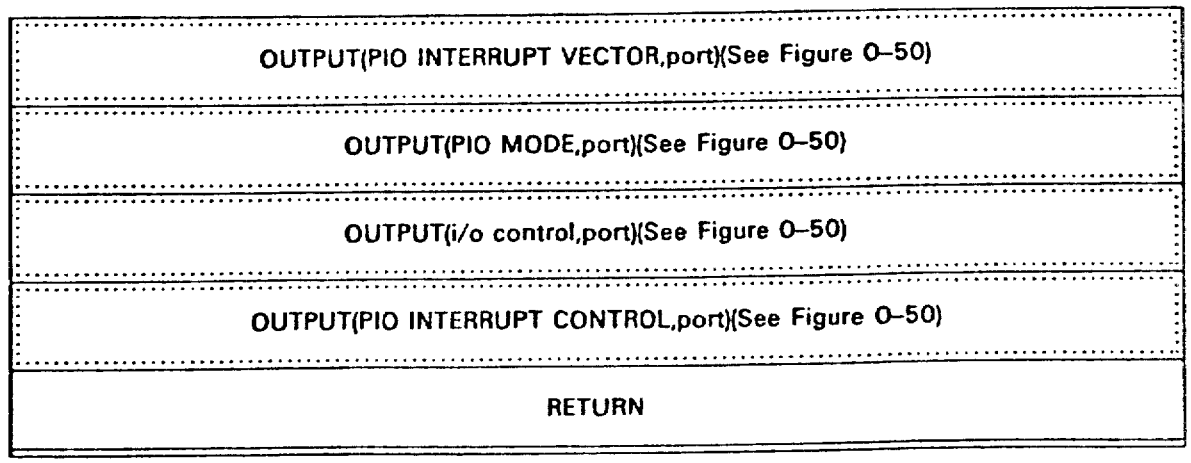
Figure O-38. Flowchart of INITIALIZE PIO(port,i/o control)

Figure C-39. Flowchart of INITIALIZE_SIO_RECEIVE
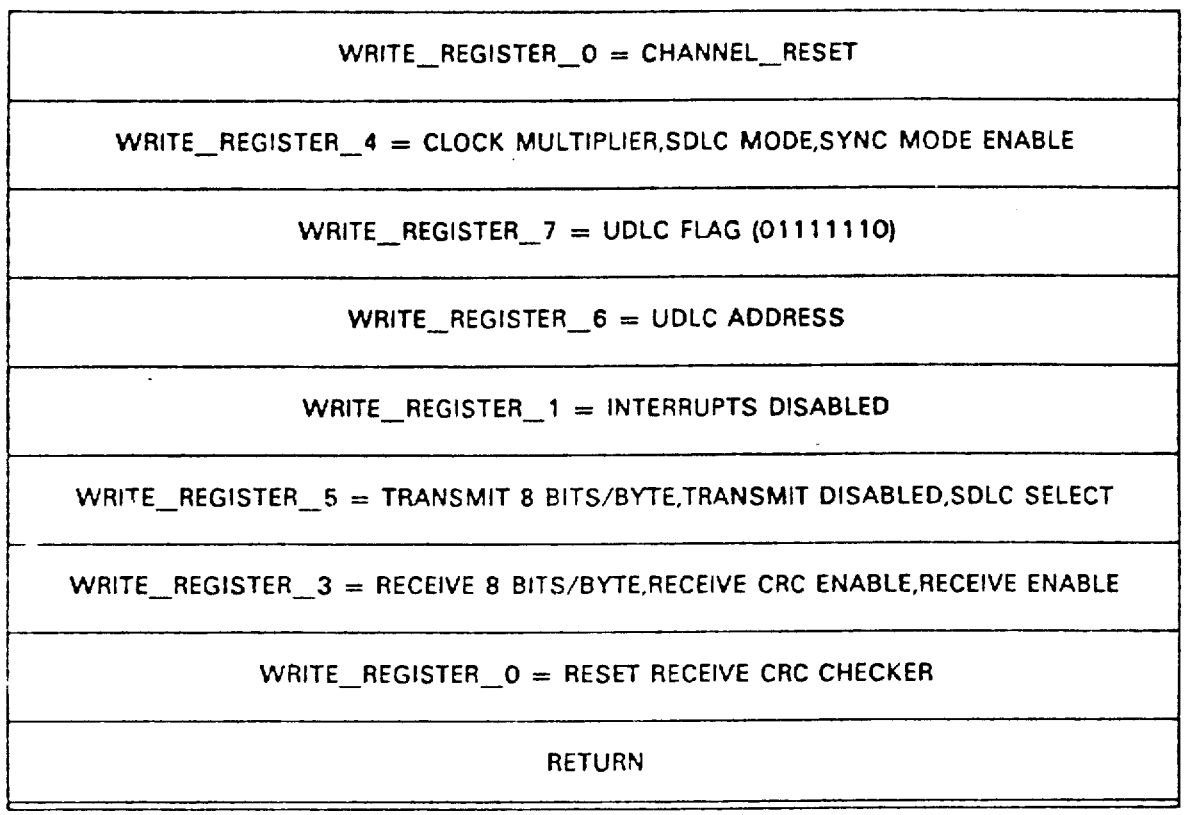

Figure O-40. Flowchart of INITIALIZE SIO TRANSMIT
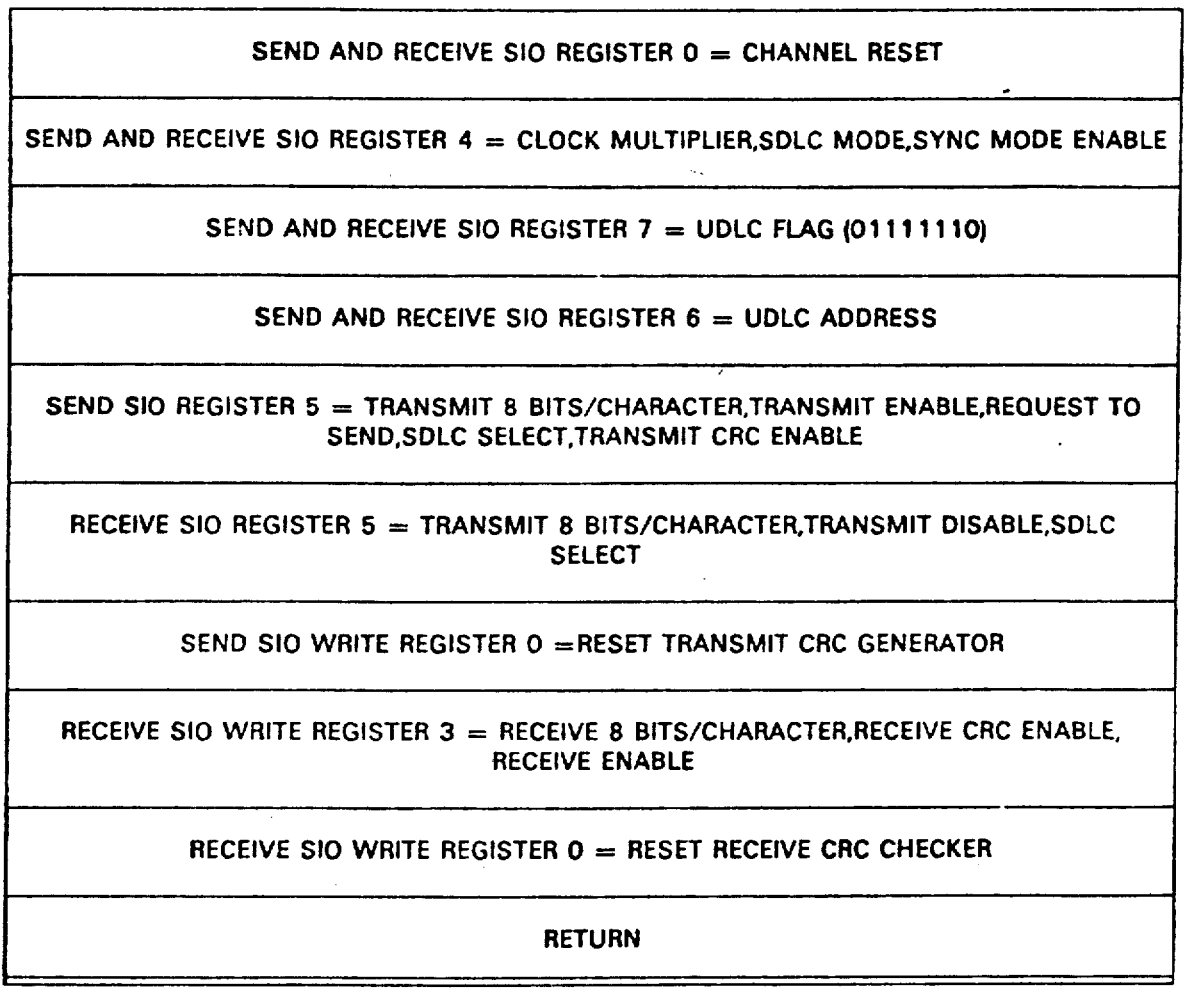
Figure O-41. Flowchart of INPUT
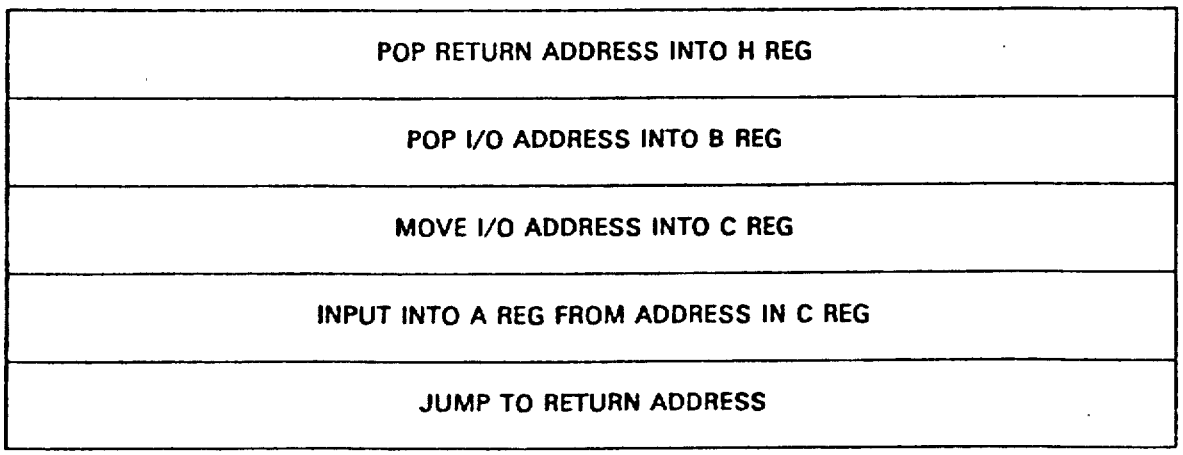

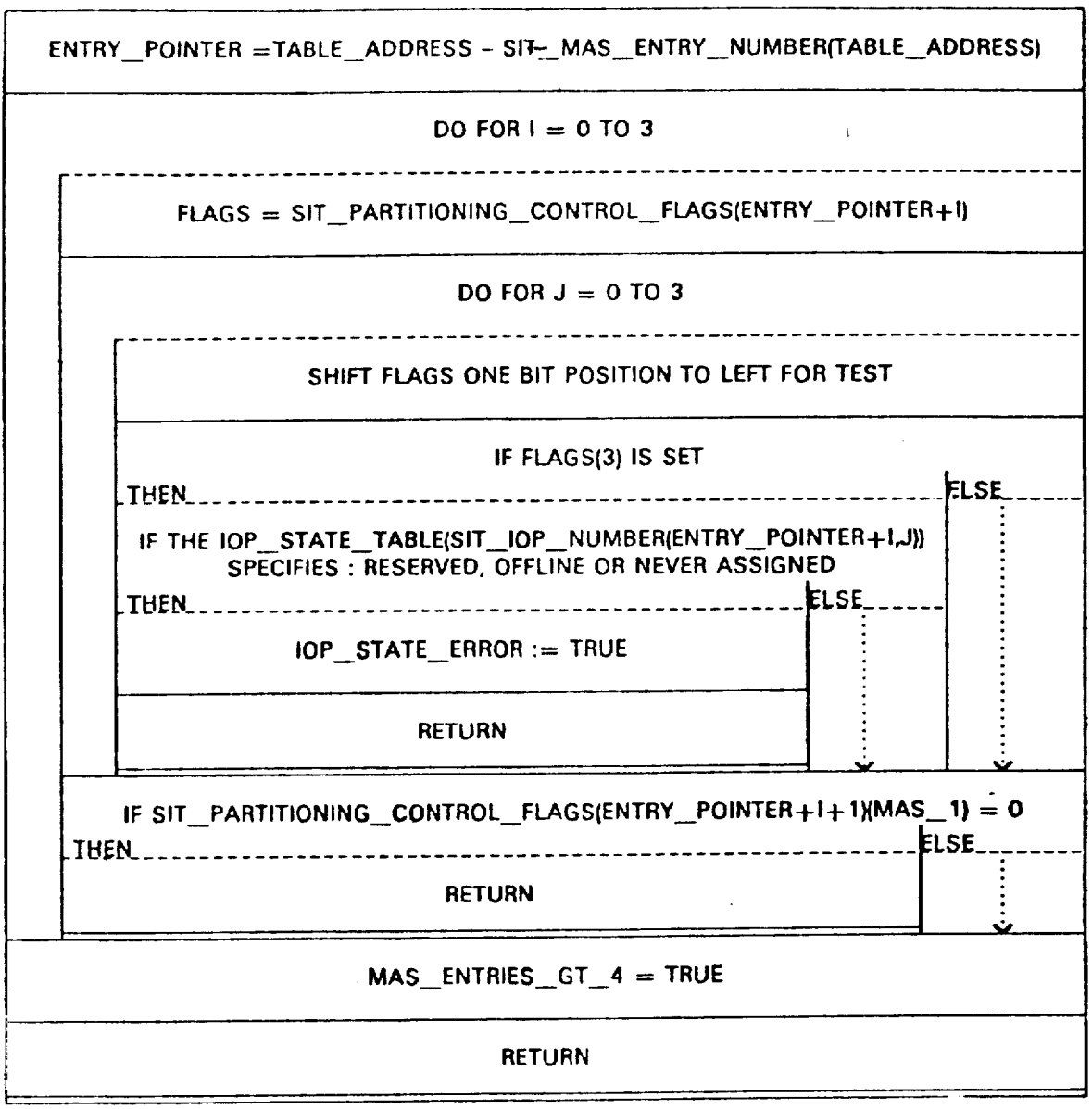
Figure O-42. Flowchart of IOP_APPLICATION_CHECK

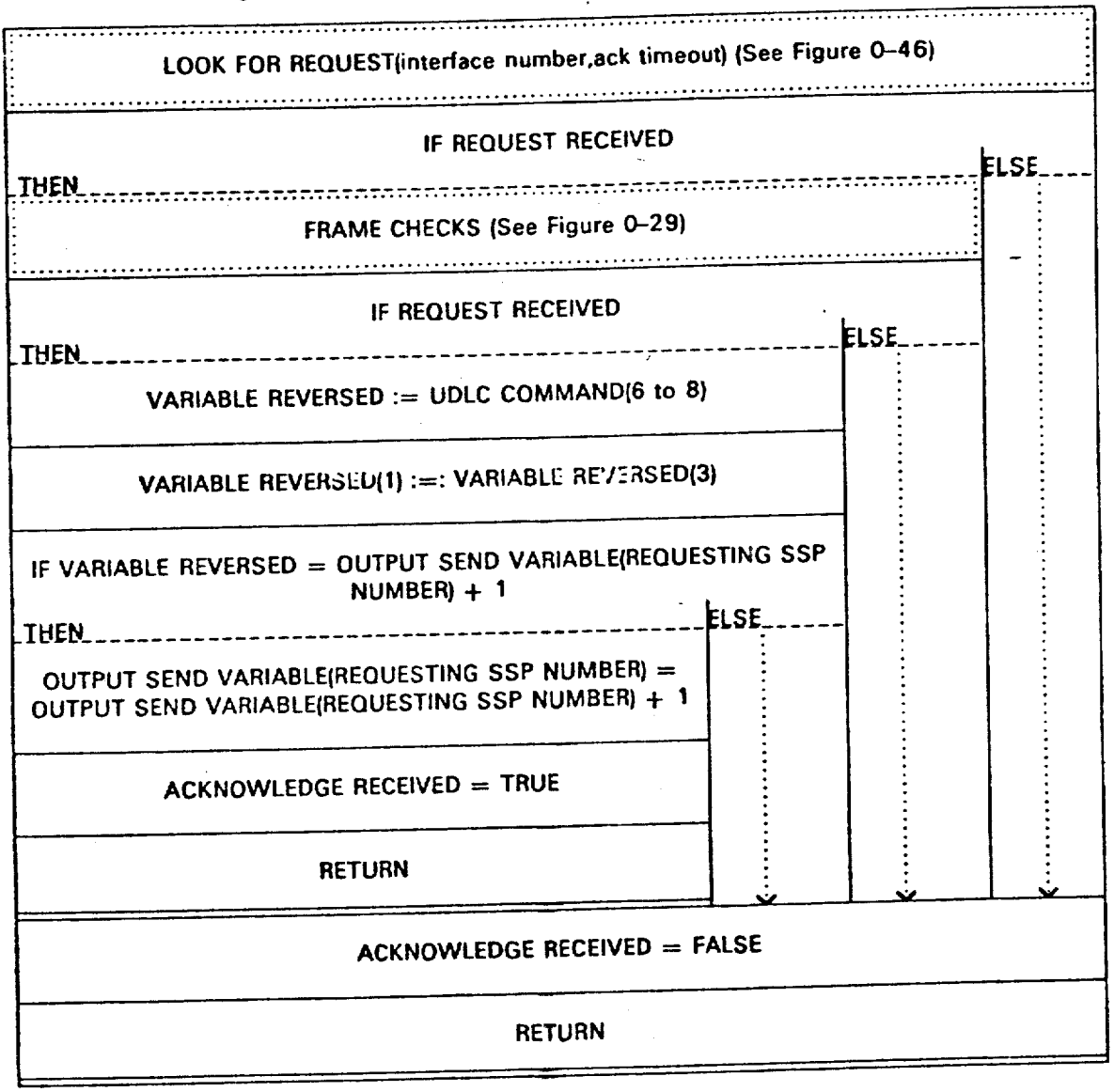
Figure O-43. Flowchart of LOOK FOR ACKNOWLEDGE(interface number)

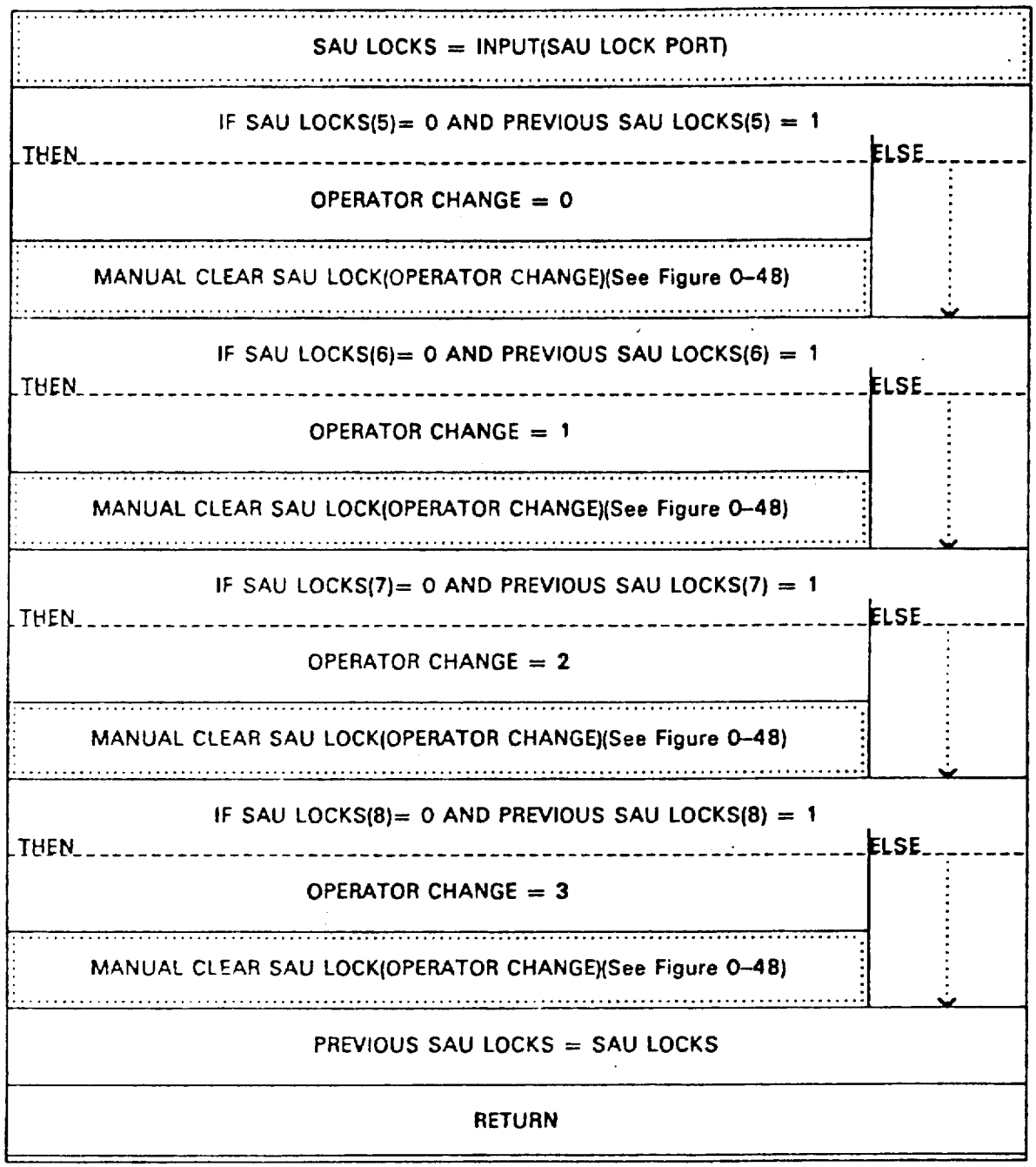
Figure O-44. Flowchart of LOOK FOR OPERATOR CONTROL CHANGES

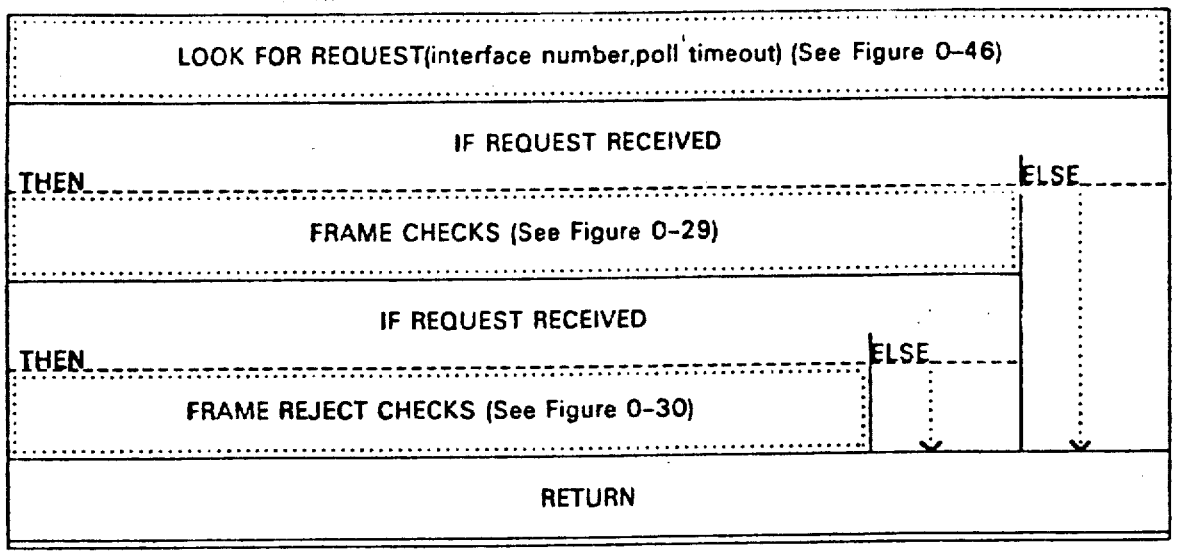
Figure O-45. Flowchart of LOOK FOR POLL(interface number)
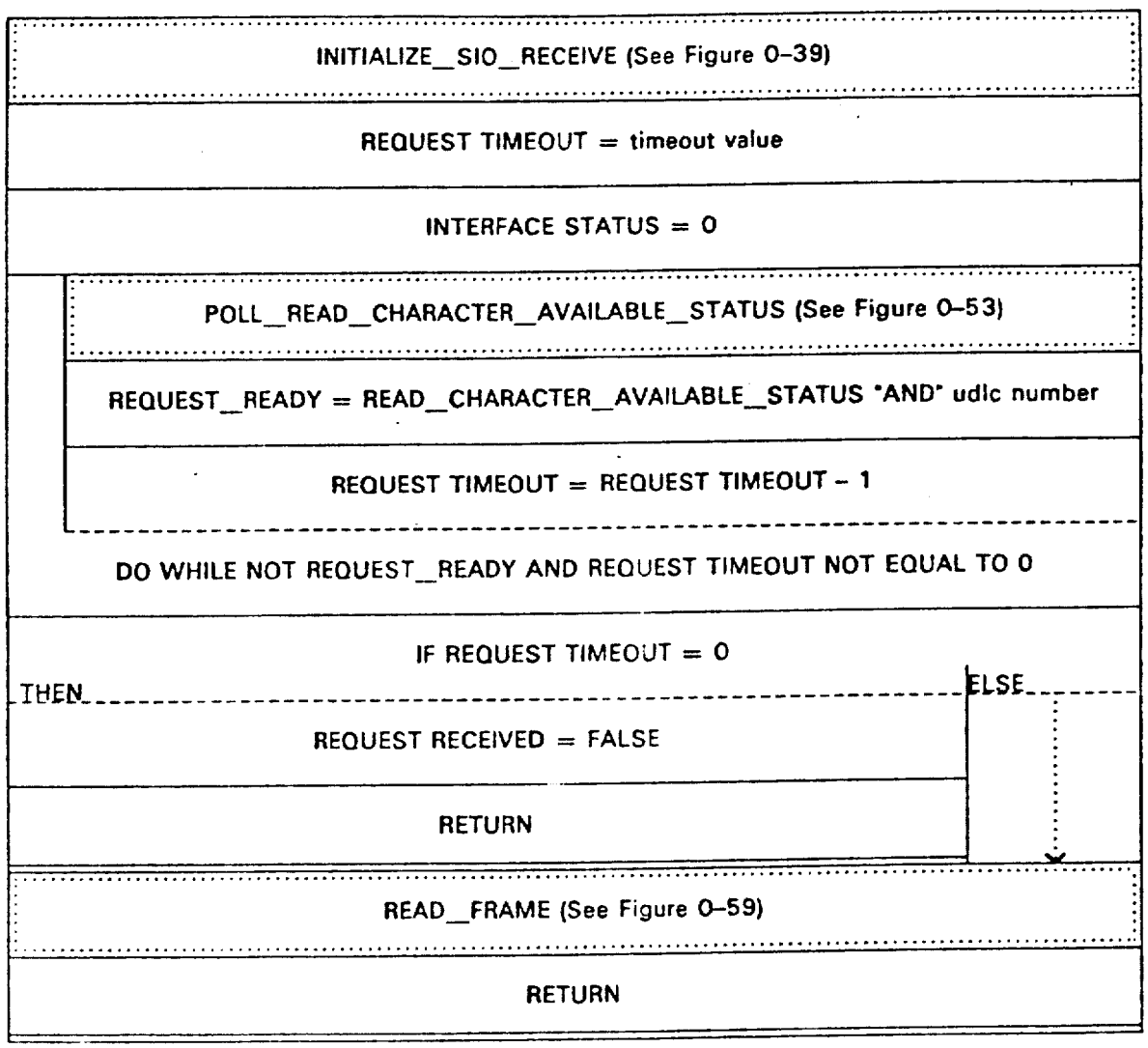
Figure O-46. Flowchart of LOOK_FOR_REQUEST(udlc number, timout value)

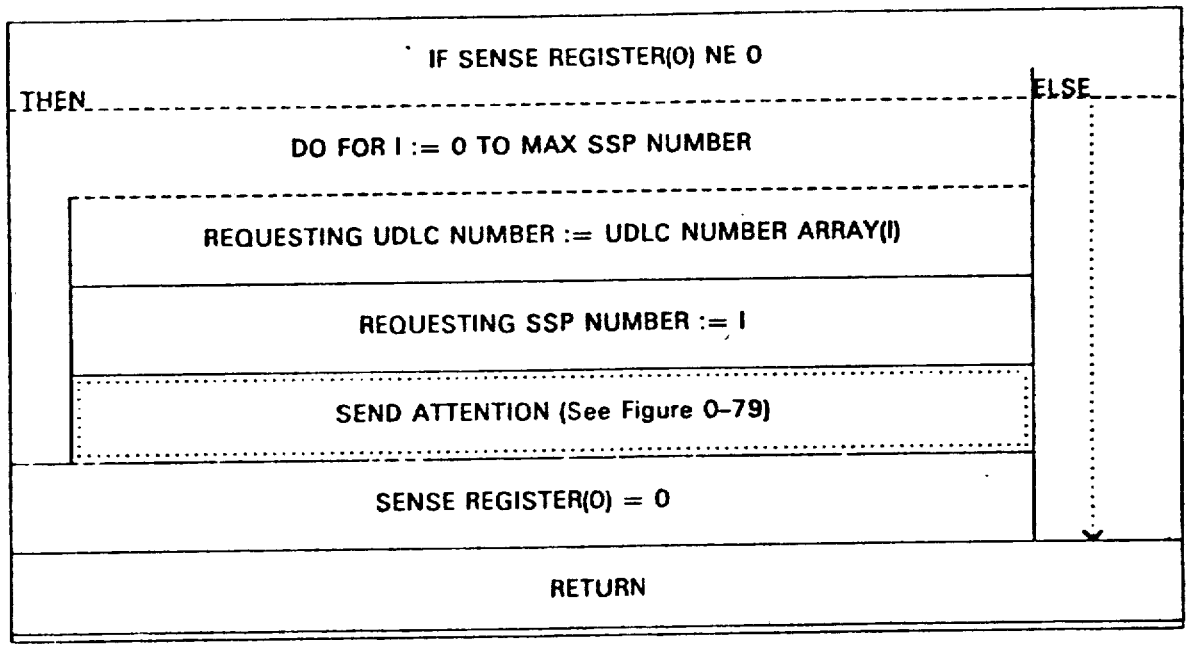
Figure O-47. Flowchart of LOOK FOR SENSE PENDING
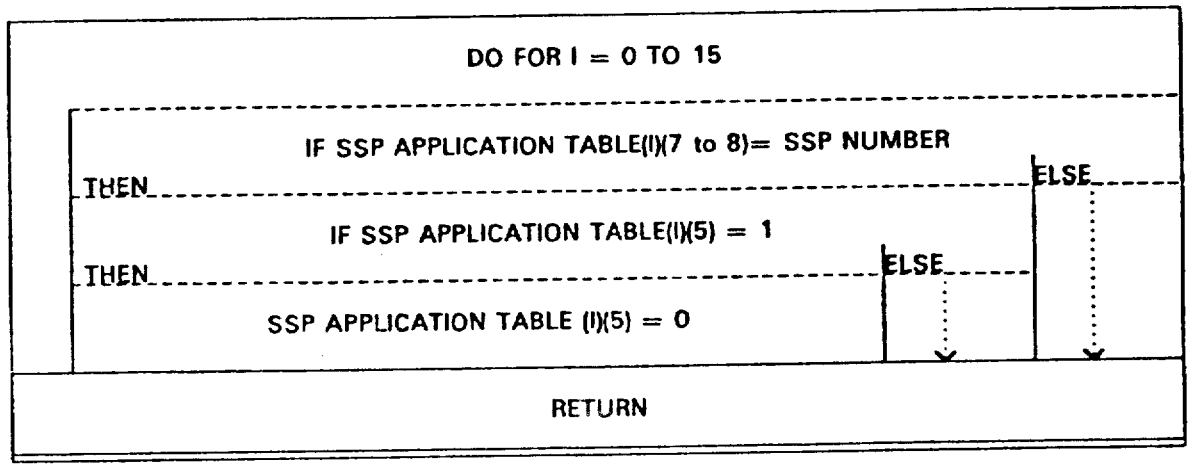
Figure O-48. Flowchart of MANUAL CLEAR SAU LOCKS(SSP NUMBER)

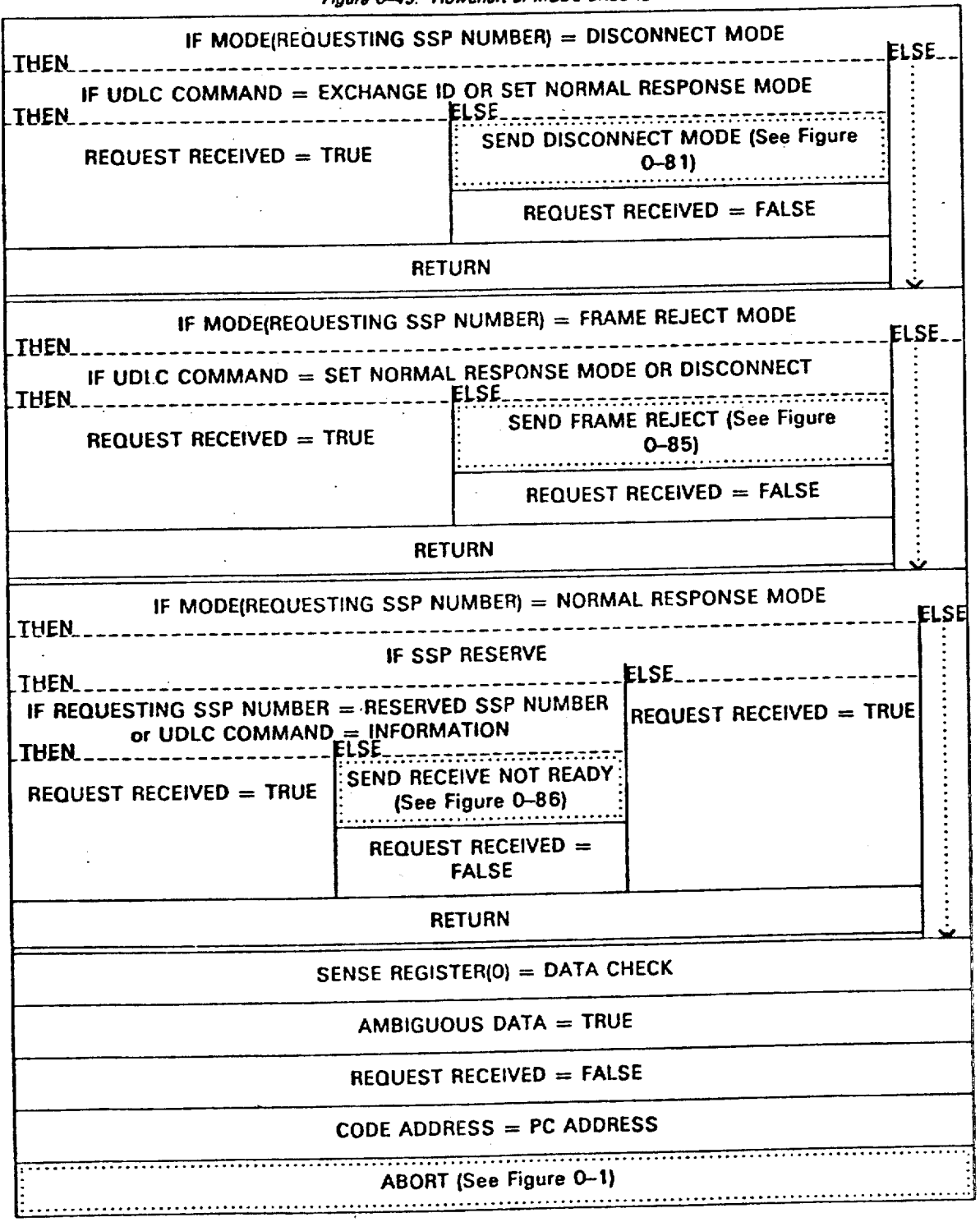
Figure O-49. Flowchart of MODE CHECKS

Figure O-50. Flowchart of OUTPUT(data,port)
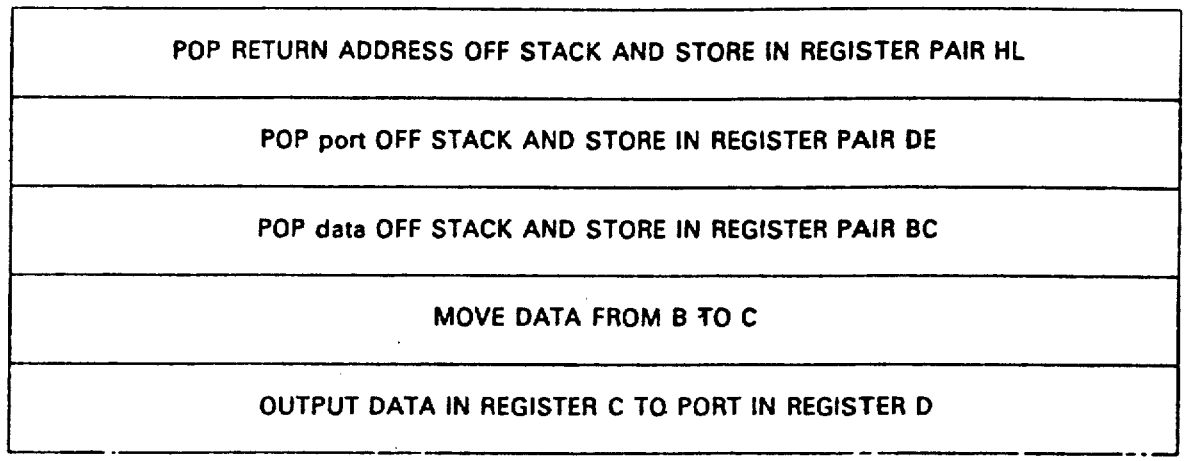
Figure O-51. Flowchart of OUTPUT_AND_VERIFY(data,port)
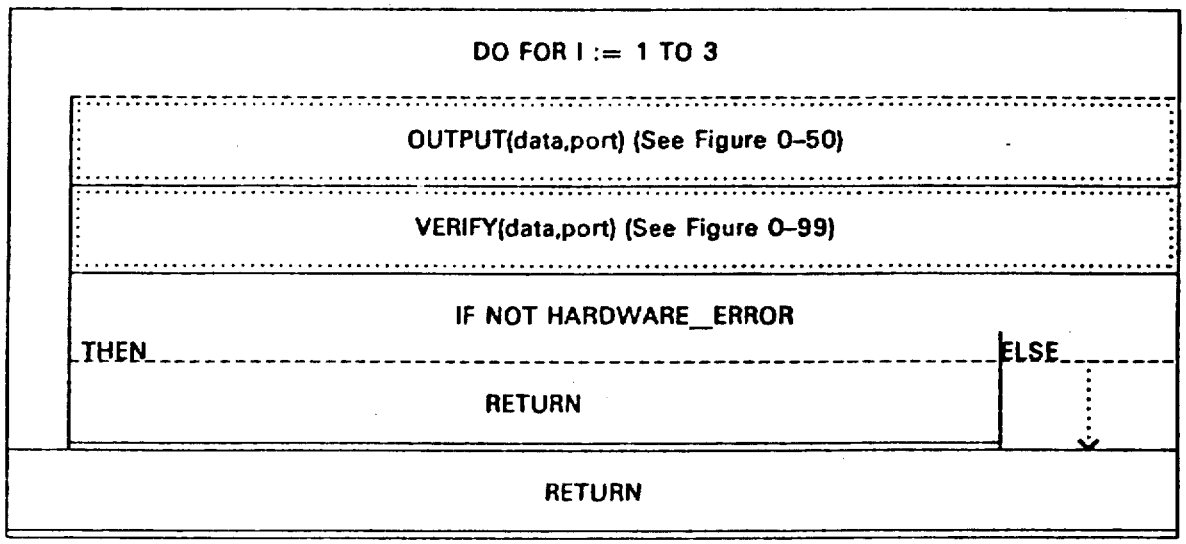
Figure O-52. Flowchart of PC_ADDRESS
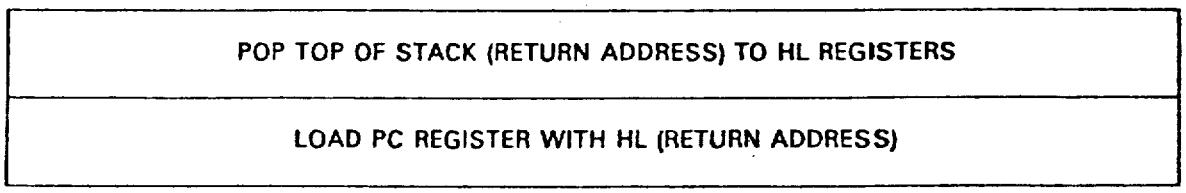

Figure O-53. Flowchart of POLL_READ_CHARACTER_AVAILABLE_STATUS

| |
|---|
| READ_CHARACTER_AVAILALE_STATUS = INPUT(SIO_0A_STATUS) |
| MASK FOR READ_CHARACTER_AVALABLE_STATUS |
| ROTATE LEFT 1 BIT POSITION |
| SAVE_REGISTER = READ_CHARACTER_AVAILABLE_STATUS |
| READ_CHARACTER_AVAILALE_STATUS = INPUT(SIO_1A_STATUS) |
| MASK FOR READ_CHARACTER_AVALABLE_STATUS |
| READ_CHARACTER_AVAILABLE_STATUS = READ_CHARACTER_AVAILABLE_STATUS OR SAVE |
| ROTATE LEFT 1 BIT POSITION |
| SAVE_REGISTER = READ_CHARACTER_AVAILABLE_STATUS |
| READ_CHARACTER_AVAILALE_STATUS = INPUT(SIO_2A_STATUS) |
| MASK FOR READ_CHARACTER_AVALABLE_STATUS |
| READ_CHARACTER_AVAILABLE_STATUS = READ_CHARACTER_AVAILABLE_STATUS OR SAVE |
| ROTATE LEFT 1 BIT POSITION |
| SAVE_REGISTER = READ_CHARACTER_AVAILABLE_STATUS |
| READ_CHARACTER_AVAILALE_STATUS = INPUT(SIO_3A_STATUS) |
| MASK FOR READ_CHARACTER_AVALABLE_STATUS |
| READ_CHARACTER_AVAILABLE_STATUS = READ_CHARACTER_AVAILABLE_STATUS OR SAVE |
| RETURN |

Figure O-54. Flowchart of PRESENTATION CHECKS
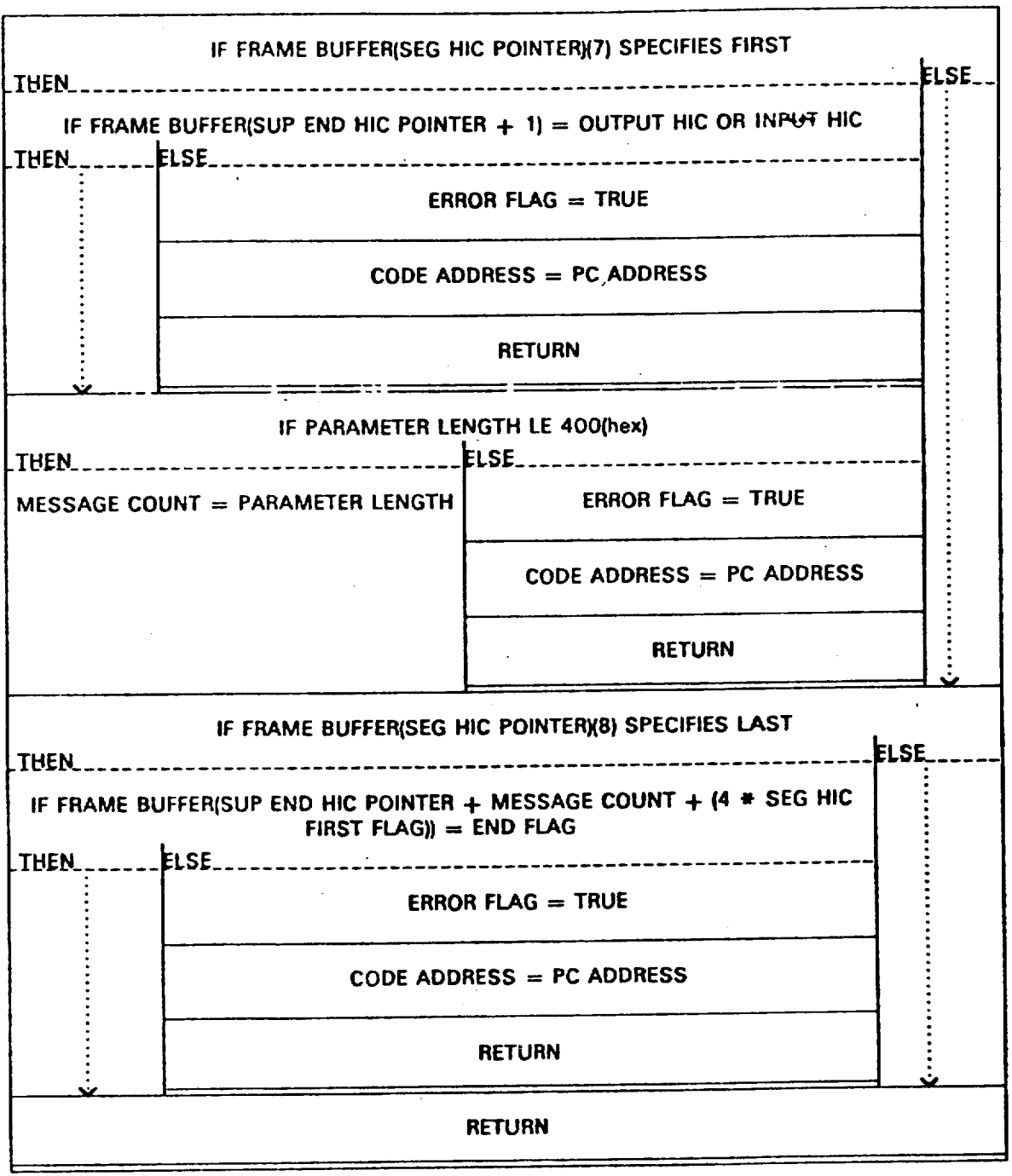

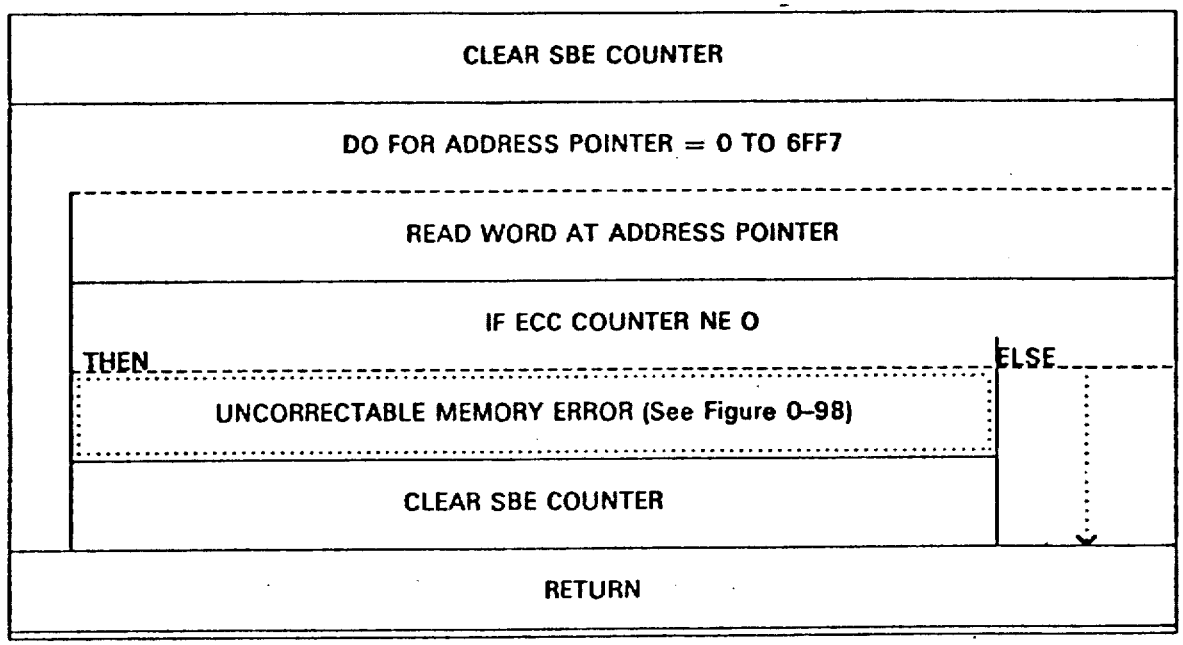
Figure 0-55. Flowchart of PROM TEST

Figure O-56. Flowchart of RAM TEST
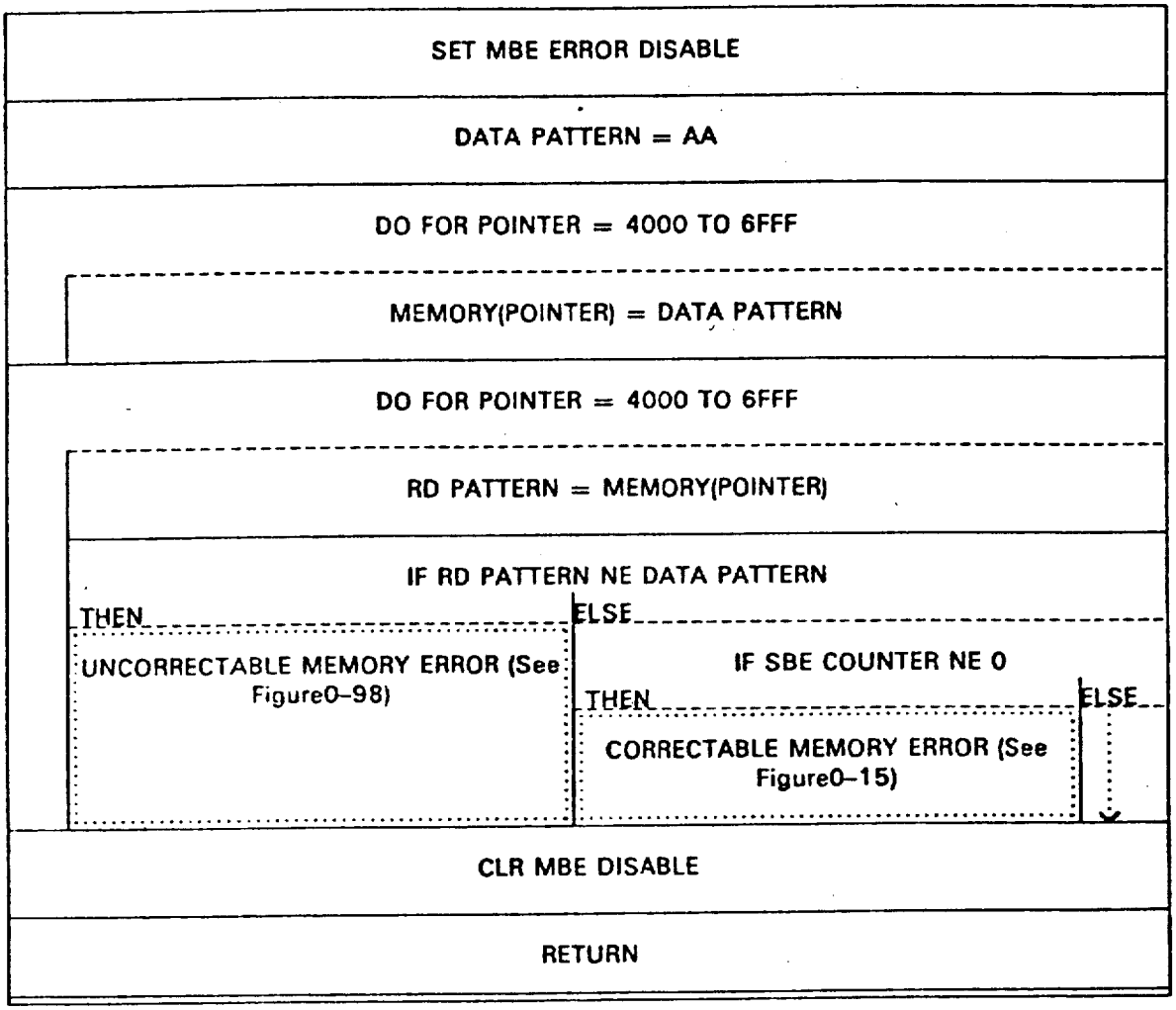

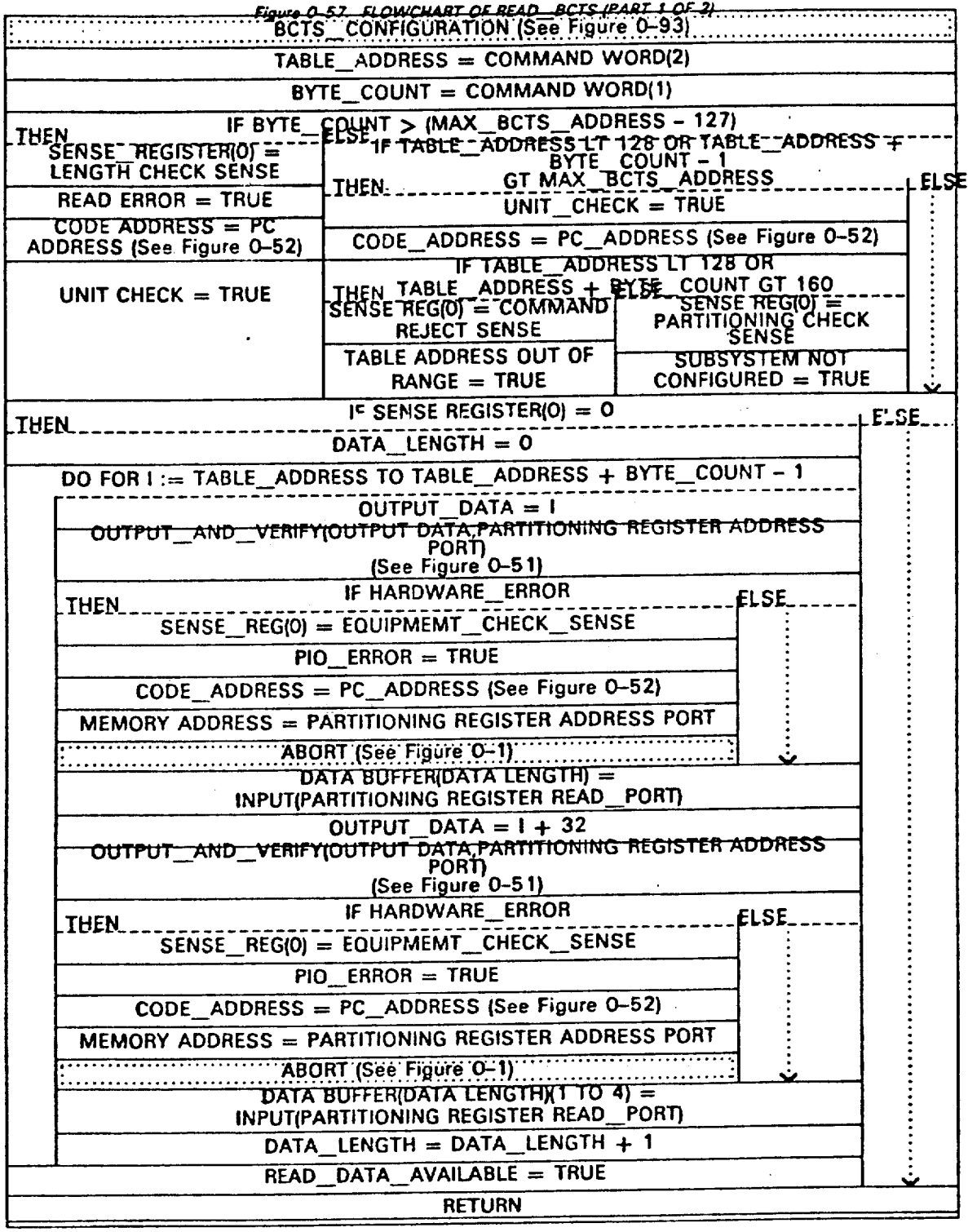
Figure 0-57. FLOWCHART OF READ_BCTS (PART 1 OF 2)

Figure O-58. Flowchart of READ_CONTROL_STORE
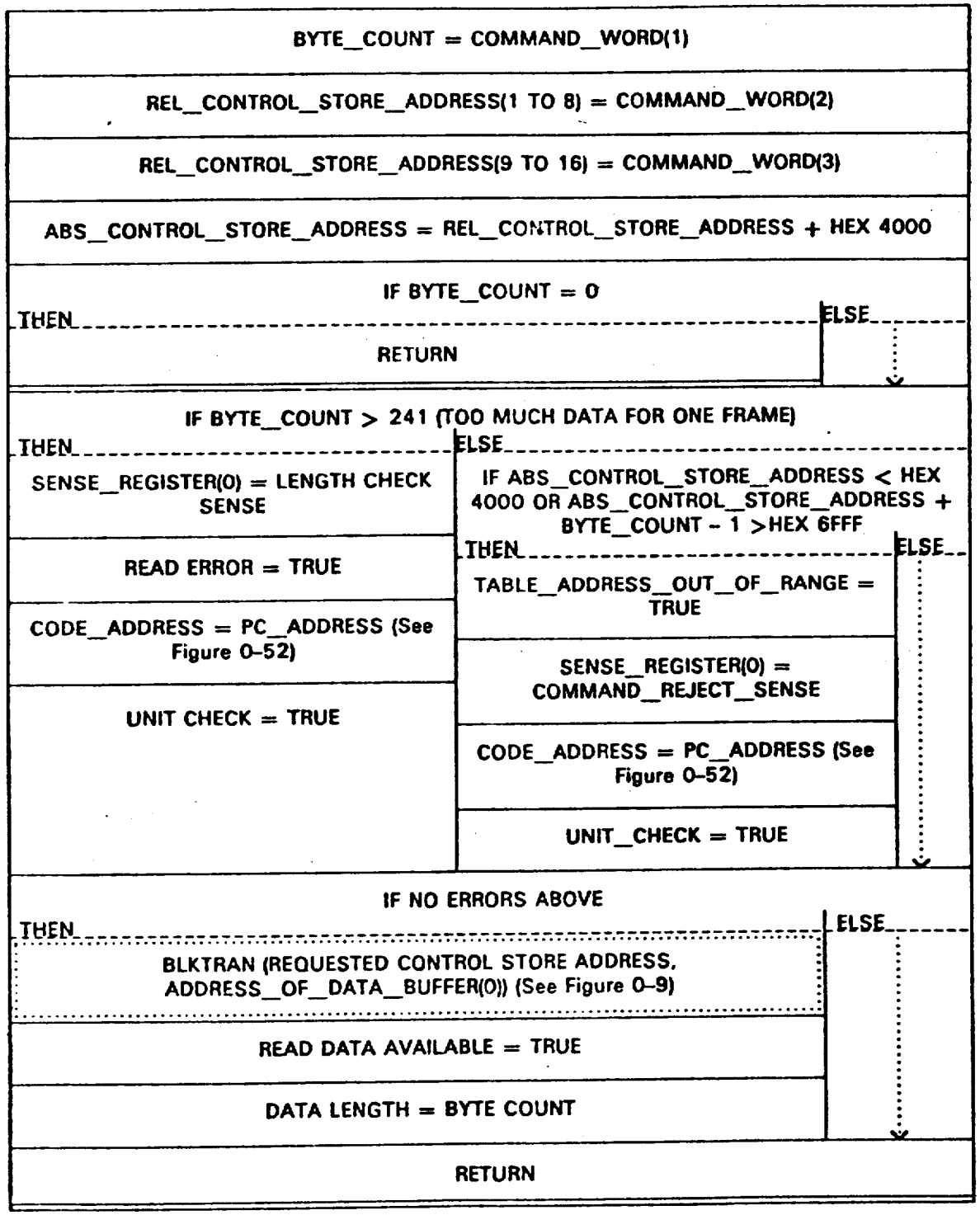

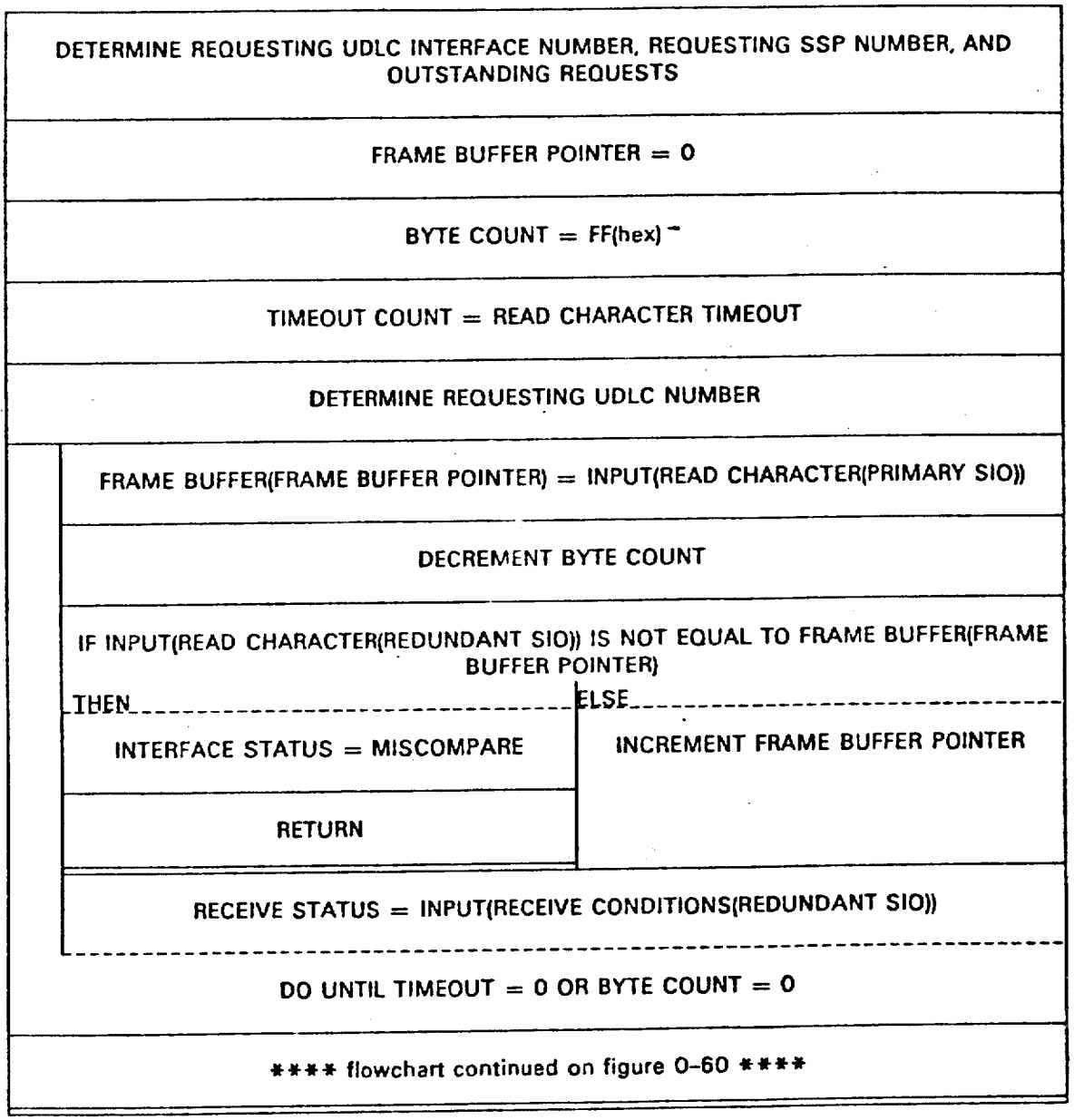
Figure O-59. Flowchart of READ_FRAME (part 1 of 2)

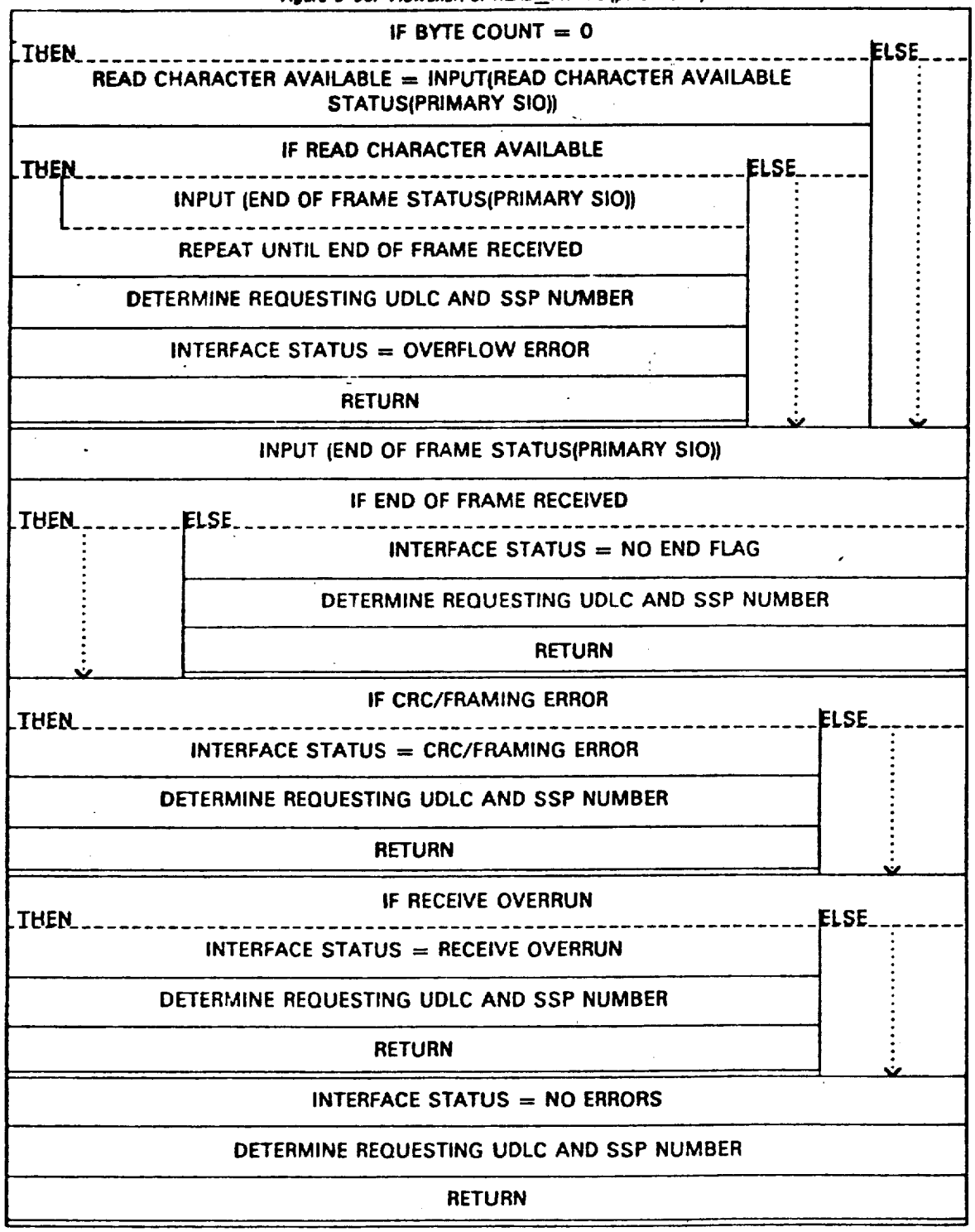
Figure O-60. Flowchart of READ_FRAME (part 2 of 2)

Figure O-61. Flowchart of READ_ID_WORD_O

| |
|---|
| DATA_BUFFER(0) = TYPE_NUMBER(1)(MSB) |
| DATA_BUFFER(1) = TYPE_NUMBER(2)(LSB) |
| HARDWARE_READ_SELECTOR = INPUT(PATCH_WORD_PORT(3))(S/N OF TYPE NUMBER) |
| DATA_BUFFER(2)(1 TO 4) = TYPE_NUMBER(3)(1 TO 4) LOR HARDWARE_READ_SELECTOR(1) |
| HARDWARE_READ_SELECTOR = INPUT(PATCH_WORD_PORT(2))(REVISION) |
| DATA_BUFFER(2)(5 TO 8) = HARDWARE_READ_SELECTOR(1 TO 4) |
| DATA_BUFFER(3)(1 TO 4) = HARDWARE_READ_SELECTOR(5 TO 8) |
| DATA_BUFFER(3) = DATA_BUFFER(3) LAND HEX F0 |
| DATA_BUFFER(4) = ZERO_BYTE |
| DATA_LENGTH = 5 |
| READ_DATA_AVAILABLE = TRUE |
| RETURN |

Figure O-62. Flowchart of READ_ID_WORD_1

| |
|---|
| HARDWARE_READ_SELECTOR =INPUT(PATCH_WORD_PORT(3)(FIRST BYTE OF SERIAL NUMBER) |
| DATA_BUFFER(0) = HARDWARE_READ_SELECTOR |
| HARDWARE_READ_SELECTOR =INPUT(PATCH_WORD_PORT(4)(2ND BYTE OF SERIAL NUMBER) |
| DATA_BUFFER(1) = HARDWARE_READ_SELECTOR |
| HARDWARE_READ_SELECTOR =INPUT(PATCH_WORD_PORT(5)(LAST 2 BITS OF S/N) |
| DATA_BUFFER(2)(1 TO 2) = HARDWARE_READ_SELECTOR(1 TO 2) |
| HARDWARE_READ_SELECTOR =INPUT(PATCH_WORD_PORT(1)(SPI, BCTS EXP BITS) |
| DATA_BUFFER(2)(3 TO 7) = HARDWARE_READ_SELECTOR(1 TO 5) |
| DATA_BUFFER(2) = DATA_BUFFER(2) LAND HEX DE |
| HARDWARE_READ_SELECTOR =INPUT(PATCH_WORD_PORT(5)(SYSTEM CONSOLE EXP BIT) |
| DATA_BUFFER(3)(1) = HARDWARE_READ_SELECTOR(3) |
| DATA_BUFFER(3) = DATA_BUFFER(3) LAND HEX 80 |
| DATA_BUFFER(4)(1 TO 2) = REQUESTING_SSP_NUMBER |
| DATA_BUFFER(4)(3 TO 4) = HARDWARE_READ_SELECTOR(4 TO 5) |
| DATA_BUFFER(4) = DATA_BUFFER(4) LAND HEX F0 |
| DATA_LENGTH = 5 |
| READ_DATA_AVAILABLE = TRUE |
| RETURN |

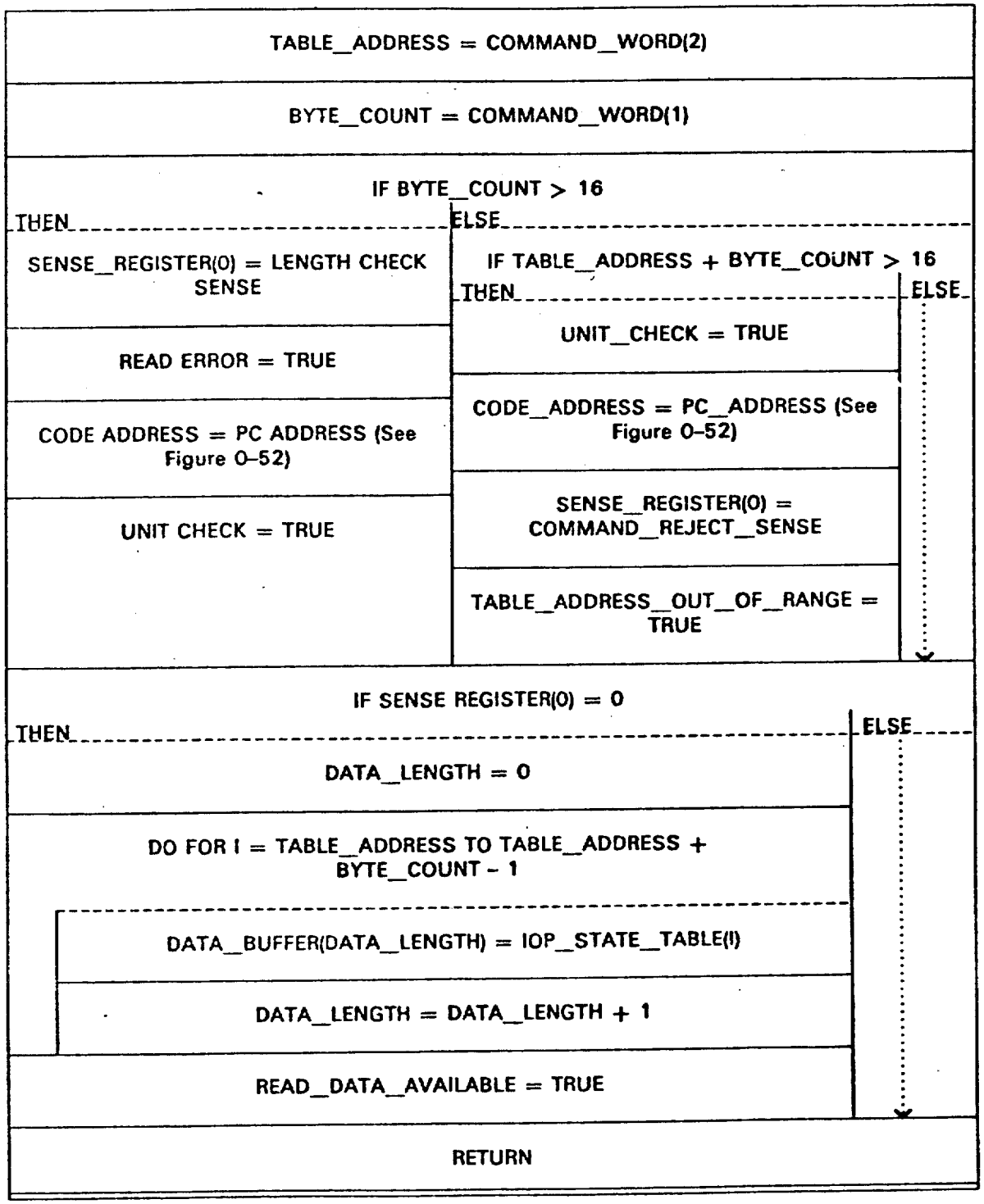
Figure O-63. Flowchart of READ_IOP_STATE

Figure O-64. Flowchart of READ SSP HISTORY
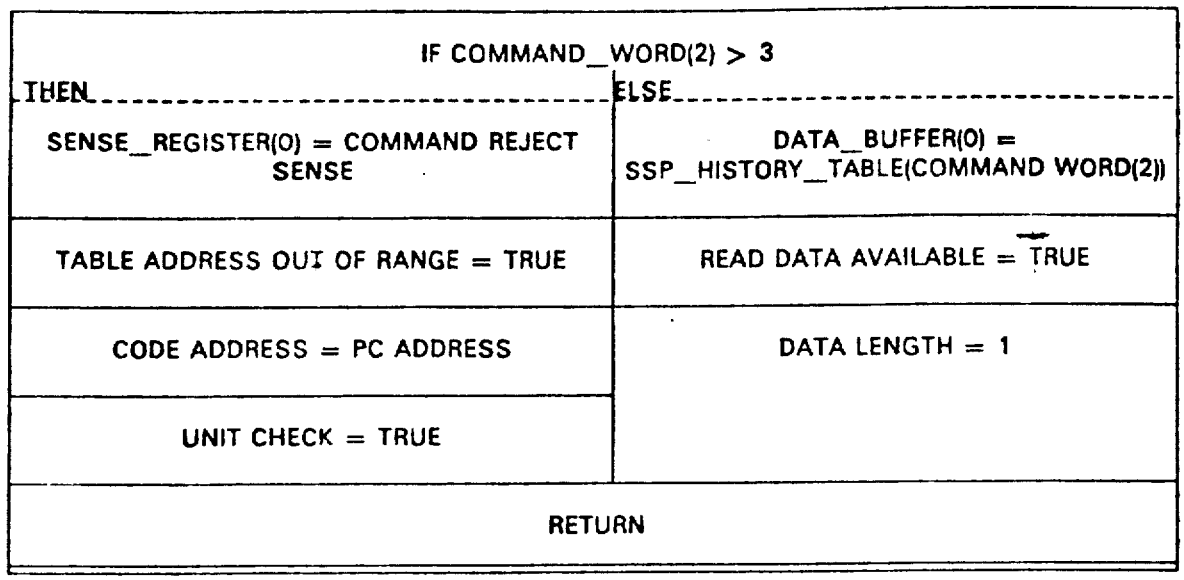
| IF COMMAND_WORD(2) > 3 | |
|---|---|
| THEN | ELSE |
| SENSE_REGISTER(0) = COMMAND REJECT SENSE | DATA_BUFFER(0) = SSP_HISTORY_TABLE(COMMAND WORD(2)) |
| TABLE ADDRESS OUT OF RANGE = TRUE | READ DATA AVAILABLE = TRUE |
| CODE ADDRESS = PC ADDRESS | DATA LENGTH = 1 |
| UNIT CHECK = TRUE | |
| RETURN | |

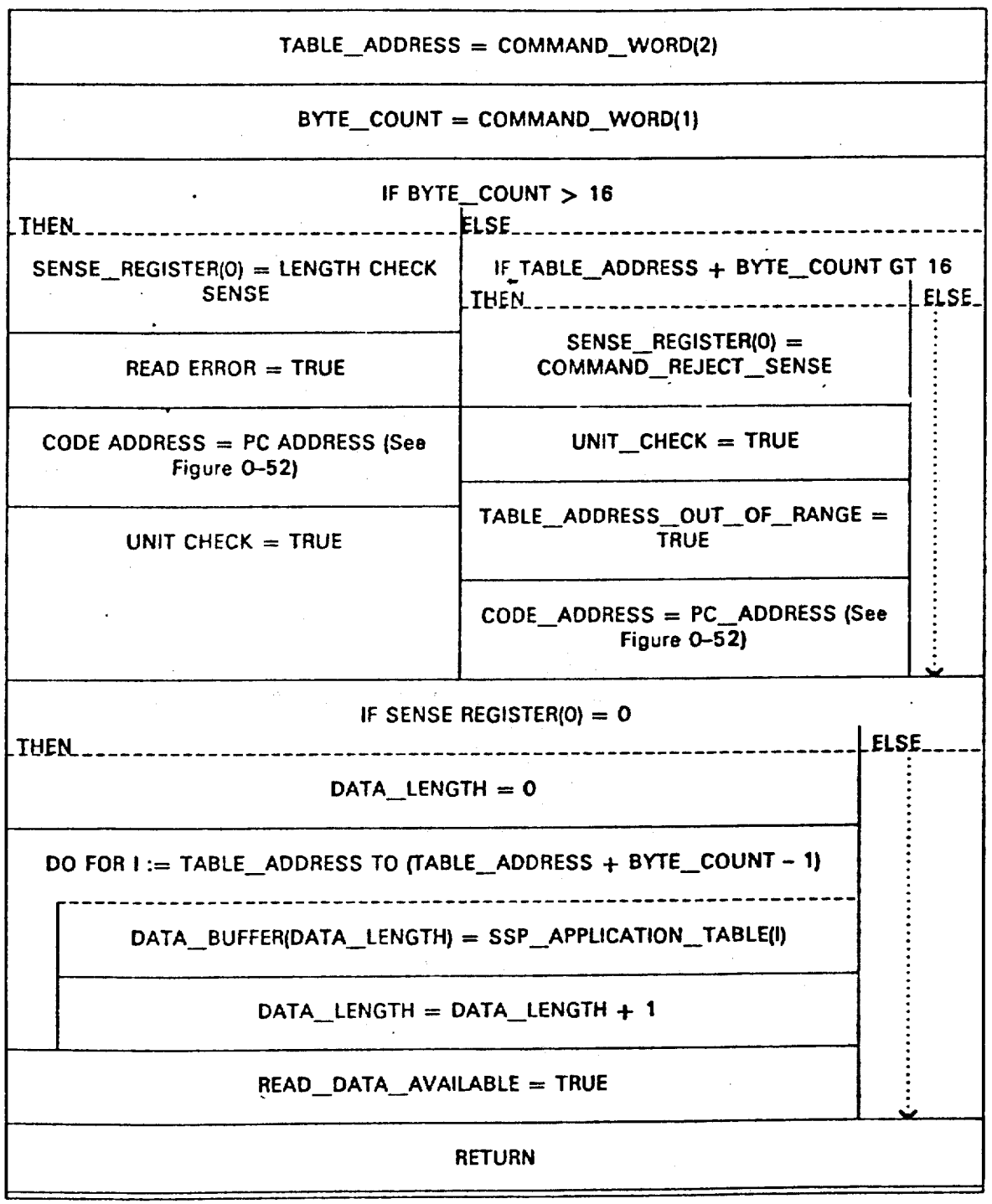
Figure O-65. Flowchart of READ SSP NUMBER

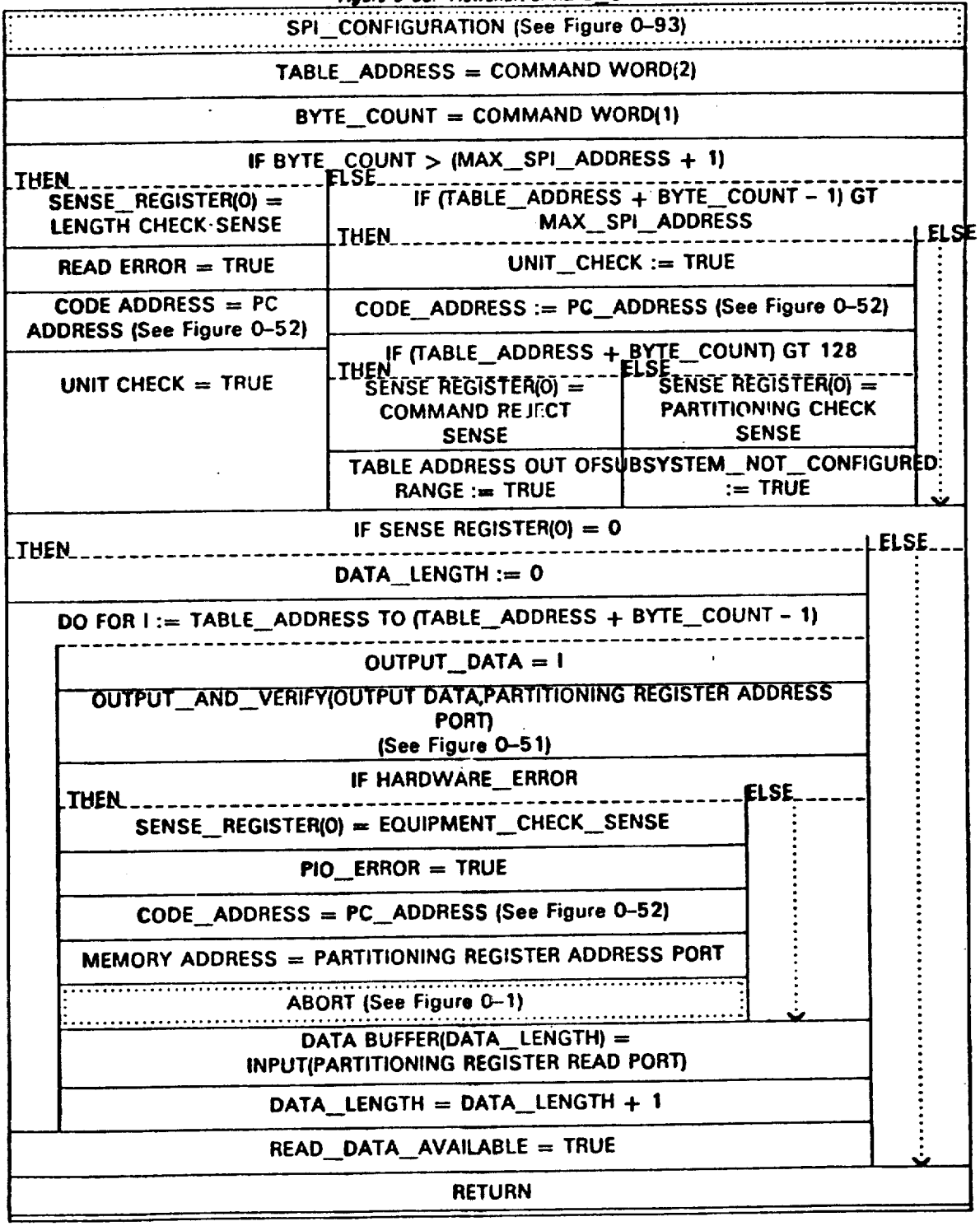
Figure O-66. Flowchart of READ_SPI

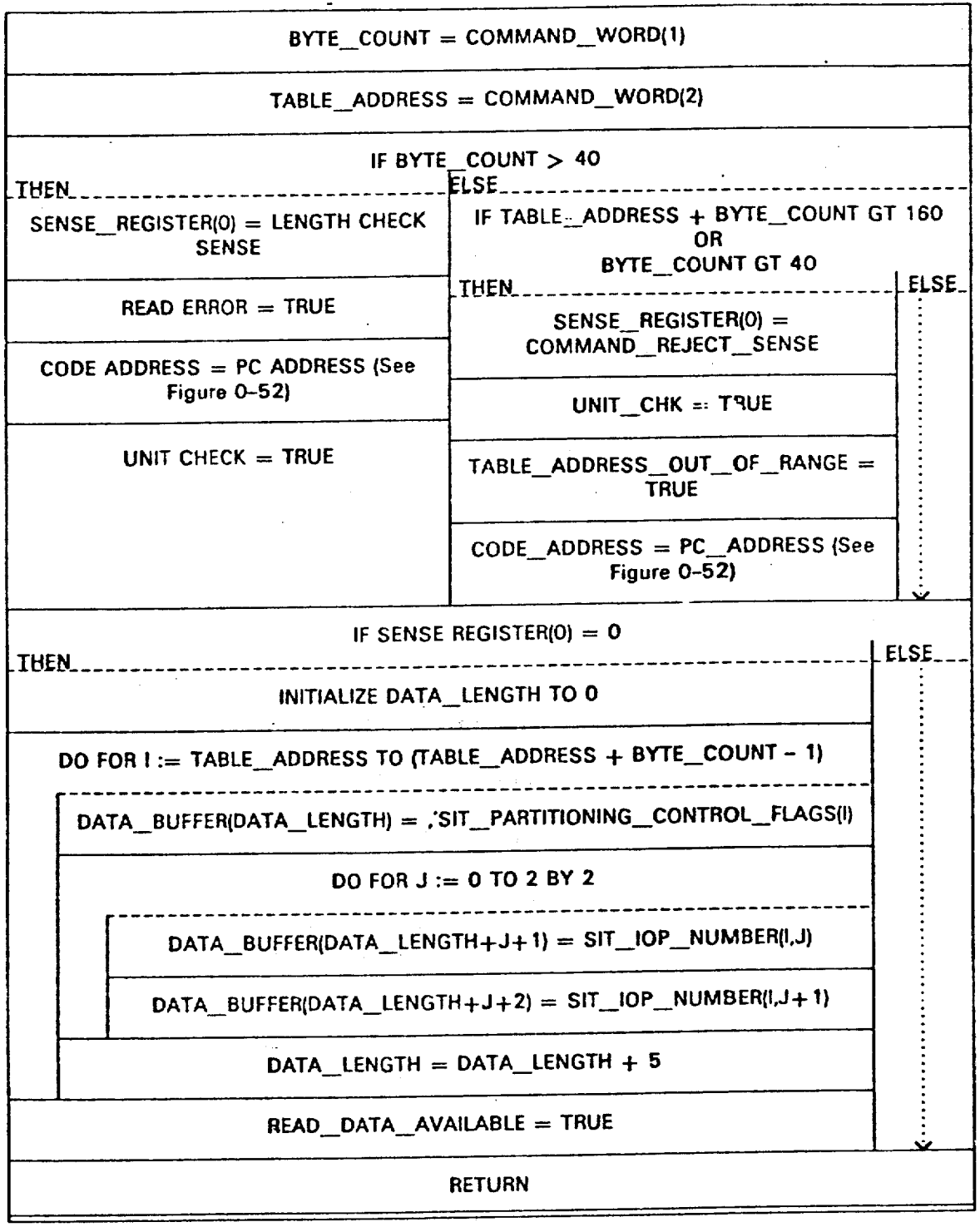
Figure O-67. Flowchart of READ SUBSYSTEM INTERFACE TABLE

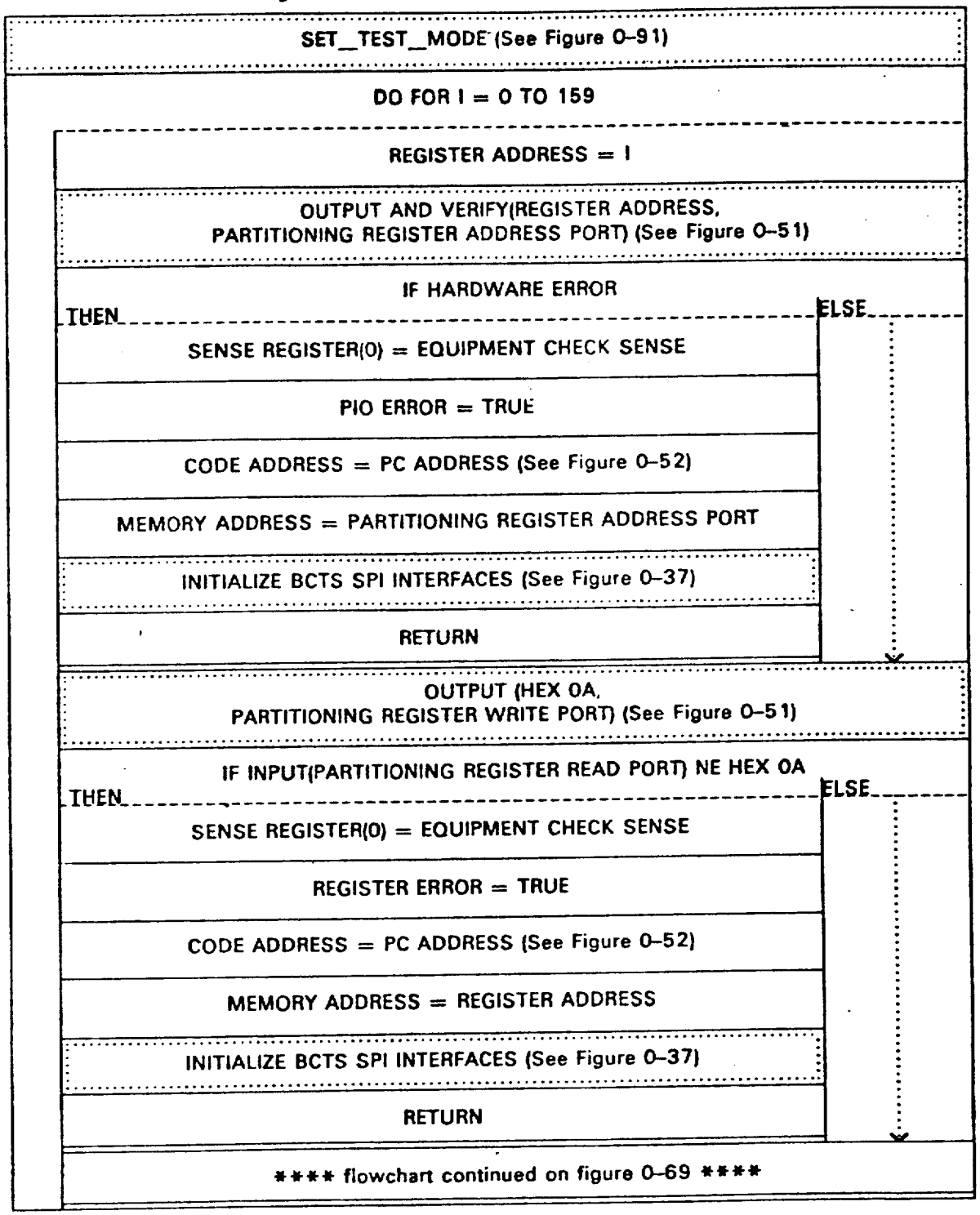
Figure 0-68. Flowchart of REGISTER TEST (part 1 of 2)

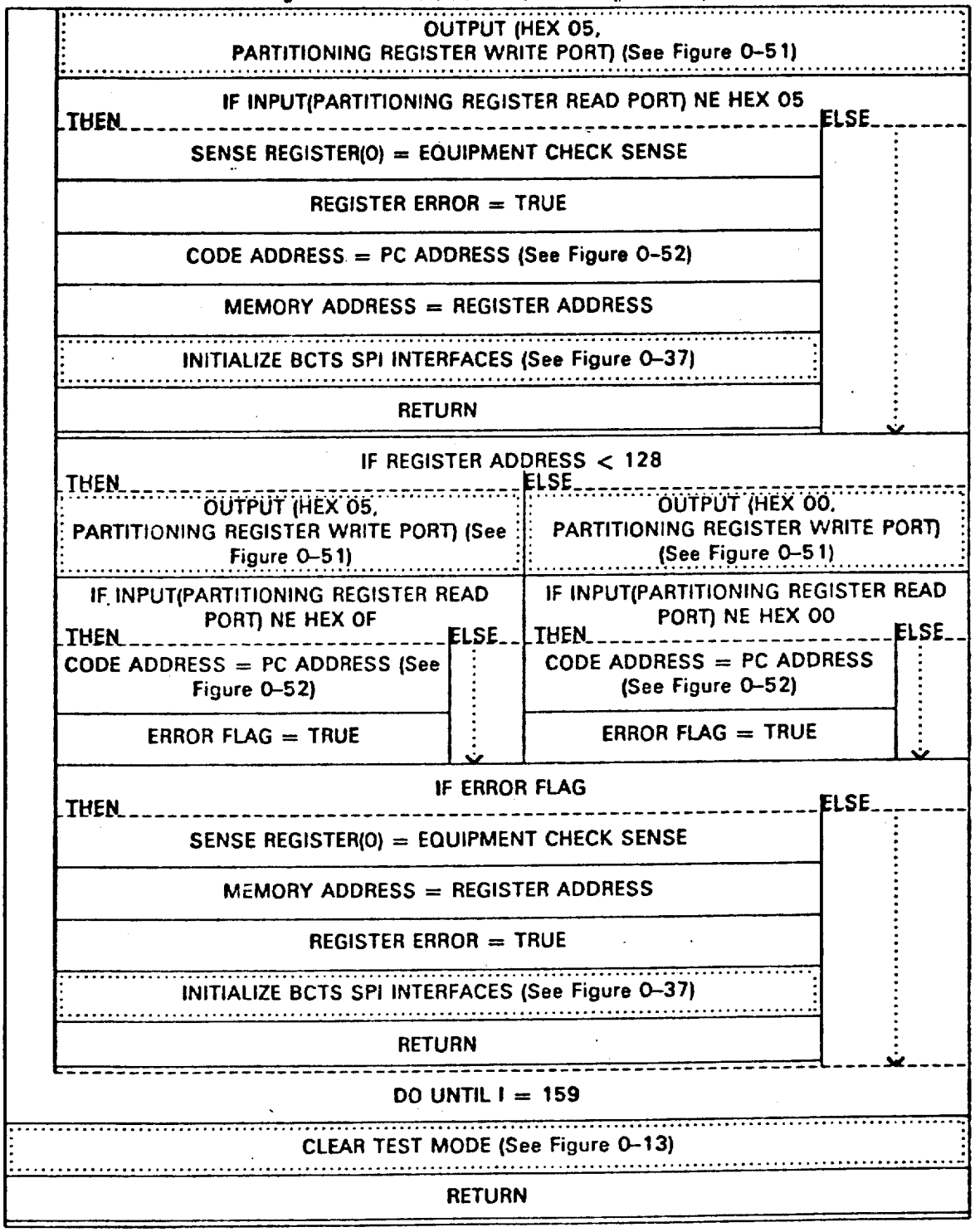
Figure O-69. Flowchart of REGISTER TEST (part 2 of 2)

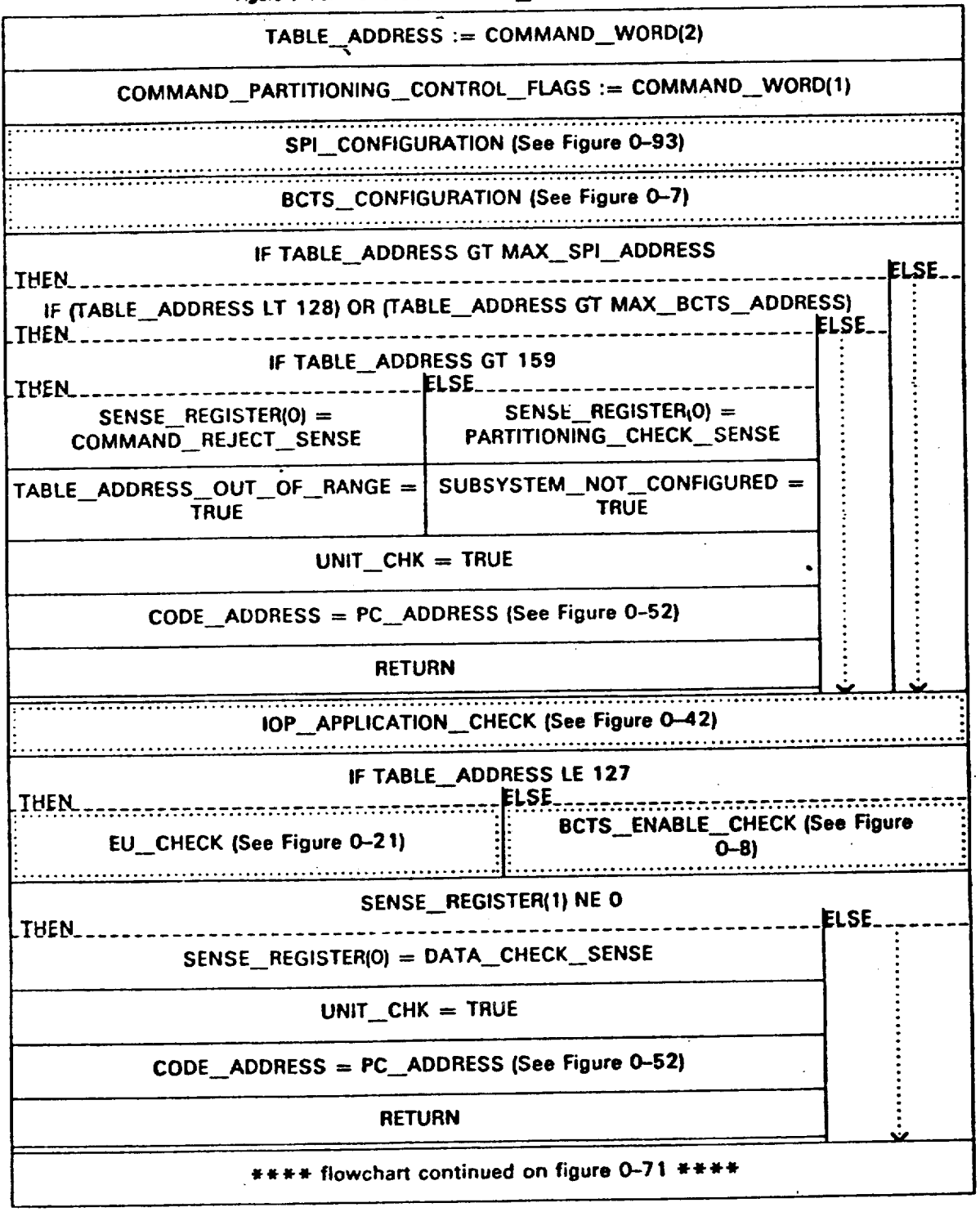
Figure O-70. Flowchart of REMOVE_SUBSYSTEM (part 1 of 2)

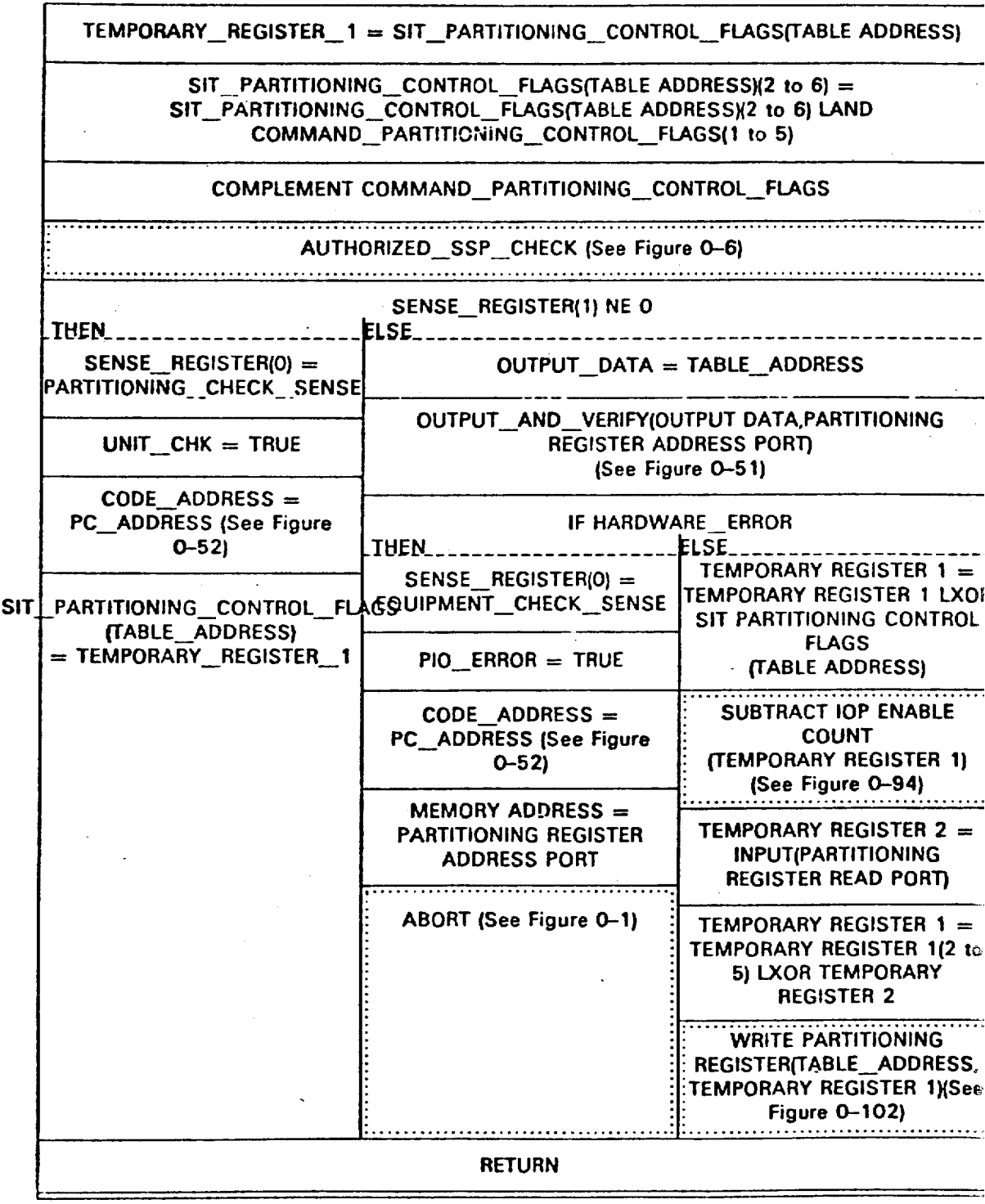
Figure O-71. Flowchart of REMOVE_SUBSYSTEM (part 2 of 2)

Figure O-72. Flowchart of SAU HARDWARE INITIALIZATION AND TEST
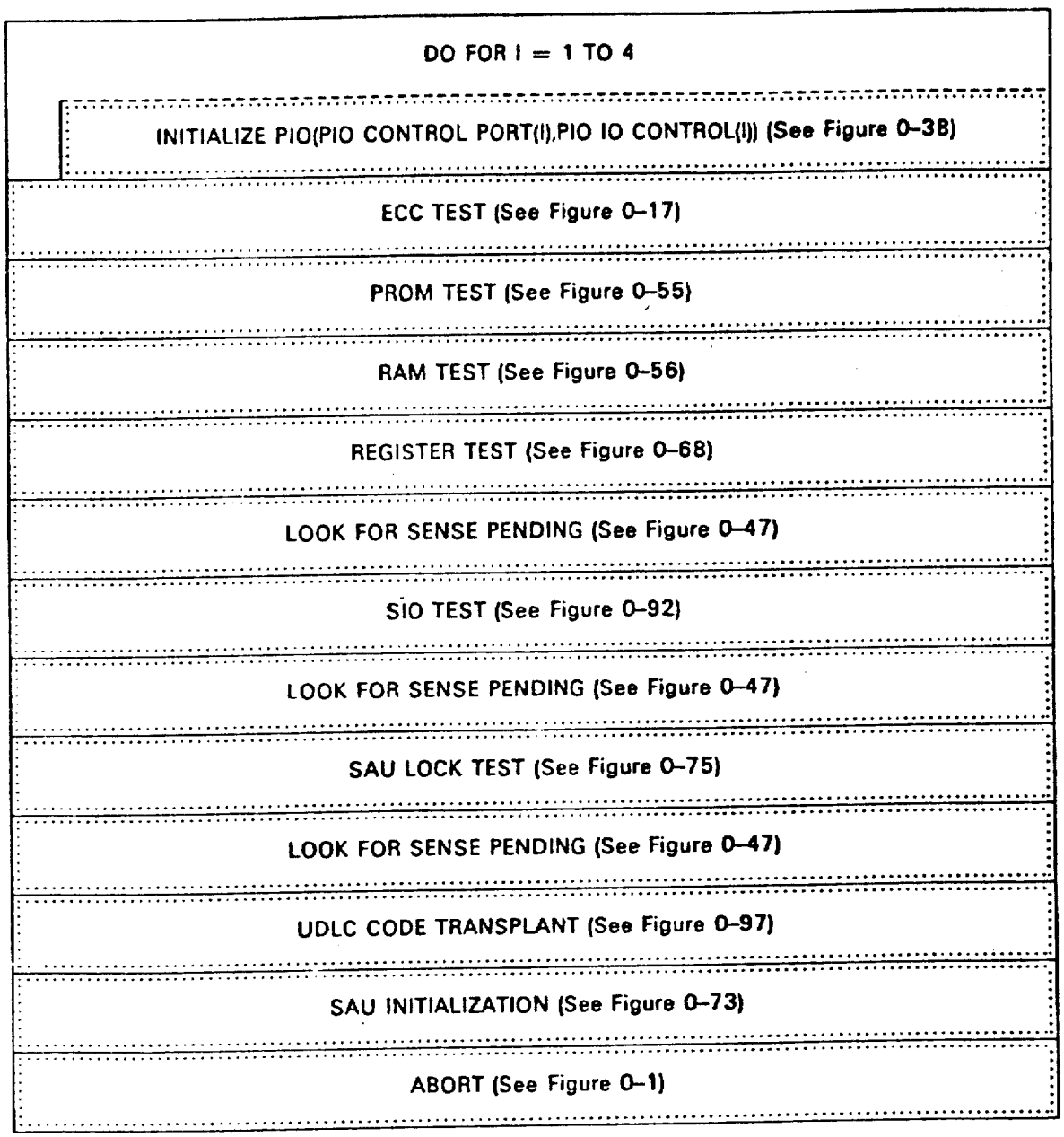

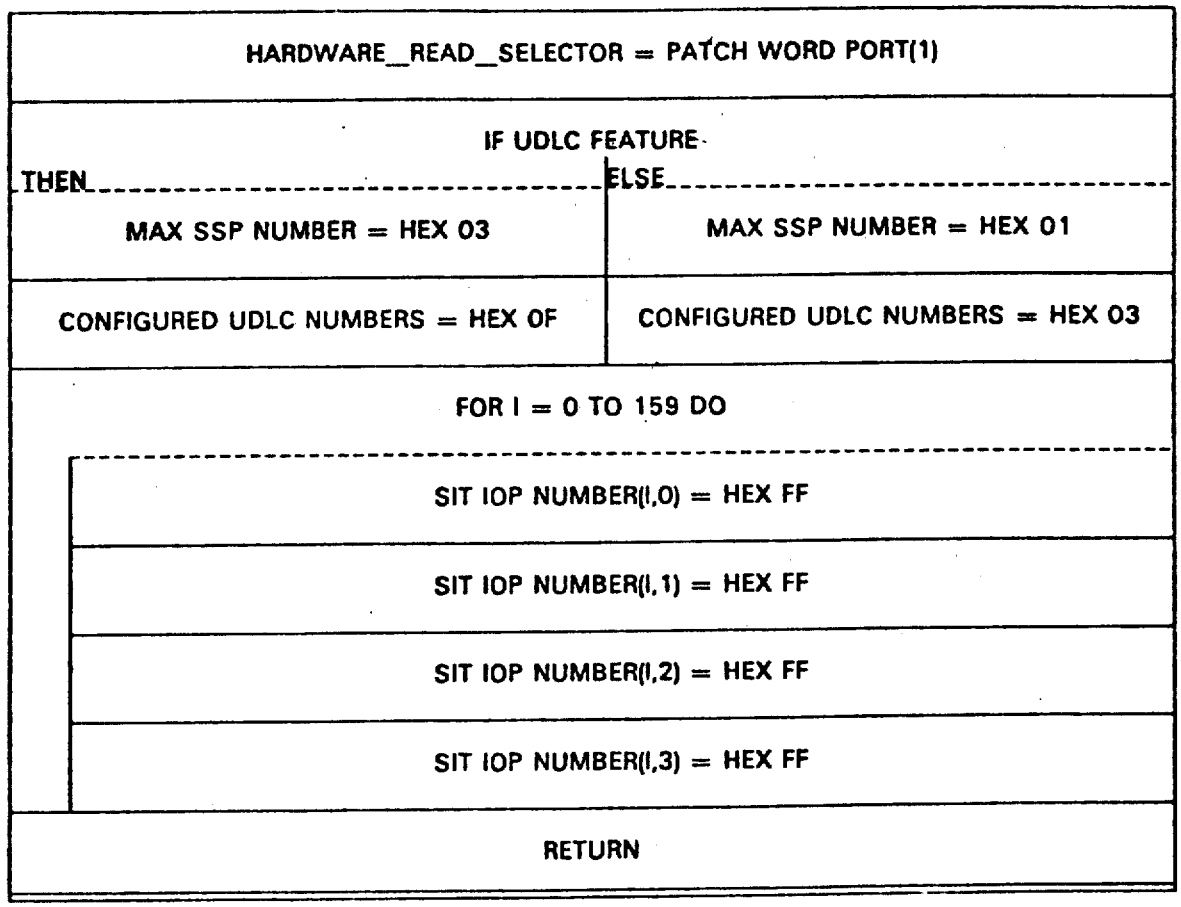
Figure O-73. Flowchart of SAU_INITIALIZATION

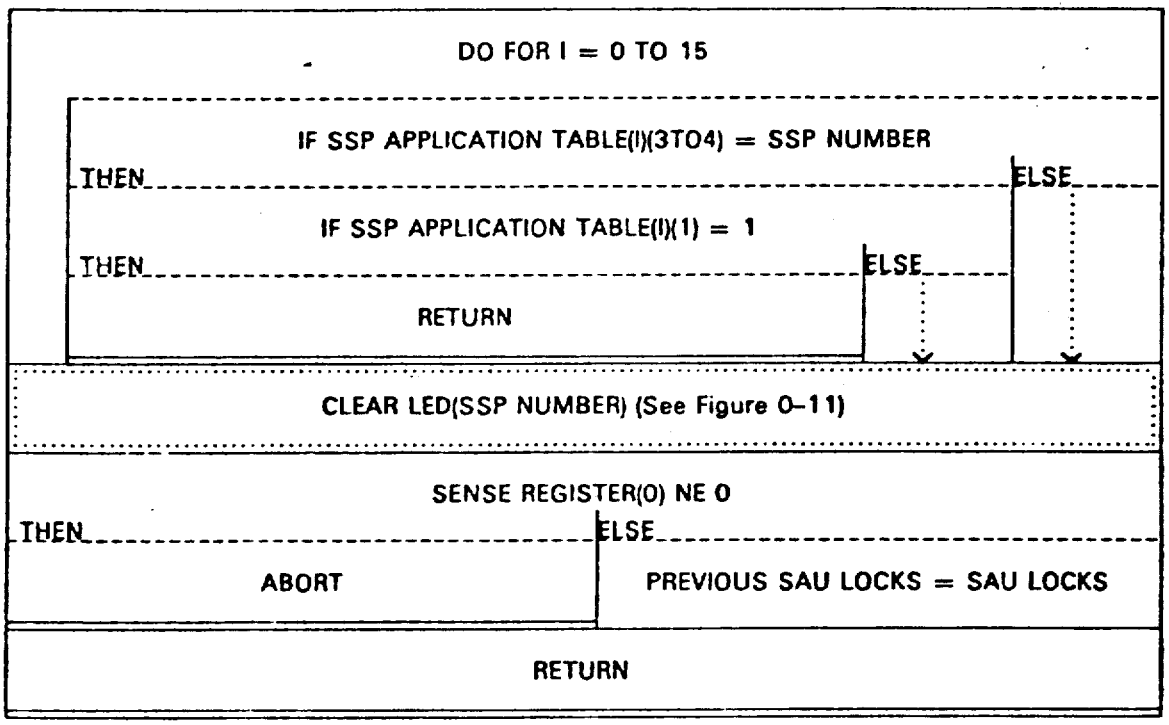
Figure O-74. Flowchart of SAU LOCK CHECKS(ssp number)

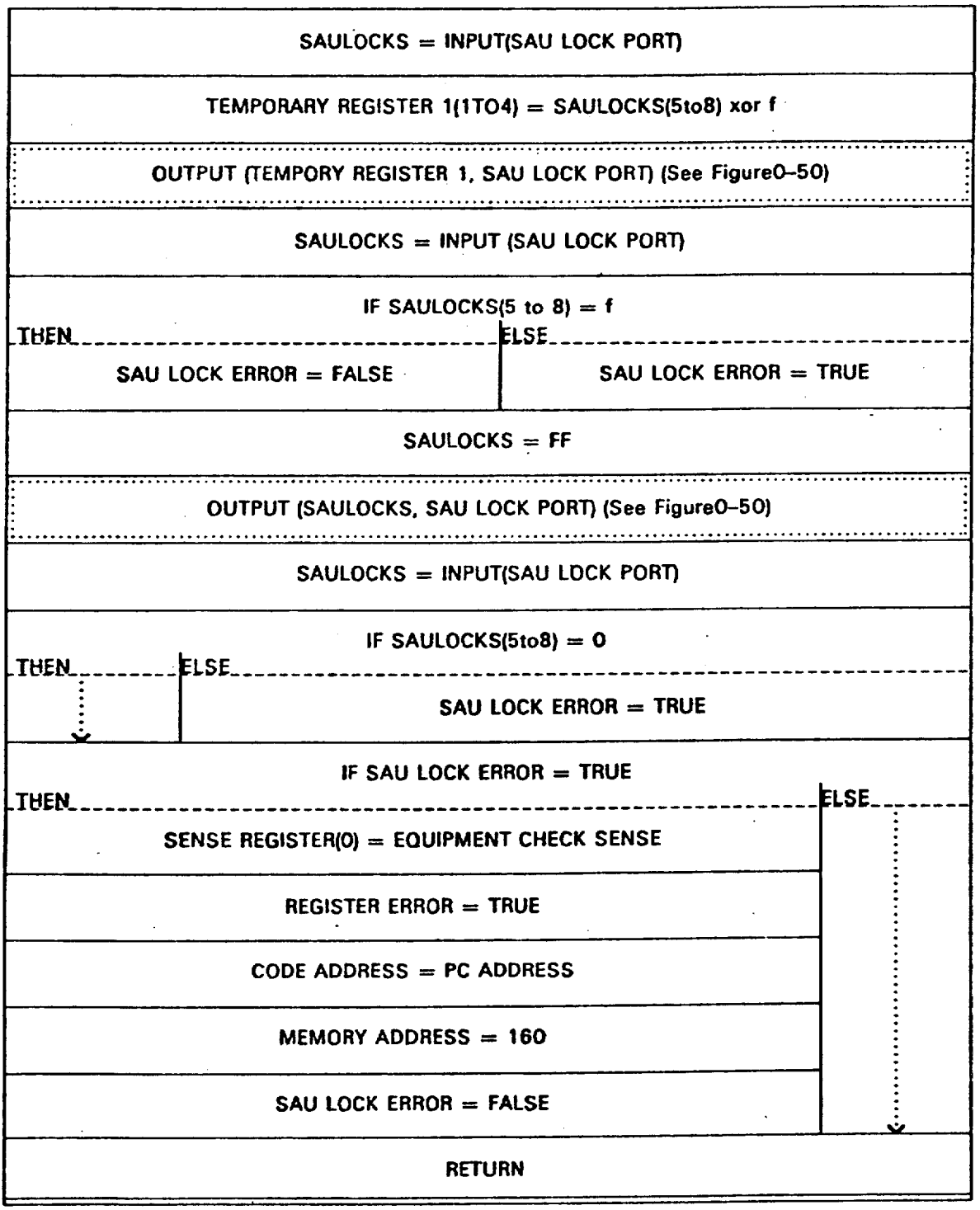
Figure O-75. Flowchart of SAU LOCK TEST

*Figure O-76. Flowchart of SAU RELEASE*
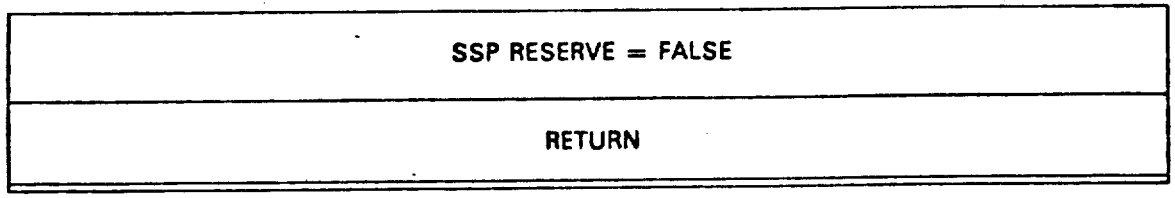
*Figure O-77. Flowchart of SAU RESERVE*
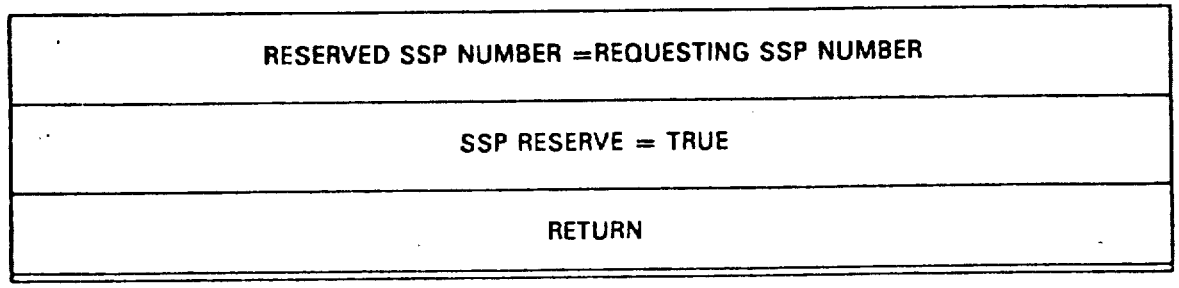
*Figure O-78. FLOWCHART OF SAU__RESET*
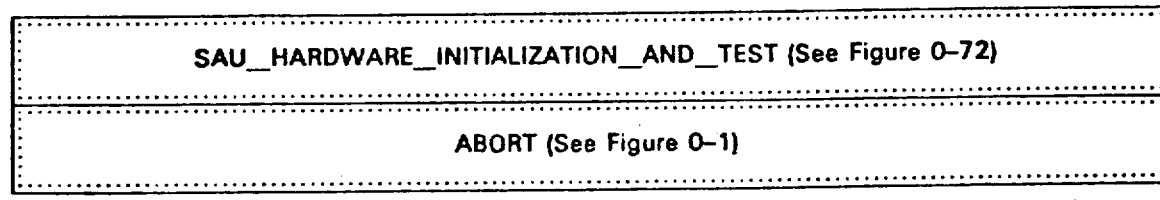

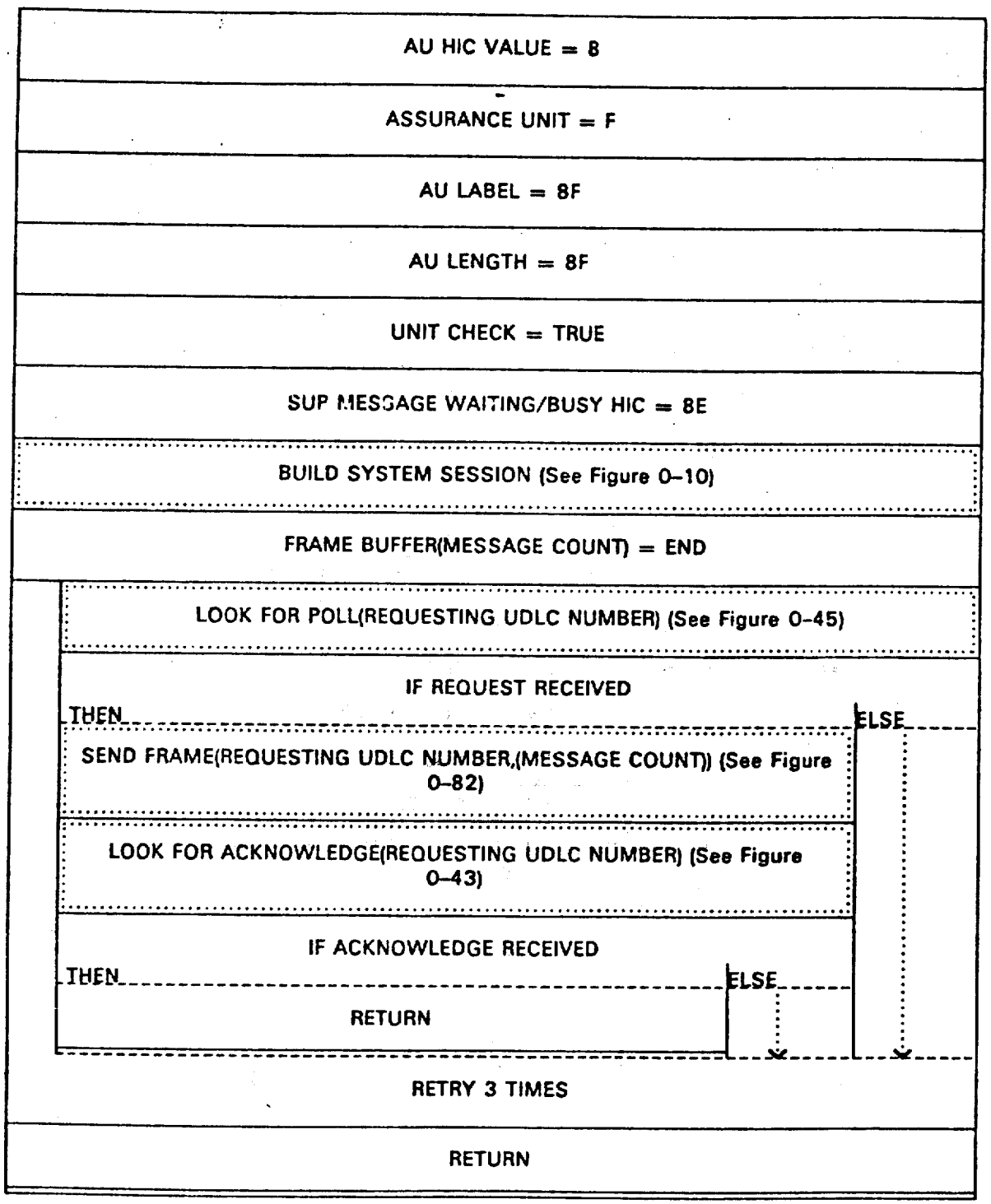
Figure O-79. Flowchart of SEND ATTENTION

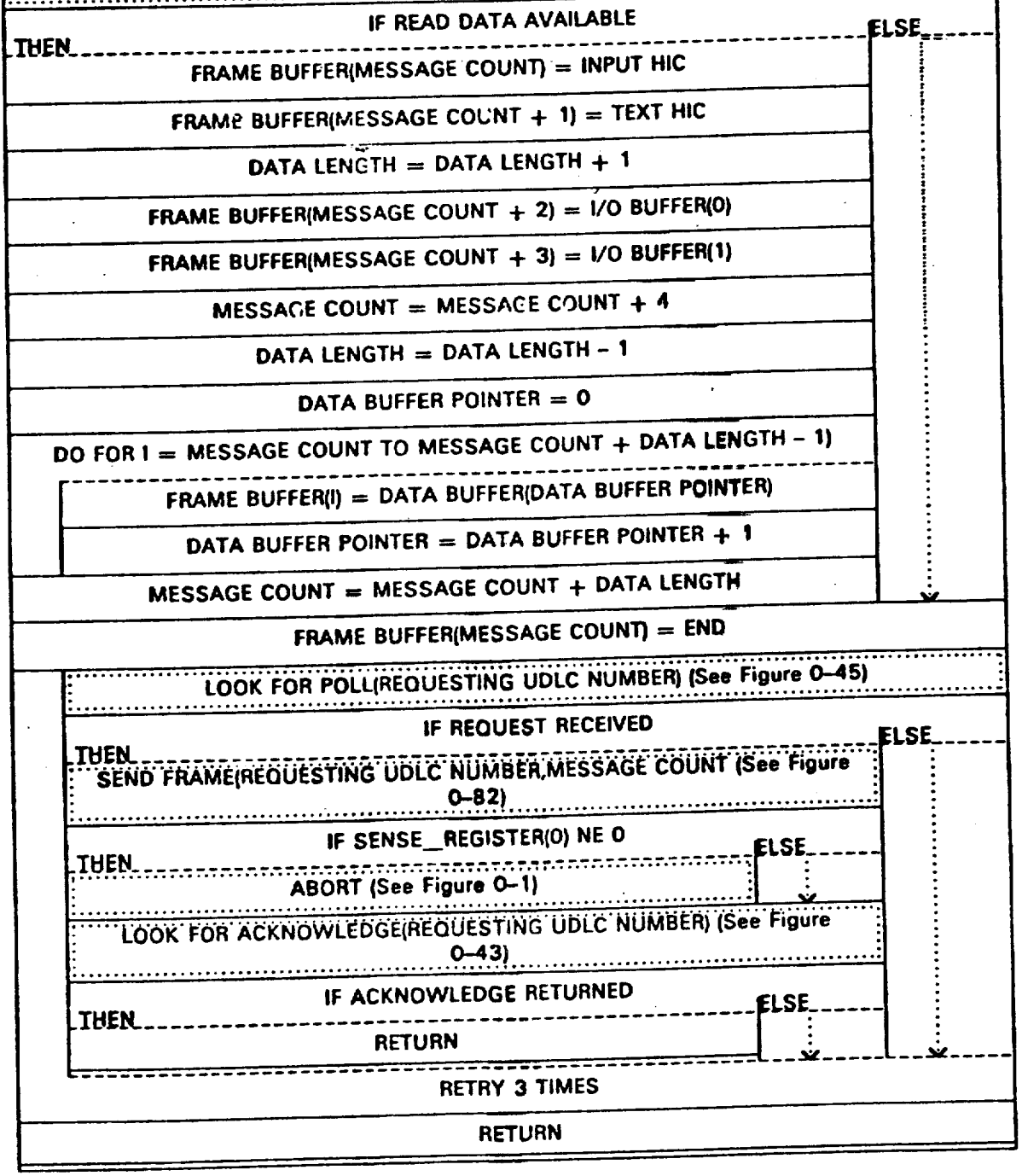
Figure O-80. Flowchart of SEND COMMAND END

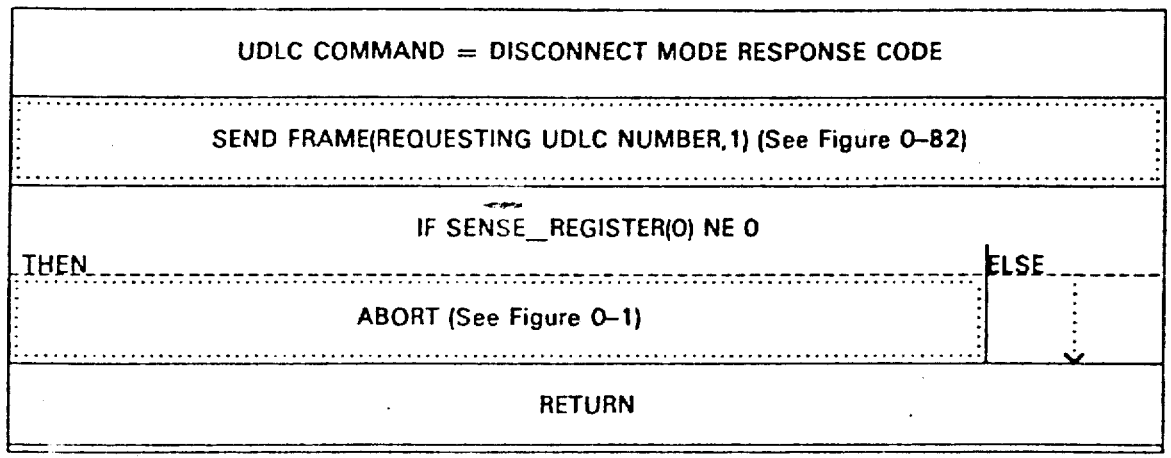
Figure O-81. Flowchart of SEND DISCONNECT MODE
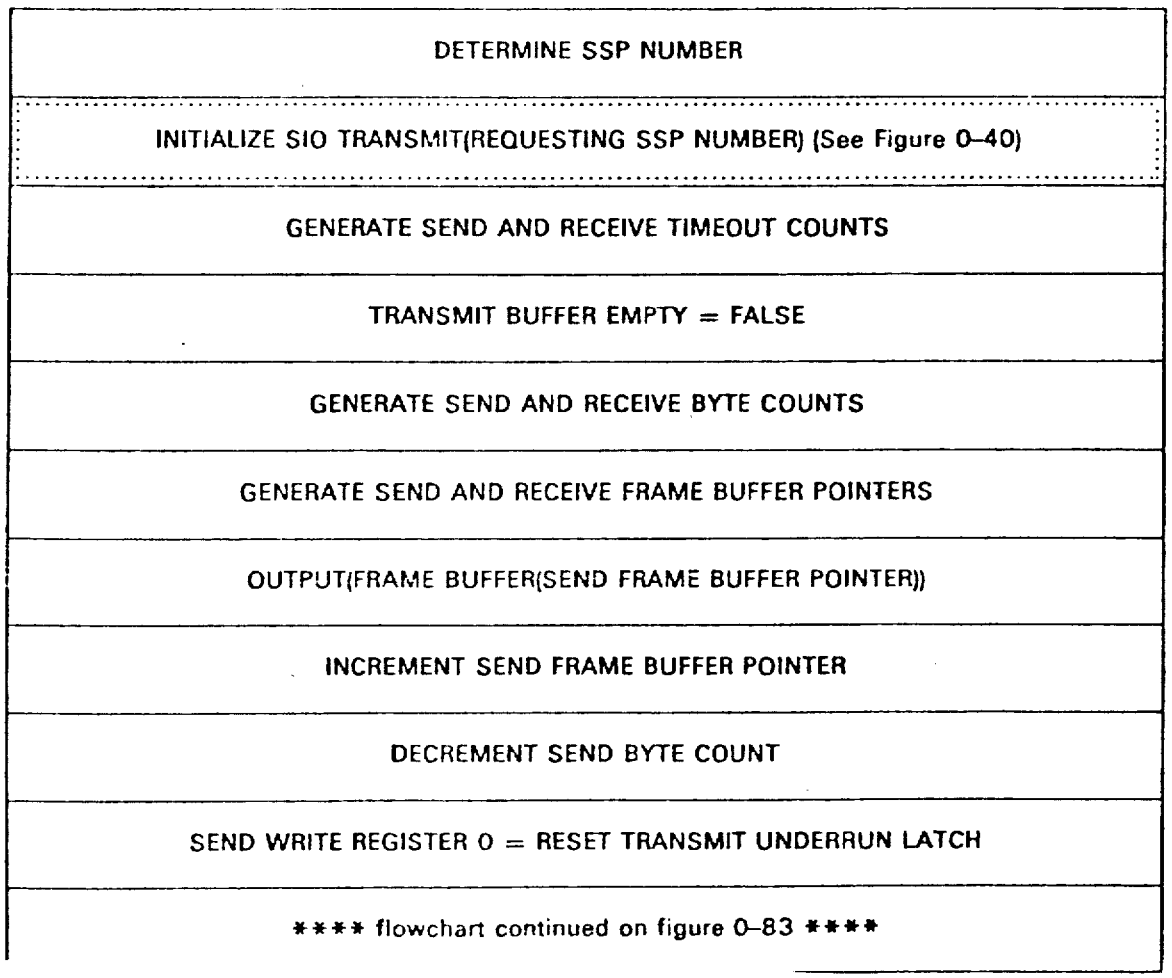
Figure O-82. Flowchart of SEND_FRAME(udlc number,count) (part 1 of 3)

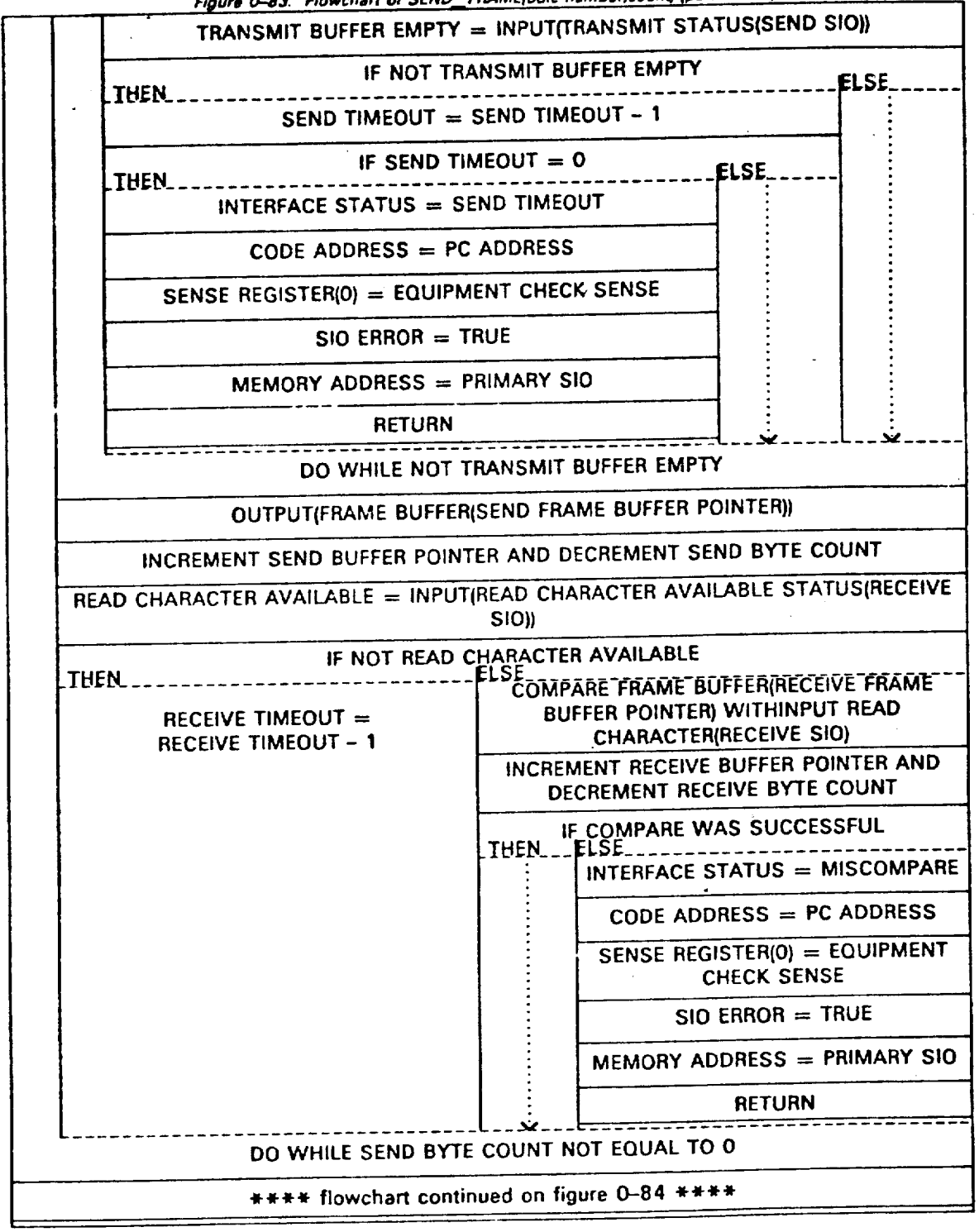
Figure O-83. Flowchart of SEND_FRAME(udlc number,count) (part 2 of 3)

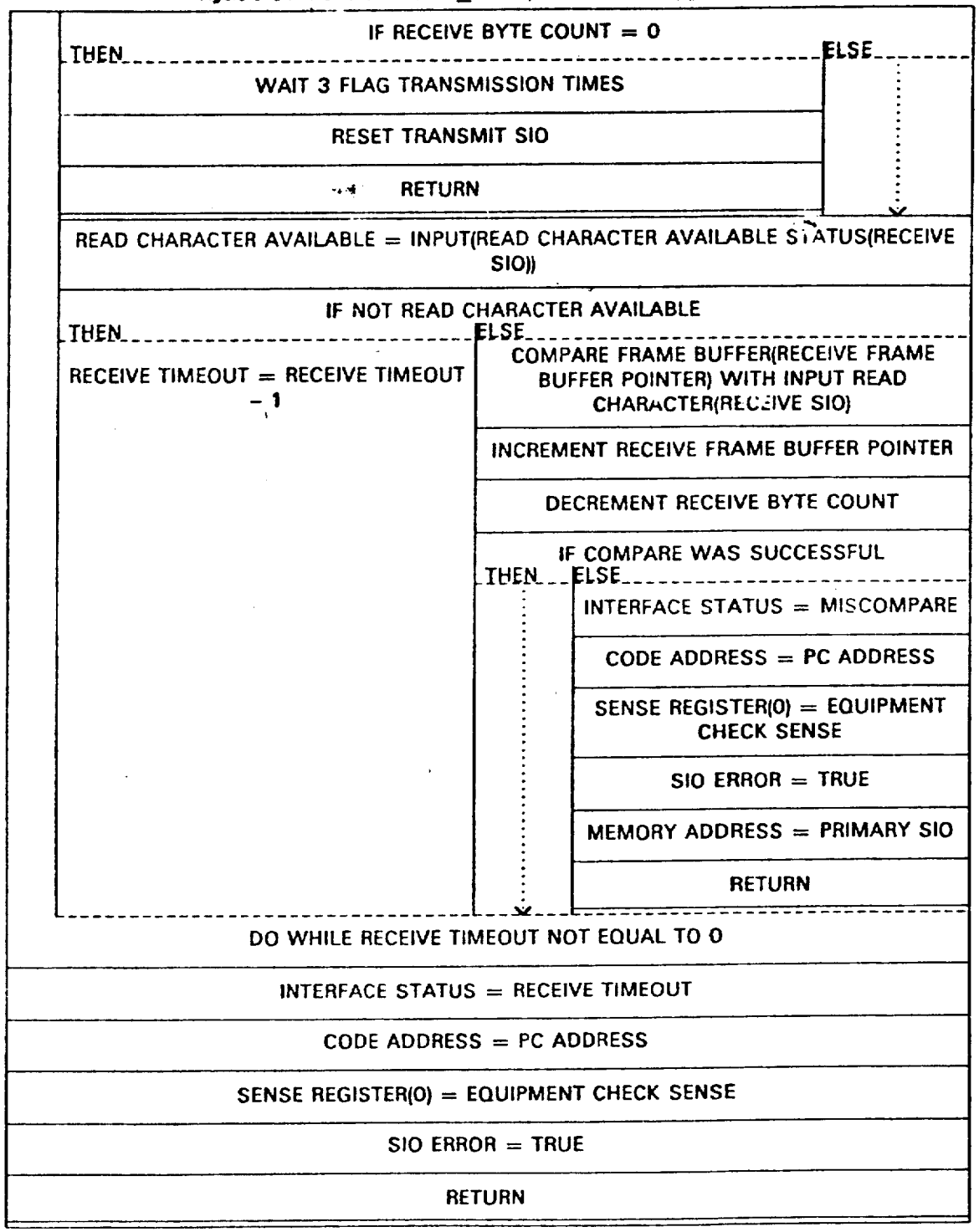
Figure O-84. Flowchart of SEND_FRAME(udlc number,count) (part 3 of 3)

Figure O-85. Flowchart of SEND FRAME REJECT
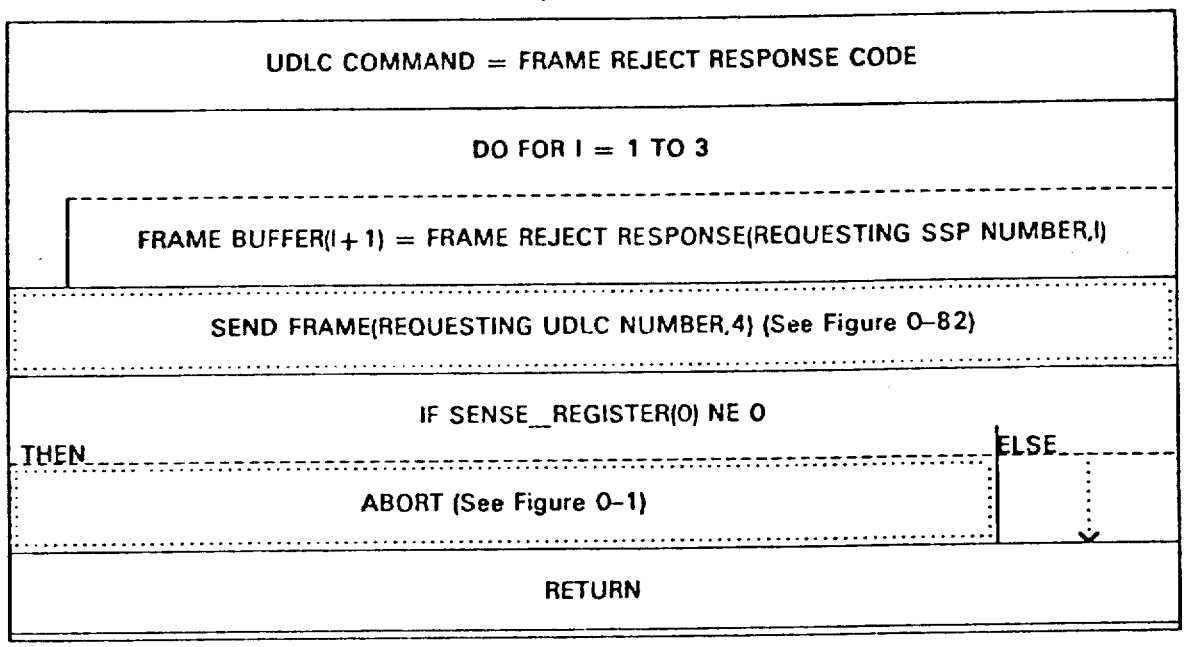

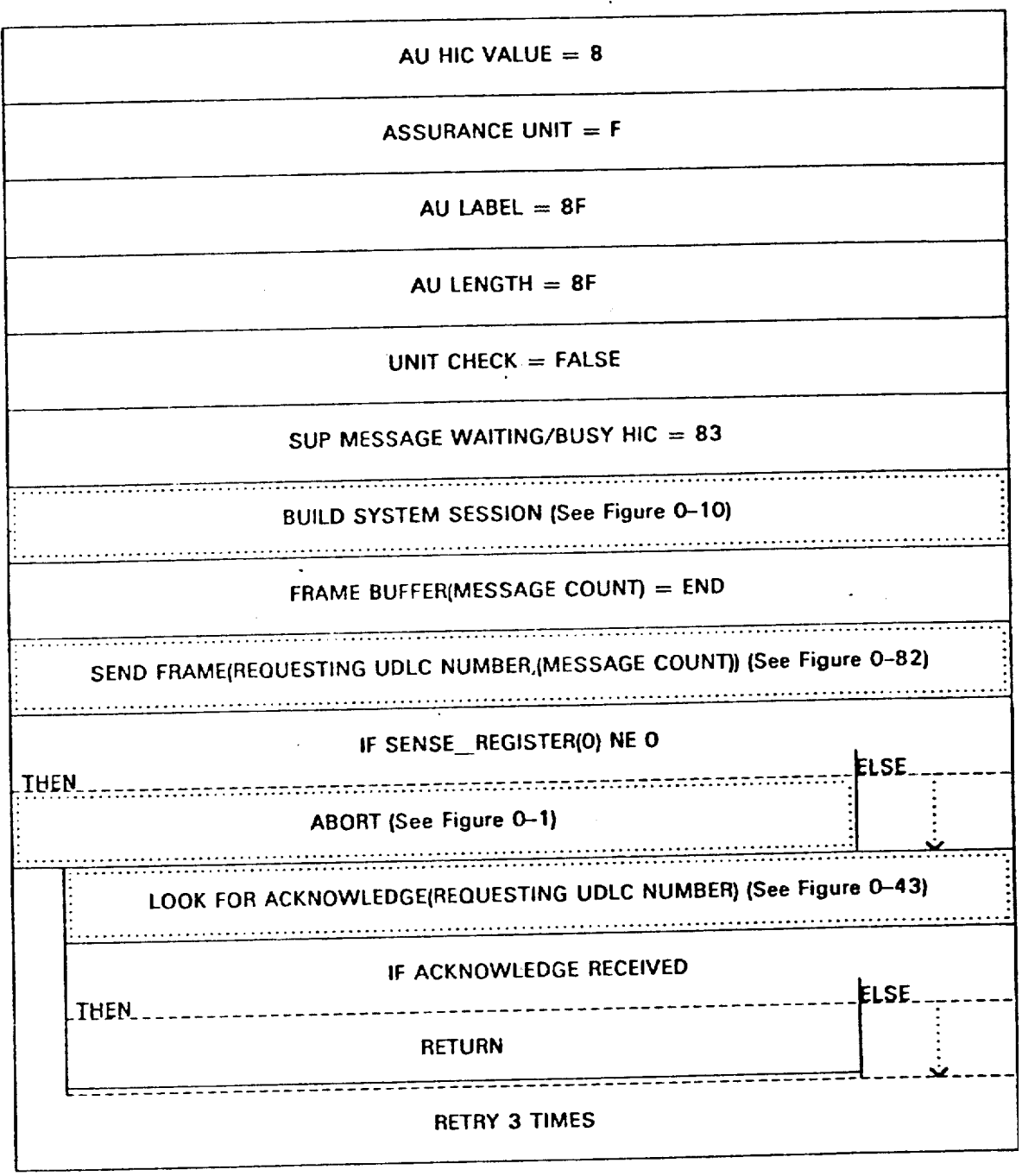
Figure O-86. Flowchart of SEND RECEIVE NOT READY

Figure O-87. Flowchart of SEND RECEIVE READY
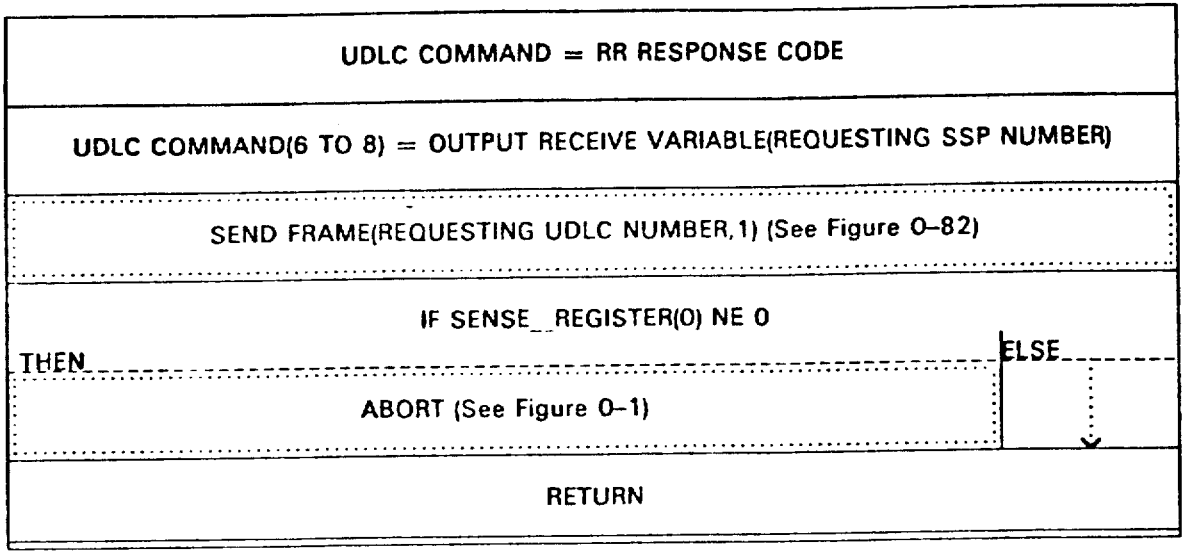
Figure O-88. Flowchart of SEND UNNUMBERED ACKNOWLEDGE
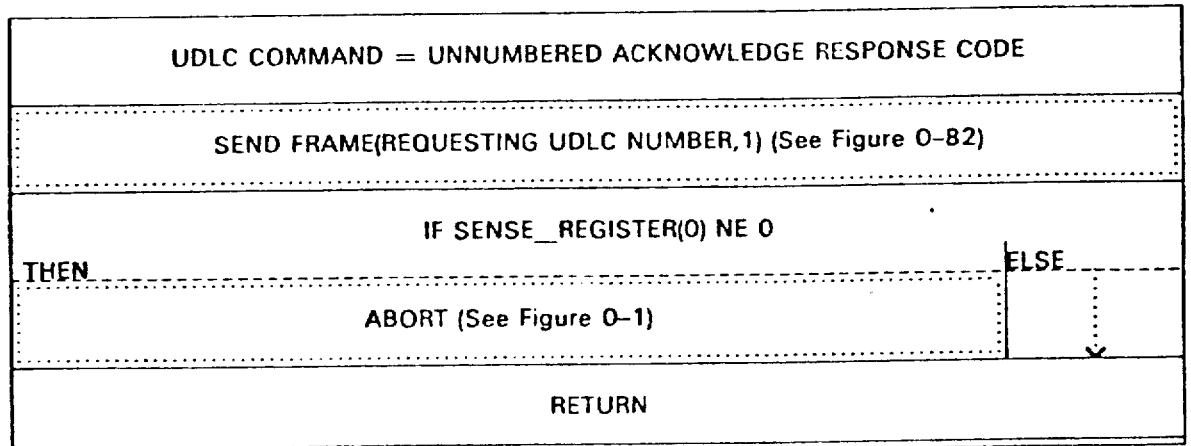

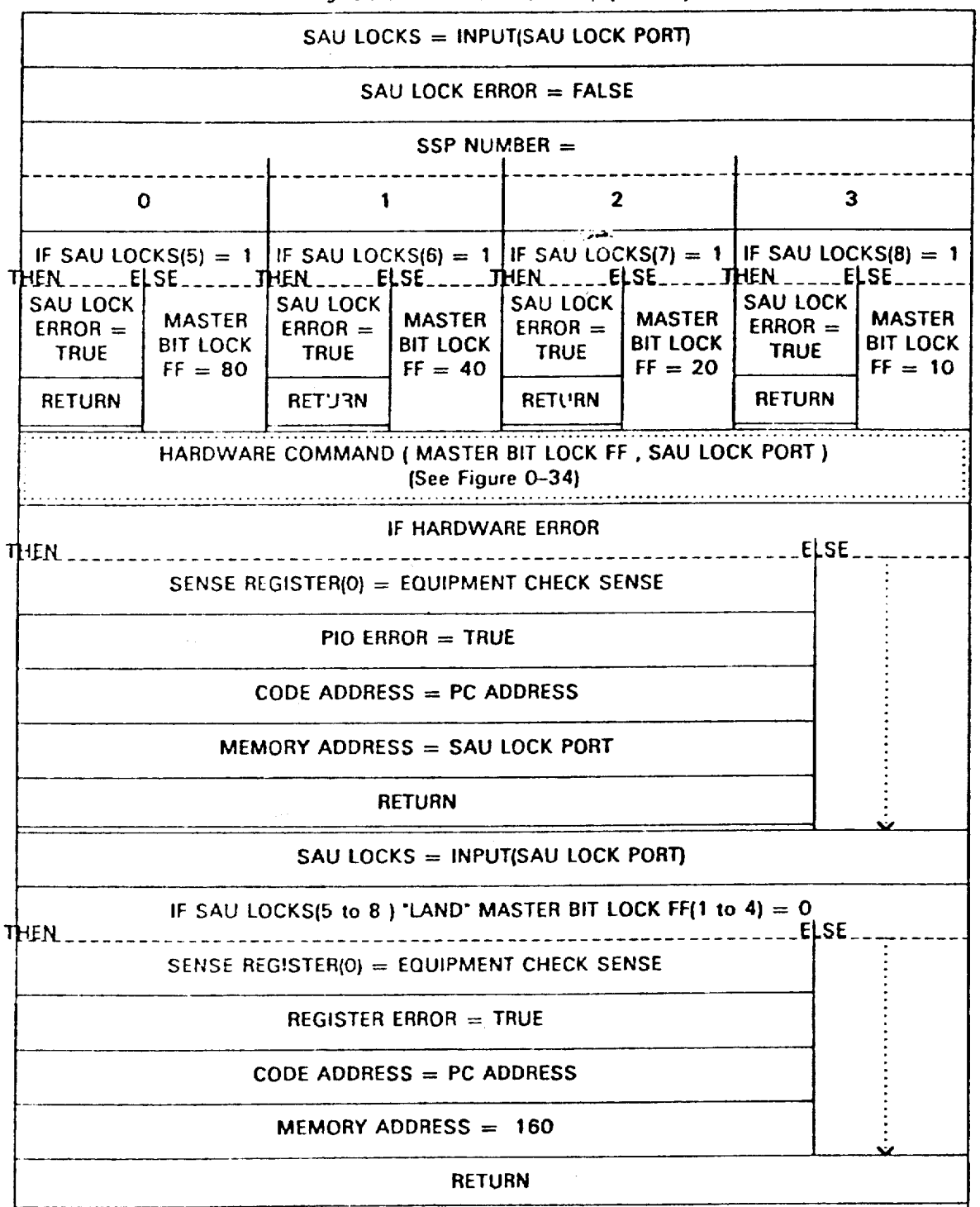
Figure O-89 Flowchart of SET LED(ssp number)

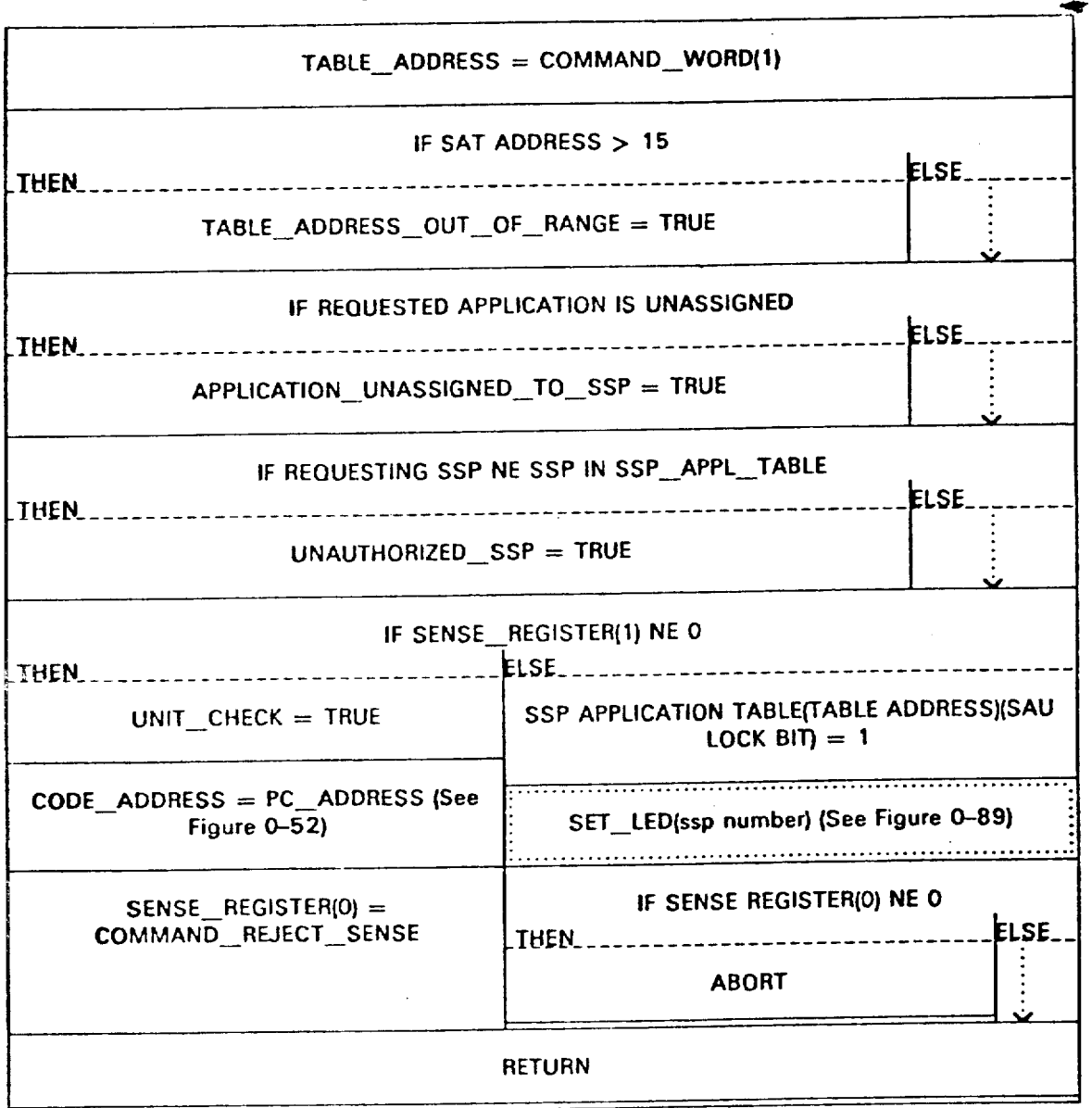
Figure O-90. Flowchart of SET_SAU_LOCK

Figure O-91. Flowchart of SET_TEST_MODE
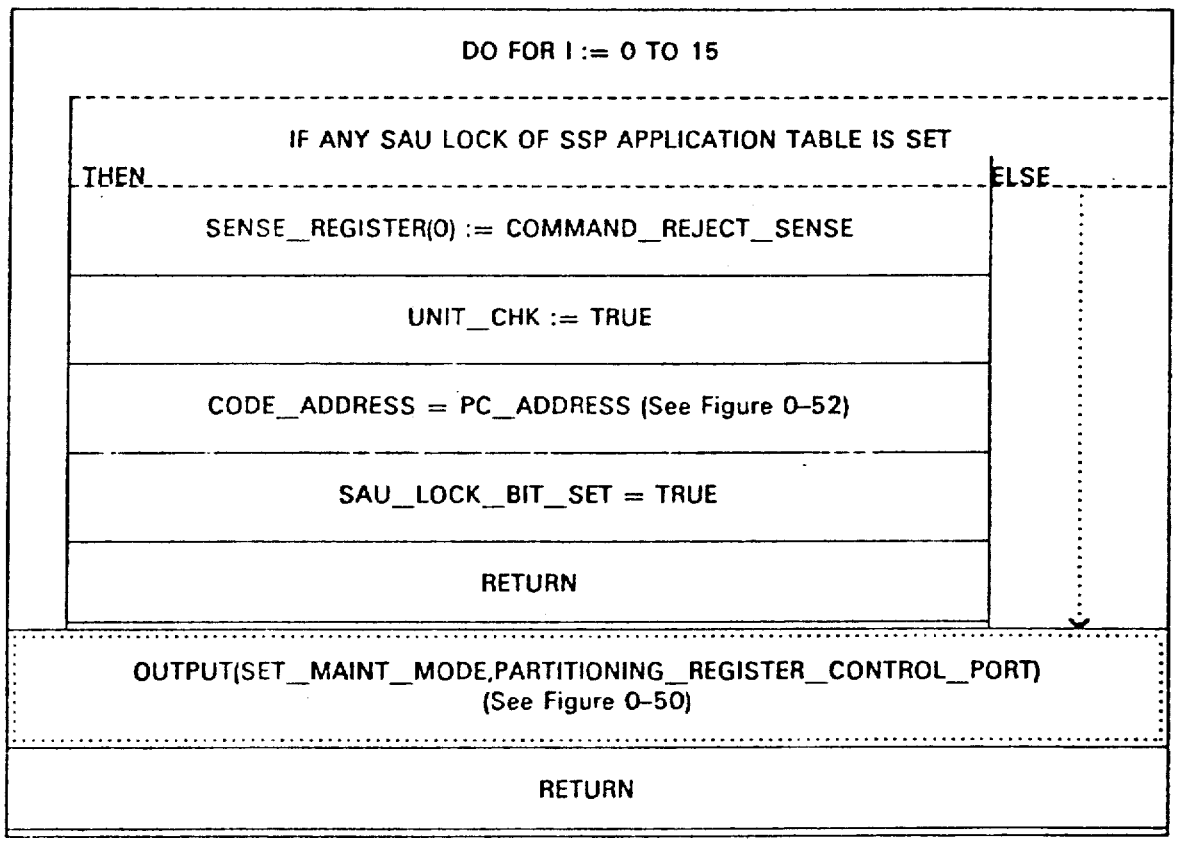

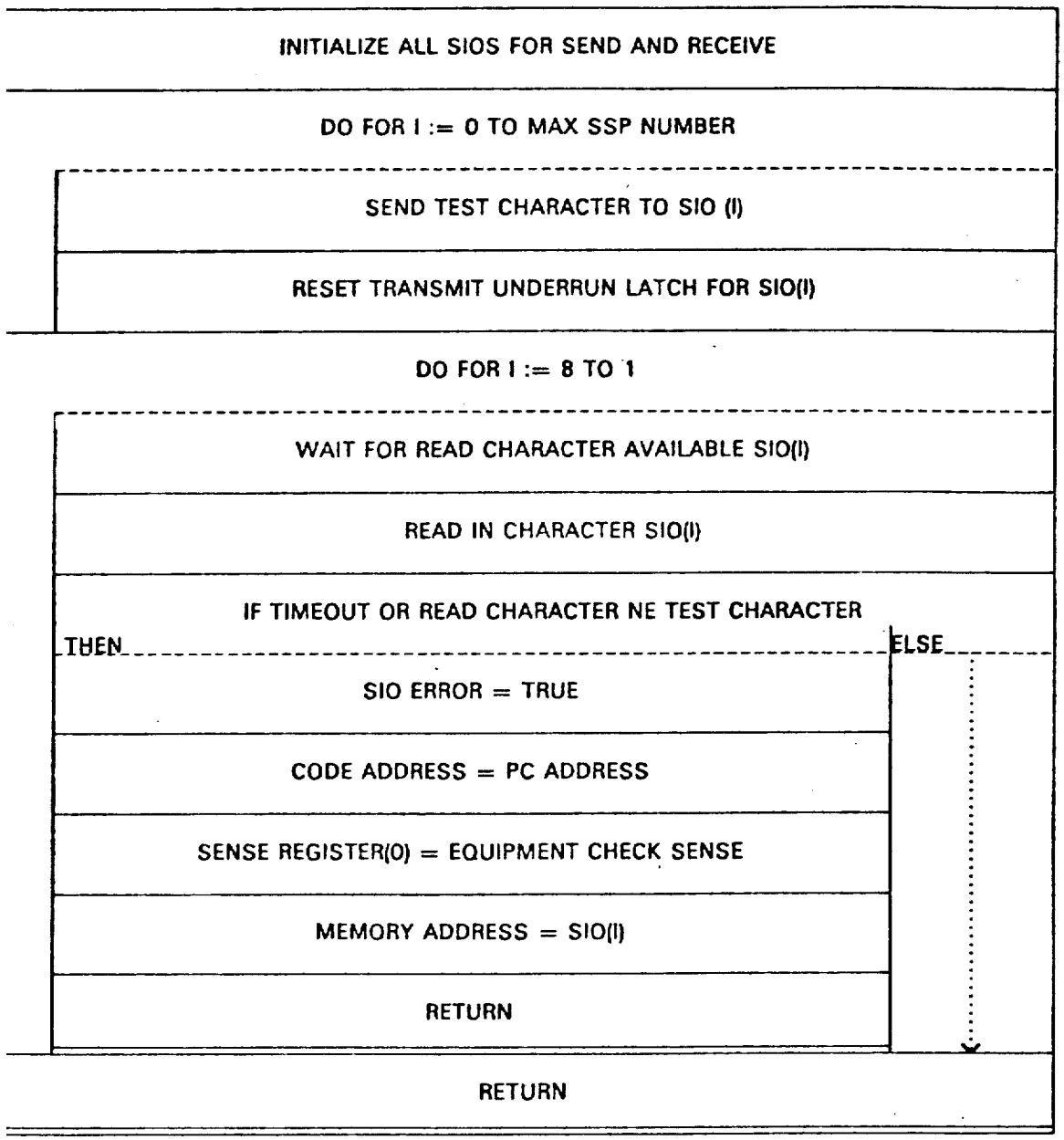
Figure O-92. Flowchart of SIO TEST

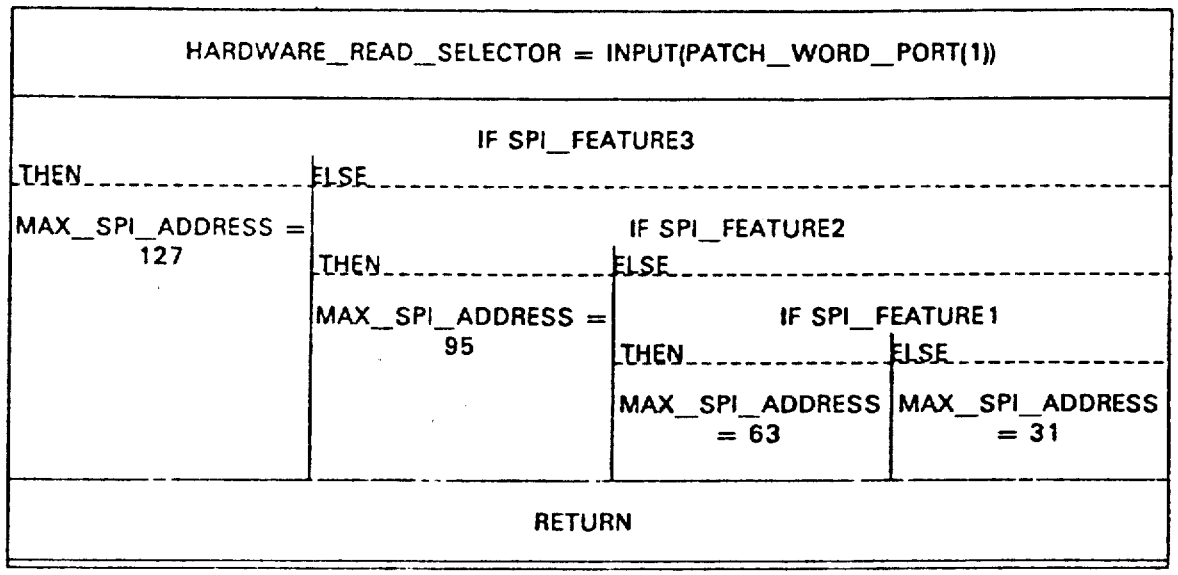
Figure O-93. Flowchart of SPI_CONFIGURATION
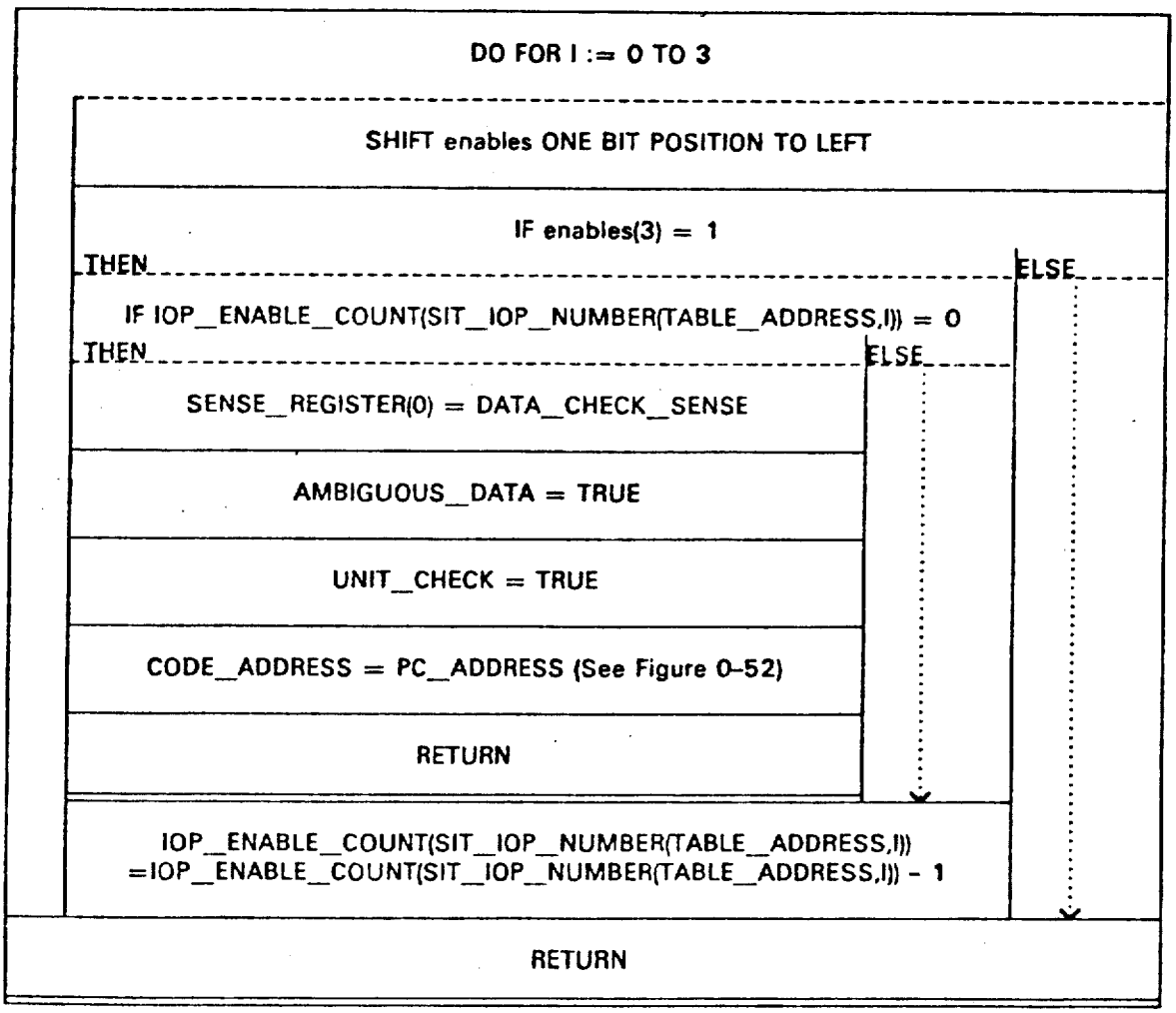
Figure O-94. Flowchart of SUBTRACT_IOP_ENABLE_COUNT(enables)

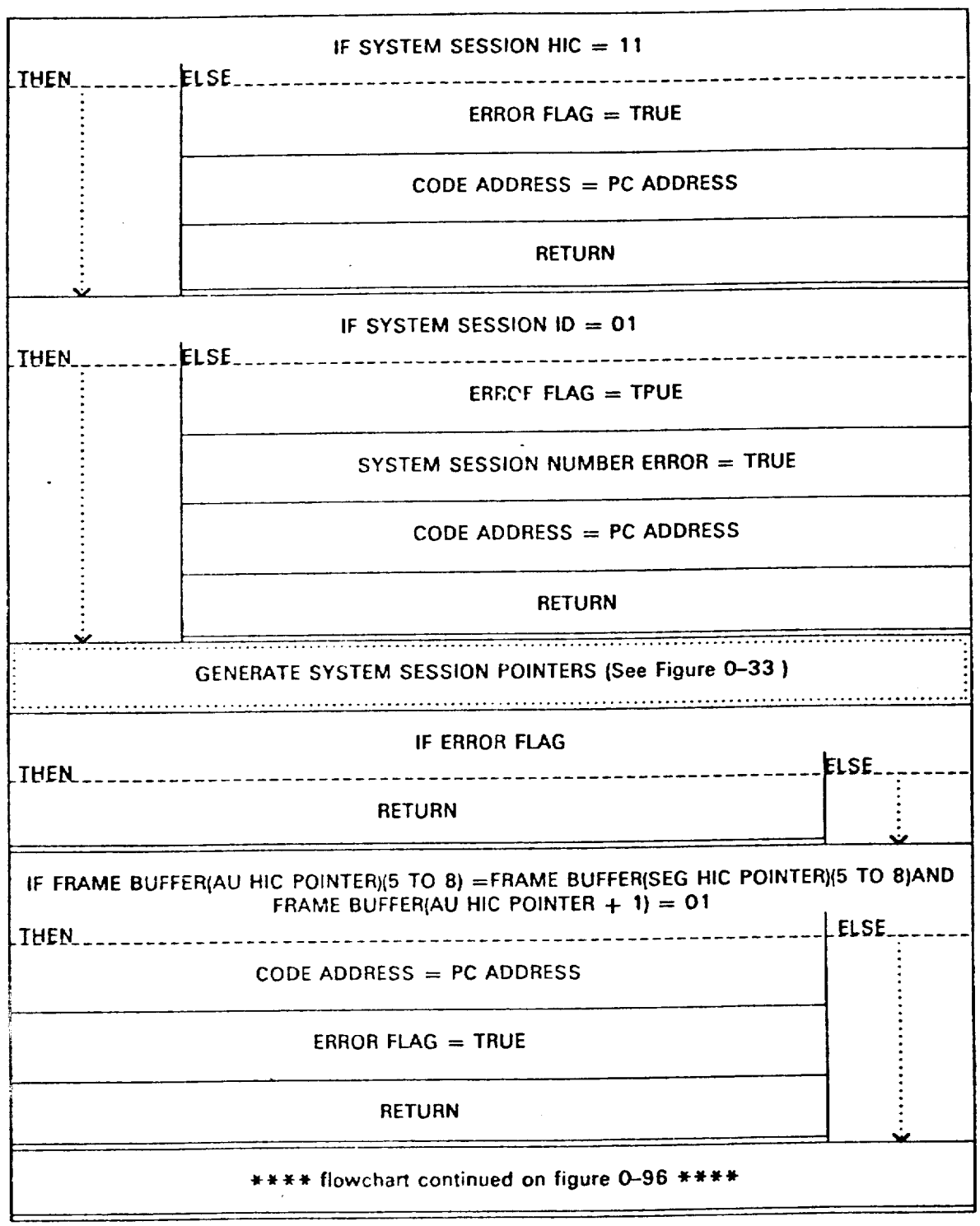
Figure 0-95. Flowchart of SYSTEM SESSION CHECKS (part 1 of 2)

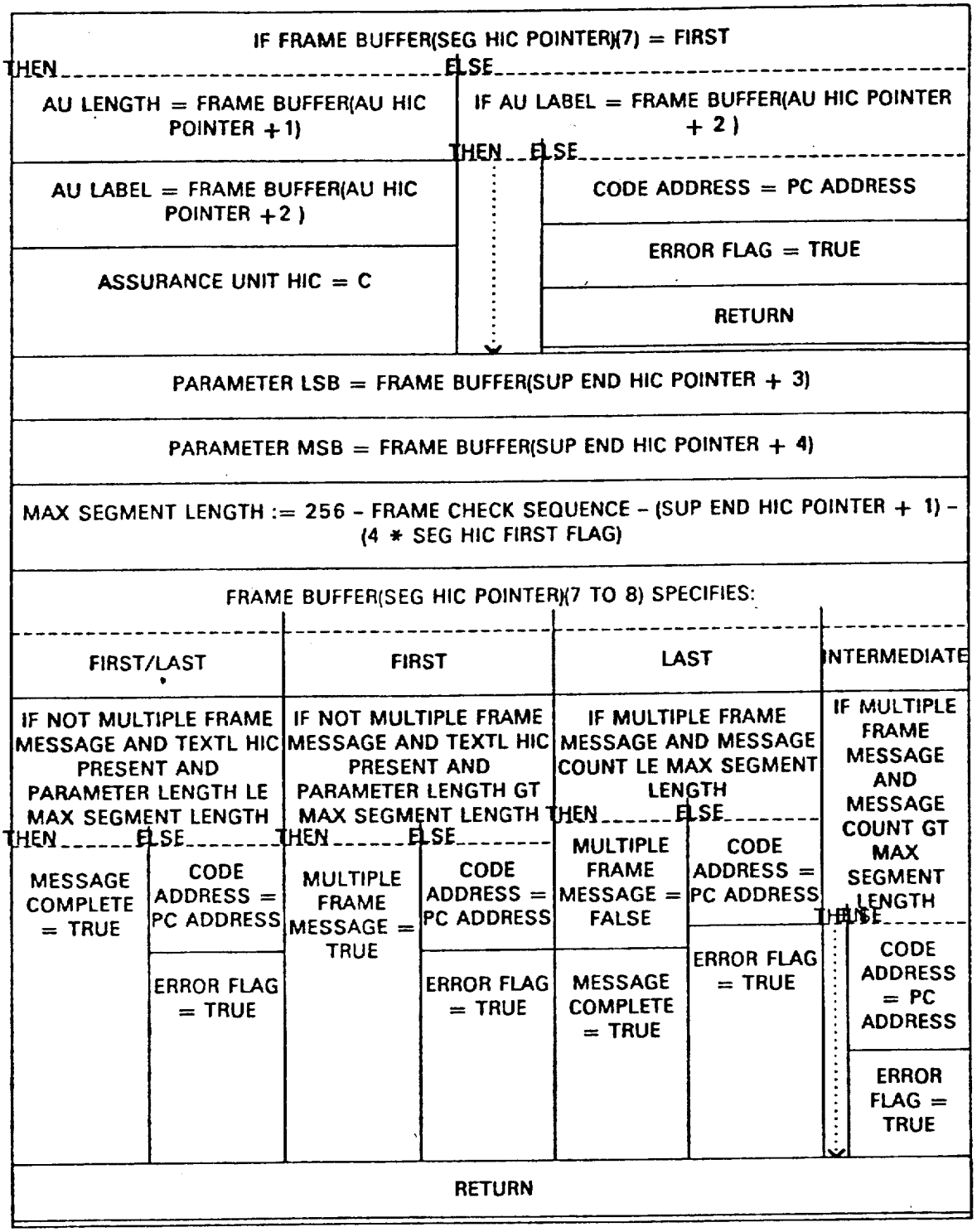
Figure O-96. Flowchart of SYSTEM SESSION CHECKS (part 2 of 2)

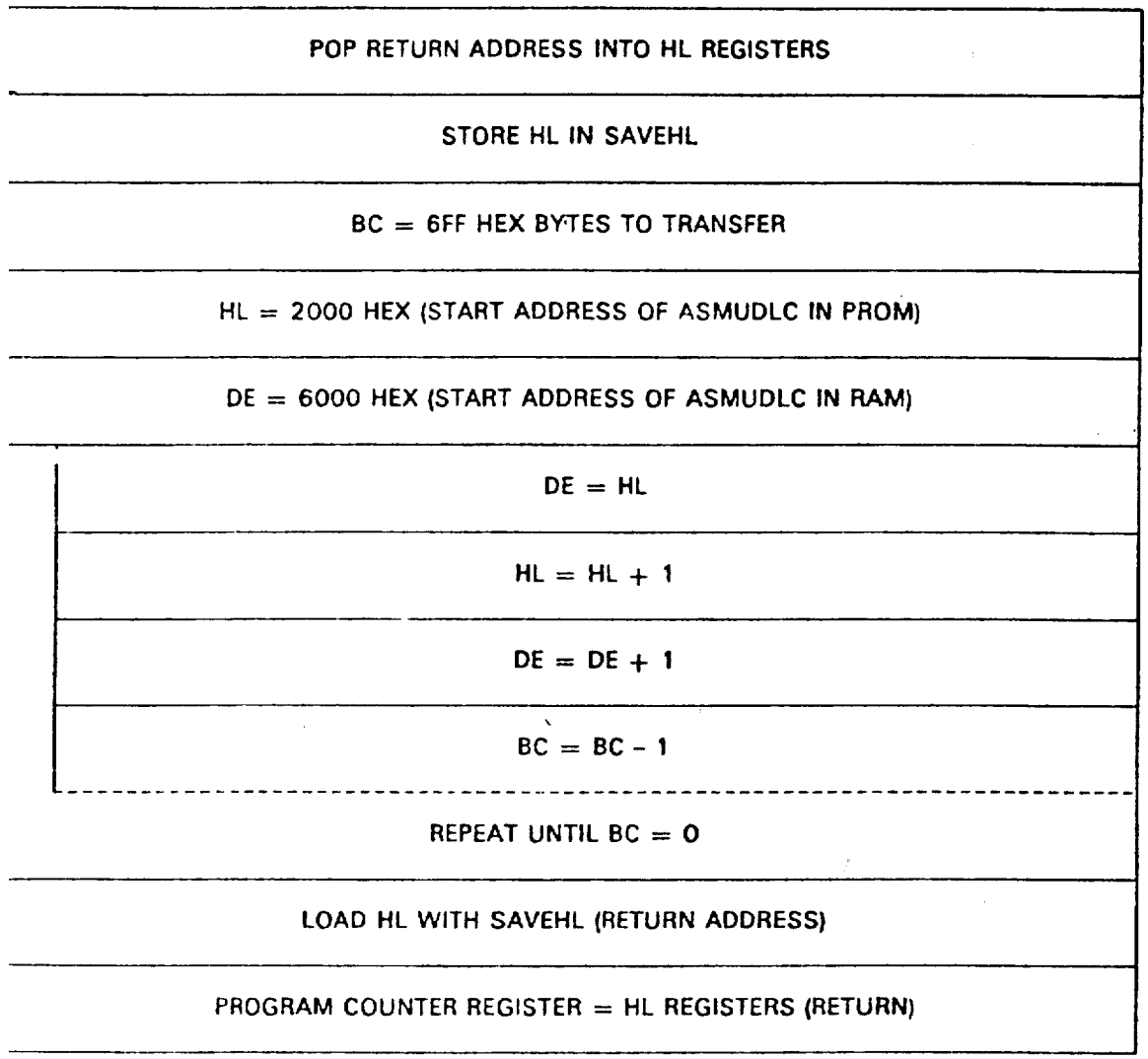
Figure O-97. Flowchart of UDLC CODE TRANSPLANT

Figure O-98. Flowchart of UNCORRECTABLE MEMORY ERROR
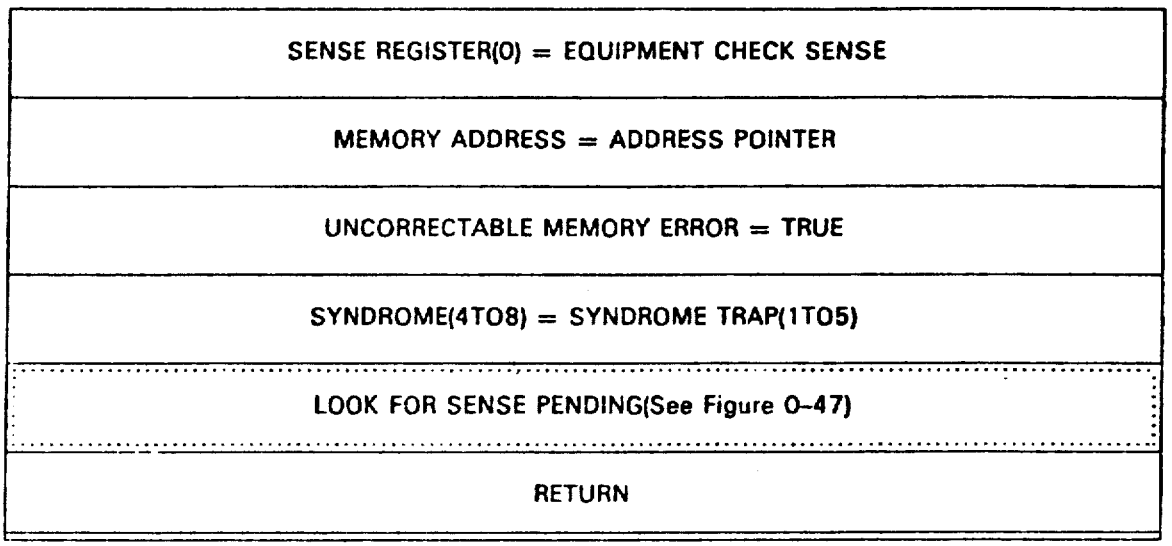
Figure O-99. Flowchart of VERIFY(signal,signal_output_port)
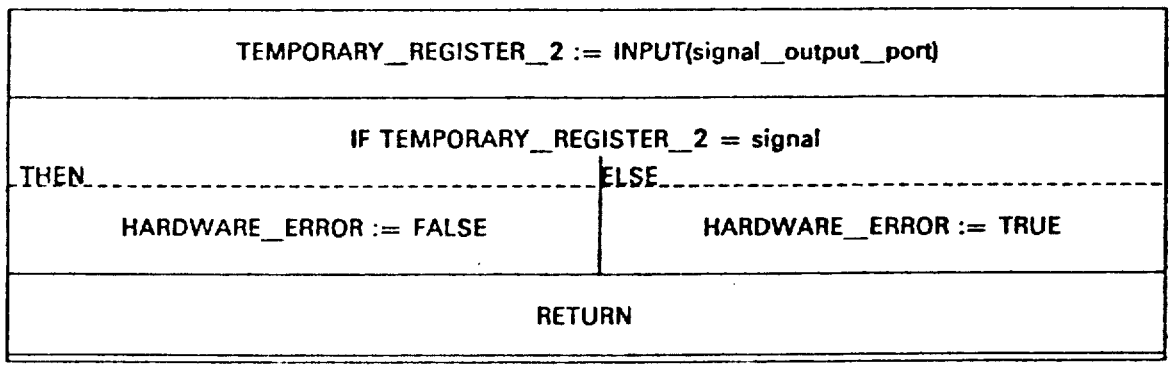

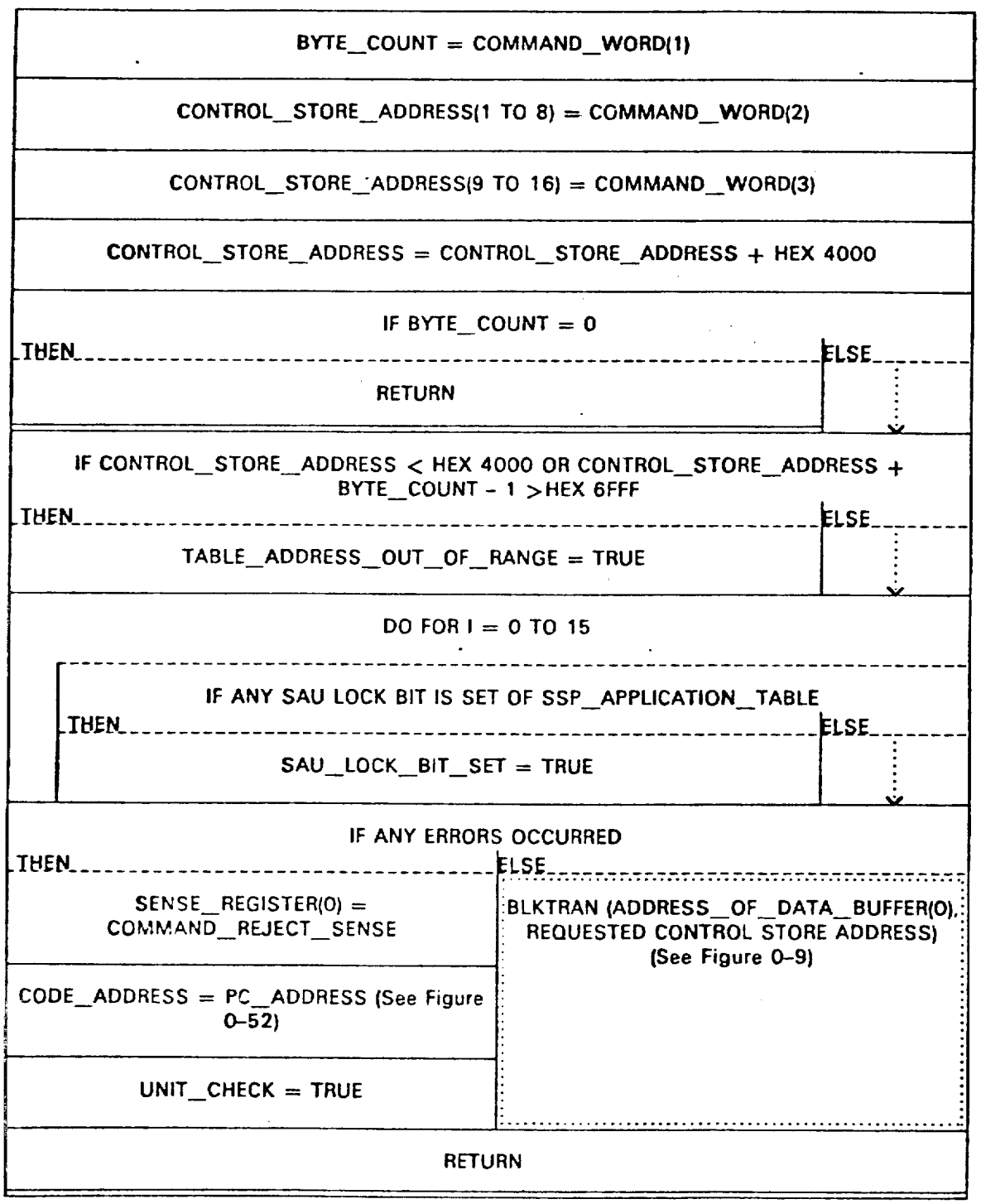
Figure O-100. Flowchart of WRITE_CONTROL_STORE

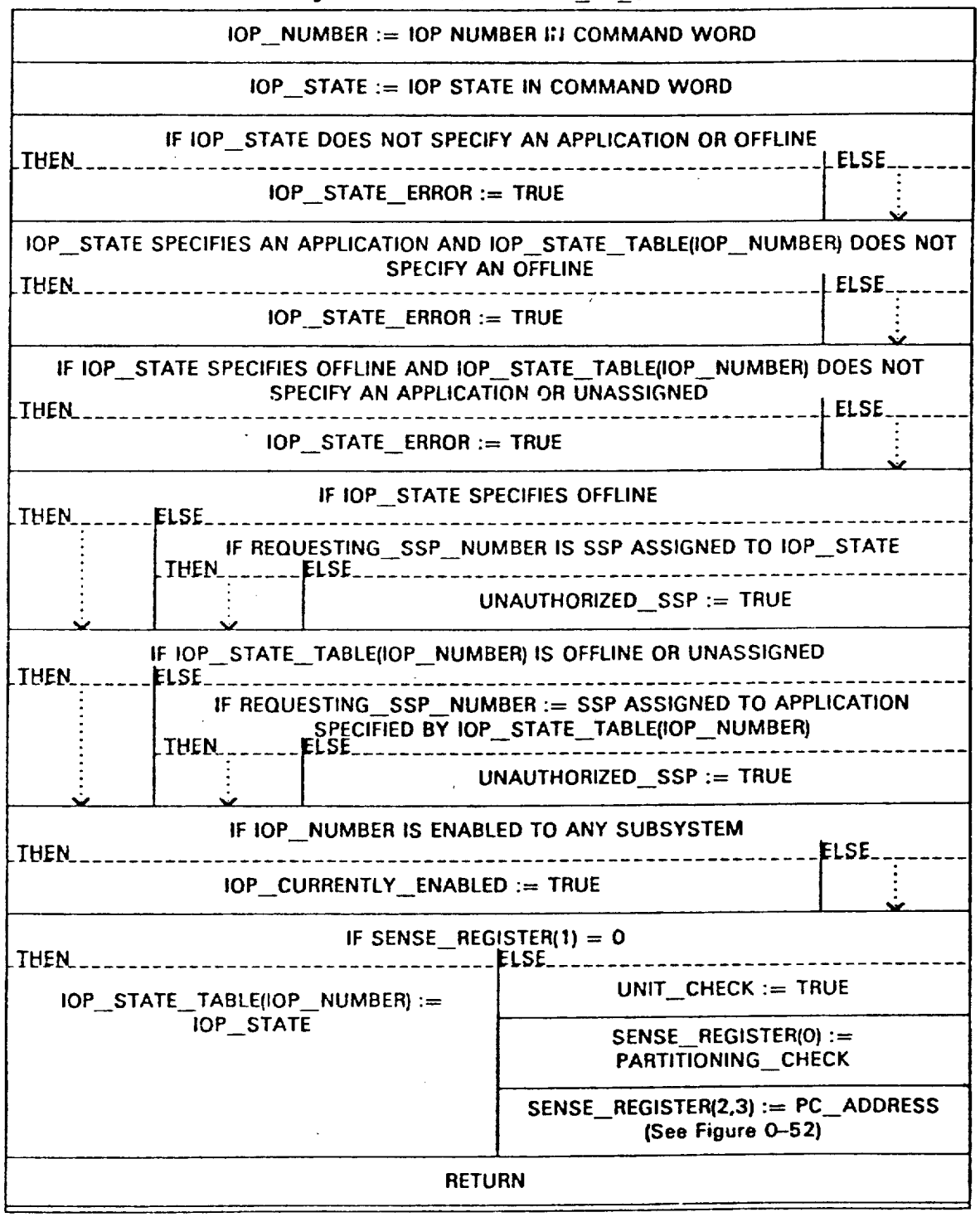
Figure O-101. Flowchart of WRITE_IOP_STATE

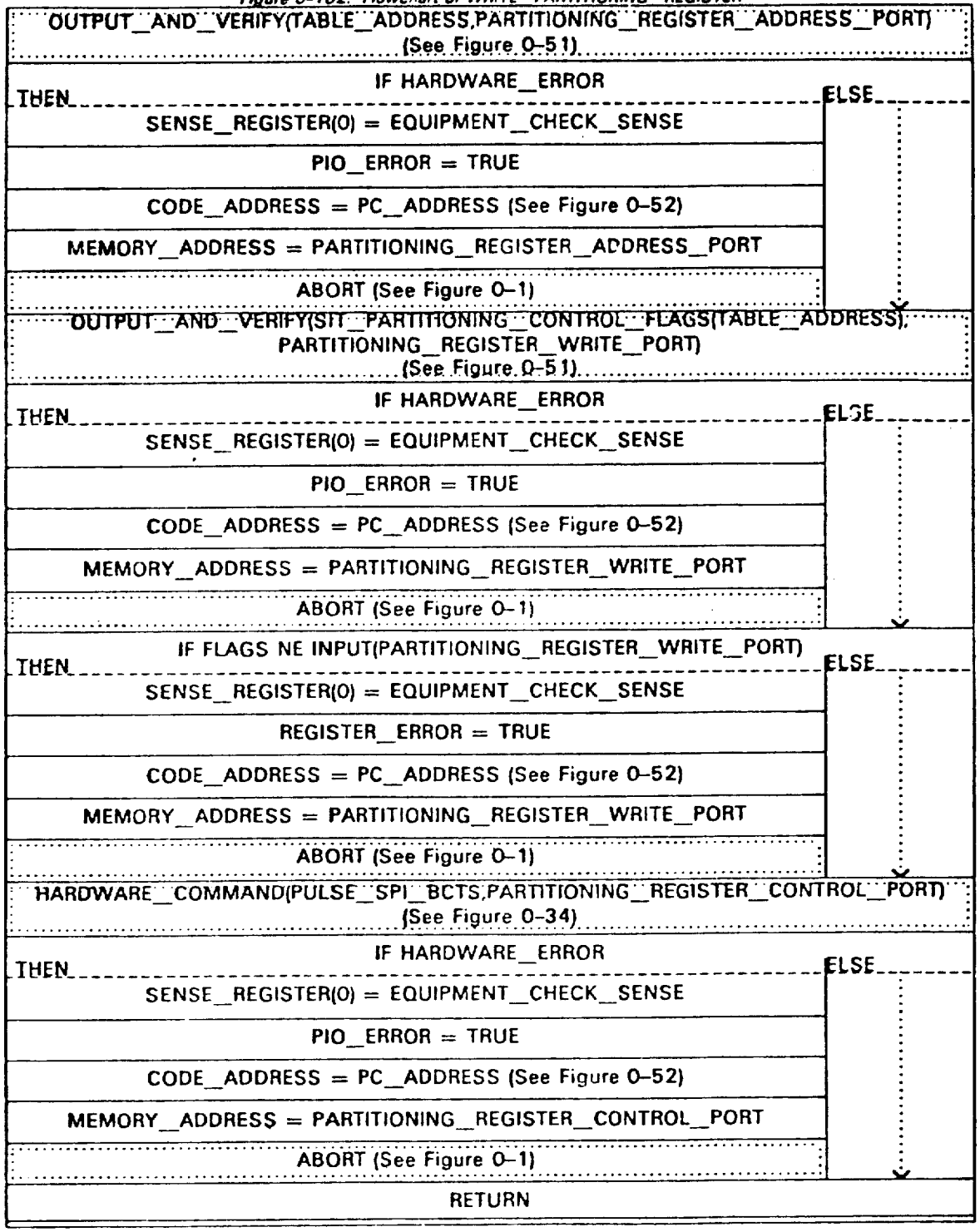
Figure O-102. Flowchart of WRITE_PARTITIONING_REGISTER

Figure O-103. Flowchart of WRITE SSP HISTORY
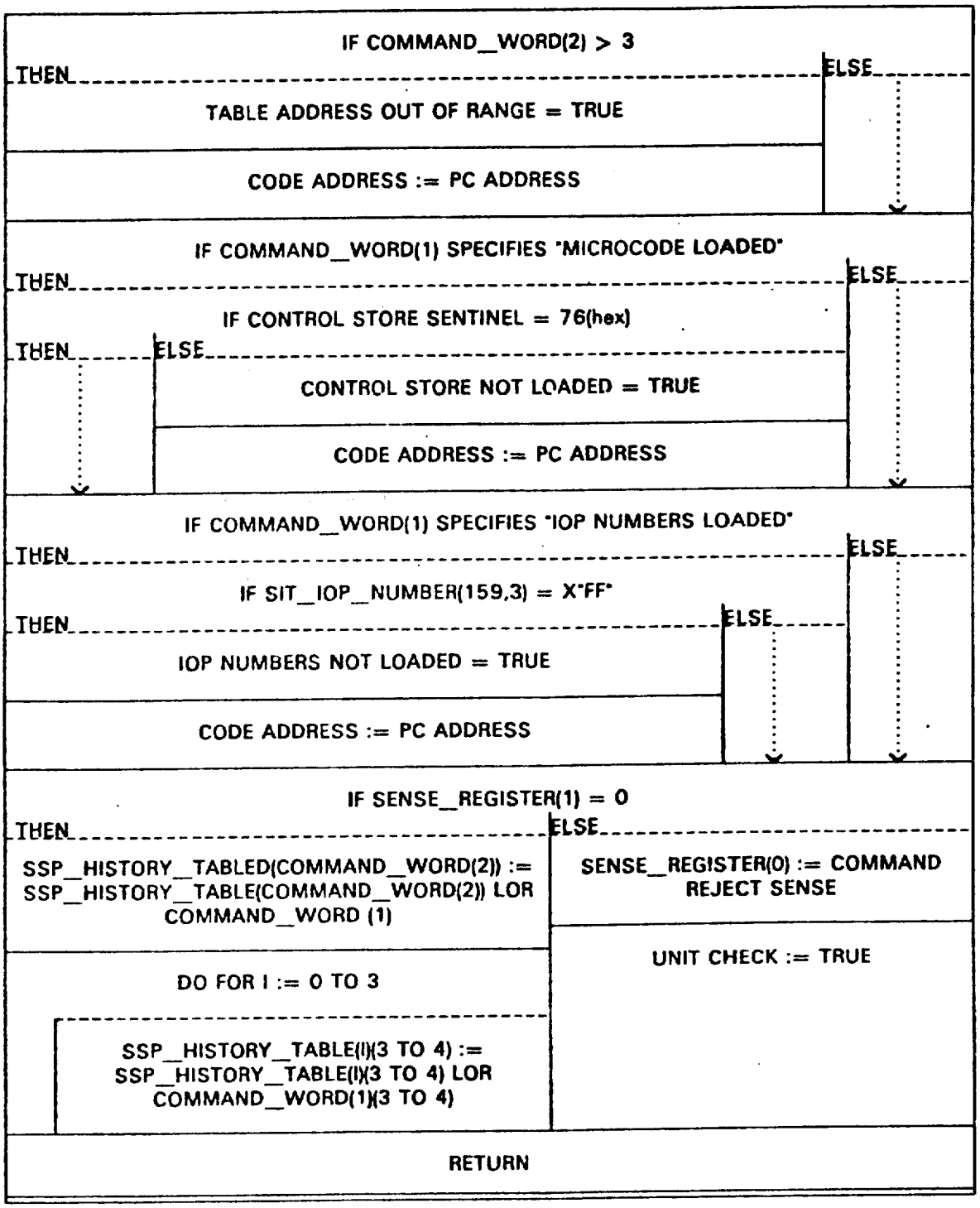

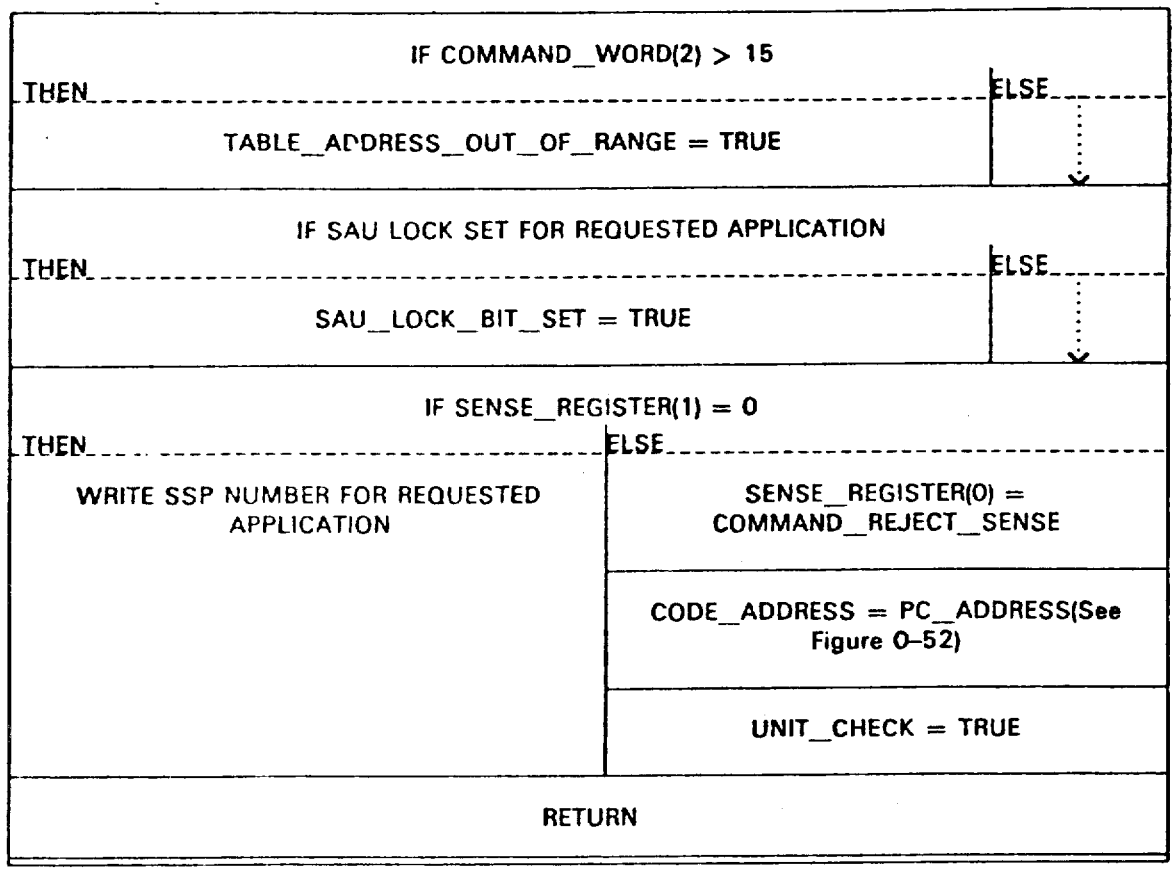
Figure O-104. Flowchart of WRITE_SSP_NUMBER

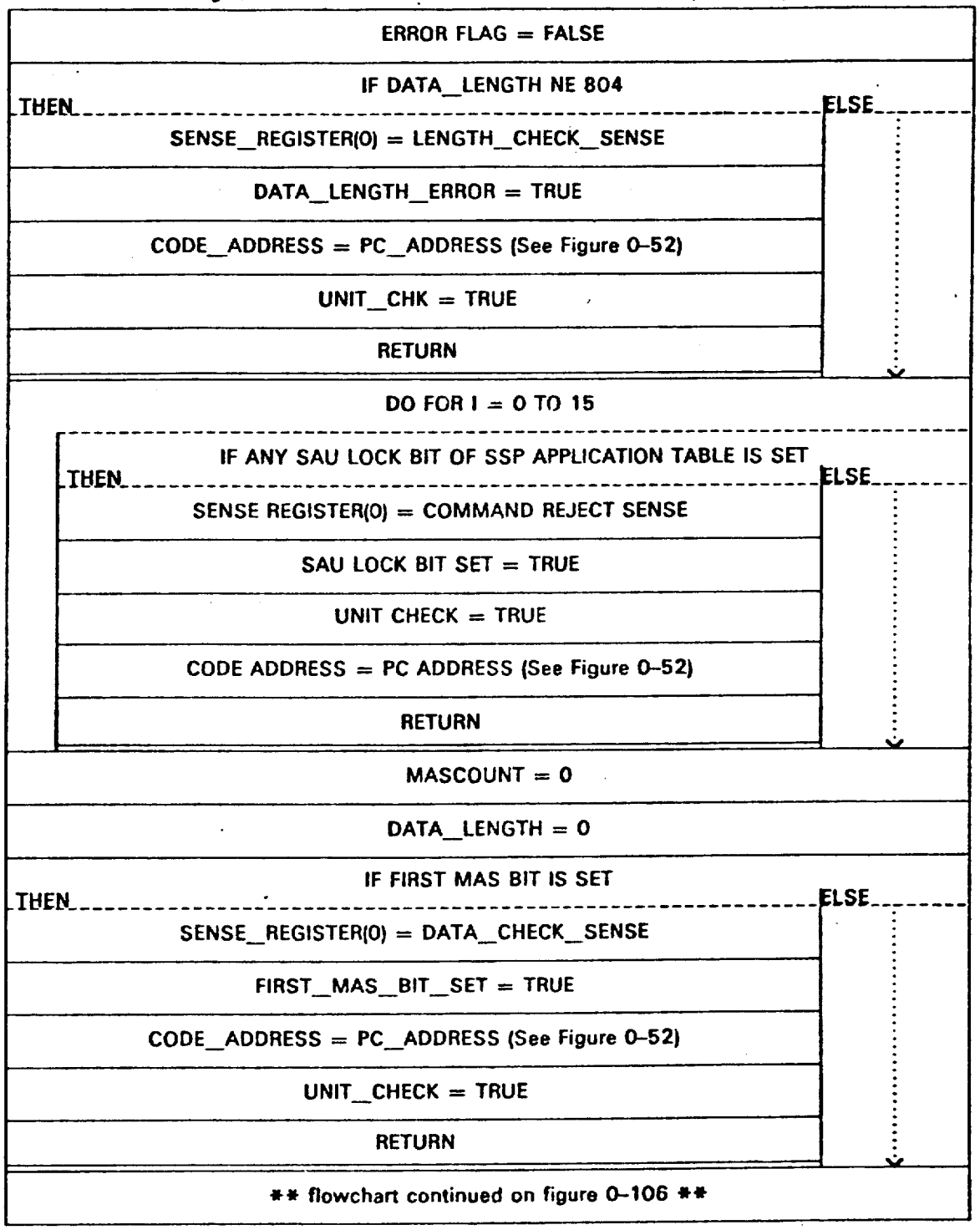
Figure O-105. Flowchart of WRITE SUBSYSTEM IOP NUMBER (Part 1 of 2)

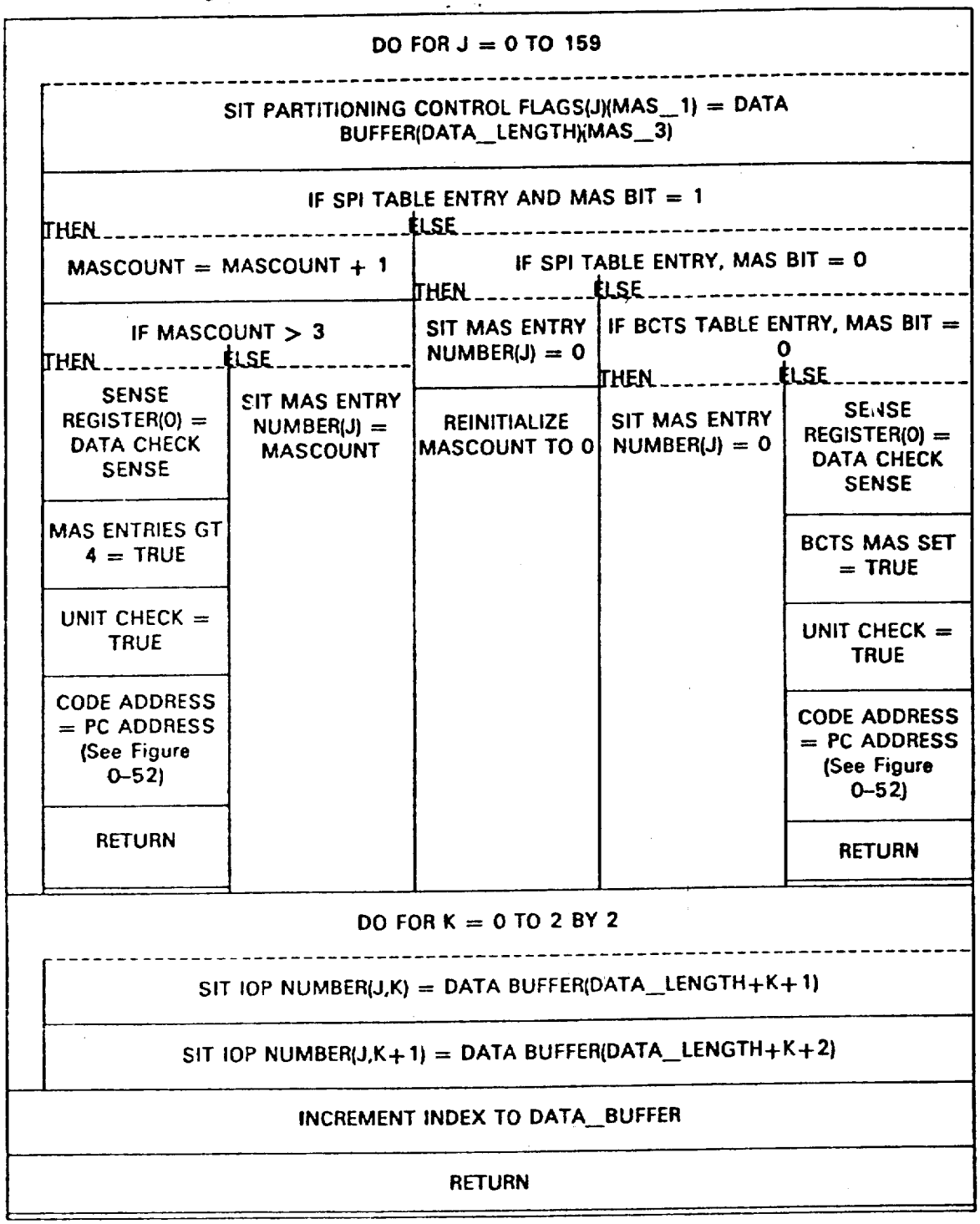
Figure O-106. Flowchart of WRITE SUBSYSTEM IOP NUMBER(Part 2 of 2)

What is claimed is:

1. A central controlling unit, for use with a plurality of data processing systems, none, some, or all of which are capable of being partitioned into a further plurality of separate entities, having the characteristics of a complete data processing system and a plurality of subsystem interface connections, said central controlling unit comprising:

enabling/disabling connection means connected to said plurality of subsystem interface connections for dynamically enabling/disabling, from a central location, said plurality of subsystem interface connections to selected entities and/or systems; and means coupled to said enabling/disabling connection means for maintaining these enabled/disabled interconnections for as long as desired from undesired appropriation; and storage means commonly connected to said enabling/disabling connection means and to said means for maintaining these interconnections, said storage means having residual information stored therein to cause various subsystem interconnections in response to corresponding system command signals.

2. A subsystem access unit which supports subsystem partitioning for multisystems and/or for multiprocessing systems comprising:

enabling/disabling connection means coupled to the interfaces of said subsystems for enabling/disabling said interfaces;

means coupled for receiving one or more command source signals associated with said multisystems and/or said multiprocessing systems to activate said enabling/disabling connection means; and storage means commonly coupled to said enabling/disabling connection means and for receiving said command source signals, said storage means having stored therein resident information to cause various combinations of enabling/disabling interface connections and to enforce the integrity of said command source signals by preventing undesired misappropriation of said subsystems by preventing erroneous enabling/disabling of said subsystem interfaces.

3. A plurality of data processing systems, none, some or all of which are capable of being partitioned into a plurality of separate system entities, each data processing system and/or each entity comprising at least one central processor unit, at least one I/O processor, and at least one memory, at least one peripheral subsystem commonly connected to said plurality of data processing systems and/or said plurality of separate system entities, and a subsystem access unit commonly connected to said plurality of data processing system and/or separate system entities and to said at least one peripheral subsystem to enable/disable communication between the I/O processor of each of said pluralities of data processing systems and/or entities and said peripheral subsystem and to monitor and maintain accessibility/inaccessibility between the I/O processors and said peripheral subsystem.

4. The data processing system as set forth in claim 3 wherein said peripheral subsystem includes switching control means under the control of said subsystem access unit whereby portions of said switching means may be selectively activated/inactivated by said subsystem access unit to thereby provide selective communication between said I/O processors and said peripheral subsystem wherein said peripheral subsystem may be operated on a shared/nonshared basis by said I/O processors.

5. The invention as set forth in claim 4 wherein said system access unit comprises:

(a) a first interface means coupled to said plurality of data processing systems and adapted to receive commands from one or more command sources;

(b) a second interface means connected to the switching control means of the peripheral subsystem; and (c) a microprocessing control system connected between said first and second interface means whereby certain commands received by the command interface provides selected switching control signals at said second interface to activate/deactivate selected switching portions of said switching control means thereby allowing communication between certain I/O processors and selected portions of said peripheral subsystem.

6. The invention as set forth in claim 5 wherein said microprocessing control system includes a plurality of microprocessors, a plurality of serial input/output means and a plurality of parallel input/output means.

7. The invention as set forth in claim 6 wherein said plurality of microprocessors includes a main and a redundant microprocessor which are operated constantly in phase while performing identical operations.

8. The invention as set forth in claim 7 wherein said microprocessing control system further includes a comparing means connected between said main and redundant microprocessors which constantly monitors the output signals of both microprocessors and indicates a miscompare signal whenever said main and redundant microprocessors provide different output signals.

9. The invention as set forth in claim 6 wherein said microprocessing control system includes a pair of serial input/output means associated with each of a plurality of channels.

10. A subsystem access unit for use in conjunction with a, partitionable multisystem and/or a multiprocessing system, wherein each of said multiprocessing systems is capable of being partitioned into a plurality of separate entities, each entity having at least one instruction processor, at least one memory storage unit and at least one input/output processor, at least one peripheral subsystem, wherein said subsystem access unit is coupled to the data processing systems of said multisystem and/or to the entities of said multiprocessing system and includes means for enabling/disabling communication between input/output processors and said common peripheral subsystem, and enforcing exclusive use thereof once the communication link is enabled.

11. The invention as set forth in claim 10 wherein said centralized peripheral subsystem access means comprises:

(a) a plurality of command source interface means coupled to said data processing systems for receiving commands therefrom;

(b) a plurality of enabling/disabling means connected between said input/output means and said peripheral subsystem to providing selective intercommunication therebetween; and (c) a control means coupled to said plurality of command source interfaces and connected to said plurality of enabling/disabling means for monitoring of the status of said enabling/disabling means by providing access to said enabling/disabling means when it is indicated, and for forcibly preventing such access when that is desired.

12. In a plurality of data processing systems, none, some or all of which are capable of being partitioned into one or more separate entities, said data processing system having more than one instruction processing means, more than one memory means, more than one input/output processing means and at least one peripheral subsystem, a centralized control system comprising:
   (a) dynamically enabling/disabling means coupled between the peripheral subsystem means and the remainder of the means of the data processing systems to provide or prevent intercommunication therebetween;
   (b) policing and enforcing means further coupled to said peripheral subsystem means to determine, monitor and maintain the accessibility or inaccessibility of said peripheral subsystem to one or more of said systems or partitionable portions; and
   (c) central control means commonly connected to said data processing system and said peripheral subsystem to provide control for the dynamic enabling/disabling means and for the policing and enforcing means, via external, intelligent message protocols.

13. A centralized controlling system for use with a plurality of data processing systems each of the plurality of data processing systems capable of isolated performance, a peripheral subsystem coupled to said plurality of data processing systems for either shared or non-shared use by the separate ones of said data processing systems, said centralized controlling system comprising:
   enabling/disabling means for dynamically enabling/disabling hardware communication links between the plurality of data processing systems and the peripheral subsystem;
   further means coupled to said enabling/disabling means for policing and enforcing accessibility/inaccessibility of the peripheral subsystem once the enabling/disabling decision has been accomplished; and
   controlling means commonly connected to said enabling/disabling means and said further means for providing this control via external, intelligent message protocols.

14. A subsystem access unit (SAU) for use in a partitionable multiprocessing system, said SAU comprising:
   (a) means for the interface coupling of said SAU to one or more command sources;
   (b) means for the interface coupling of said SAU to one or more shared peripheral interfaces;
   (c) means for the interface coupling of said SAU to one or more serial channel transfer switch interfaces;
   (d) means interconnected to (a), (b) and (c) for receiving information from said command sources, processing same, and therefrom providing switching information via said shared peripheral interfaces and said channel transfer switch interfaces which switching information is capable of not only enabling/disabling communication paths between a plurality of processing systems and a plurality of peripheral devices, but policing and enforcing said enabling/disabling decisions to allow exclusive use of a certain peripheral device by a certain system.

15. A method of dynamically disconnecting and/or exclusively connecting data processing systems and/or partitions/applications of partitionable multiprocessing systems to a peripheral subsystem through the use of the resident information of a subsystem access unit comprising the steps of:
   (a) sending a first identifying request signal from a command source to said subsystem access unit;
   (b) accessing a cabling information table within the resident information stored in said access unit;
   (c) providing the identification of an input/output processor from said cabling information table;
   (d) supplying the application number affected by this identified input/output processor from the input/output processor/application designation table within said stored resident information;
   (e) supplying from a command source/application designation table of said resident information, the interface number assigned to that application;
   (f) comparing the assigned command source interface number with the requesting command source interface number;
   (g) if a mismatch exists, rejecting the request;
   (h) if a match exists, determining if change can be made, using the partitioning status information status and the exclusive use status information;
   (i) if change cannot be made, rejecting the request;
   (j) if change can be made, effecting the change.

16. A method of dynamically changing the application assignments of peripheral units of a shared peripheral subsystem to other application assignments within a multiprocessor system and/or a multisystem by remotely controlling a switching peripheral control unit from a subsystem access unit comprising the steps of:
   (a) sending a command request to said subsystem access unit requesting a particular interface;
   (b) from a cabling information table within said subsystem access unit providing the identification number of the I/O processor making the request;
   (c) using the input/output processor identification number, determine from the I/O processor/application designation table of the resident information which application is affected;
   (d) using the application number, determine from the command source/application designation table of the resident information, the command source interface number assigned to that application number;
   (e) compare this assigned command source interface number with the requesting interface number;
   (f) if a mismatch exists, reject the request;
   (g) if a match exists, determine if a change can be made using the resident information on partitioning and exclusive use status;
   (h) if the change cannot be made, reject the request;
   (i) if the change can be made affect the change.

17. A peripheral subsystem access unit for use in centrally controlling multisystem or multiprocessing system access to shared and non-shared peripheral subsystems comprising:
   a microprocessing means;
   a plurality of serial input/output circuits commonly coupled to said microprocessing means;
   a plurality of parallel input/output circuits also commonly coupled to said microprocessing means;
   a memory means coupled to said microprocessing means;
   an input/output read selector connected to said plurality of serial and parallel input/output circuits;
   a bidirectional data bus interconnected between said microprocessing means, said pluralities of serial and parallel input/output circuits, said memory means and said input/output read selector to provide a communication path therebetween;
   a plurality of shared peripheral interface registers;

a plurality of byte channel transfer switch interface registers; and another data bus interconnected between said pluralities of shared peripheral interface registers and said byte channel transfer switch interface registers and the plurality of parallel input/output circuits to provide a data path therebetween.

18. The peripheral subsystem access unit as set forth in claim 17 wherein the microprocessor includes means for generating a plurality of address signals and a plurality of control signals to supervise control of the signals along the bidirectional data bus.

19. The peripheral subsystem access unit as set forth in claim 18 wherein said plurality of address signals comprise a sixteen (16) bit address signal and said plurality of control signals comprise five (5) control signals.

20. The peripheral subsystem access unit as set forth in claim 19 wherein said five (5) control signals comprise an:
  (a) Instruction fetch cycle signal; a
  (b) Memory operation signal; an
  (c) Input/output operation signal; a
  (d) Read signal and a
  (e) Write signal.

21. The peripheral subsystem access unit as set forth in claim 20 wherein the microprocessor further includes means, using the address and control signals, for reading its program instructions from said memory and further means enabling it to perform the following operations under program control to:
  (a) Read or write each serial input/output register; to
  (b) Read or write each parallel input/output register; to
  (c) Read or write into the memory; and to
  (d) Read data from the input/output read selector.

22. The peripheral subsystem access unit as set forth in claim 17 wherein each serial input/output circuit includes further means enabling it to translate a serial message from a 250K baud interface means into a series of eight bit bytes that can be read by the microprocessor or to translate bytes from the microprocessor into serial data for transmission on the 250K baud interface means.

23. The peripheral subsystem access unit as set forth in claim 17 wherein the interface read selector includes means for allowing the microprocessor to read a plurality of information bytes by doing an input/output operation.

24. The peripheral subsystem access unit as set forth in claim 17 wherein each of said parallel input/output circuits includes two eight (8) bit parallel input/output ports that can be used as input or output means, which ports are used to communicate with the shared peripheral interface registers and the byte channel transfer switching interface registers.

25. The peripheral subsystem access unit as set forth in claim 17 wherein the data bus interconnecting the shared peripheral interface registers, the byte channel switch interface registers and the plurality of parallel input/output circuits further includes:
  (a) means for generating an interface address;
  (b) means for generating write data for the interface registers;
  (c) means for generating a write signal for the interface registers; and
  (d) means to provide a read path for the data from the interface registers.

26. The peripheral subsystem access unit as set forth in claim 25 wherein the generated interface address comprises an eight bit signal capable of selecting an interface register for a read or write operation.

27. The peripheral subsystem access unit as set forth in claim 26 wherein the registers associated with the read path means capable of carrying the data from the interface are read only registers used as data assurance means whose bit status is maintained as an entry in a subsystem interface table in the memory means enabling the microprocessor to use these signals to read or write into the interface registers through the parallel input/output circuits.

28. The peripheral subsystem access unit as set forth in claim 27, wherein the contents of each of these interface registers are used to drive the shared peripheral interfaces and the byte channel transfer switch interfaces.

29. The peripheral subsystem access unit as set forth in claim 17 wherein said microprocessing means includes a further memory means.

30. The peripheral subsystem access unit as set forth in claim 17 wherein the memory means includes an error correction means.

31. The peripheral subsystem access unit as set forth in claim 30 wherein the memory error correction means is accomplished by means capable of error correction whenever reference is made to the information resident therein.

32. The peripheral subsystem access unit as set forth in claim 17 wherein further means are included for reading information from the byte channel transfer switch interface registers which indicates the enable/disable status of the interface channel.

33. The peripheral subsystem as set forth in claim 17 wherein further means are included for reading information from the shared peripheral interface registers which indicates the enable/disable status of that interface.

34. The peripheral device as set forth in claim 9 wherein the pair of serial input/output means associated with each of a plurality of channels are interconnected in a manner to provide a redundant path for comparison by the microprocessor on incoming messages and to further provide a turnaround path for comparison by the microprocessor on outgoing messages and thereby accomplish an error checking function.

* * * * *

UNITED STATES PATENT AND TRADEMARK OFFICE
CERTIFICATE OF CORRECTION

PATENT NO. : 4,484,270

DATED : November 20, 1984

INVENTOR(S) : John M. Quernemoen, Timothy R. Voltz, Richard P. Campbell, Joseph G. Krischunas It is certified that error appears in the above–identified patent and that said Letters Patent are hereby corrected as shown below:

Column 226, Line 62, "to" should be -- for -- .

Signed and Sealed this

Sixteenth Day of April 1985

[SEAL]

Attest:

DONALD J. QUIGG

Attesting Officer

Acting Commissioner of Patents and Trademarks